United States Patent
Fuchs et al.

(10) Patent No.: US 11,501,434 B2
(45) Date of Patent: Nov. 15, 2022

(54) DEEP MULTI-MAGNIFICATION NETWORKS FOR MULTI-CLASS IMAGE SEGMENTATION

(71) Applicant: MEMORIAL SLOAN KETTERING CANCER CENTER, New York, NY (US)

(72) Inventors: Thomas Fuchs, New York, NY (US); David Joon Ho, New York, NY (US)

(73) Assignee: MEMORIAL SLOAN KETTERING CANCER CENTER, New York, NY (US)

( * ) Notice: Subject to any disclaimer, the term of this patent is extended or adjusted under 35 U.S.C. 154(b) by 8 days.

(21) Appl. No.: 17/062,340

(22) Filed: Oct. 2, 2020

(65) Prior Publication Data

US 2021/0133966 A1  May 6, 2021

Related U.S. Application Data

(60) Provisional application No. 62/909,401, filed on Oct. 2, 2019.

(51) Int. Cl.
*G06T 7/00* (2017.01)
*G06N 3/04* (2006.01)
(Continued)

(52) U.S. Cl.
CPC .......... *G06T 7/0012* (2013.01); *G06K 9/6256* (2013.01); *G06N 3/0454* (2013.01);
(Continued)

(58) Field of Classification Search
CPC ......... G06T 7/0012; G06T 7/11; G06T 19/00; G06T 2207/30068; G06T 2219/004; G06V 10/25; G06K 9/6256; G06N 3/0454
See application file for complete search history.

(56) References Cited

U.S. PATENT DOCUMENTS

| 2007/0036402 A1* | 2/2007 | Cahill | G06T 7/0012 |
| | | | 382/128 |
| 2014/0064581 A1* | 3/2014 | Madabhushi | G06V 20/698 |
| | | | 382/128 |

(Continued)

OTHER PUBLICATIONS

Ye G, Ruan J, Wu C, Zhou J, He S, Wang J, Zhu Z, Yue J, Zhang Y. Multitask classification of breast cancer pathological images using se-densenet. In2019 Eleventh International Conference on Advanced Computational Intelligence (ICACI) Jun. 7, 2019 (pp. 173-178). IEEE. (Year: 2019).*

(Continued)

*Primary Examiner* — Bobbak Safaipour
*Assistant Examiner* — Duy Tran
(74) *Attorney, Agent, or Firm* — Foley & Lardner LLP

(57) ABSTRACT

Described herein are Deep Multi-Magnification Networks (DMMNs). The multi-class tissue segmentation architecture processes a set of patches from multiple magnifications to make more accurate predictions. For the supervised training, partial annotations may be used to reduce the burden of annotators. The segmentation architecture with multi-encoder, multi-decoder, and multi-concatenation outperforms other segmentation architectures on breast datasets, and can be used to facilitate pathologists' assessments of breast cancer in margin specimens.

21 Claims, 136 Drawing Sheets

(51) Int. Cl.
  *G06T 19/00* (2011.01)
  *G06T 7/11* (2017.01)
  *G06K 9/62* (2022.01)
  *G06K 9/32* (2006.01)
  *G06V 10/25* (2022.01)

(52) U.S. Cl.
  CPC ............... *G06T 7/11* (2017.01); *G06T 19/00* (2013.01); *G06V 10/25* (2022.01); *G06T 2207/30068* (2013.01); *G06T 2219/004* (2013.01)

(56) References Cited

U.S. PATENT DOCUMENTS

2018/0218502 A1* 8/2018 Golden .................... G06N 3/08
2018/0315193 A1* 11/2018 Paschalakis ......... G06K 9/6269
2019/0205758 A1* 7/2019 Zhu ..................... G06K 9/6256

OTHER PUBLICATIONS

Feng Gu et al: "Multi-Resolution Networks for Semantic Segmentation in Whole Slide Images", arxiv.org, Cornell University Library, 201 Olin Library Cornell University Ithaca, NY 14853, Jul. 25, 2018 (Jul. 25, 2018), XP081253653.

International Search Report and Written Opinion on PCT PCT/US2020/054102 dated Jan. 15, 2021.

John-Melle Bokhorst et al: "Learning from sparsely annotated data for semantic segmentation in histopathology images", Proceedings of Machine Learning Research, Jul. 1, 2019 (Jul. 1, 2019), pp. 84-91, XP055760218.

Tokunaga Hiroki et al: "Adaptive Weighting Multi-Field-of-View CNN for Semantic Segmentation in Pathology", 2019 IEEE/CVF Conference on Computer Vision and Pattern Recognition (CVPR), IEEE, Jun. 15, 2019 (Jun. 15, 2019), pp. 12589-12598, XP033686373.

* cited by examiner

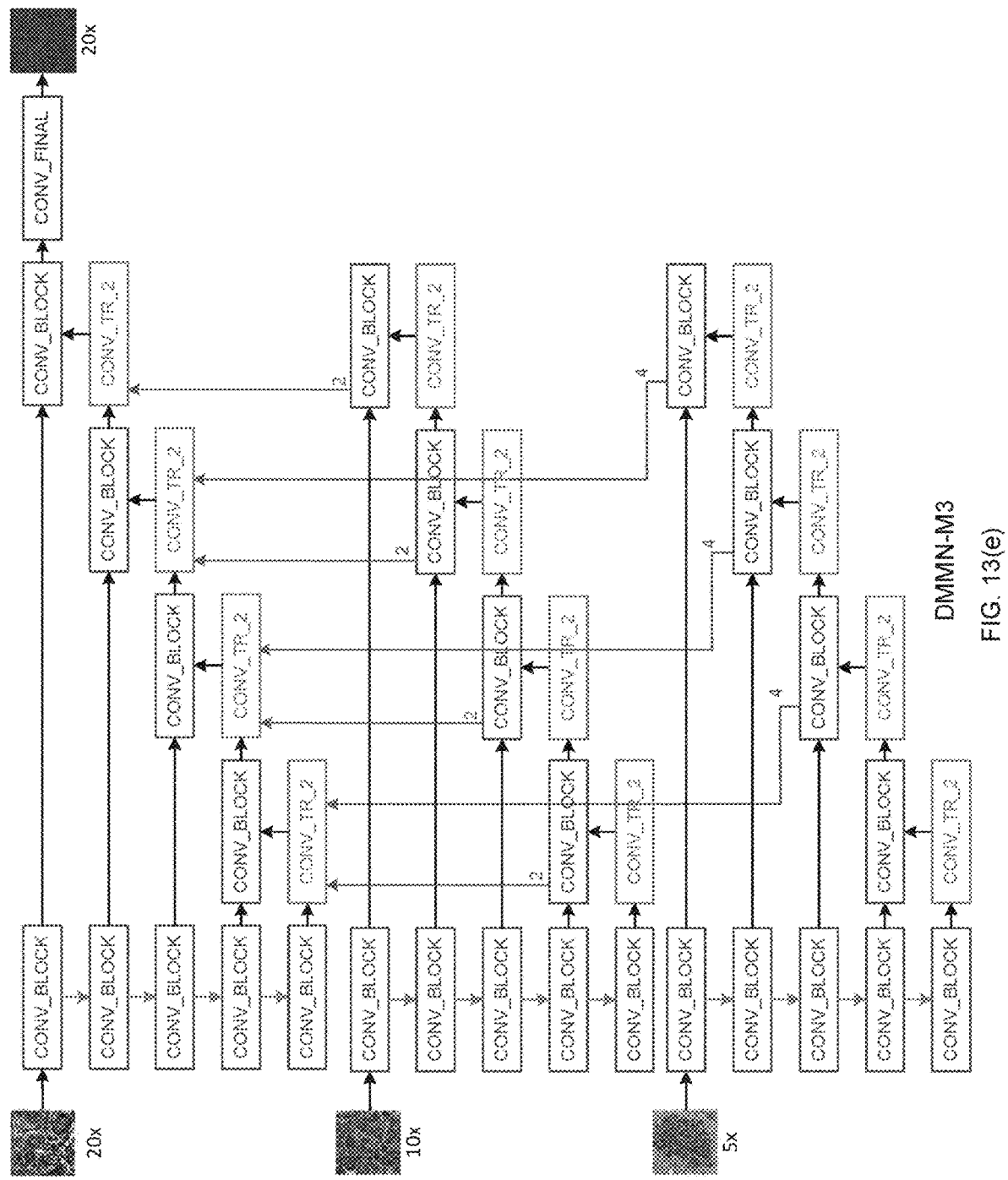
FIG. 13(e) DMMN-M3

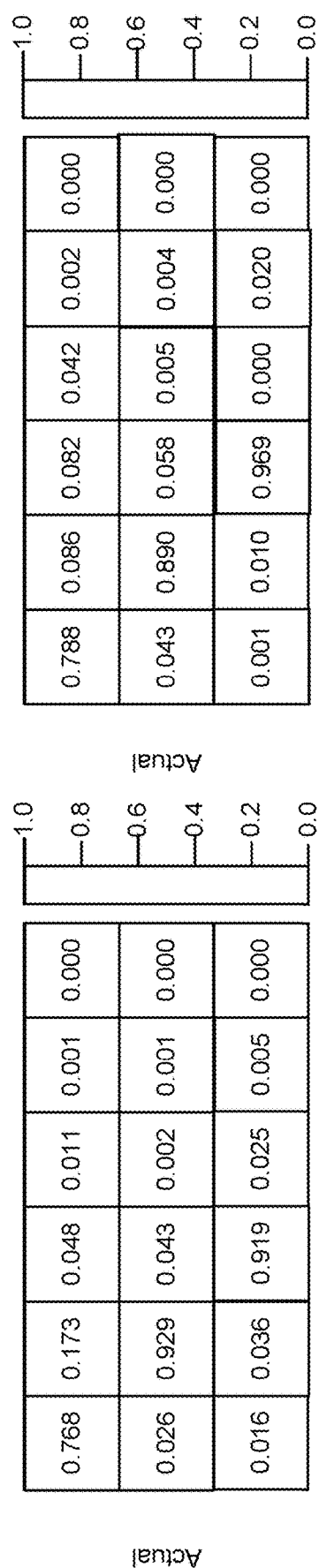
FIG. 19(a) SegNet
FIG. 19(b) U-Net

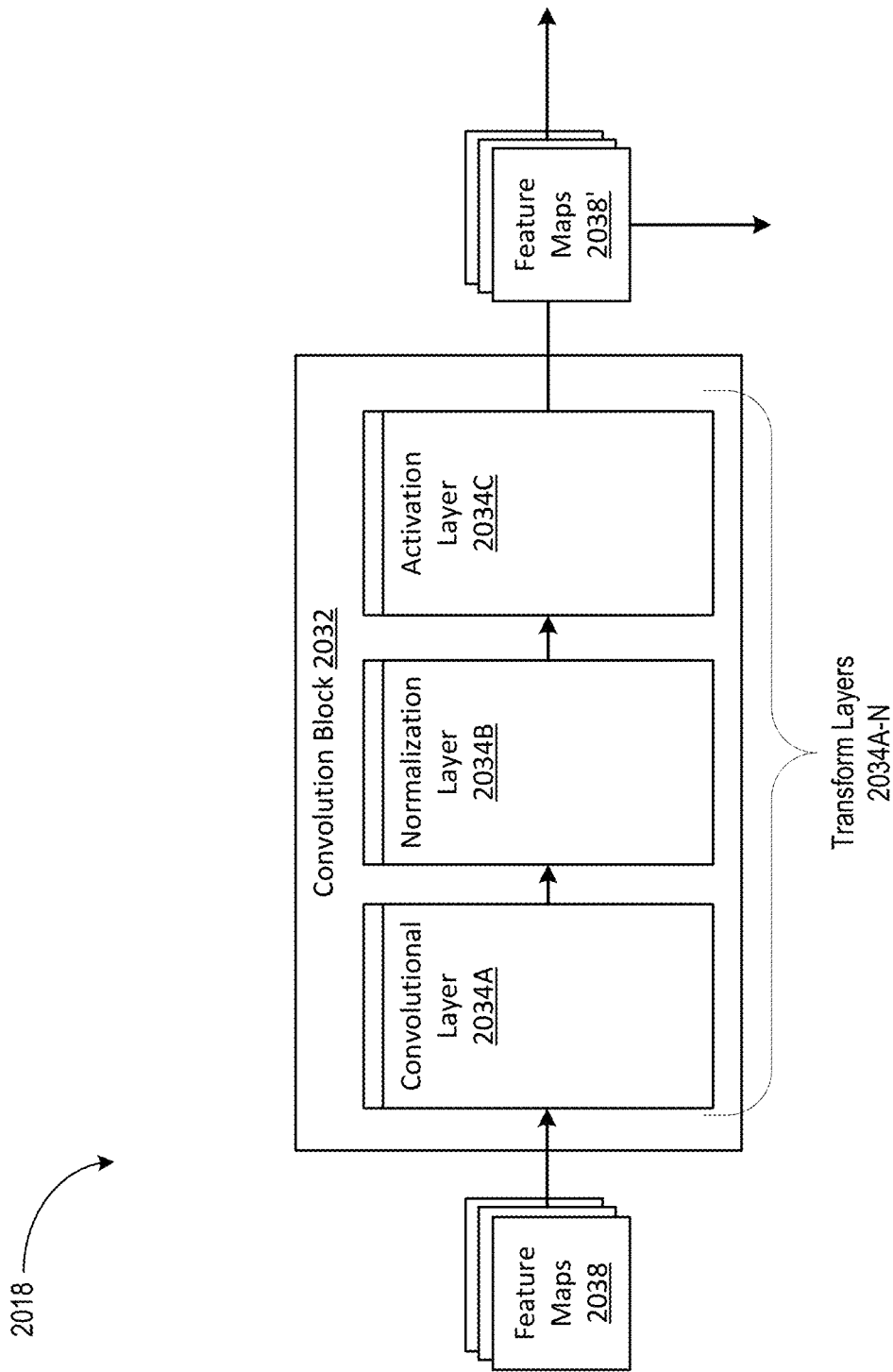

DEEP MULTI-MAGNIFICATION NETWORKS FOR MULTI-CLASS IMAGE SEGMENTATION

CROSS REFERENCE TO RELATED APPLICATIONS

The present application claims the benefit of priority under 35 U.S.C. § 119(e) to U.S. Provisional Patent Application 62/909,401, titled "Deep Multi-Magnification Networks for Multi-Class Breast Cancer Image Segmentation," filed Oct. 2, 2019, which is incorporated by reference in its entirety.

BACKGROUND

Computer vision algorithms may be used to recognize and detect various features on digital images. Detection of features on a biomedical image may consume a significant amount of computing resources and time, due to the potentially enormous resolution and size of biomedical images.

SUMMARY

Breast cancer is one of the most common cancers for women in the United States. Analyzing the margin status of surgical procedures is important to evaluate surgery performance and implicates future treatment for breast cancer patients. Analysis of tissue is performed manually by pathologists reviewing glass slides with the margins of interest. Digital pathology has provided means to digitize the glass slides and generate whole slide images. Computational pathology enables whole slide images to be automatically analyzed to assist pathologists, especially with the advancement of deep learning. The whole slide images generally contain giga-pixels of data, so it is impractical to process the images at the whole-slide-level. Most of the current deep learning techniques process the images at the patch-level, but they may produce poor results by looking at individual patches with a narrow field-of-view at a single magnification.

Presented herein are Deep Multi-Magnification Networks (DMMNs) to resemble how pathologists look at slides with their microscopes. The multi-class tissue segmentation architecture processes a set of patches from multiple magnifications to make more accurate predictions. For the supervised training, partial annotations may be used to reduce the burden of annotators. The segmentation architecture with multi-encoder, multi-decoder, and multi-concatenation outperforms other segmentation architectures on breast datasets, and can be used to facilitate pathologists' assessments of breast cancer in margin specimens.

At least one aspect of the present disclosure is directed to systems and methods of segmenting biomedical images using multi-magnification encoder-decoder concatenation networks. A computing system having one or more processors may identify a biomedical image derived from a histopathological image preparer. The biomedical image may be divided into a plurality of tiles. Each tile of the plurality of tile may correspond to a portion of the biomedical image. The computing system may create a plurality of patches from at least one tile of the plurality of tiles of the biomedical image using a corresponding plurality of magnification factors. The plurality of patches may have: a first patch of a first magnification factor of the plurality of magnification factors, a second patch of a second magnification factor of the plurality of magnification factors, and a third patch of a third magnification factor of the plurality of magnification factors.

Additionally, the computing system may apply a segmentation model to the plurality of patches from the at least one tile. The segmentation model may include a plurality of networks for the corresponding plurality of magnification factors. The plurality of networks may include a first network for patches of the first magnification factor. The first network may have a first set of encoders and a first set of decoders to transform the first patch into a first set of feature maps of the first magnification factor. Each decoder of the first set may have a concatenator to combine feature maps from successive networks. The plurality of networks may include a second network for patches of the second magnification factor. The second network may have a second set of encoders and a second set of decoders to transform the second patch into a second set of feature maps of the first magnification factor. Each encoder of the second set may feed output feature maps to the concatenator of a corresponding decoder of the first set in the first network. The plurality of networks may include a third network for patches of the third magnification factor. The third network may have a third set of encoders and a third set of decoders to transform the second patch into a third set of feature maps of the third magnification factor. At least one of the encoders of the third set may feed output feature maps to the concatenator of the corresponding decoder of the first set in the first network. The computing system may generate a segmented tile corresponding to the at least one tile of the first magnification factor using the first set of feature maps outputted by the first network of the plurality of networks of the segmentation model.

At least one aspect of the present disclosure is directed to training multi-magnification encoder-decoder concatenation networks for segmenting biomedical images. A computing system having one or more processors may identify a training dataset. The training dataset may include a sample biomedical image derived from a histopathological image preparer. The sample biomedical image may be divided into a plurality of tiles. Each tile of the plurality of tile may correspond to a portion of the sample biomedical image. The sample biomedical image may have a region of interest. The training dataset may include an annotation labeling a portion of the region of interest. The annotation may indicate that at least the portion of region of interest within the sample biomedical image is to be segmented. The computing system may create a plurality of patches from each tile of the plurality of tiles of the sample biomedical image using a corresponding plurality of magnification factors. The plurality of patches may have a first patch of a first magnification factor of the plurality of magnification factors, a second patch of a second magnification factor of the plurality of magnification factors, and a third patch of a third magnification factor of the plurality of magnification factors.

Additionally, the computing system may apply a segmentation model to the plurality of patches from the at least one tile. The segmentation model may include a plurality of networks for the corresponding plurality of magnification factors. The plurality of networks may include a first network for patches of the first magnification factor. The first network may have a first set of encoders and a first set of decoders to transform the first patch into a first set of feature maps of the first magnification factor. Each decoder of the first set may have a concatenator to combine feature maps from successive networks. The plurality of networks may include a second network for patches of the second magnification factor. The second network may have a second set of encoders and a second set of decoders to transform the second patch into a second set of feature maps of the first magnification factor. Each encoder of the second set may feed output feature maps to the concatenator of a corresponding decoder of the first set in the first network. The plurality of networks may include a third network for patches of the third magnification factor. The third network may have a third set of encoders and a third set of decoders to transform the second patch into a third set of feature maps of the third magnification factor.

Furthermore, the computing system may generate a segmented biomedical image using the first set of feature maps outputted by the first network of the plurality of networks of the segmentation model over the plurality of tiles of the biomedical image. The computing system may determine an error metric between the segmented biomedical image and the sample biomedical image based on the annotation labeling the portion of the region of interest in the sample biomedical image. The computing system may modify at least one parameter in the plurality of networks of the segmentation model based on the error metric.

At least one aspect of the present disclosure is directed to systems and methods of segmenting biomedical images. A computing system having one or more processors may identify, for at least one tile of a biomedical image, a first patch at a first magnification factor and a second patch at a second magnification factor. The computing system may apply a trained segmentation model to the first patch and the second patch to generate a segmented tile. The trained segmentation model may include a plurality of networks. The plurality of networks may include a first network to generate a plurality of first feature maps using the first patch at the first magnification factor. The plurality of networks may include a second network to generate a second feature map using the second patch at the second magnification factor and the one or more first feature maps from the first network. The computing system may store the segmented tile identifying a region of interest within the at least one tile of the biomedical image.

In some embodiments, the plurality of networks of the segmentation model may include a third network. The third network may generate a plurality of third feature maps using a third patch of the at least one tile at a third magnification factor. The third network may provide the plurality of third feature maps to a corresponding plurality of decoders of the second network to generate the second feature map.

In some embodiments, the second network may include a plurality of decoders arranged across a corresponding plurality of columns. Each of the plurality of decoders may process a corresponding feature map of the plurality of first maps from the first network. In some embodiments, the first network may include a plurality of encoders arranged across a corresponding plurality of columns. Each of the plurality of encoders may provide a corresponding feature map of the plurality of first networks to a respective decoder in the second network. In some embodiments, the second network may include a plurality of concatenators to combine the plurality of first feature maps from the first network with a corresponding plurality of intermediate feature maps in generating the second feature map.

In some embodiments, the computing system may generate a segmented biomedical image using a plurality of segmented tiles from applying the segmentation model applied to a plurality of patches at corresponding plurality of magnification factors. Each patch may be identified from a corresponding tile of the plurality of tiles of the biomedical image. In some embodiments, the computing system may obtain the biomedical image derived from a histopathological image preparer. The biomedical image may be divided into a plurality of tiles. Each tile of the plurality of tile corresponding to a portion of the biomedical image.

At least one aspect of the present disclosure is directed to systems and methods of training networks for segmenting biomedical images. A computing system having one or more processors may identify a training dataset. The training dataset may include at least one sample tile from a sample biomedical image. The sample biomedical image biomedical image may have a region of interest. The training dataset may include an annotation labeling at least a portion of the region of interest. The annotation may indicate that at least the portion of region of interest within the at least one sample tile. The computing system may generate, for the at least one sample tile of the sample biomedical image, a first patch at a first magnification factor and a second patch at a second magnification factor. The computing system may train a segmentation model using the first patch, the second patch, and the annotation of the at least one sample tile. The segmentation model may include a plurality of networks. The plurality of networks may include a first network to generate a plurality of first feature maps using the first patch at the first magnification factor. The plurality of networks may include a second network to generate a second feature map using the second patch at the second magnification factor and the one or more first feature maps from the first network. A segmented tile corresponding to the second feature map may be compared to the annotation.

In some embodiments, the computing system may train the segmentation model by determining an error metric between the segmented tile and the sample tile based on the annotation labeling the portion of region of interest. In some embodiments, the computing system may train the segmentation model by updating at least one parameter in the plurality of networks of the segmentation model using the error metric.

In some embodiments, the plurality of networks of the segmentation model may include a third network. The third network may generate a plurality of third feature maps using a third patch of the at least one tile at a third magnification factor. The third network may provide the plurality of third feature maps to a corresponding plurality of decoders of the second network to generate the second feature map.

In some embodiments, the second network may include a plurality of decoders arranged across a corresponding plurality of columns. Each of the plurality of decoders may process a corresponding feature map of the plurality of first maps from the first network. In some embodiments, the first network may include a plurality of encoders arranged across a corresponding plurality of columns. Each of the plurality of encoders may provide a corresponding feature map of the plurality of first networks to a respective decoder in the second network.

In some embodiments, the second network may include a plurality of concatenators to combine the plurality of first feature maps from the first network with a corresponding plurality of intermediate feature maps in generating the second feature map. In some embodiments, the annotation of the training dataset may label the portion less than an entirety of the region of interest within the sample biomedical image. The annotation may be separated from an edge of the entirety of the region of interest.

In some embodiments, the computing system may generate a segmented biomedical image using a plurality of segmented tiles from applying the segmentation model applied to a plurality of patches at corresponding plurality of magnification factors. Each patch may be identified from a corresponding tile of the plurality of tiles of the sample biomedical image. In some embodiments, the sample biomedical image may be derived from a histopathological image preparer. The sample biomedical image may be divided into a plurality of tiles. Each tile of the plurality of tile may correspond to a portion of the sample biomedical image.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 6(a)-(l). Segmentation predictions on the TNBC dataset. (a)-(f) are thumbnail versions of a whole slide image and (g)-(l) are zoom-in images with size of 1024×1024 pixels in magnification of 10×. (a) and (g) are original image, (b) and (h) are partial annotations, (c) and (i) are segmentation predictions using the Single-Encoder Single Decoder (SESD) architecture, (d) and (j) are segmentation predictions using the Multi-Encoder Single Decoder (MESD) architecture, (e) and (k) are segmentation predictions using the Multi-Encoder Multi-Decoder Single-Concatenation (MEMDSC) architecture, and (f) and (l) are segmentation predictions using the Multi-Encoder Multi-Decoder Multi-Concatenation (MEMDMC) architecture.

FIGS. 8(a)-(l). Segmentation predictions on the breast margin dataset. (a)-(f) are thumbnail versions of a whole slide image and (g)-(l) are zoom-in images with size of 1024×1024 pixels in magnification of 10×. (a) and (g) are original image, (b) and (h) are exhaustive annotations, (c) and (i) are segmentation predictions using the Single-Encoder Single Decoder (SESD) architecture, (d) and (j) are segmentation predictions using the Multi-Encoder Single Decoder (MESD) architecture, (e) and (k) are segmentation predictions using the Multi-Encoder Multi-Decoder Single-Concatenation (MEMDSC) architecture, and (f) and (l) are segmentation predictions using the Multi-Encoder Multi-Decoder Multi-Concatenation (MEMDMC) architecture.

FIG. 13(a)-(e). CNN architectures for multi-class tissue segmentation of a Deep Single-Magnification Network (DSMN) in (a) utilizing a patch from a single magnifications and Deep Multi-Magnification Networks (DMMNs) in (b-e) utilizing multiple patches in various magnifications. (a) U-Net is used as the DSMN architecture. (b) Single-Encoder Single-Decoder (DMMN-S2) is a DMMN architecture where multiple patches are concatenated and used as an input to the U-Net architecture. (c) Multi-Encoder Single-Decoder (DMMN-MS) is a DMMN architecture having only one decoder. (d) Multi-Encoder Multi-Decoder Single-Concatenation (DMMN-M2S) is a DMMN architecture where feature maps from multiple magnifications are only concatenated at the final layer. (e) The proposed Multi-Encoder Multi-Decoder Multi-Concatenation (DMMN-M3) is a DMMN architecture where feature maps are concatenated during intermediate layers to enrich feature maps in the decoder of the highest magnifications.

FIGS. 19(a)-19(f). Confusion matrices evaluating carcinoma, benign epithelial, and stroma segmentation on Dataset-II based on two Deep Single-Magnification Networks (DSMNs), SegNet and U-Net, and four Deep Multi-Magnification Networks (DMMNs), Single-Encoder Single-Decoder (DMMN-S2), Multi-Encoder Single-Decoder (DMMN-MS), Multi-Encoder Multi-Decoder Single-Concatenation (DMMN-M2S), and the proposed Multi-Encoder Multi-Decoder Multi-Concatenation (DMMN-M3). Necrotic, adipose, and background are excluded from the evaluation on Dataset-II due to the lack of pixels being evaluated.

DETAILED DESCRIPTION

Figure 1A:
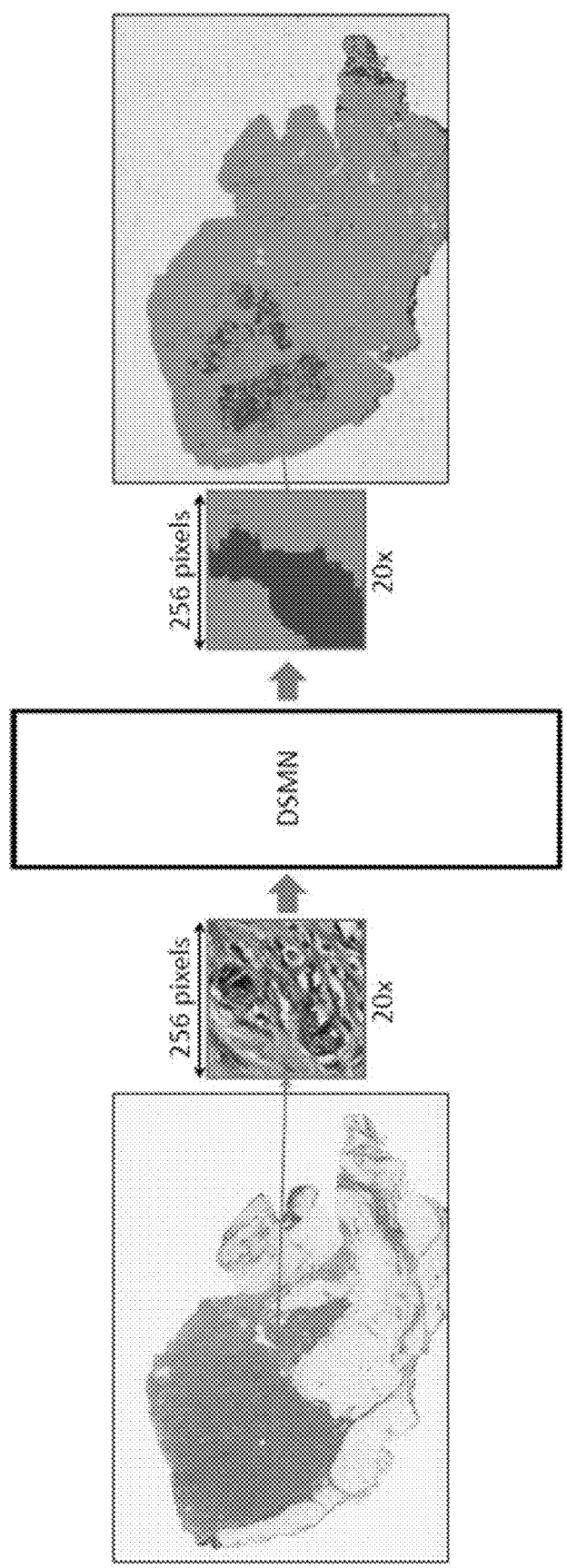
FIGS. 1(a) and 1(b). Comparison between a Deep Single-Magnification Network (DSMN) and a Deep Multi-Magnification Network (DMMN). (a) A Deep Single-Magnification Network only look at a patch from a single magnification with limited field-of-view. (b) A Deep Multi-Magnification Network can look at a set of patches from multiple magnifications to have wider field-of-view.

Following below are more detailed descriptions of various concepts related to, and embodiments of, systems and methods for segmenting biomedical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a first approach for deep multi-magnification networks for multi-class breast cancer image segmentation.

Section B describes a second approach for deep multi-magnification networks for multi-class breast cancer image segmentation.

Section C describes systems and methods for segmenting biomedical images using multi-magnification, multi-encoder, multi-decoder, and multi-concatenation networks.

Section D describes a network environment and computing environment which may be useful for practicing various computing related embodiments described herein.

A. First Approach for Deep Multi-Magnification Networks for Multi-Class Breast Cancer Image Segmentation

I. Introduction

Breast carcinoma is the most common cancer to be diagnosed and the second leading cause of cancer death for women in the United States. Approximately 12% of women in the United States will be diagnosed with breast cancer during their lifetime. Patients with early-stage breast cancer often undergo breast-conserving surgery, or lumpectomy, which removes a portion of breast tissue containing the cancer. Lumpectomy, which is usually combined with adjuvant radiotherapy, has been shown to be equivalent to mastectomy in terms of survival, with improved cosmetic outcomes. During surgery, it is the goal of the surgeon to remove the entire cancerous tumor as well as a rim of benign tissue surrounding the tumor. A common method for evaluating surgical margins for lumpectomy specimens involves the surgeon excising additional segments of tissue from the wall of the lumpectomy cavity after the main lump containing the cancer has been removed. This "cavity shave" method, which allows the surgeon to designate the specific margins intraoperatively, has been associated with lower rates of positive margins (tumor present at inked margin) and lower rates of re-excisions. To determine the completeness of the surgical excision, the edges of the lumpectomy specimen, or margins, are evaluated microscopically by a pathologist. Achieving negative margins (no cancer found touching the margins) is important to minimize the risk of local recurrence of the cancer. Pathologic analysis of margin specimens involves the pathologist reviewing roughly 20-40 histologic slides per case, and this process can be time-consuming and tedious. With the increasing capabilities of digitally scanning histologic glass slides, computational pathology approaches could potentially improve the efficiency and accuracy of this process by evaluating whole slide images (WSIs) of margin specimens. Ultimately, accurate analysis of margins by the pathologist is critical for determining the need for additional surgery.

Various approaches have been used to analyze WSI. Most models include localization, detection, classification, and segmentation of objects (i.e. histologic features) in digital slides. Histopathologic features include pattern based identification, such as nuclear features, cellular/stromal architecture, or texture. Computational pathology has been used in nuclei segmentation to extract nuclear features such as size, shape, and relationship between them. Nuclei segmentation is done by adaptive thresholding and morphological operations to find regions where nuclei density is high. A breast cancer grading method can be developed by gland and nuclei segmentation using a Bayesian classifier and structural constraints from domain knowledge. To segment overlapping nuclei and lymphocytes, an integrated active contour based on region, boundary, and shape may be presented. These nuclei-segmentation-based approaches are challenging because shapes of nuclei and structures of cancer regions may have large variations in the tissues captured in the WSIs.

Deep learning a type of machine learning, may be used for automatic image analysis due to the availability of a large training dataset and the advancement of graphics processing units (GPUs). Deep learning models composed of deep layers with non-linear activation functions enable to learn more sophisticated features. Especially, convolutional neural networks (CNNs) learning spatial features in images have shown outstanding achievements in image classification, object detection, and semantic segmentation. Fully Convolutional Network (FCN) may be used for semantic segmentation, also known as pixelwise classification, can understand location, size, and shape of objects in images. FCN is composed of an encoder and a decoder, where the encoder extracts low-dimensional features of an input image and the decoder utilizes the low-dimensional features to produce segmentation predictions. Semantic segmentation has been used on medical images to automatically segment biological structures. For example, U-Net is used to segment cells in microscopy images. U-Net architecture has concatenations transferring feature maps from an encoder to a decoder to preserve spatial information. This architecture has shown more precise segmentation predictions on biomedical images.

Deep learning may be used in the computational pathology community. Investigators have shown automated identification of invasive breast cancer detection in WSIs by using a simple 3-layer CNN. A method of classifying breast tissue slides to invasive cancer or benign by analyzing stroma regions may include using CNNs. A multiple-instance-learning-based CNN achieves 100% sensitivity where the CNN is trained by 44,732 WSIs from 15,187 patients. The availability of public pathology datasets contributes to develop many deep learning approaches for computational pathology. For example, a breast cancer dataset to detect lymph node metastases was released for the CAMELYON challenges and several deep learning techniques to analyze breast cancer datasets are developed.

One challenge of using deep learning on WSIs is that the size of a single, entire WSI is too large to be processed into GPUs. Images can be downsampled to be processed by pretrained CNNs, but critical details needed for clinical diagnosis in WSIs would be lost. To solve this, patch-based approaches are generally used instead of slide-level approaches. Here, patches are extracted from WSIs to be processed by CNNs. A patch-based process followed by a multi-class logistic regression to classify in slide-level may be used. The winner of the CAMELYON16 challenge uses the Otsu thresholding technique to extract tissue regions and trains a patch-based model to classify tumor and non-tumor patches. To increase the performance, class balancing between tumor and non-tumor patches and data augmentation techniques such as rotation, flip, and color jittering may be used. The winner of the CAMELYON17 challenge additionally develops patch-overlapping strategy for more accurate predictions. A patch may be processed with an additional larger patch including border regions in the same magnification to segment subtypes in breast WSIs. Alternatively, Representation-Aggregation CNNs to aggregate features generated from patches in WSIs are developed to share representations between patches. Patch-based approaches are not realistic because (1) pathologists do not look at slides in patch-level with a narrow field-of-view and (2) they switch zoom levels frequently to see slides in multiple magnifications to accurately analyze them.

Figure 1B:
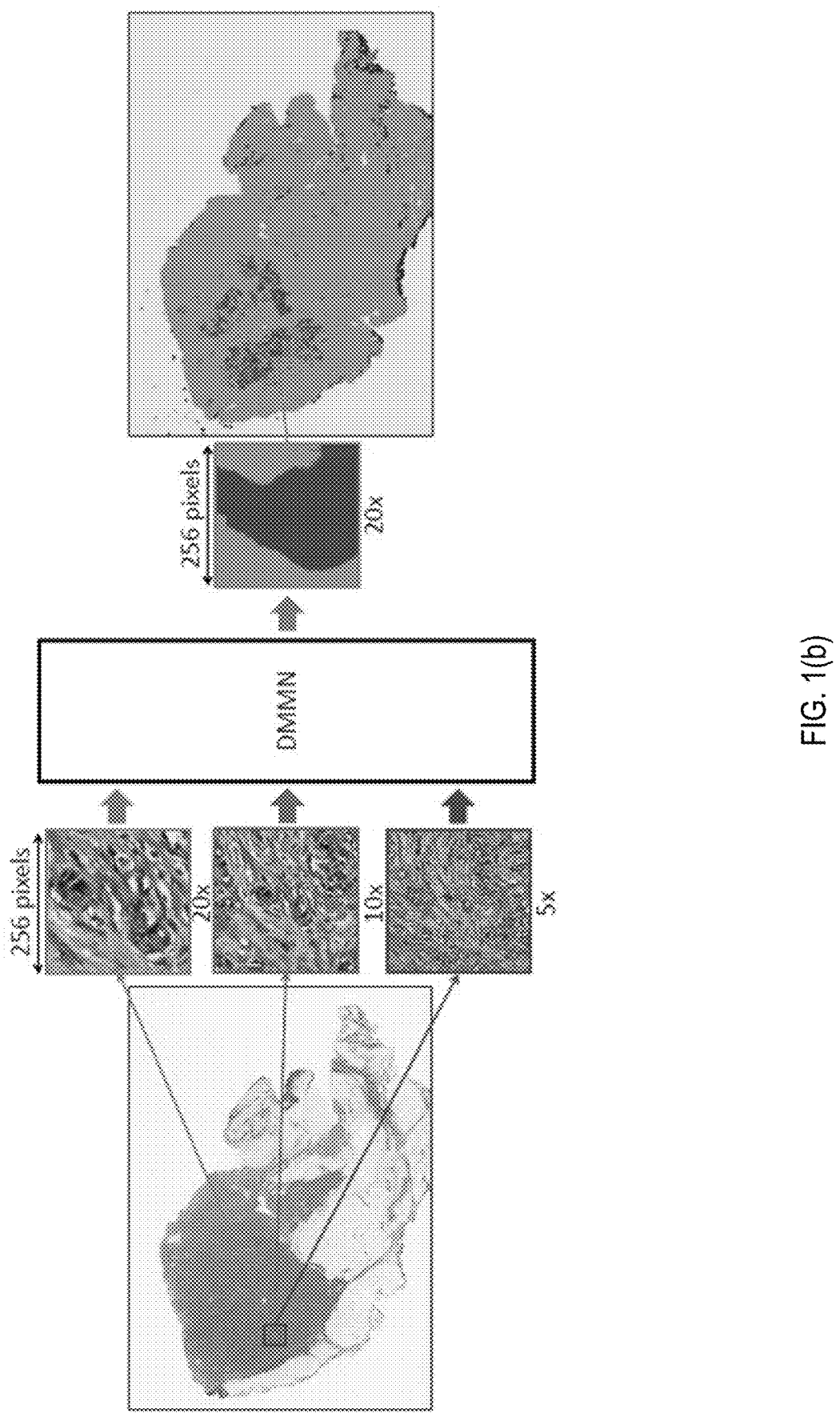

To develop more realistic CNNs, it is required to input a set of patches in multiple magnifications to increase the field-of-view and provide more information from other magnifications. FIG. 1 shows the difference between a Deep Single-Magnification Network (DSMN) and a Deep Multi-Magnification Network (DMMN). An input to a DSMN in FIG. 1(a) is a single patch with size of 256×256 pixels in a single magnification of 20× which limits a field-of-view. An input to a DMMN in FIG. 1(b) is a set of patches with size of 256×256 pixels in multiple magnifications in 20×, 10×, and 5× allowing a wider field-of-view. DMMN can mimic how pathologists look at slides using a microscope by providing multiple magnifications in a wider field-of-view and this can produce more accurate analysis.

There are several approaches using multiple magnifications to analyze whole slide images. A binary segmentation CNN may be used to segment tumor regions in the CAM-ELYON dataset. In this work, four encoders for different magnifications are implemented but only one decoder is used to generate the final segmentation predictions. A CNN architecture composed of three expert networks for different magnifications, a weighting network to automatically select weights to emphasize specific magnifications based on input patches, and an aggregating network to produce final segmentation predictions may also be used. Here, intermediate feature maps are not shared between the three expert networks which can limit utilizing feature maps from multiple magnifications.

In the present disclosure, presented is a Deep Multi-Magnification Network (DMMN) to accurately segment multiple subtypes in images of breast tissue, with the goal to identify breast cancer found in margin specimens. An DMMN architecture has multiple encoders, multiple decoders, and multiple concatenations between decoders to have richer feature maps in intermediate layers. To train the DMMN, WSIs may be partially annotate WSIs to reduce the burden of annotations. The DMMN model trained by the partial annotations can learn not only features of each subtype, but also morphological relationship between subtypes, which leads to outstanding segmentation performance. The multi-magnification model is tested on two breast datasets and observe that the model consistently outperforms other architectures. This method can be used to automatically segment cancer regions on breast margin images to assist in diagnosis of patients' margin status and to decide future treatments. Deep Multi-Magnification Networks may be developed to combine feature maps in various magnification for more accurate segmentation predictions, and partial annotations may be used to save annotation time for pathologists and still achieve high performance.

II. Method

Figure 2:
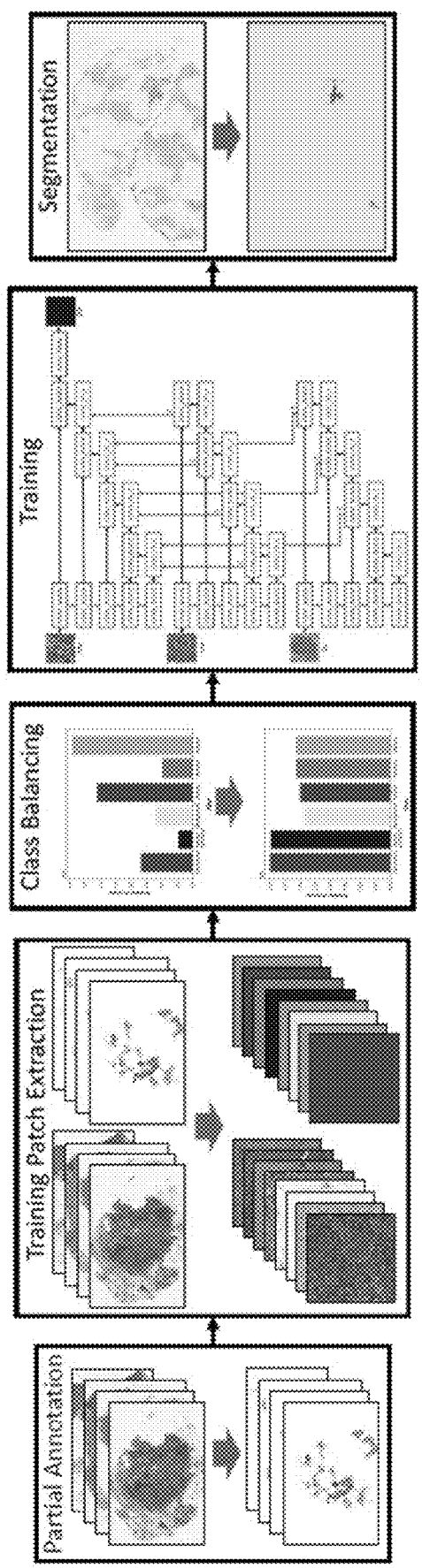
FIG. 2. Block diagram of the proposed method with a Deep Multi-Magnification Network. The first step of the method is to partially annotate training whole slide images. After extracting training patches from the partial annotations and balancing the number of pixels between classes, the Deep Multi-Magnification Network is trained. The trained network is used for multi-class tissue segmentation of whole slide images.

FIG. 2 shows the block diagram of the method. The goal is to segment cancer regions on breast margin images using a Deep Multi-Magnification Network (DMMN). The breast margin images do not contain large cancer regions. Therefore, another breast cancer dataset containing large cancer regions may be used as the training dataset. First of all, manual annotations is done on the training dataset with C classes. Note this annotation is done partially for an efficient and fast process. To train the multi-class segmentation DMMN, patches are extracted from whole slide images and the corresponding annotations. Before training the DMMN with the extracted patches, elastic deformation may be used to multiply patches belonging to rare classes to balance the number of pixels between classes. After the training step is done, the model can be used for multi-class segmentation of breast cancer images.

Partial Annotation

A large set of annotations is needed for supervised learning, but this is generally an expensive step requiring pathologists' time and effort. Especially, due to giga-pixel scale of image size, exhaustive annotation to label all pixels in whole slide images is not practical. Many works are done using public datasets such as CAMELYON datasets but public datasets are designed for specific application and may not be generalized to other applications. To segment multiple tissue subtypes on the breast training dataset, images may be partially segmented.

Figure 3A:
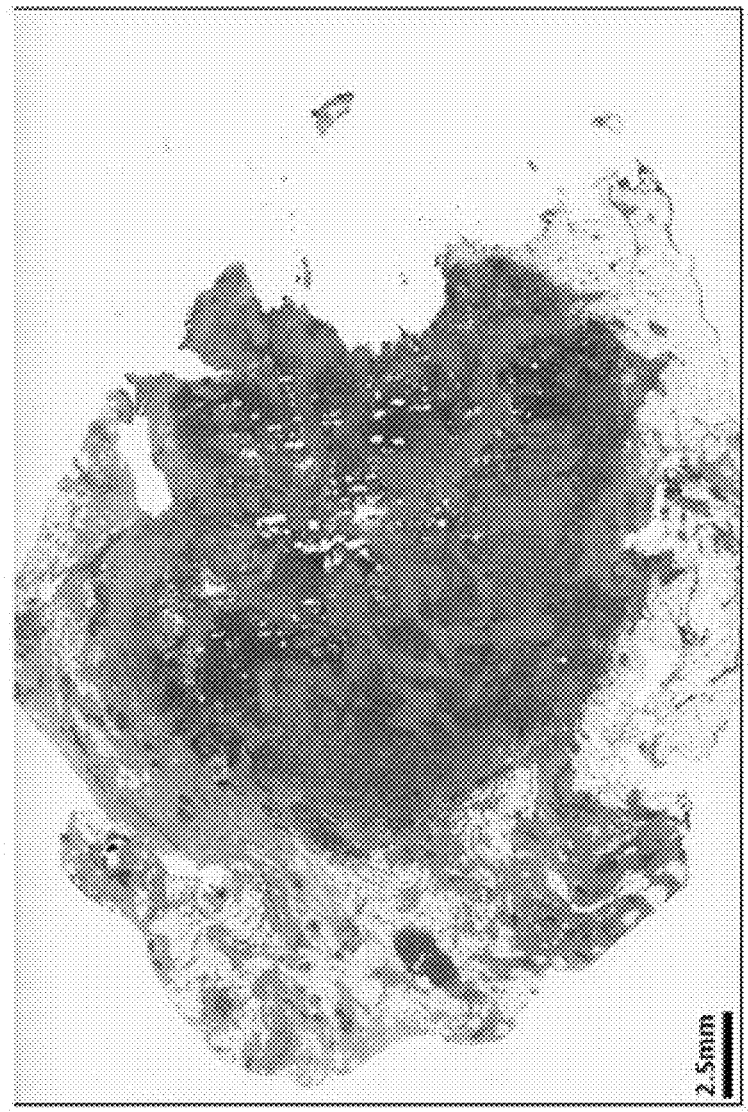
FIGS. 3(a) and 3(b). An example of partial annotation. (a) A whole slide image from a breast cancer dataset. (b) A partially annotated image of the whole slide image in (a) where multiple tissue subtypes are annotated in distinct colors and white regions are unlabeled.
Figure 3B:
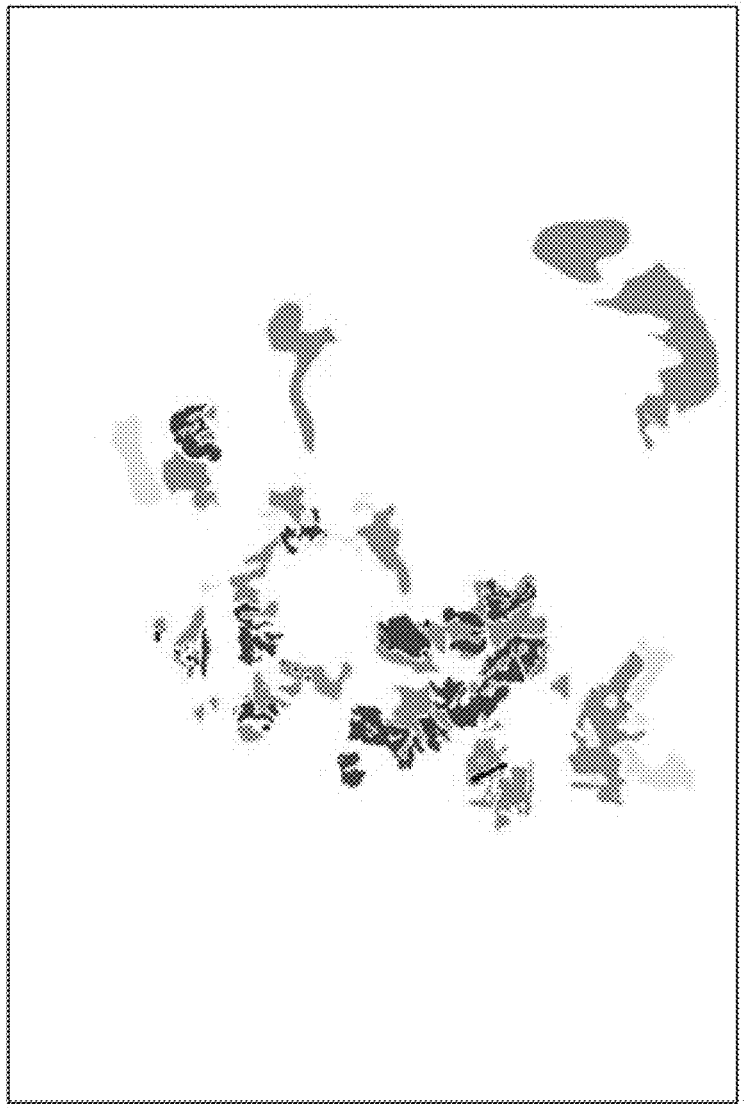

For partial annotations, annotating close boundary regions between subtypes while minimizing the thickness of these unlabeled regions and annotated the entire subtype components without cropping may be avoided. Exhaustive annotations, especially on boundary regions, without any overlapping portions and subsequent inaccurate labeling can be challenging given the regions merge into each other seamlessly. Additionally, the time required for complete, exhaustive labeling is immense. By minimizing the thickness of these unlabeled boundary regions, the CNN model trained by the partial annotation can learn the spatial relationships between subtypes and generate precise segmentation boundaries. This is different from the partial annotation in which annotated regions of different subtypes were too widely spaced and thus unsuitable for training spatial relationships between them. This approach also indicates exhaustive annotation in subregions of whole slide images to reduce annotation efforts, but if the subtype components are cropped the CNN model cannot learn the growth pattern of the different subtypes. Here, each subtype component may be annotated entirely to let the CNN model learn the growth pattern of all subtypes. FIGS. 3(a) and (b) shows an example of the partial annotations where an experienced pathologist can spend approximately 30 minutes to partially annotate one whole slide image. Note white regions in FIG. 3(b) are unlabeled.

Training Patch Extraction

Whole slide images are generally too large to process in slide-level using convolutional neural networks. For example, the dimension of the smallest margin WSI is 43,824 pixels by 31,159 pixels which is more than 1.3 billion pixels. To analyze WSIs, patch-based methods are used where patches extracted from an image is processed by a CNN and then the outputs are combined for slide-level analysis. One limitation of the patch-based methods is that they do not mimic pathologists, who switch zoom levels while examining a slide. In contrast, patch-based methods only look at patches in a single magnification with a limited field-of-view.

To resemble what pathologists do with a microscope, a set of multi-magnification patches may be extracted to train the DMMN. In this work, the size of a target patch may be set to be analyzed in a WSI be 256×256 pixels in 20× magnification. To analyze the target patch, an input patch with size of 1024×1024 pixels in 20× is extracted from the image where the target patch is located at the center of the input patch. From this input patch, a set of three multi-magnification patches is extracted. The first patch is extracted from the center of the input patch with size of 256×256 pixels in 20×, which is the same location and magnification with the target patch. The second patch is extracted from the center of the input patch with size of 512×512 pixels and downsampled by a factor of 2 to become size of 256×256 pixels in 10×. Lastly, the third patch is generated by downsampling the input patch by a factor of 4 to become size of 256×256 pixels in 5×. The set of three patches in different magnifications becomes the input to the DMMN to segment cancer in the target patch with size of 256×256 pixels. Input patches are extracted from training images if more than 1% of pixels in the corresponding target patches are annotated. The stride to x and y-directions is 256 pixels to avoid overlapping target patches.

Class Balancing

Class balancing is a prerequisite step for training CNNs for accurate performance. When the number of training patches in one class dominates the number of training patches in another class, CNNs cannot properly learn features from the minor class. In this work, class imbalance is observed in the annotations. For example, the number of annotated pixels in carcinoma regions dominates the number of annotated pixels in benign epithelial regions. To balance between classes, elastic deformation is used to multiply training patches belonging to minor classes.

Elastic deformation is widely used as a data augmentation technique in biomedical images due to the squiggling shape of biological structures. To perform elastic deformation on a patch, a set of grid points in the patch is selected and displaced randomly by a normal distribution with a standard deviation of α. According to the displacements of the grid points, all pixels in the patch are displaced by bicubic interpolation. The grid points may be set by 17×17 and σ=4.

The number of patches to be multiplied needs to be carefully selected to balance the number of pixels between classes. Here, a rate of elastic deformation for a class c, denoted as $r_c$, may be defined to be the number of patches to be multiplied for the class c and a class order to decide the order of classes when multiplying patches. The rate can be selected based on the number of pixels in each class. The rate is a non-negative integer and elastic deformation is not performed if the rate is 0. The class order can be decided based on applications. For example, if one desires an accurate segmentation on carcinoma regions, then a class of carcinoma would have a higher order than other classes. To multiply patches, each patch needs to be classified to a class c if the patch contains a pixel label classified to c. If a patch contains pixels in multiple classes, a class with a higher class order becomes the class of the patch. After patches are classified, $r_c$ number of patches will be multiplied for each patch in class c using elastic deformation. Once class balancing is done, all patches are used to train CNNs.

CNN Architectures

FIGS. 4(a)-(d) shows various CNN architectures for cancer segmentation. Note the size of input patches is 256×256 pixels and the size of an output prediction is 256×256 pixels. CONV_BLOCK contains two sets of a convolutional layer with kernel size of 3×3 with padding of 1 followed by a rectified linear unit (ReLU) activation function in series. CONV_TR_u contains a transposed convolutional layer followed by the ReLU activation function where u is an upsampling rate. Note CONV_TR_4 is composed of two CONV_TR_2 in series. CONV_FINAL contains a convolutional layer with kernel size of 3×3 with padding of 1, the ReLU activation function, and a convolutional layer with kernel size of 1×1 to output C channels. The final segmentation predictions are produced using the softmax operation.

Green arrows are max-pooling operations by a factor of 2 and red arrows are center-crop operations where cropping rates are written in red. The center-crop operations crop the center regions of feature maps in all channels by the cropping rate to fit the size and magnification of feather maps for the next operation. During the center-crop operations, the width and height of the cropped feature maps become a half and a quarter of the width and height of the input feature maps if the cropping rate is 2 and 4, respectively.

Figure 4A:
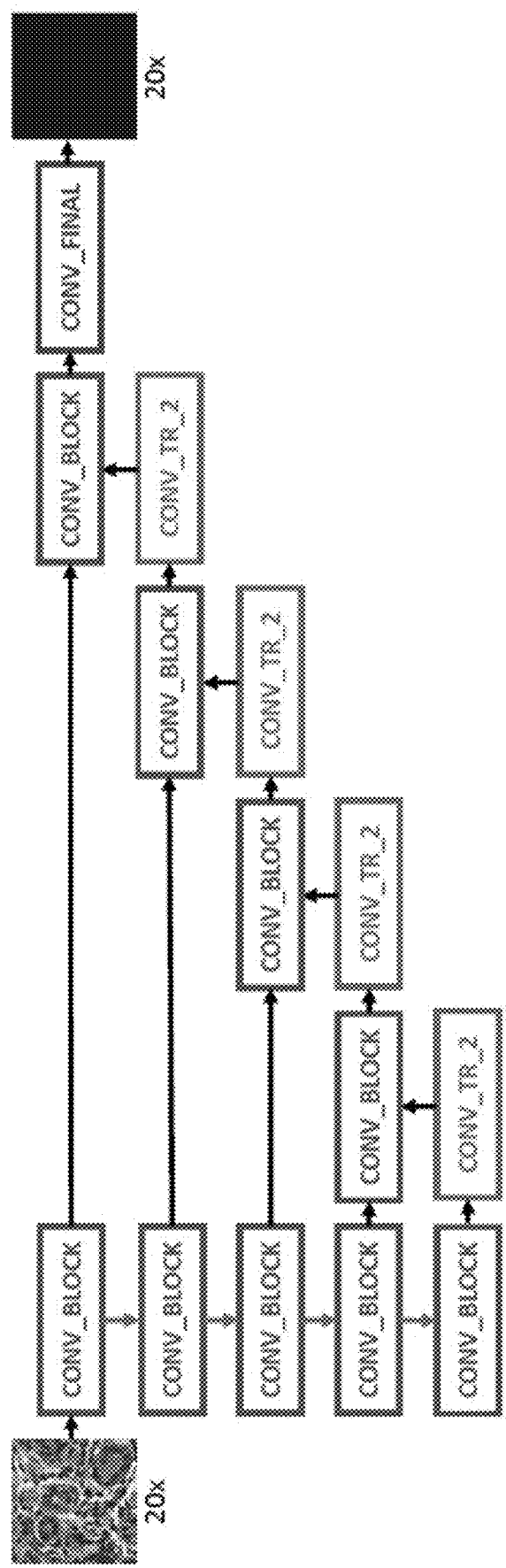
FIGS. 4(a)-(d). CNN architectures for multi-class tissue segmentation using a Deep Single-Magnification Network in (a) and Deep Multi-Magnification Networks in (b)-(d). (a) Single-Encoder Single-Decoder (SESD) is an architecture utilizing a patch from a single magnification to generate a segmentation prediction patch. (b) Multi-Encoder Single-Decoder (MESD) is an architecture utilizing multiple patches in various magnifications but it has only one decoder to generate a segmentation prediction patch. (c) Multi-Encoder Multi-Decoder Single-Concatenation (MEMDSC) is an architecture utilizing multiple patches in various magnifications but feature maps are only concatenated at the final layer to generate a segmentation prediction patch. (d) the Multi-Encoder Multi-Decoder Multi-Concatenation (MEMDMC) is an architecture utilizing multiple patches in various magnifications and feature maps are concatenated during intermediate layers to enrich feature maps for the 20× decoder.
Figure 4B:
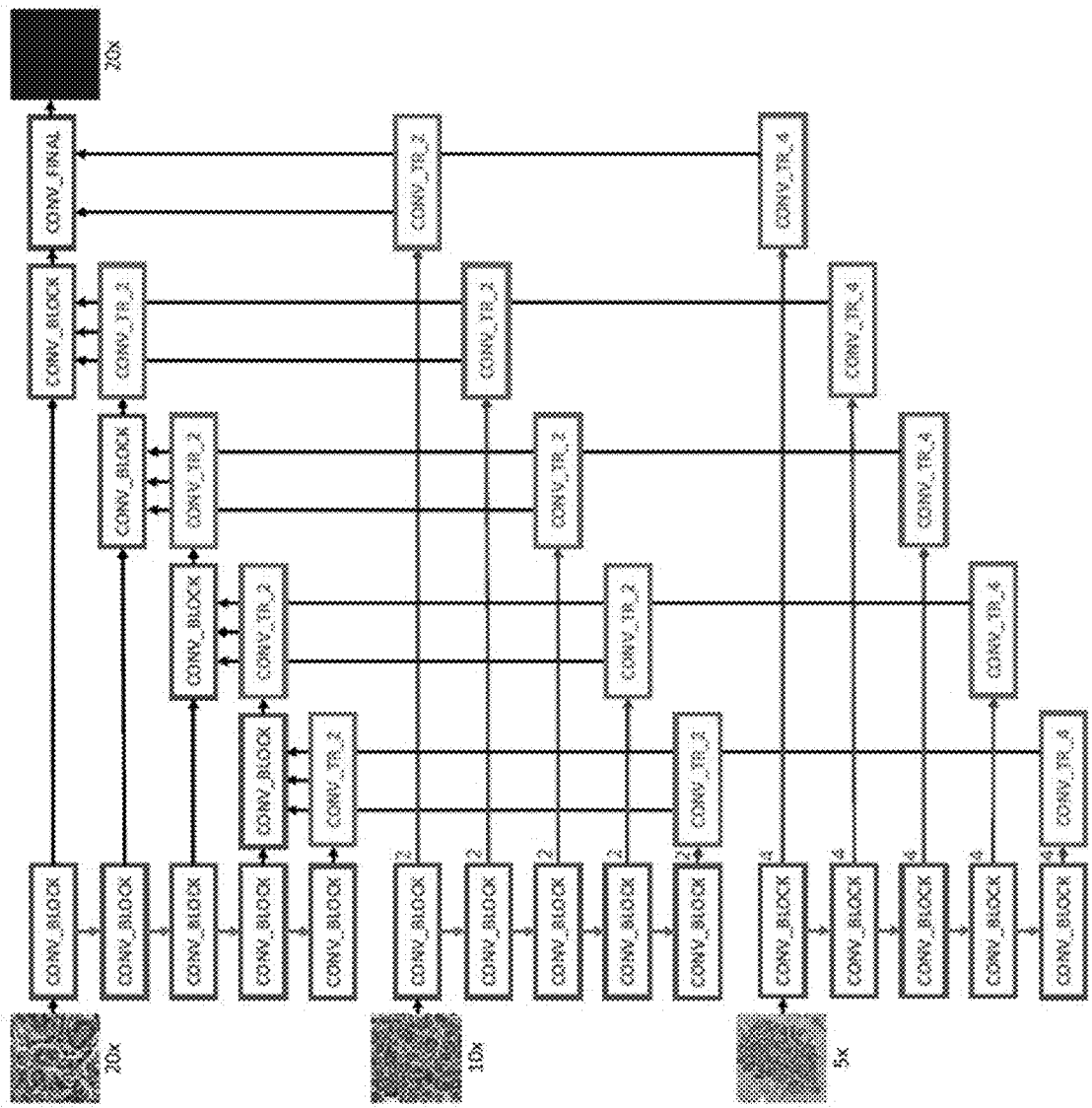
Figure 4C:
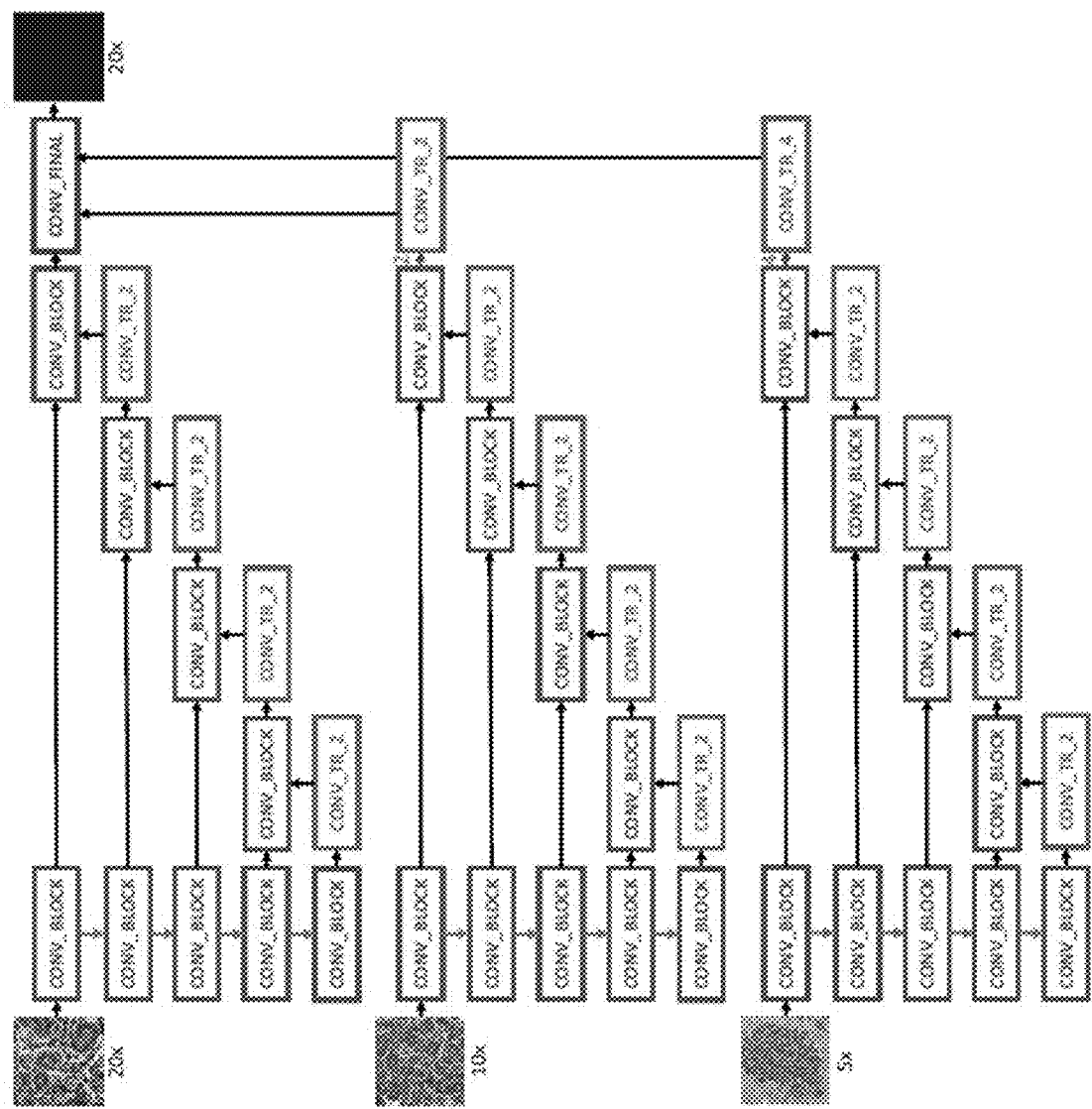
Figure 4D:
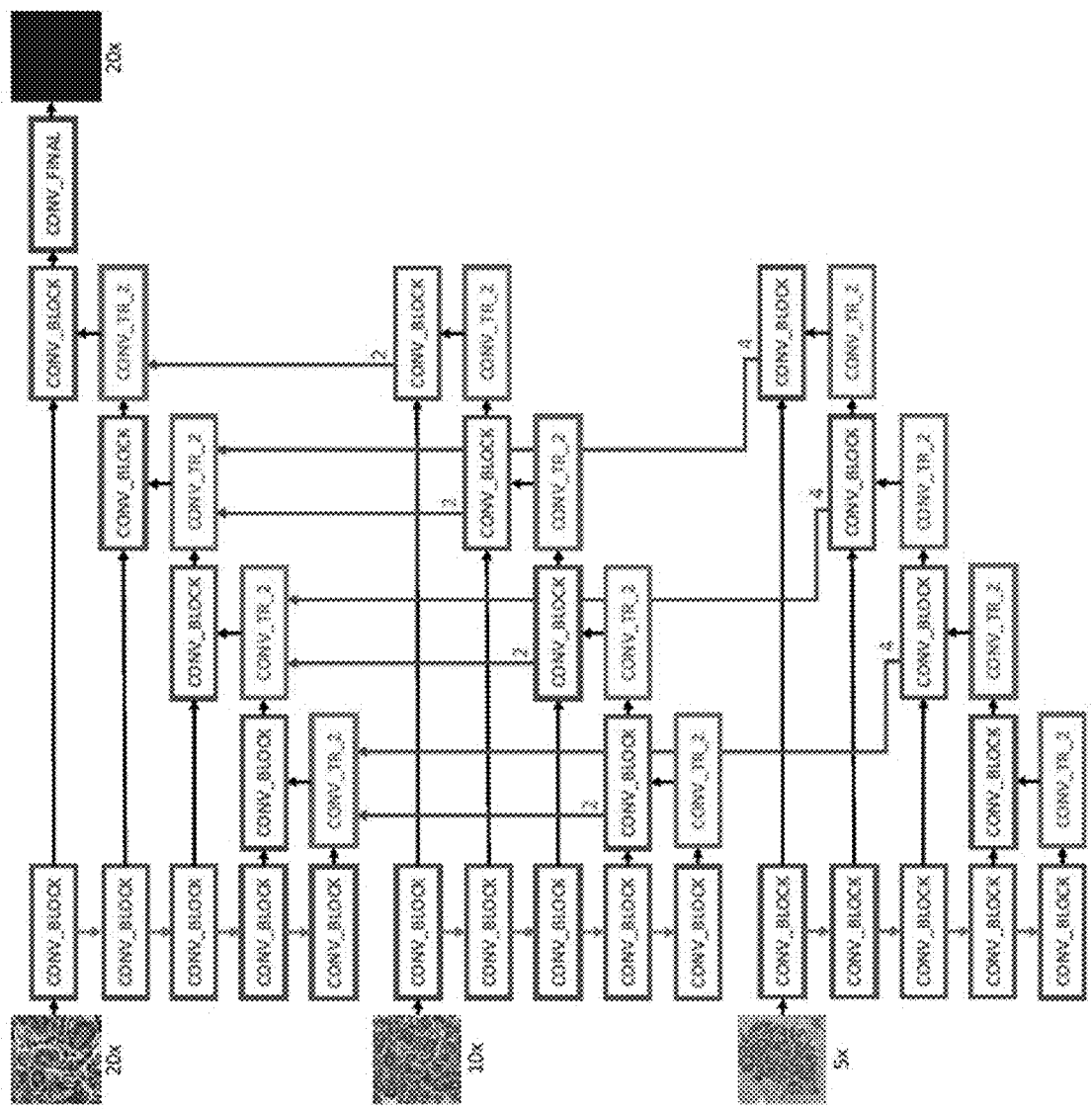

The Single-Encoder Single-Decoder (SESD) architecture in FIG. 4(a) uses a single magnification patch in 20× to produce the corresponding segmentation predictions. Note that this implementation is the same as U-Net except the number of channels is reduced by a factor of 2. The Multi-Encoder Single-Decoder (MESD) architecture in FIG. 4(b) uses multiple encoders for 20×, 10×, and 5× magnifications, but only uses a single decoder to produce segmentation predictions. The Multi-Encoder Multi-Decoder Single-Concatenation (MEMDSC) architecture in FIG. 4(c) has multiple encoders and the corresponding decoders for 20×, 10×, and 5× magnifications, but the concatenation is done only at the end of the encoder-decoder architectures. Note that the weighting CNN is excluded for a fair comparison with other architectures. Lastly, the Multi-Encoder Multi-Decoder Multi-Concatenation (MEMDMC) architecture in FIG. 4(d), has multiple encoders and decoders and has concatenations between multiple layers in the decoders to enrich feature maps for the 20× decoder.

CNN Training

The balanced set of patches from Section II-C is used to train the multi-class segmentation CNNs. A weighted cross entropy may be used as the training loss function with N pixels in a patch and C classes:

$$L(t^{gt}, t^{pred}) = \frac{1}{N} \sum_{p=1}^{N} \sum_{c=1}^{C} w_c t_c^{gt}(p) \log t_c^{pred}(p) \qquad (1)$$

where $t_c^{gt}$ and $t_c^{pred}$ are two-dimensional groundtruth and segmentation predictions for a class c, respectively. $t_c^{gt}(p)$ is a binary groundtruth value for a class c at a pixel location p, either 0 or 1, and $t_c^{pred}(p)$ is a segmentation prediction value for a class c at a pixel location p, between 0 and 1. In Equation 1, a weight for class c, $w_c$ is defined as $$w_c = 1 - \frac{N_c}{\sum_c N_c} \qquad (2)$$

where $N_c$ is the number of pixels for class c in a training set. Note unlabeled pixels do not contribute to the training loss function. Stochastic gradient descent (SGD) with a learning rate of $5 \times 10^{-5}$, a momentum of 0.99, and a weight decay of $10^{-4}$ may be used for 20 epochs for optimization. A CNN model with the highest mean intersection-over-union (mIOU) on validation images is selected as the final model. During training, data augmentation using rotation, vertical and horizontal flip, brightness, contrast, and color jittering is used.

Multi-Class Segmentation

Multi-class tissue segmentation on breast images can be done using the trained CNN. The final label in each pixel is selected as a class which has the largest prediction value among the C classes. An input patch with size of 1024×1024 pixels is extracted from a whole slide image to generate a set of three patches with size of 256×256 pixels in 20×, 10×, and 5× magnifications by the process described in Section II-B. The set of three patches is processed by the trained CNN. The segmentation predictions with size of 256×256 pixels are located at the center location of the input patch. Input patches are extracted from the top-left corner of the WSI with a stride of 256 pixels in x and y directions to process the entire WSI. Zero-padding is done to extract input patches on the boundary of WSIs. The Otsu thresholding technique can be used before extracting patches as optional to remove background regions to speed up the segmentation process.

III. Experimental Results

The goal of this architecture is to segment carcinoma regions on the breast margin dataset. Images from the breast margin dataset have small carcinoma regions or no carcinoma region. A Triple-Negative Breast Cancer (TNBC) dataset containing large invasive ductal carcinoma (IDC) regions may be used to train the CNN model. All whole slide images in the TNBC dataset and the breast margin dataset were hematoxylin and eosin (H&E) stained and digitized from Memorial Sloan Kettering Cancer Center. The TNBC dataset was scanned by Aperio XT where microns per pixel (MPP) in 20× is 0.4979 and the breast margin dataset was scanned by Aperio AT2 where MPP in 20× is 0.5021.

Figure 5A:
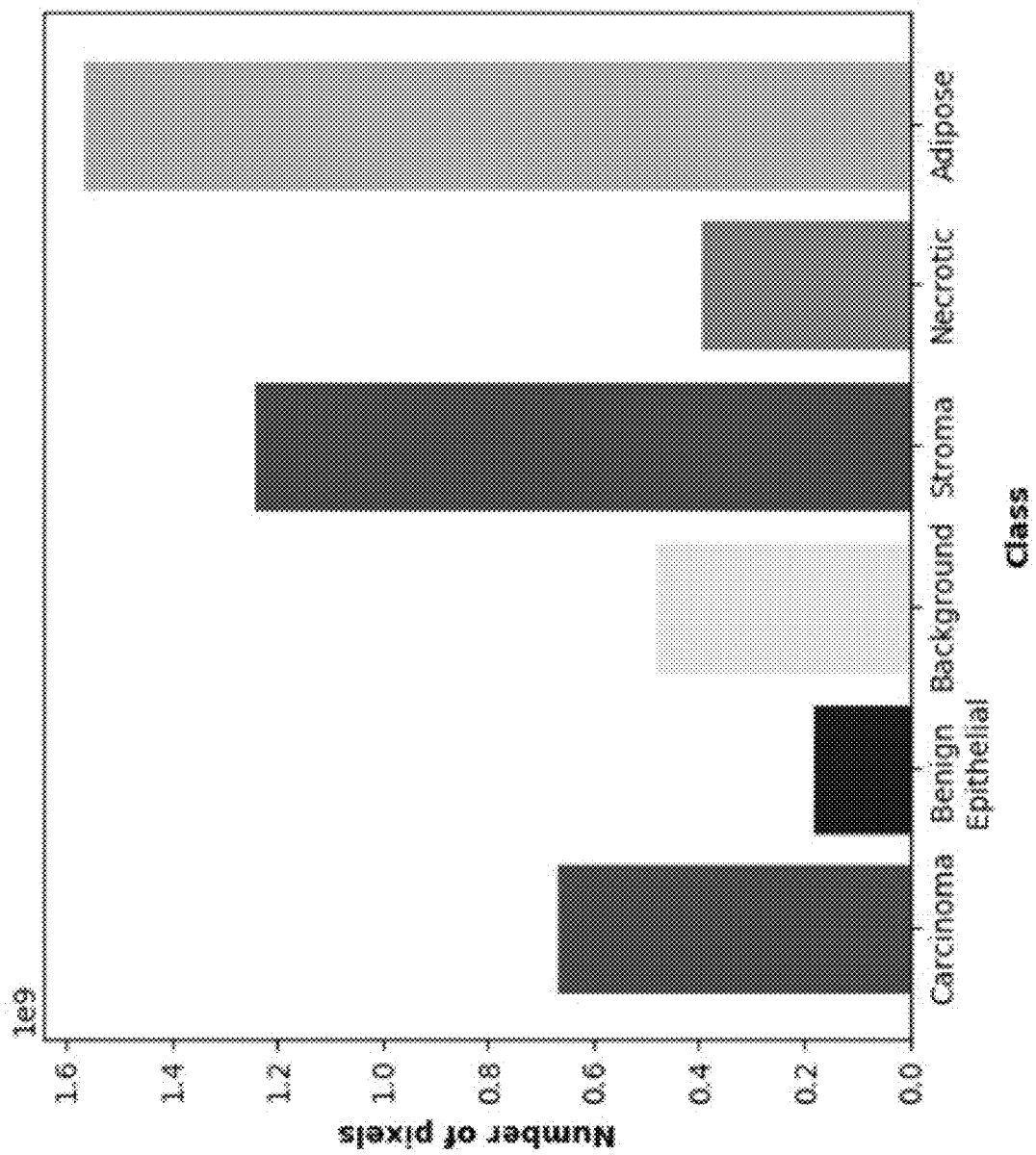
FIGS. 5(a) and (b). Class balancing using elastic deformation in the training breast dataset. (a) Number of annotated pixels between classes before elastic deformation. (b) Number of annotated pixels between classes after elastic deformation.
Figure 5B:
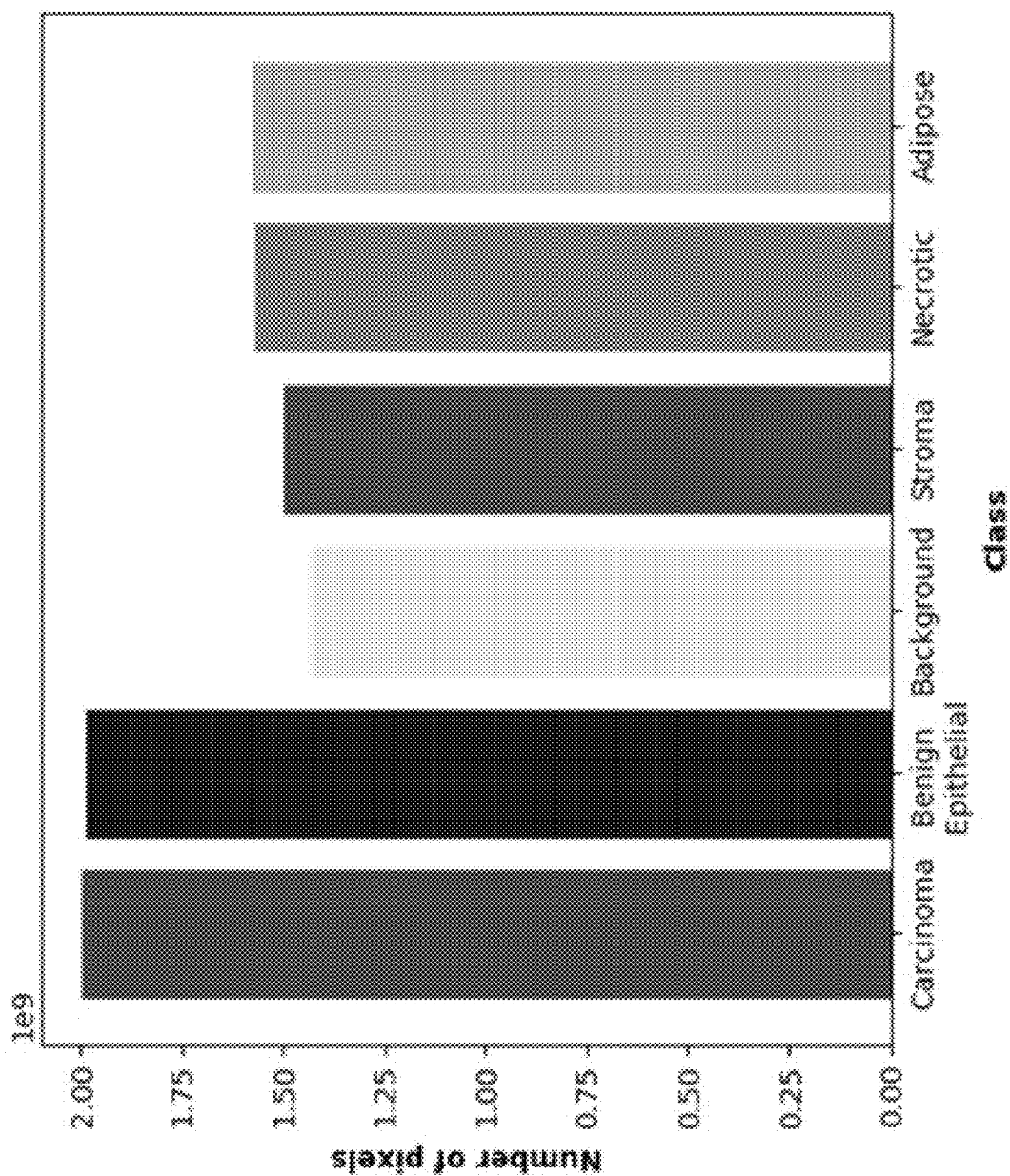
Figure 6A:
Figure 6B:
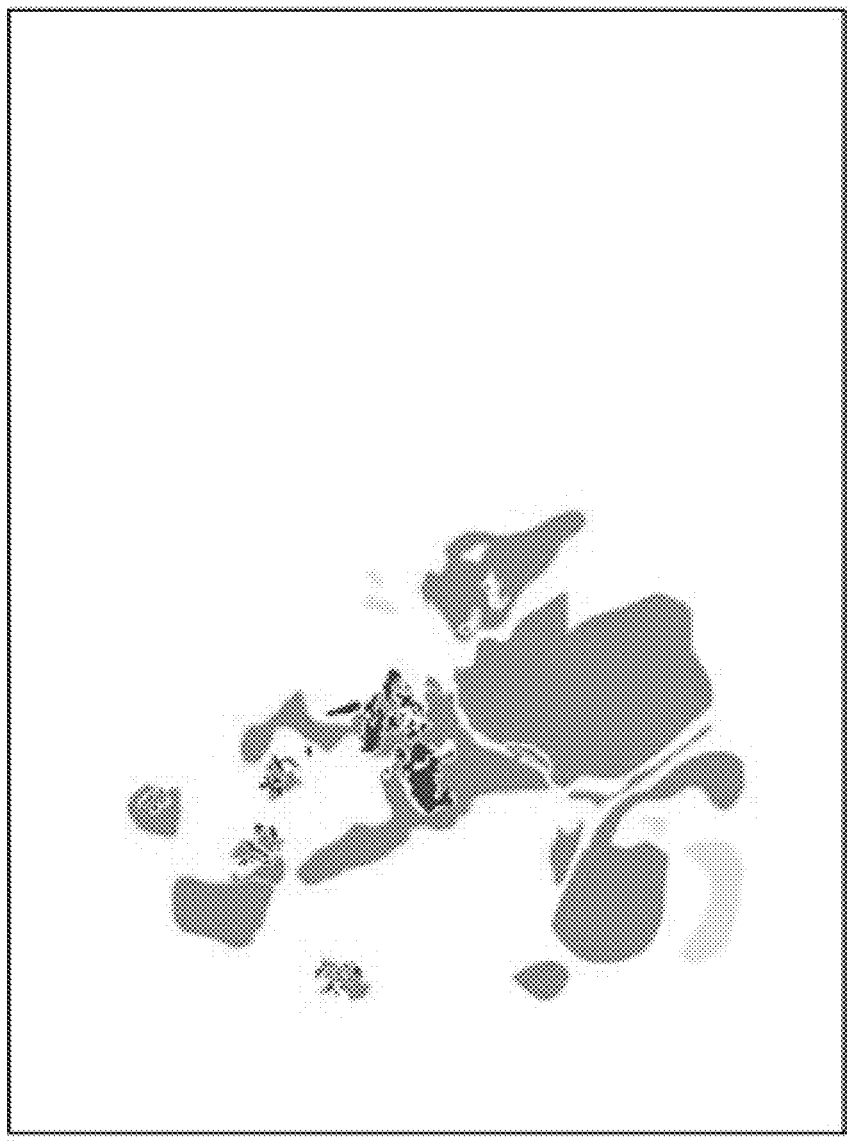
Figure 6C:
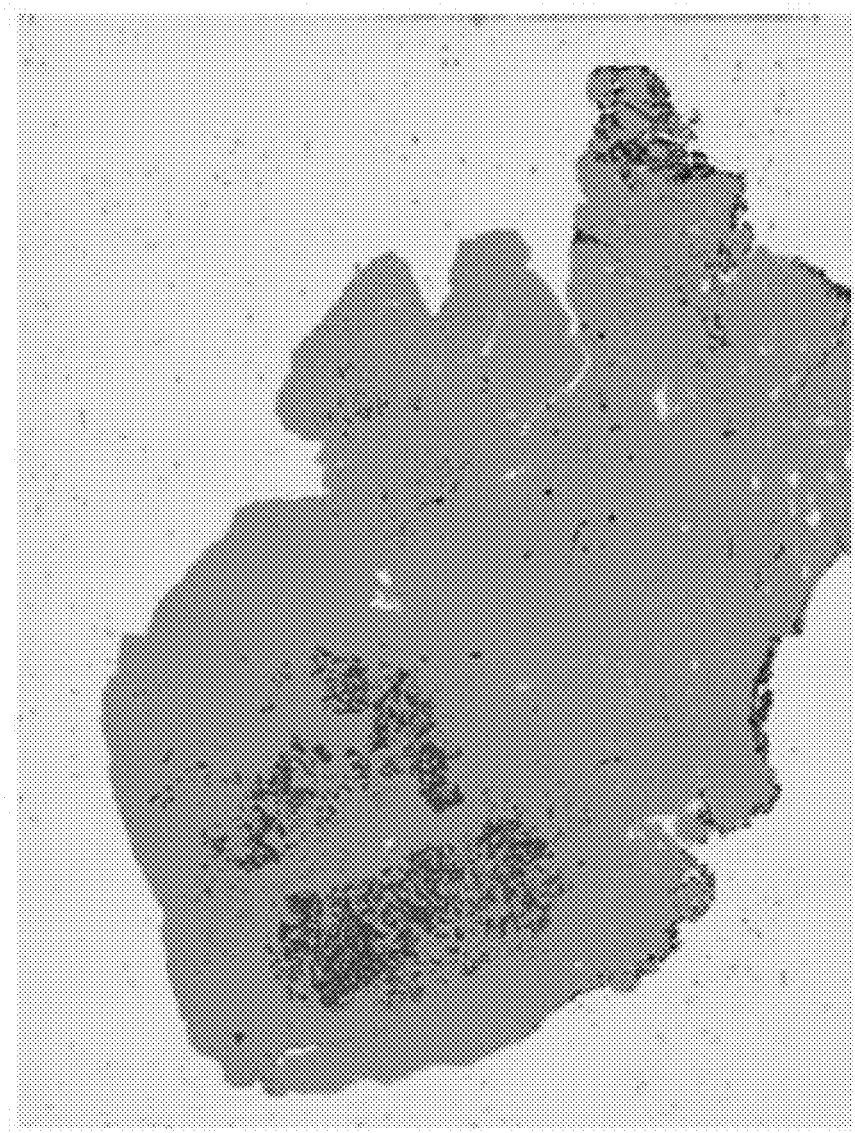
Figure 6D:
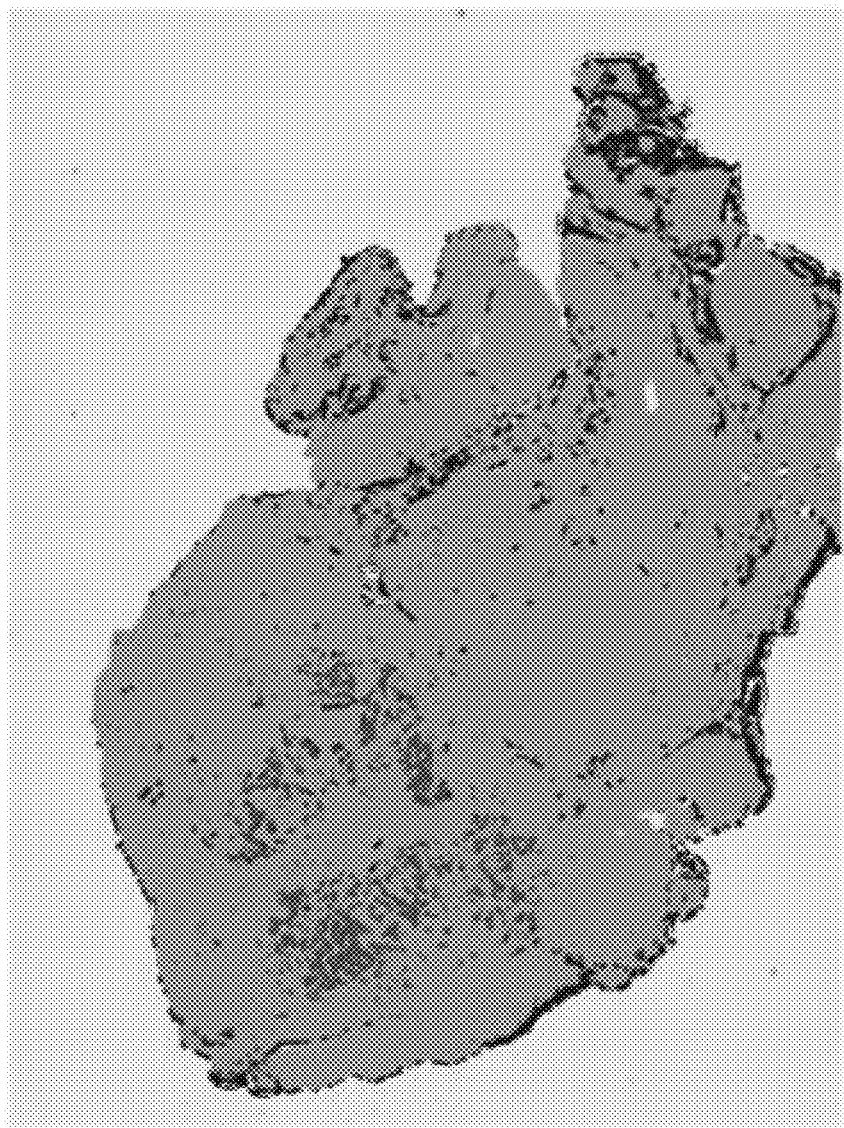
Figure 6E:
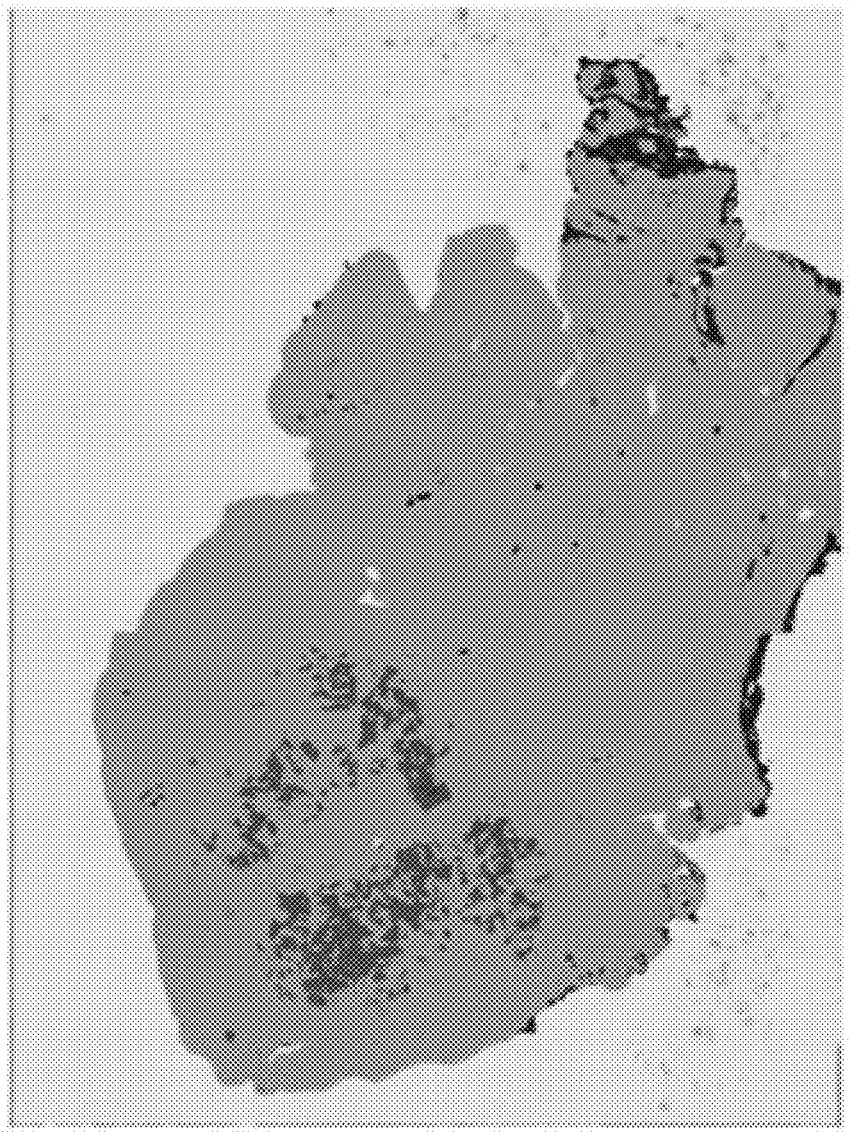
Figure 6F:
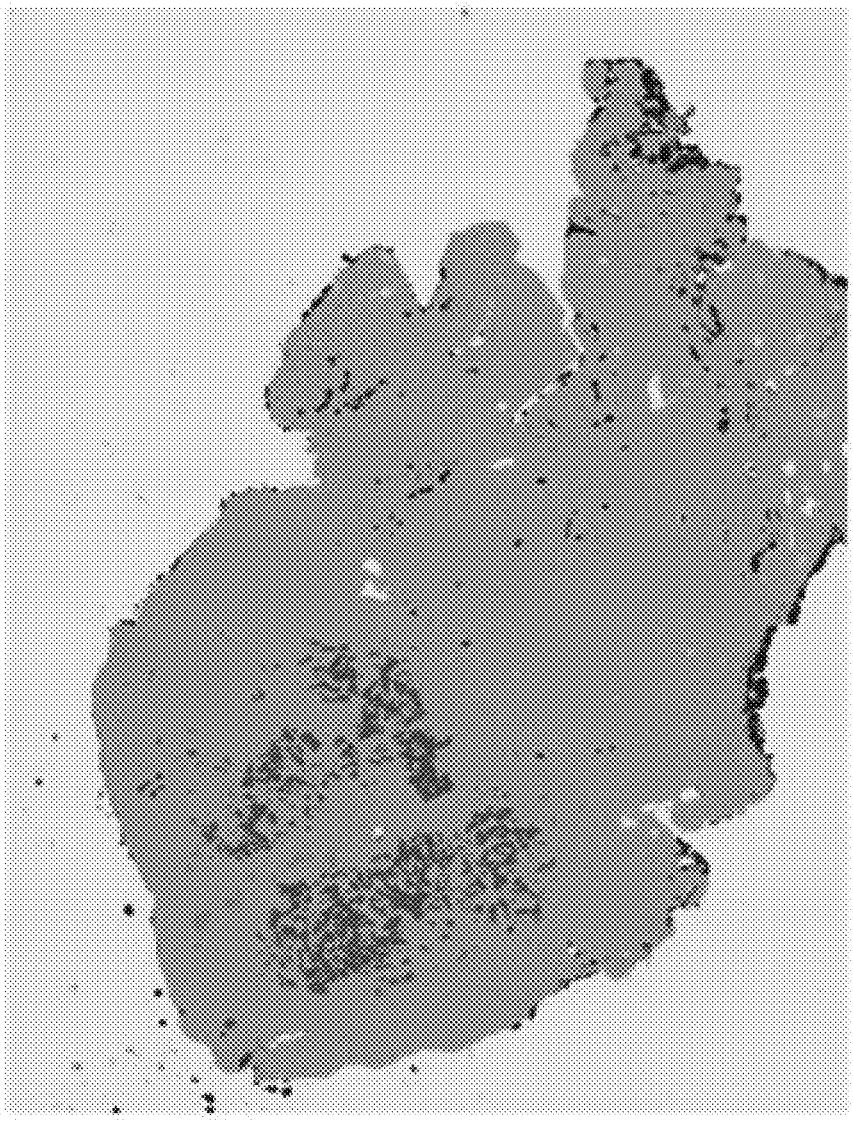
Figure 6G:
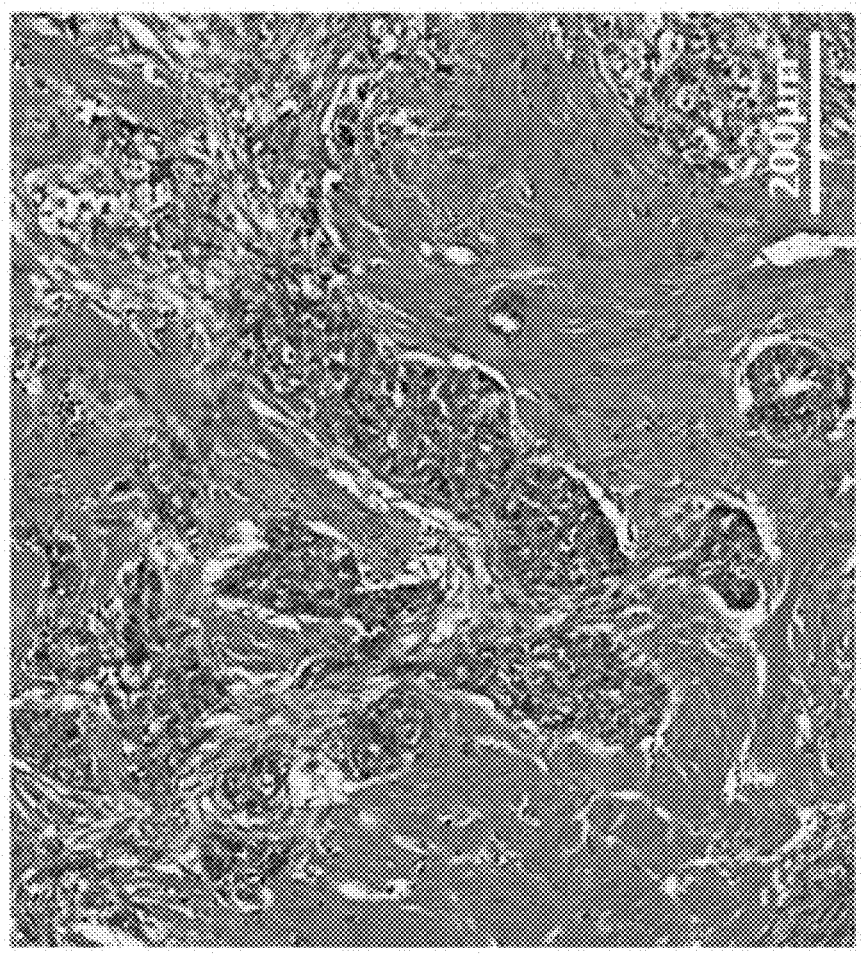
Figure 6H:
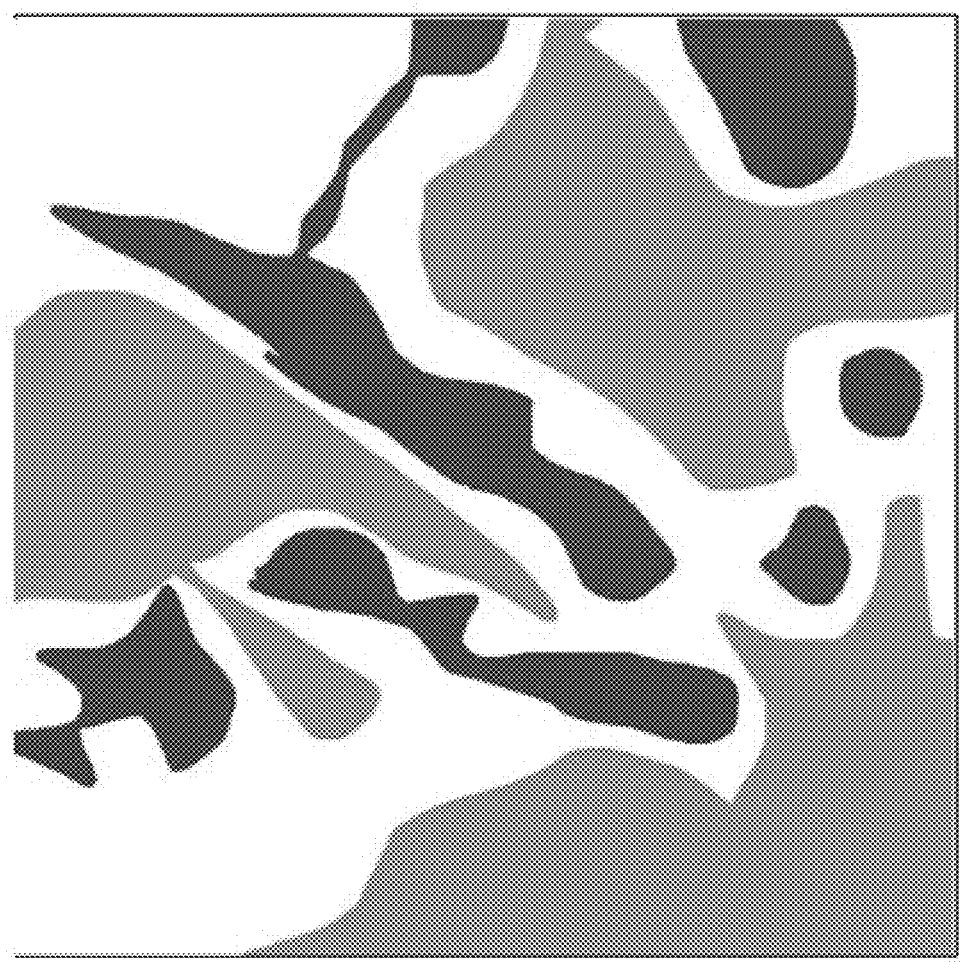
Figure 6I:
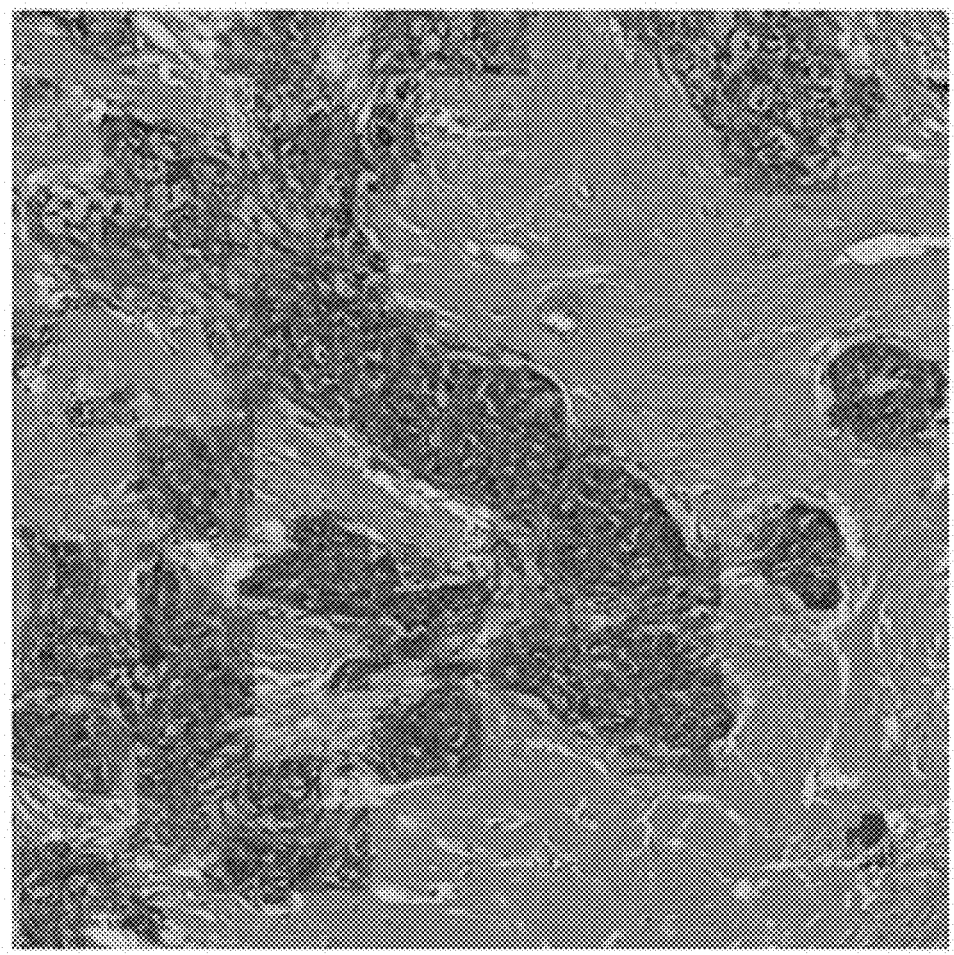
Figure 6J:
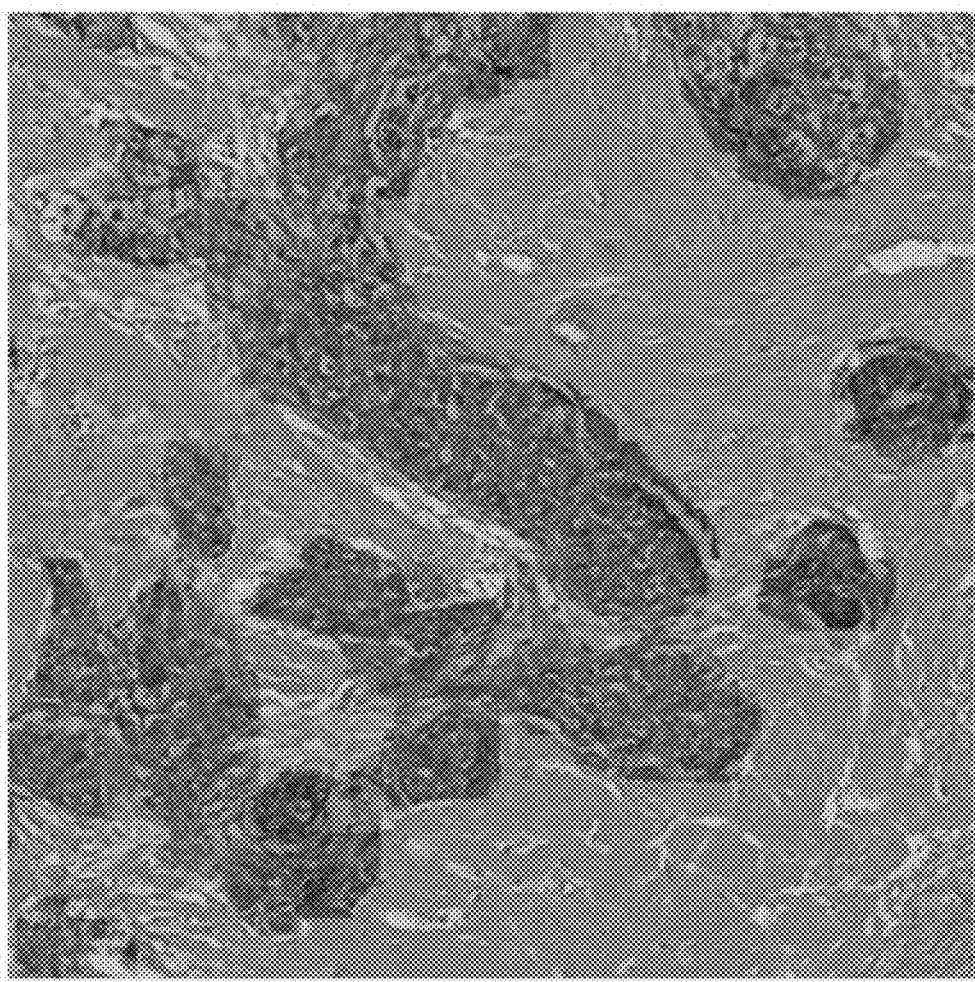
Figure 6K:
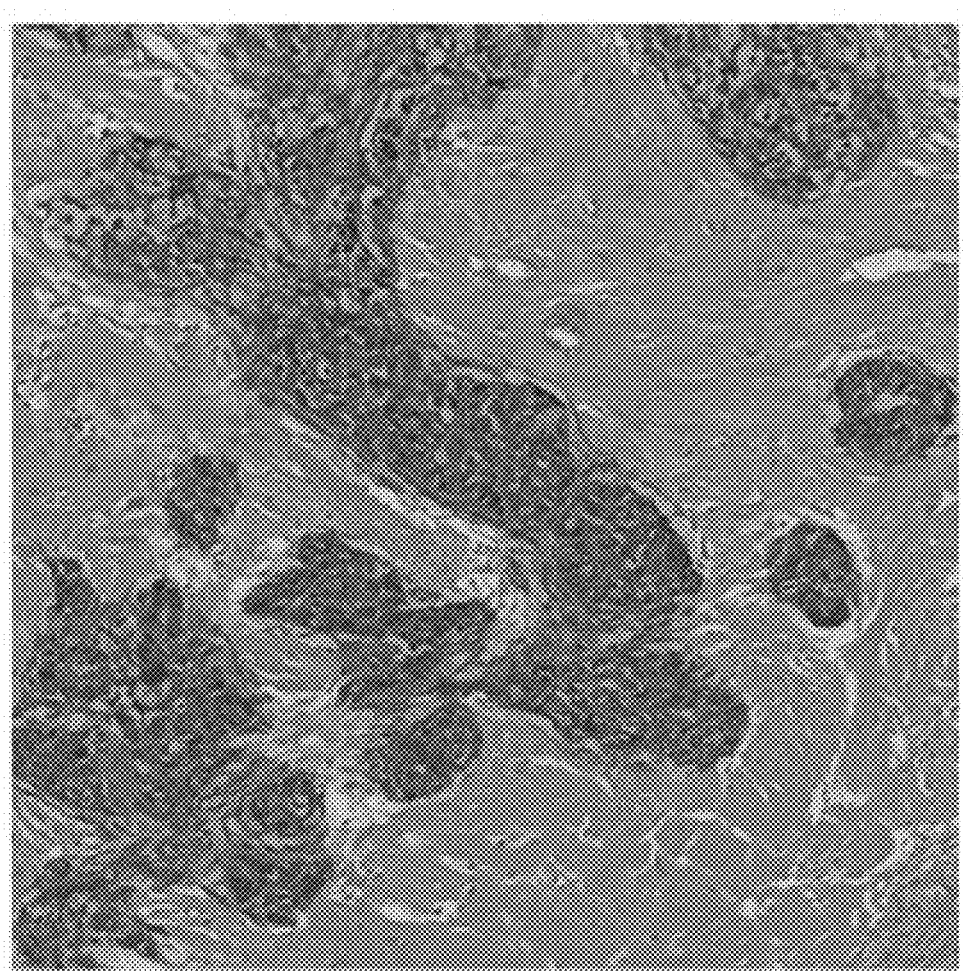
Figure 6I:
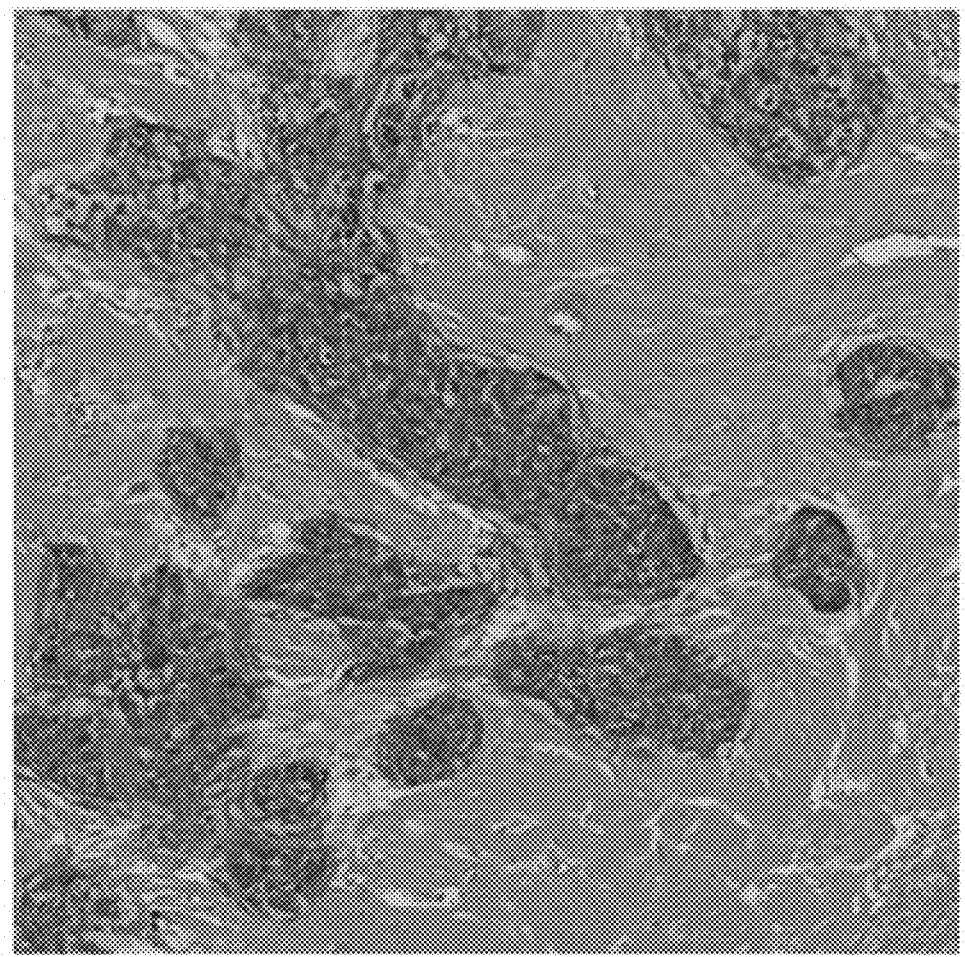
Figure 7A:
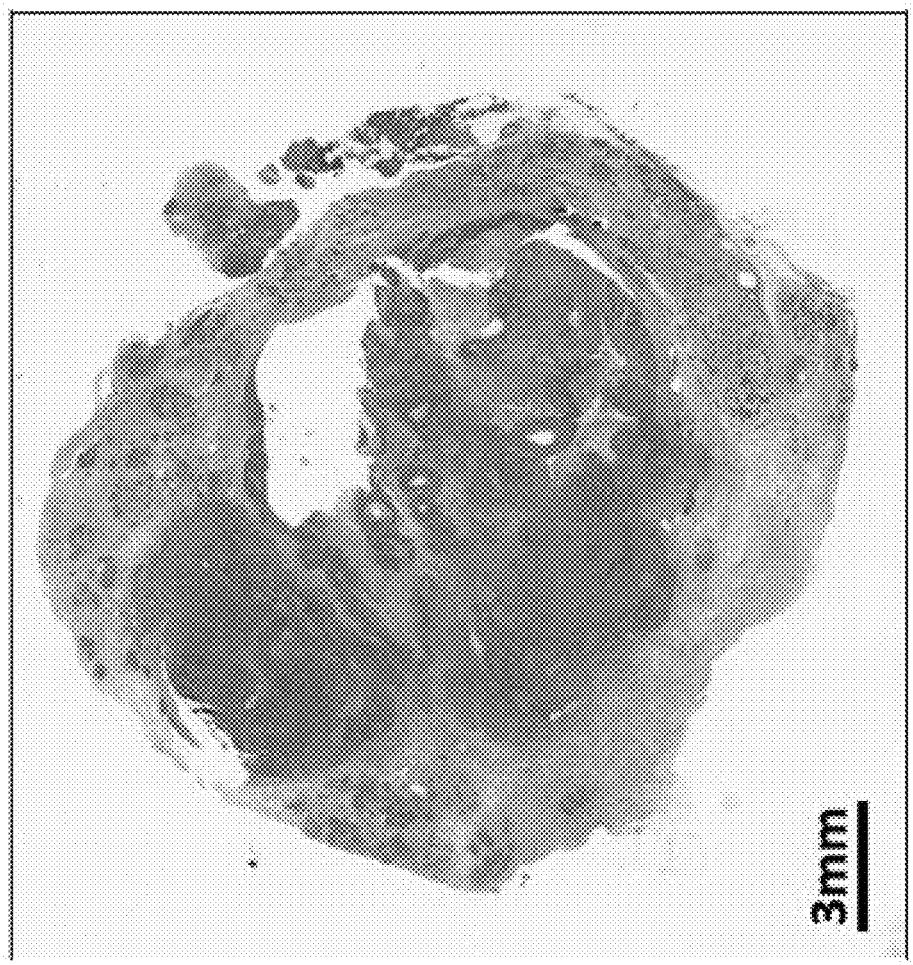
FIGS. 7(a)-(l). Segmentation predictions on the TNBC dataset. (a)-(f) are thumbnail versions of a whole slide image and (g)-(l) are zoom-in images with size of 1024×1024 pixels in magnification of 10×. (a) and (g) are original image, (b) and (h) are partial annotations, (c) and (i) are segmentation predictions using the Single-Encoder Single Decoder (SESD) architecture, (d) and (j) are segmentation predictions using the Multi-Encoder Single Decoder (MESD) architecture, (e) and (k) are segmentation predictions using the Multi-Encoder Multi-Decoder Single-Concatenation (MEMDSC) architecture, and (f) and (l) are segmentation predictions using the Multi-Encoder Multi-Decoder Multi-Concatenation (MEMDMC) architecture.
Figure 7B:
Figure 7C:
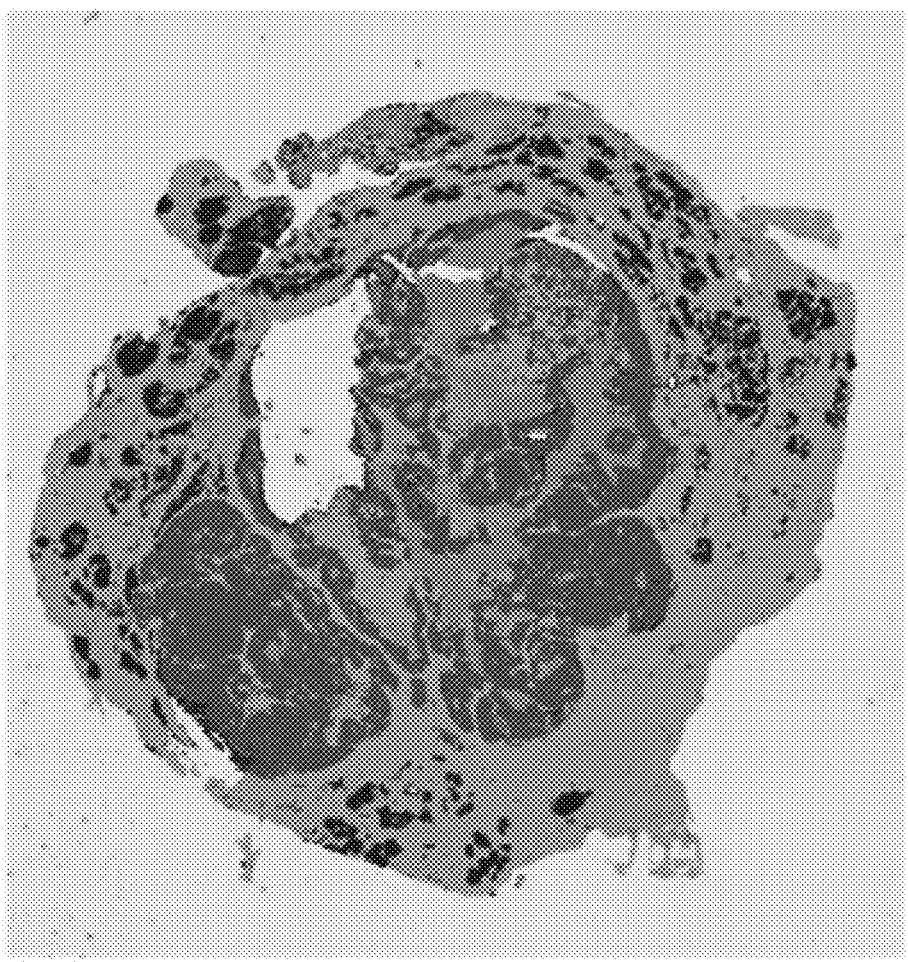
Figure 7D:
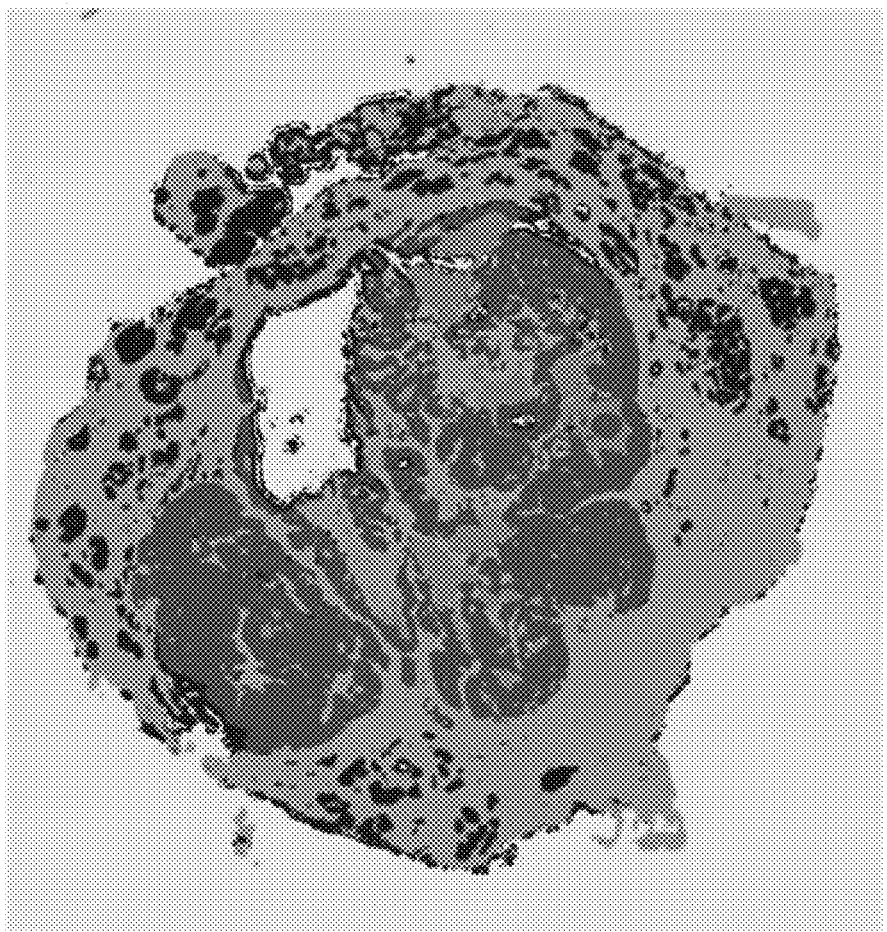
Figure 7E:
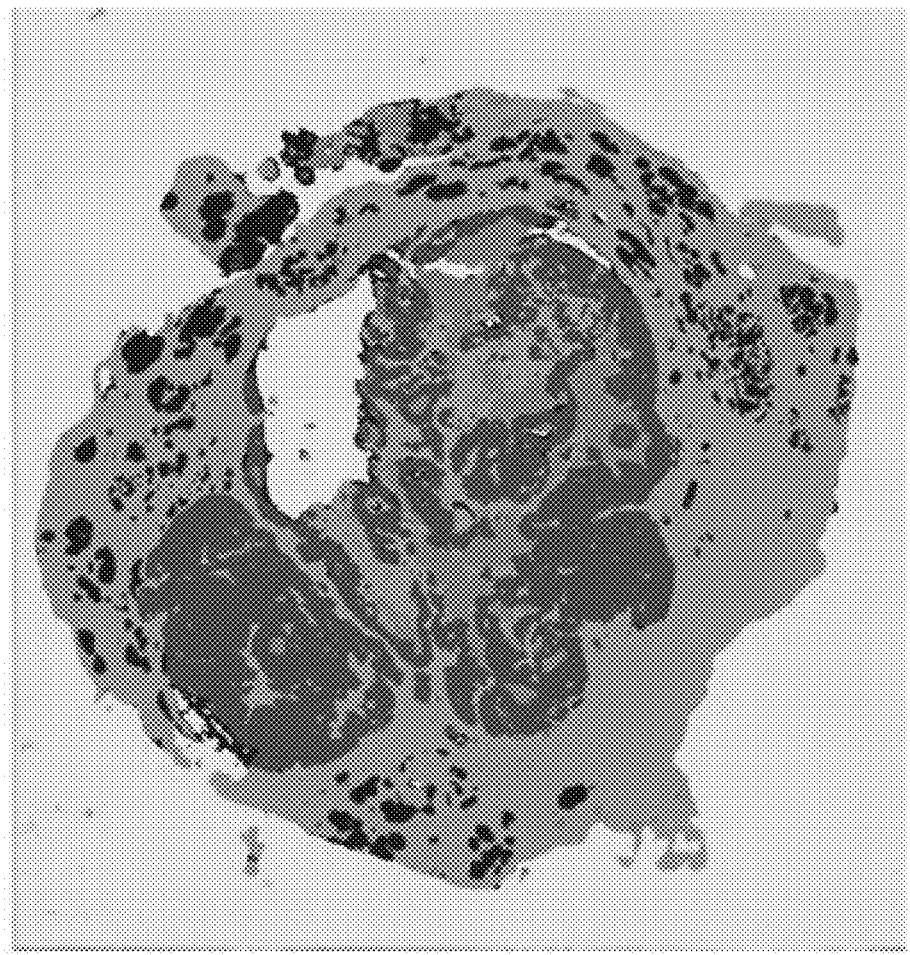
Figure 7F:
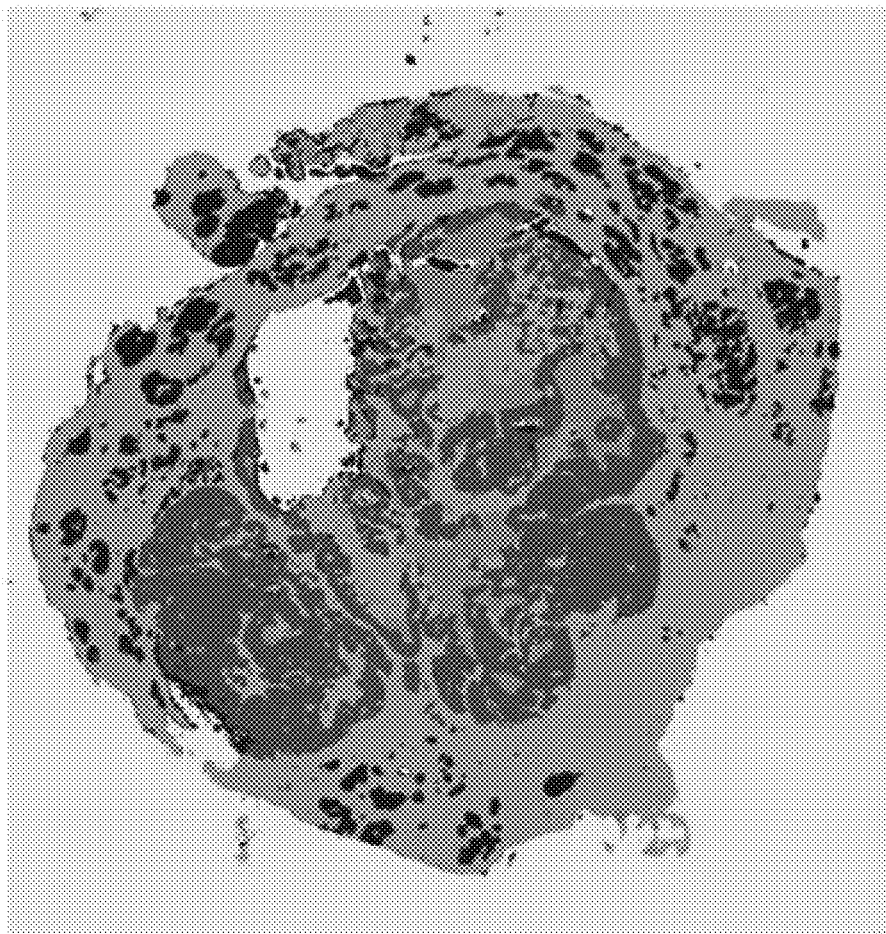
Figure 7G:
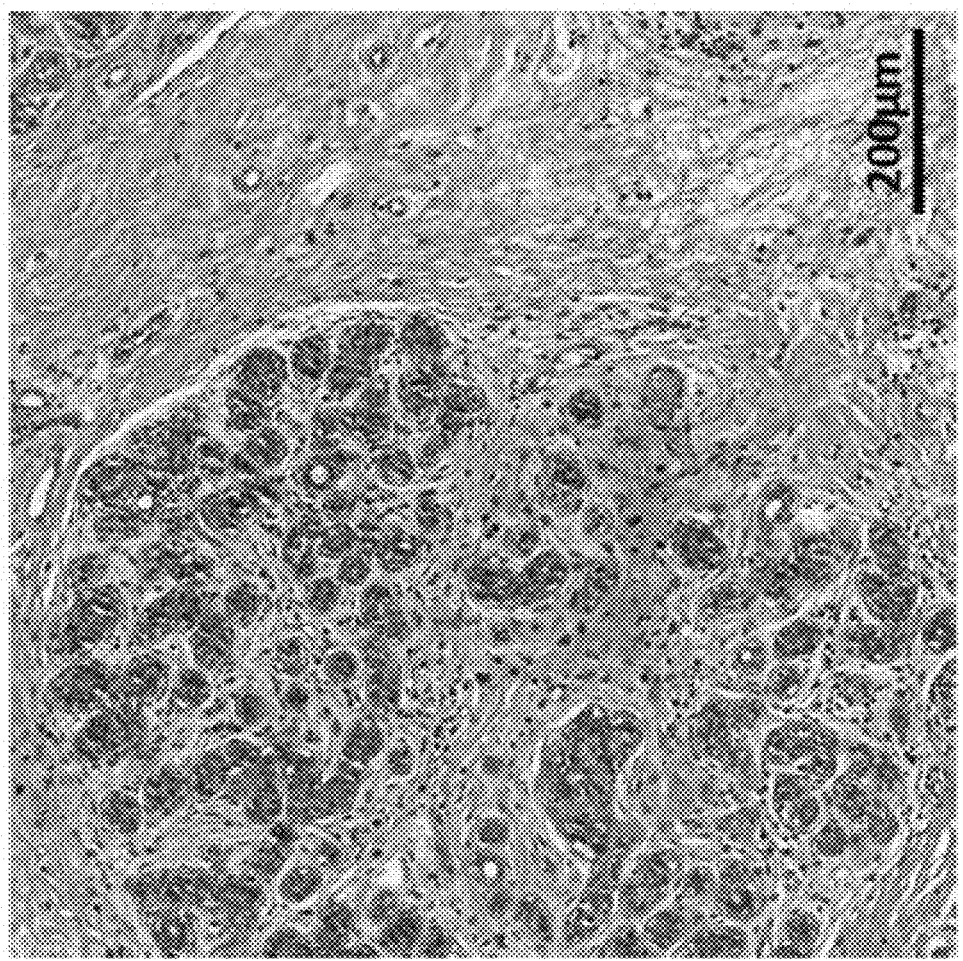
Figure 7H:
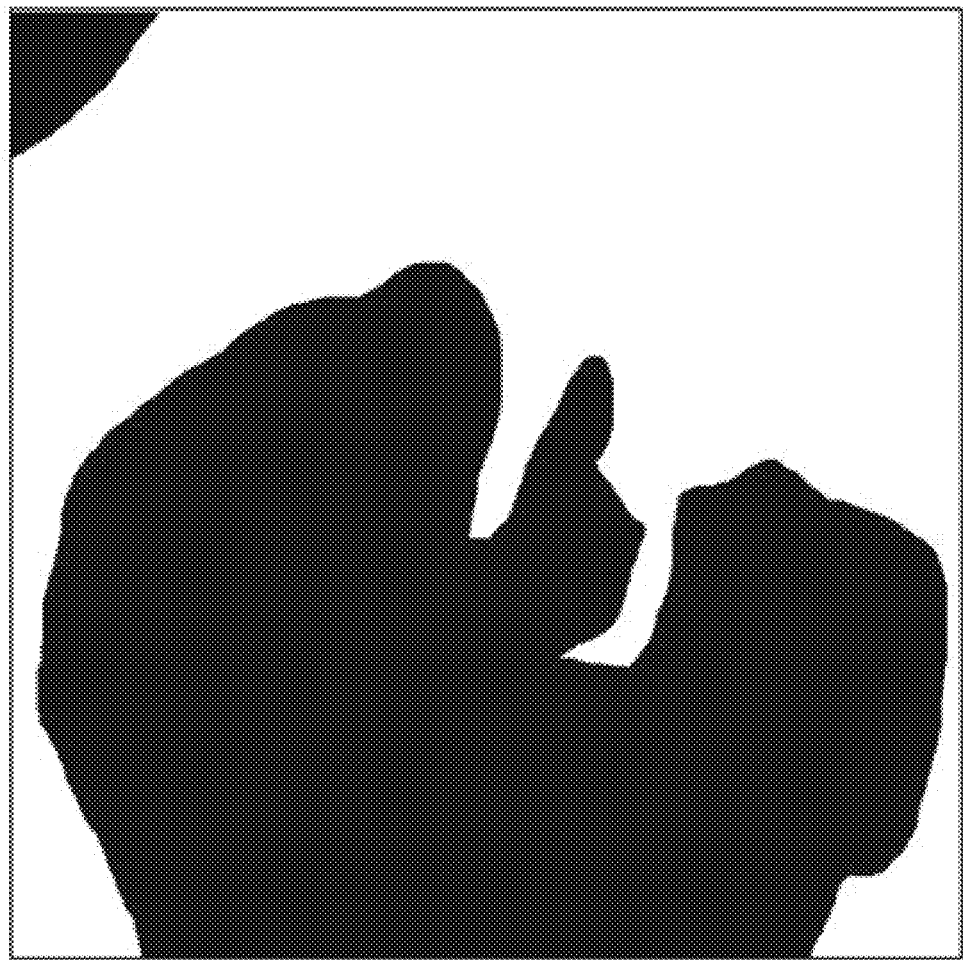
Figure 7I:
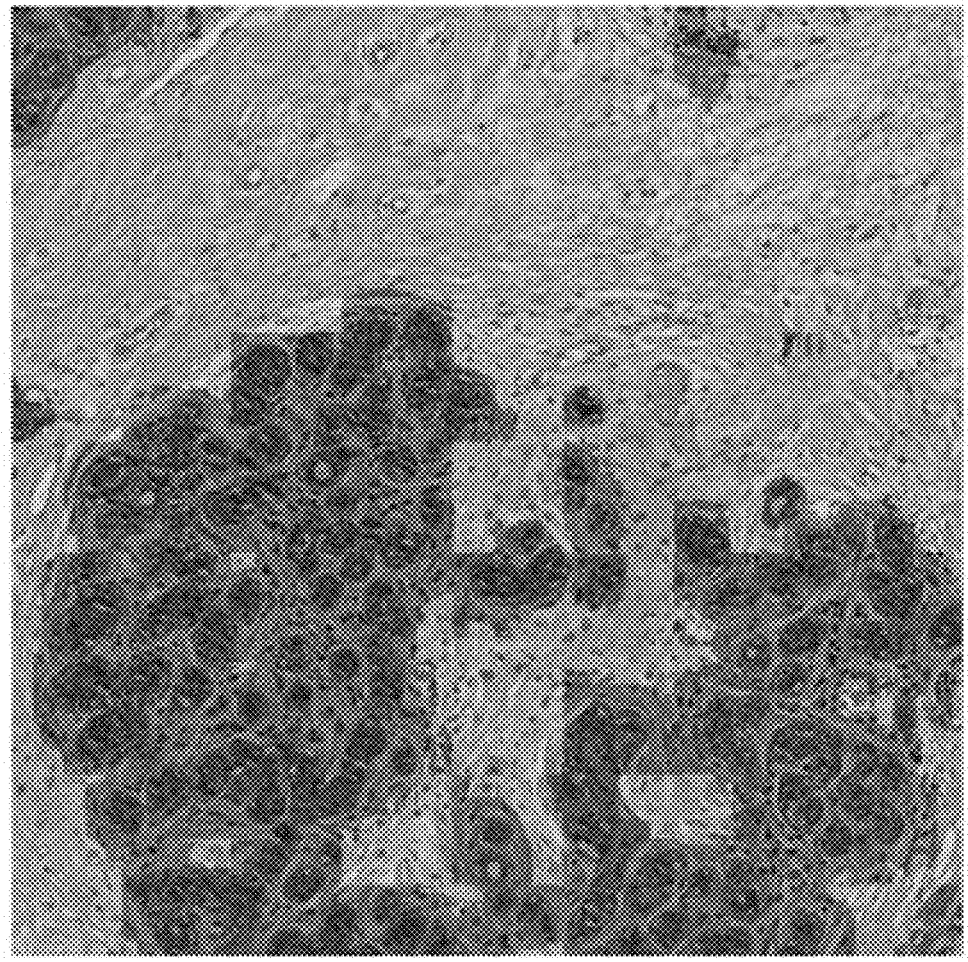
Figure 7J:
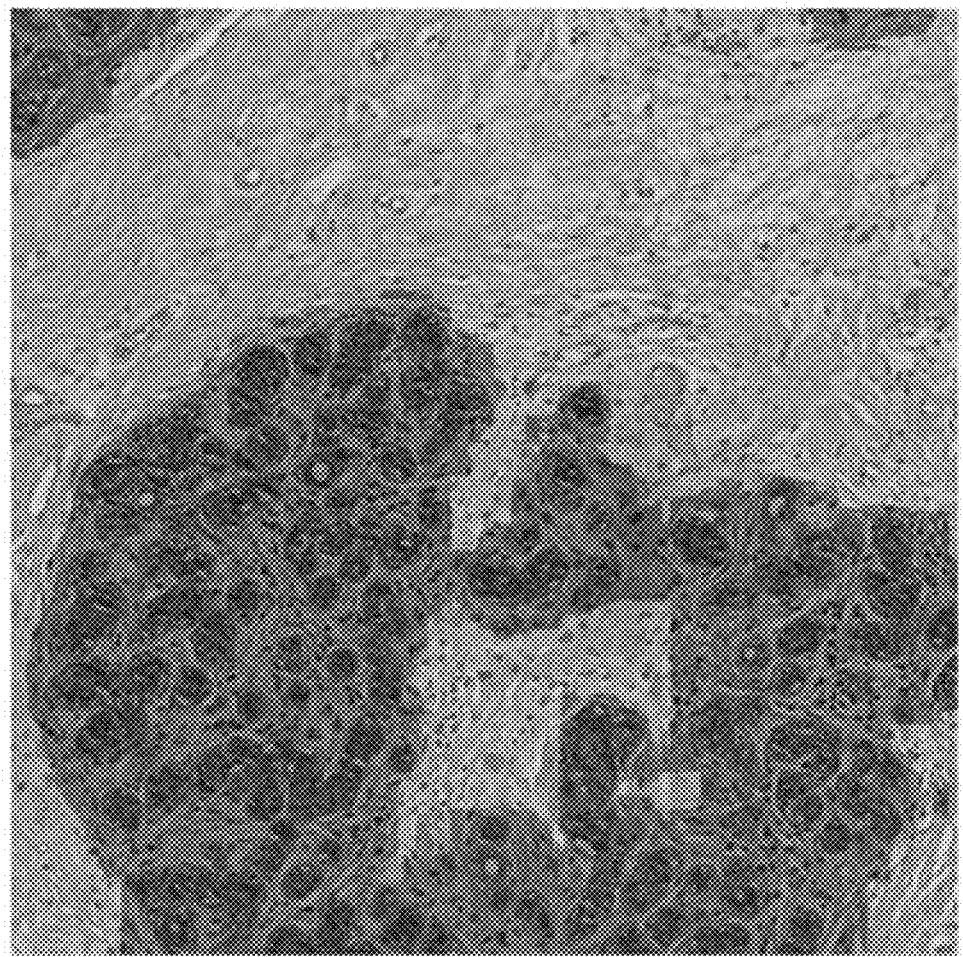
Figure 7K:
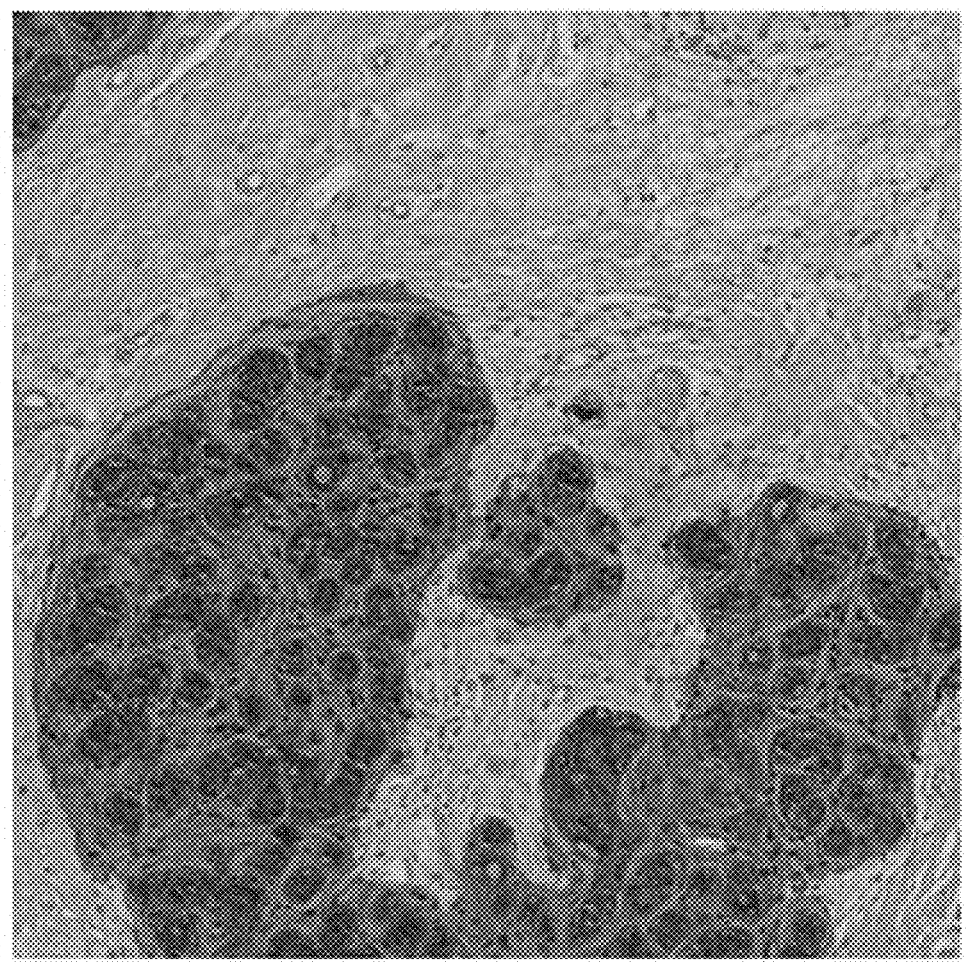
Figure 7L:
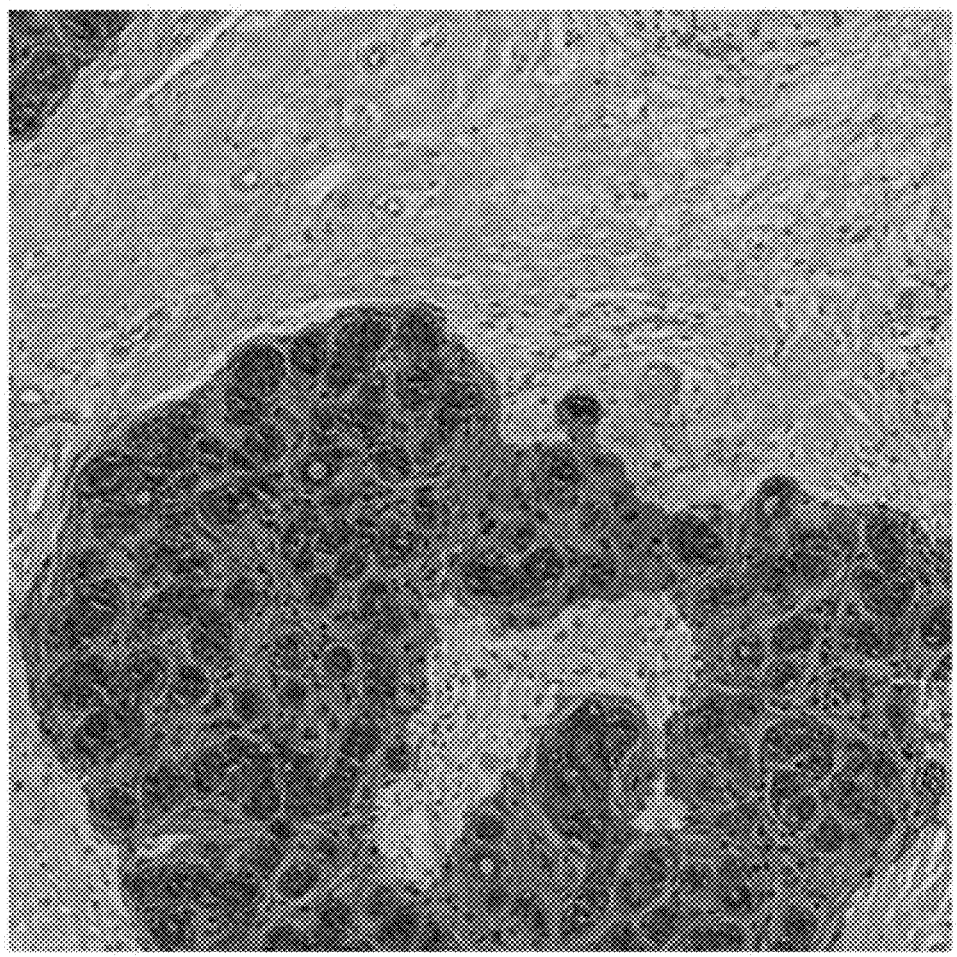
Figure 8A:
Figure 8B:
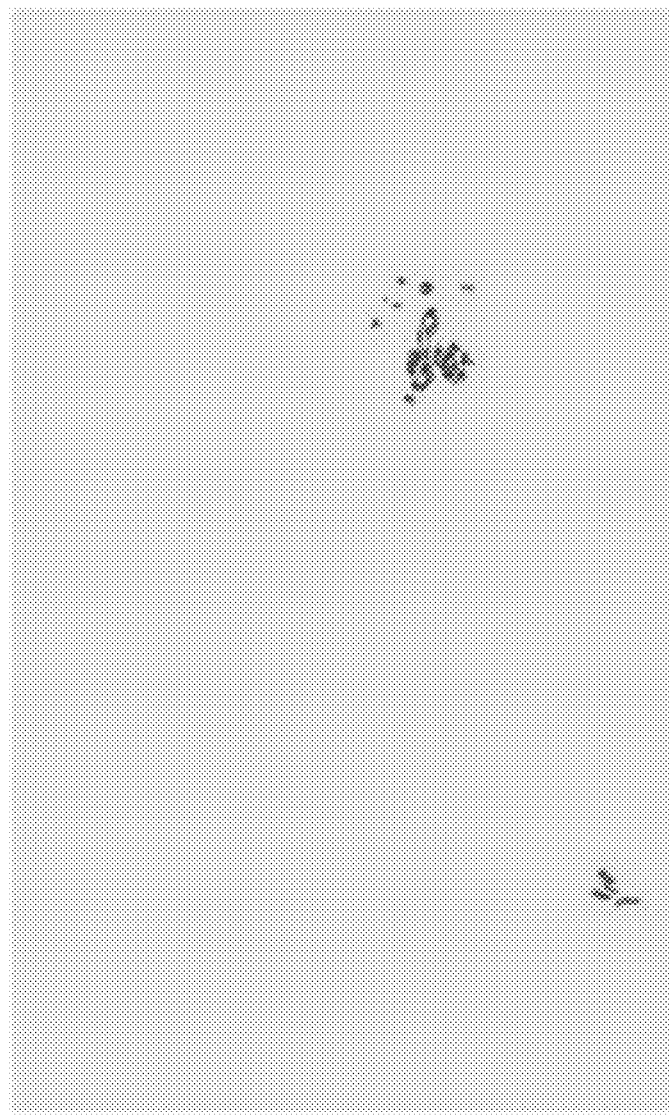
Figure 8C:
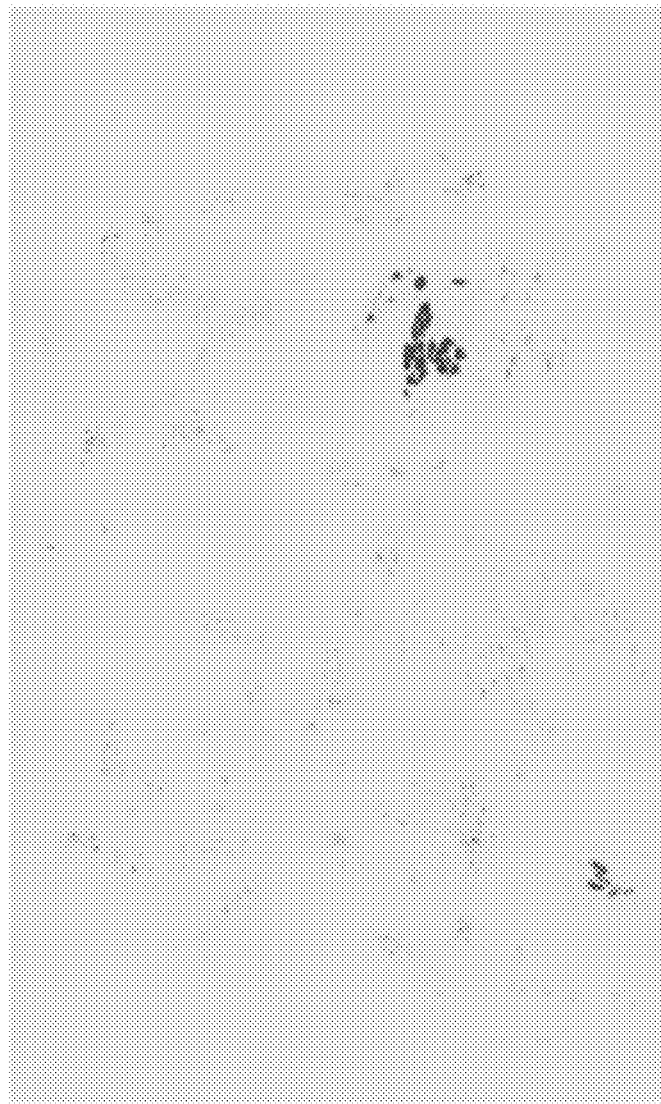
Figure 8D:
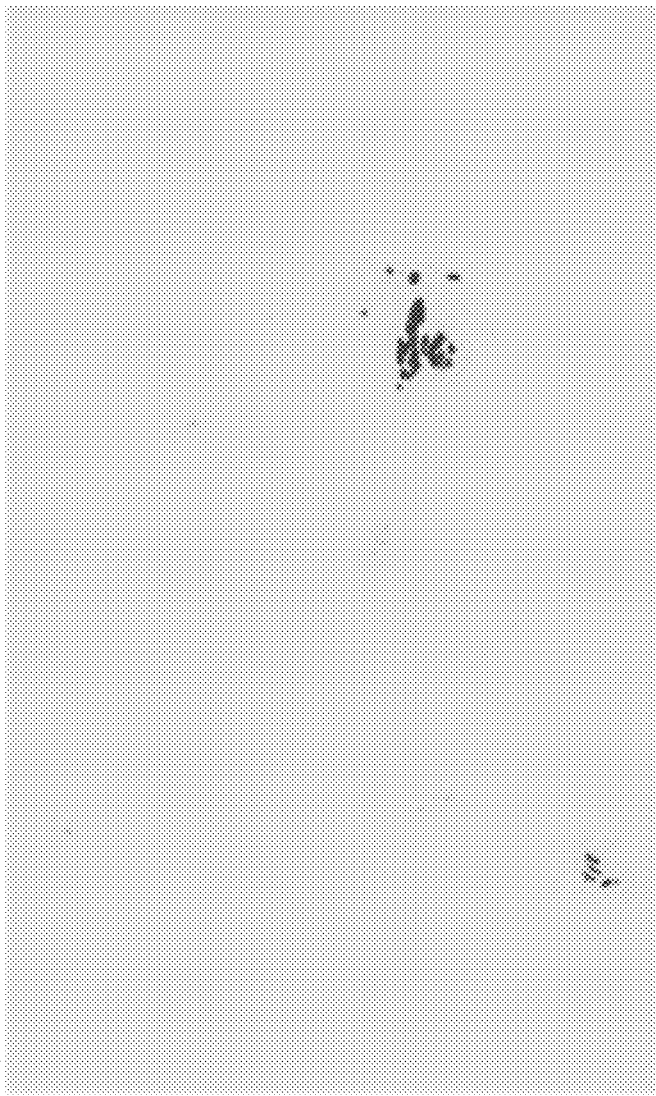
Figure 8E:
Figure 8F:
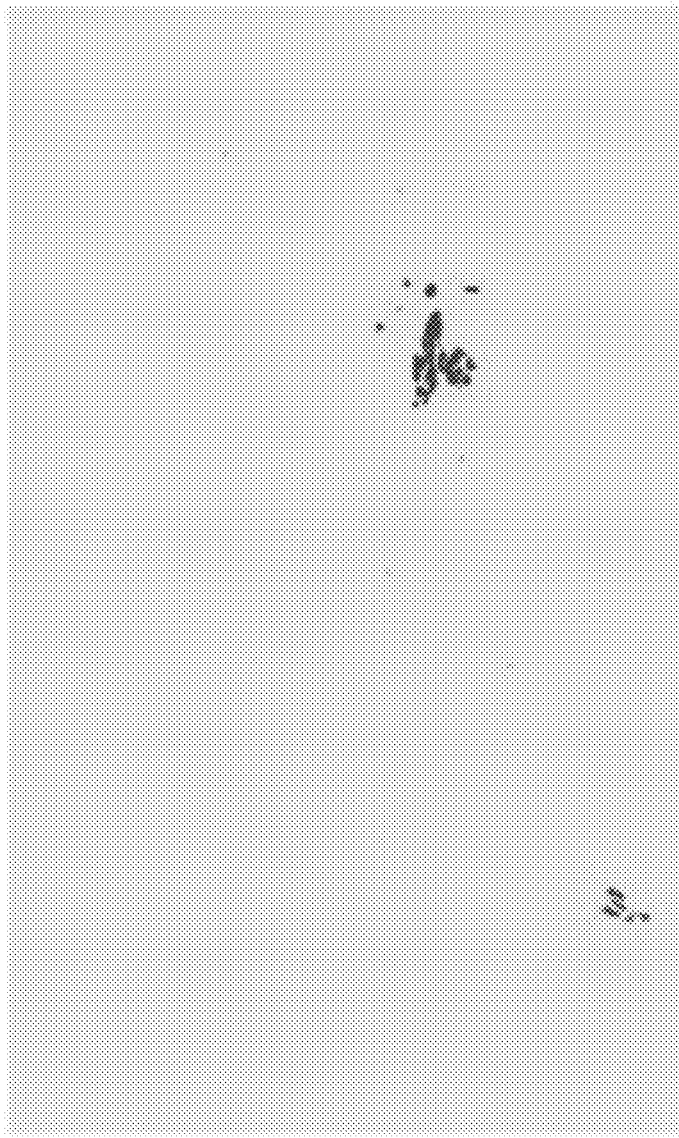
Figure 8G:
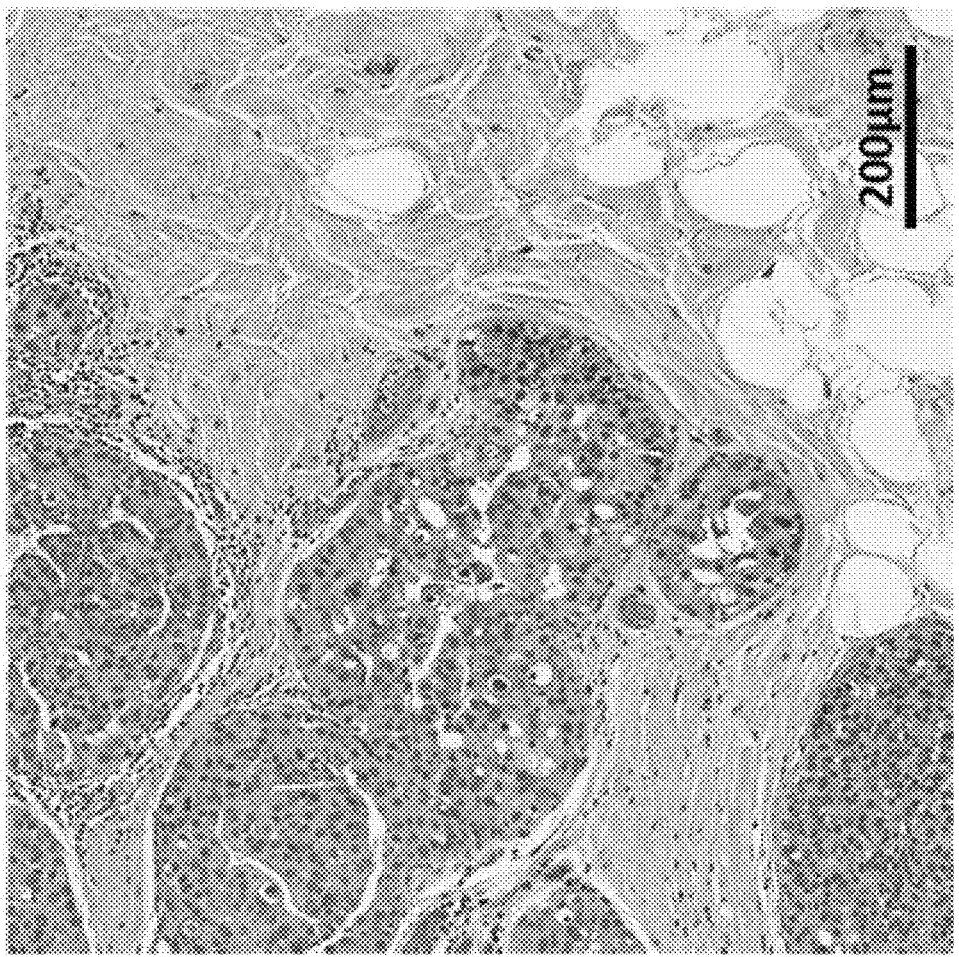
Figure 8H:
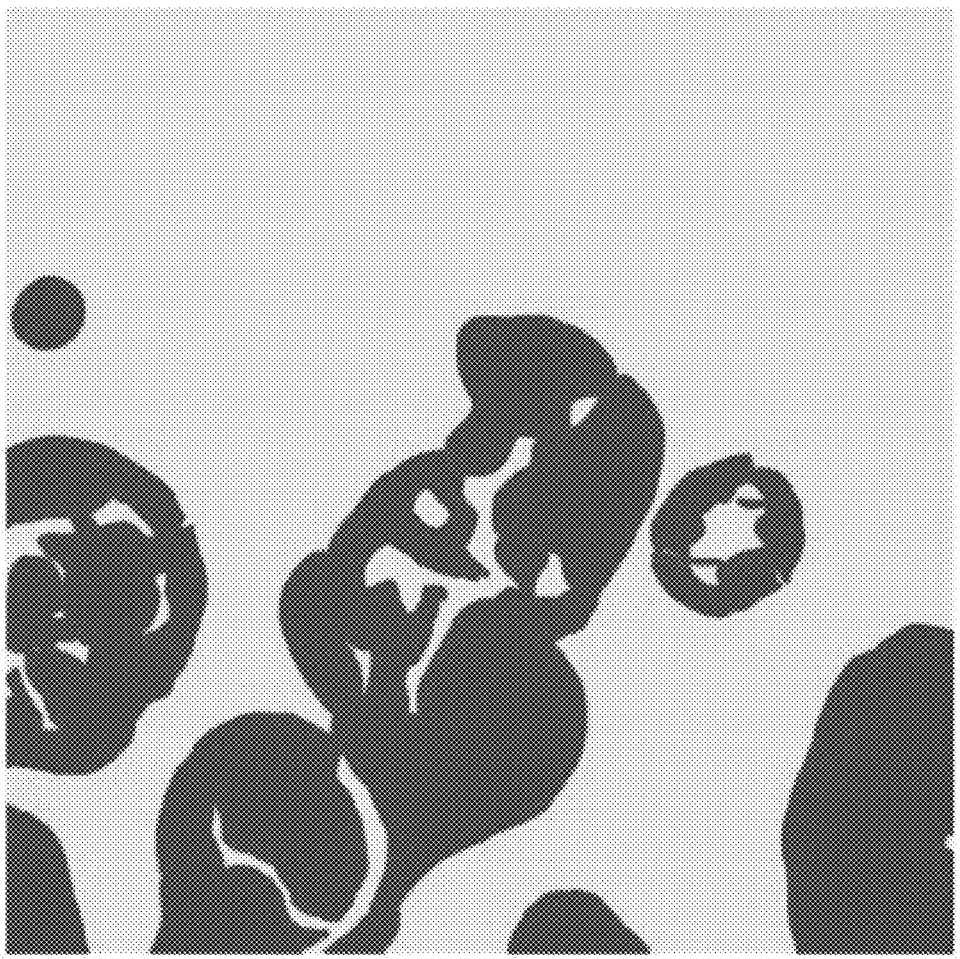
Figure 8I:
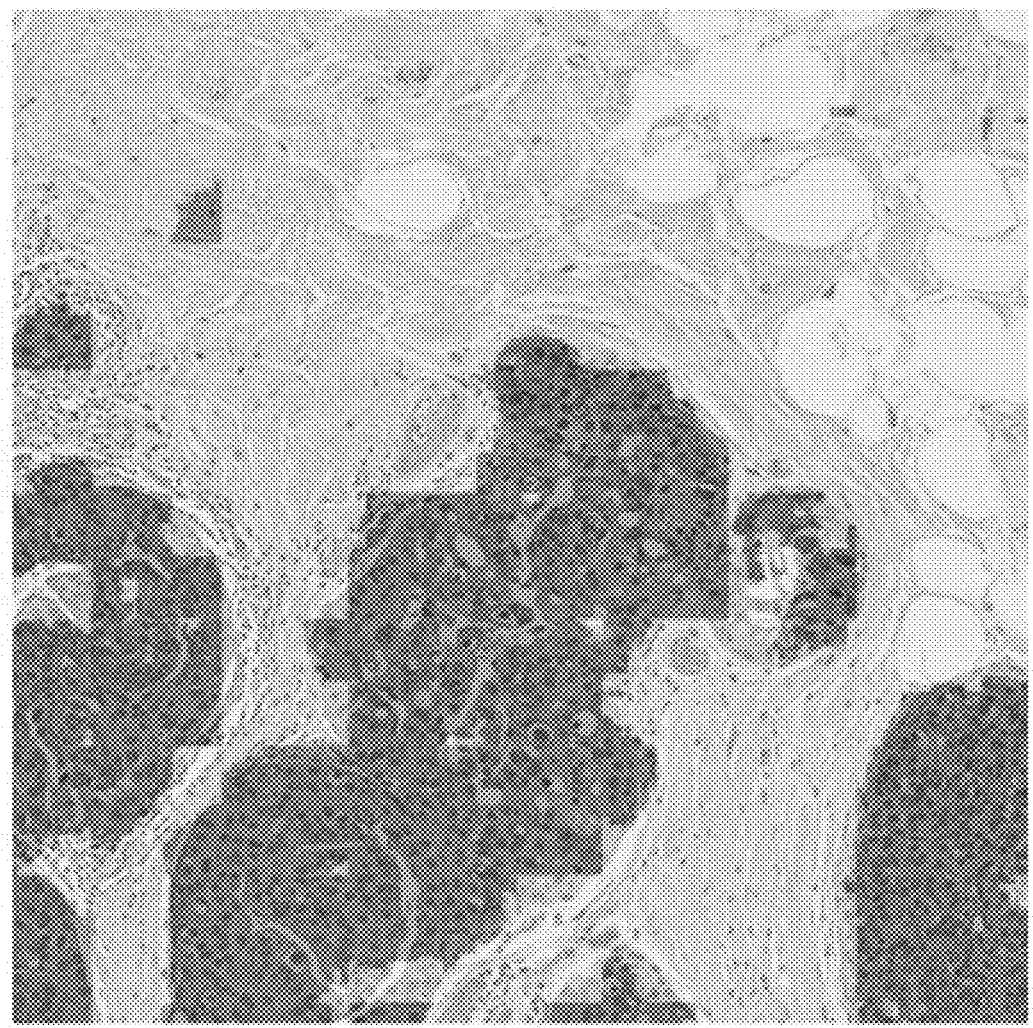
Figure 8J:
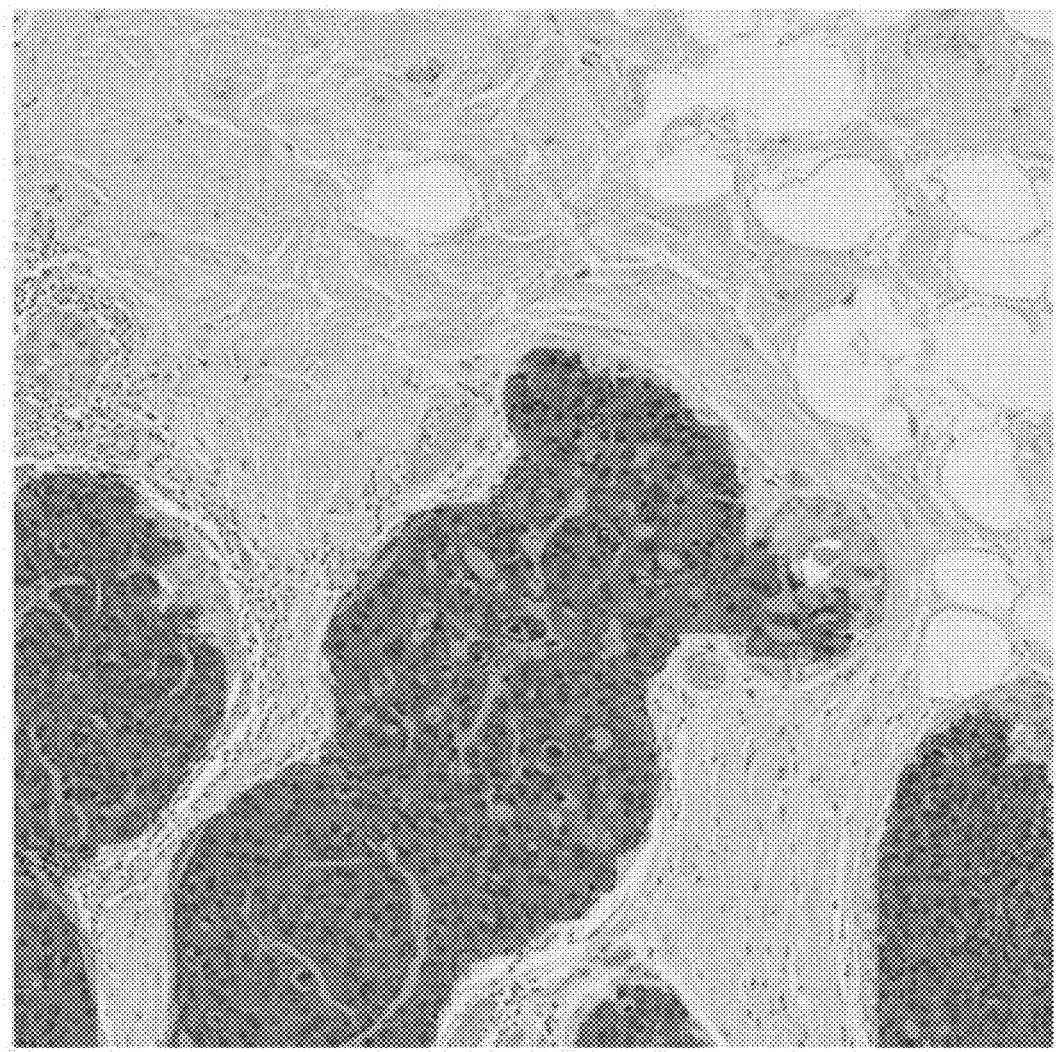
Figure 8K:
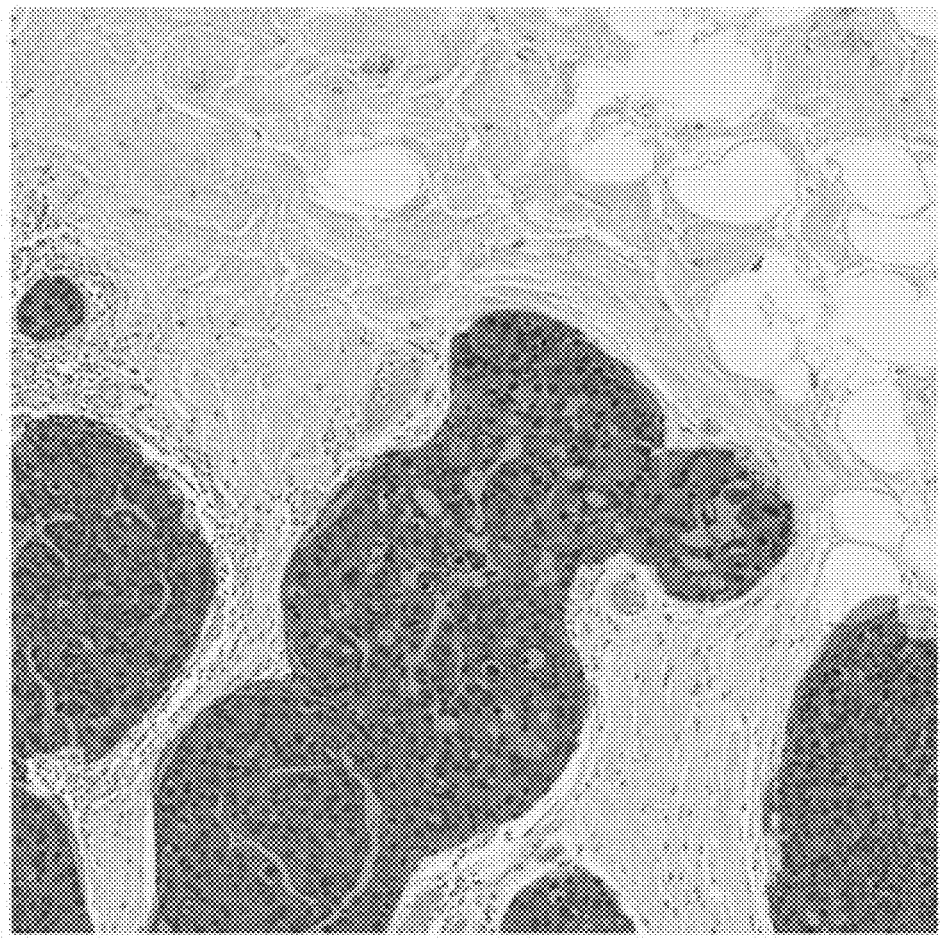
Figure 8I:
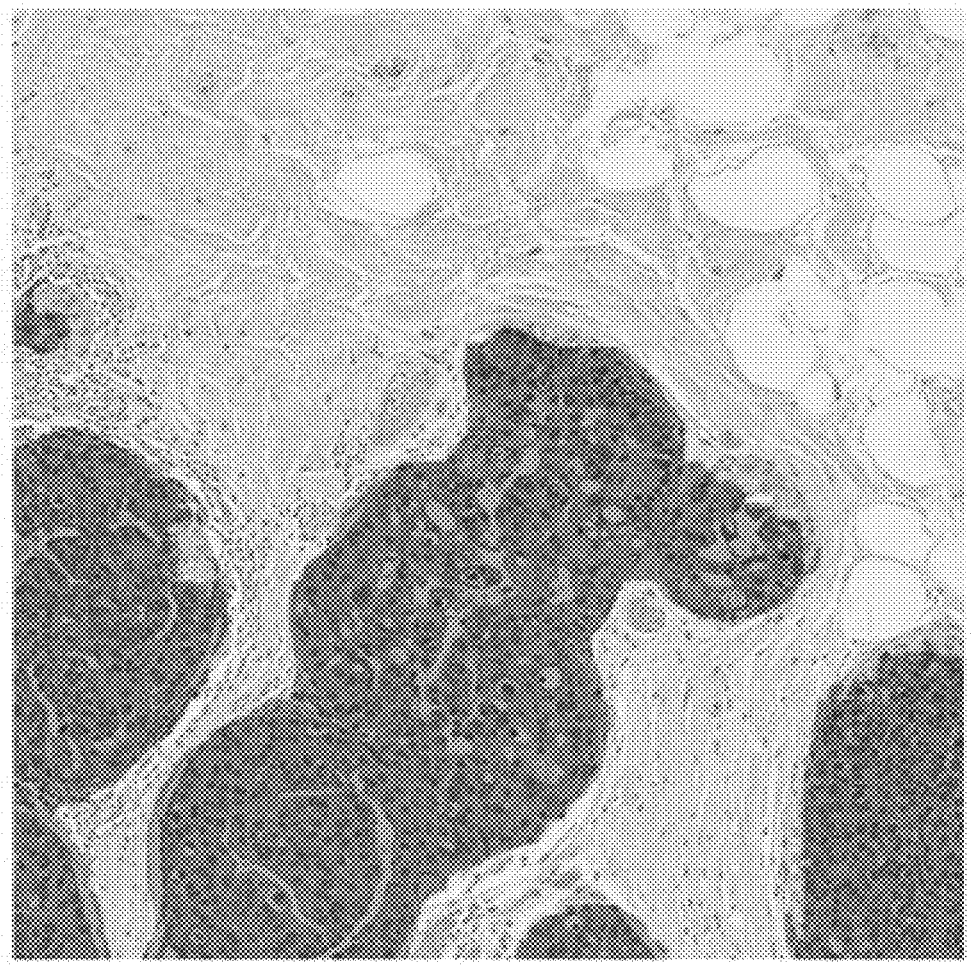
Figure 9A:
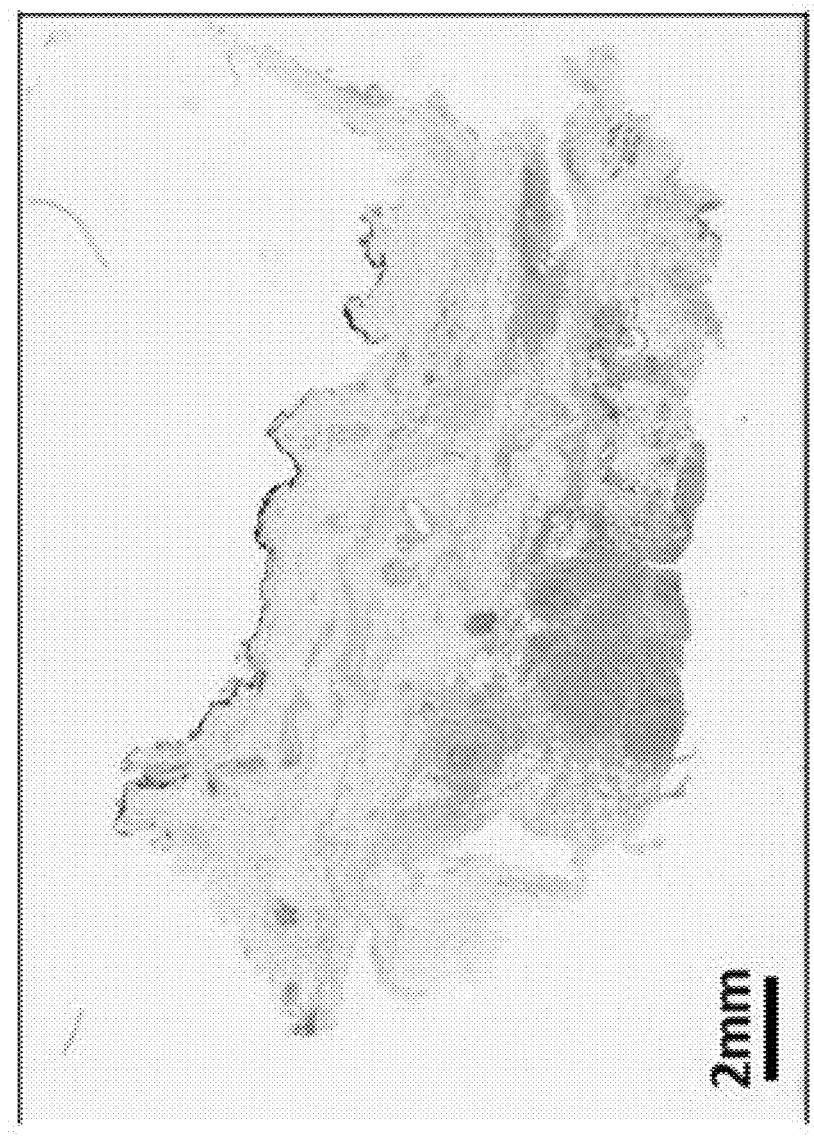
FIGS. 9(a)-(l). Segmentation predictions on the breast margin dataset. (a)-(f) are thumbnail versions of a whole slide image and (g)-(l) are zoom-in images with size of 1024×1024 pixels in magnification of 10×. (a) and (g) are original image, (b) and (h) are exhaustive annotations, (c) and (i) are segmentation predictions using the Single-Encoder Single Decoder (SESD) architecture, (d) and (j) are segmentation predictions using the Multi-Encoder Single Decoder (MESD) architecture, (e) and (k) are segmentation predictions using the Multi-Encoder Multi-Decoder Single-Concatenation (MEMDSC) architecture, and (f) and (l) are segmentation predictions using the Multi-Encoder Multi-Decoder Multi-Concatenation (MEMDMC) architecture.
Figure 9B:
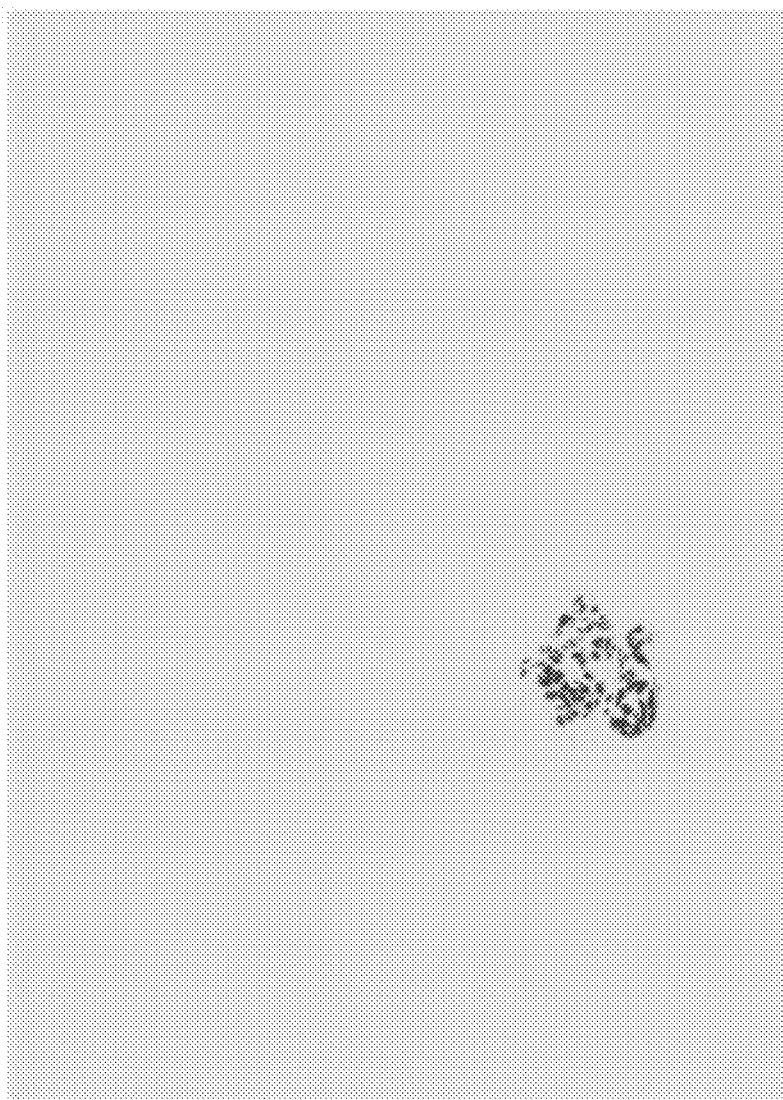
Figure 9C:
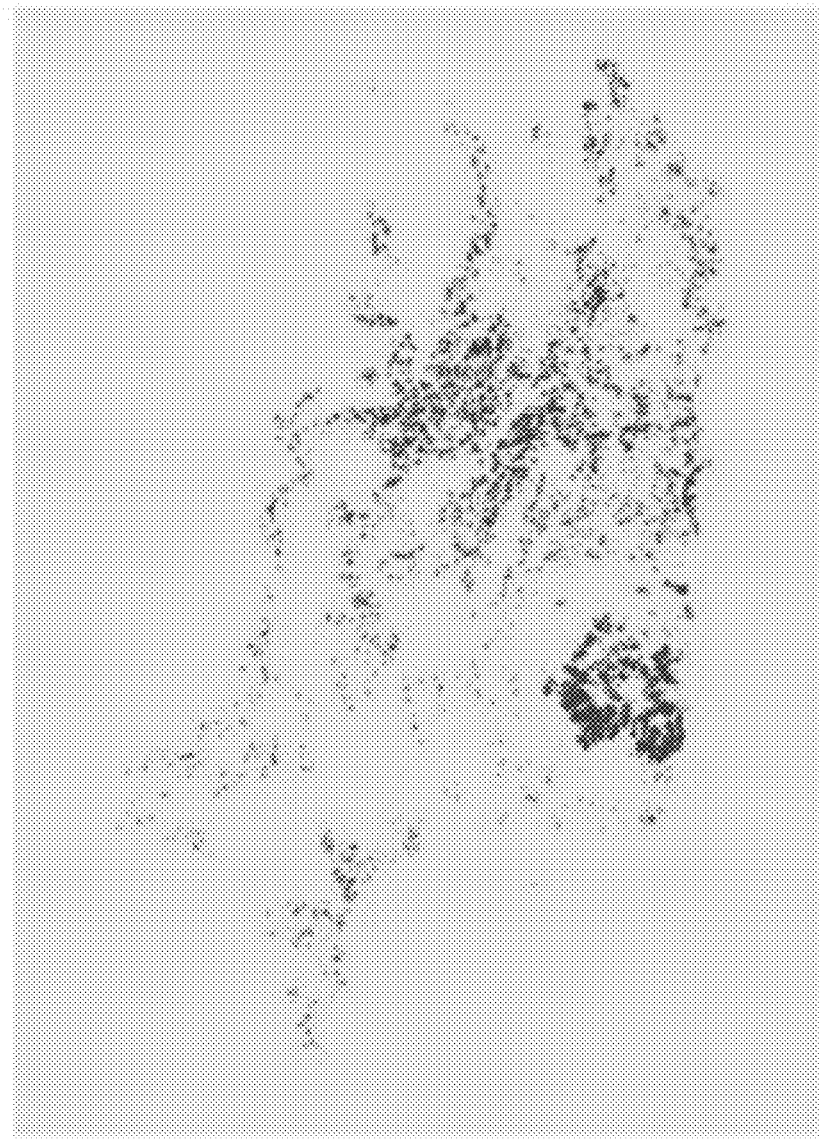
Figure 9D:
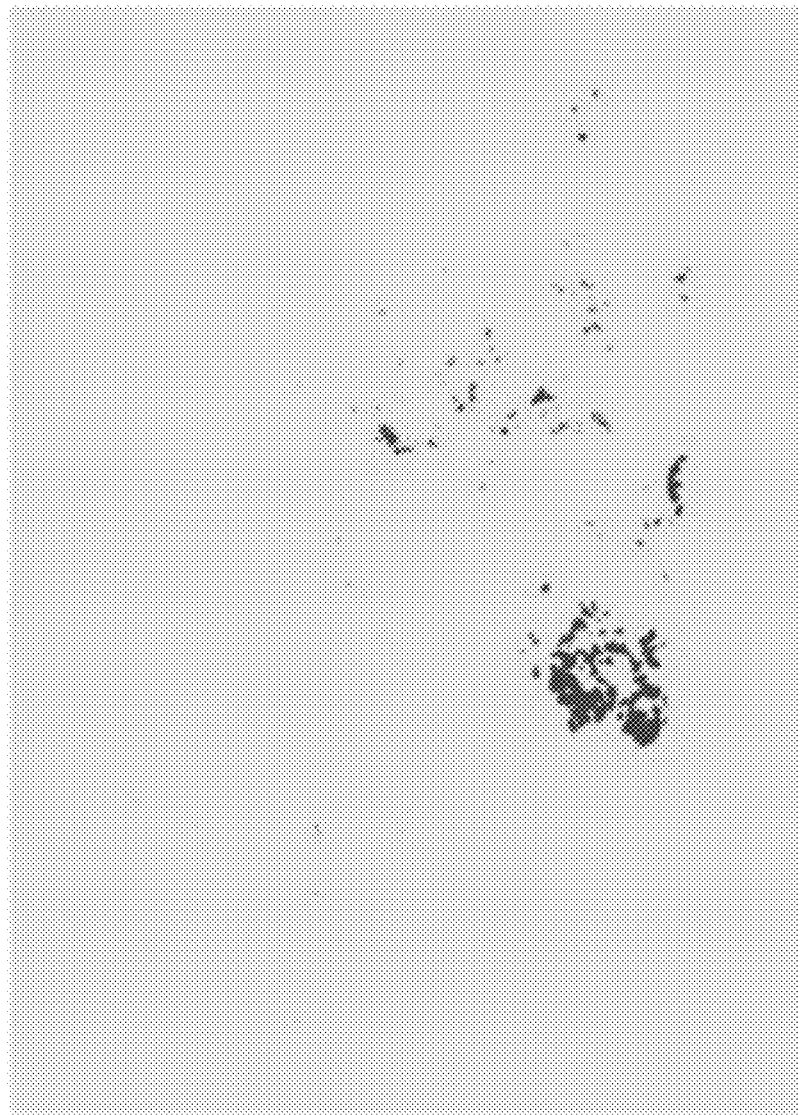
Figure 9E:
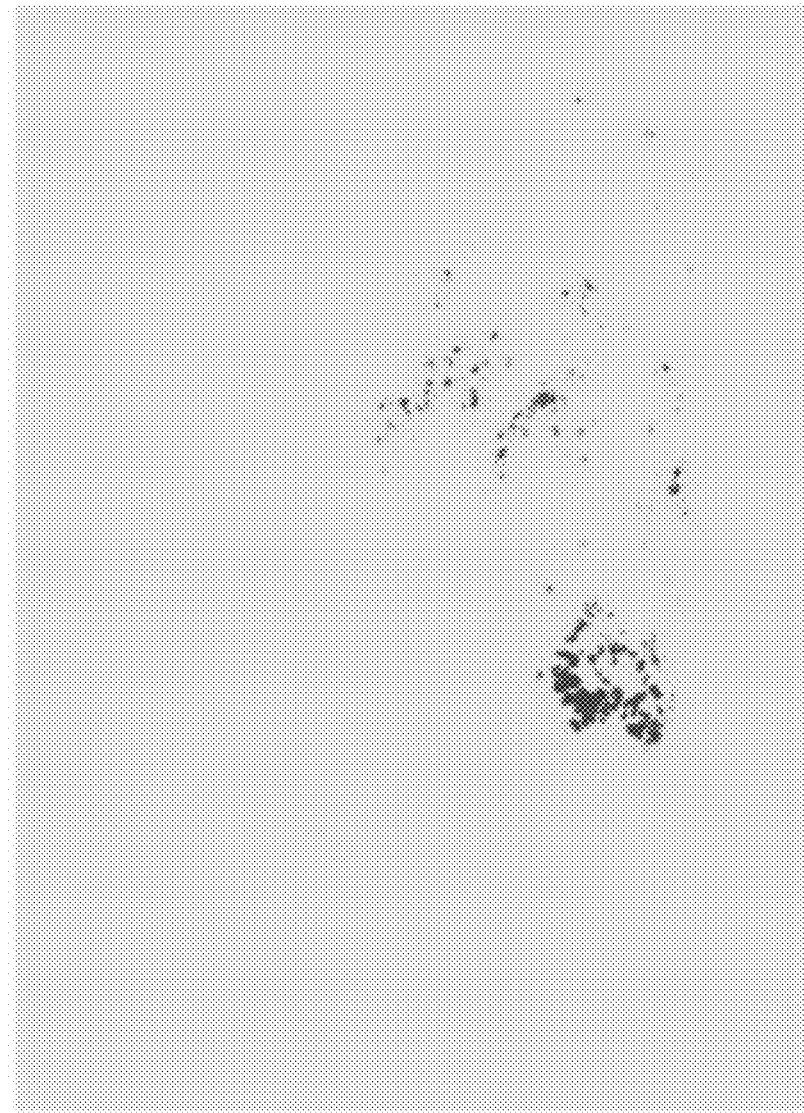
Figure 9F:
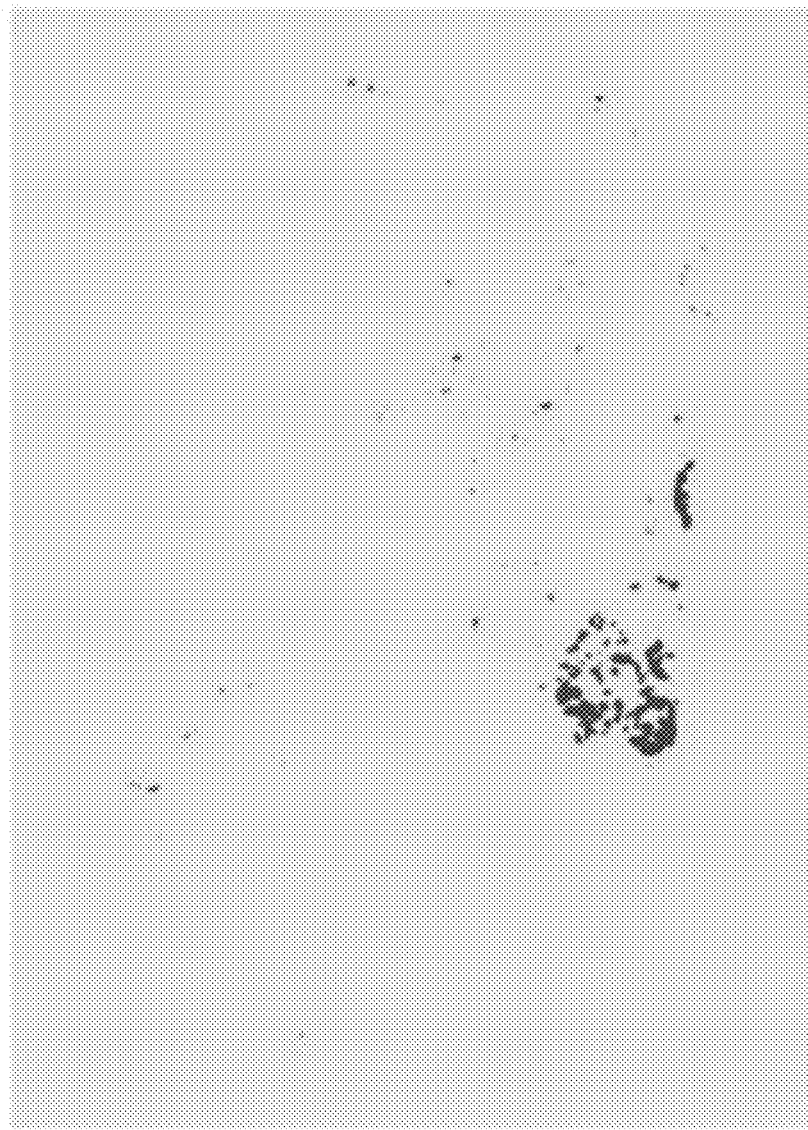
Figure 9G:
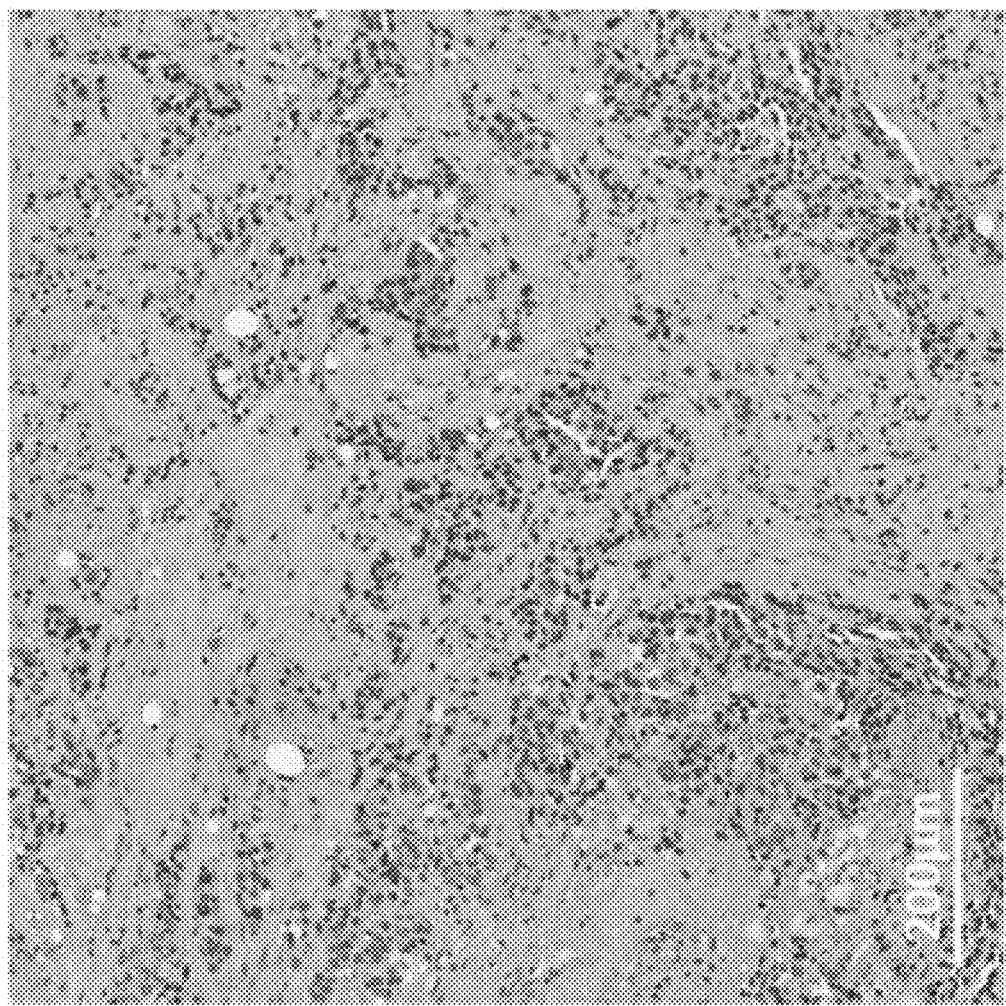
Figure 9H:
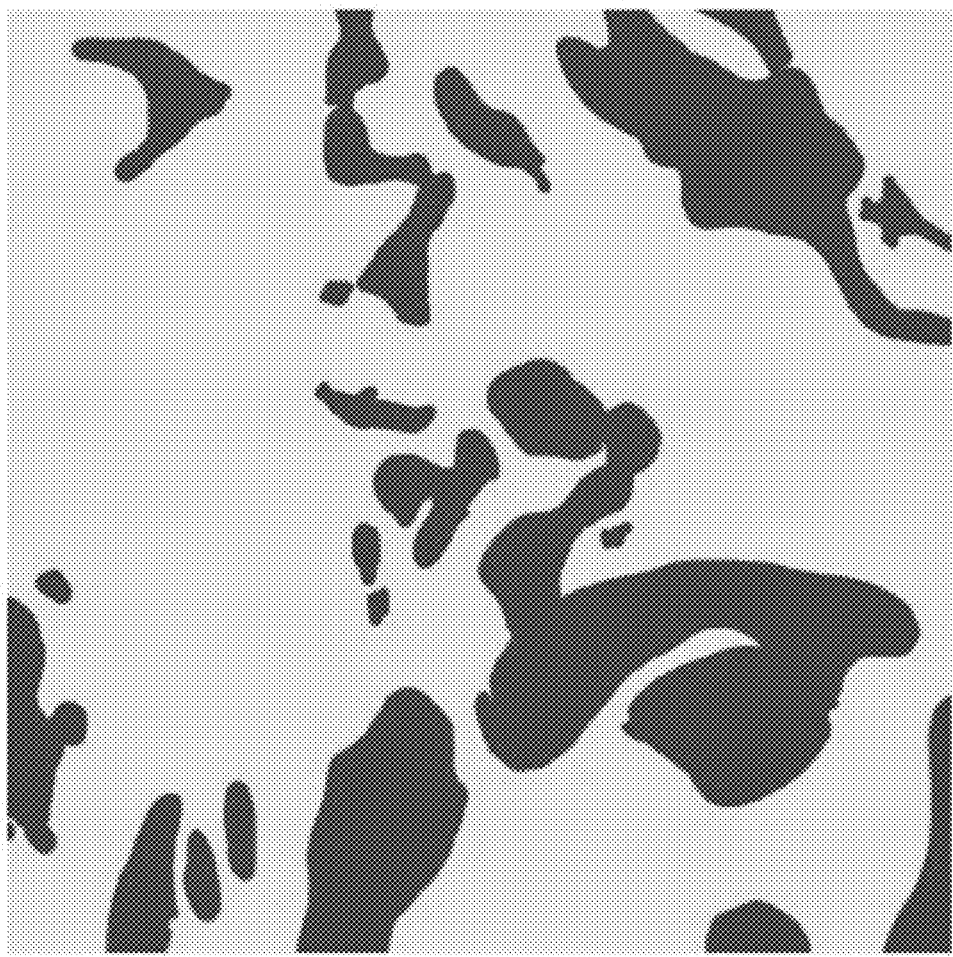
Figure 9I:
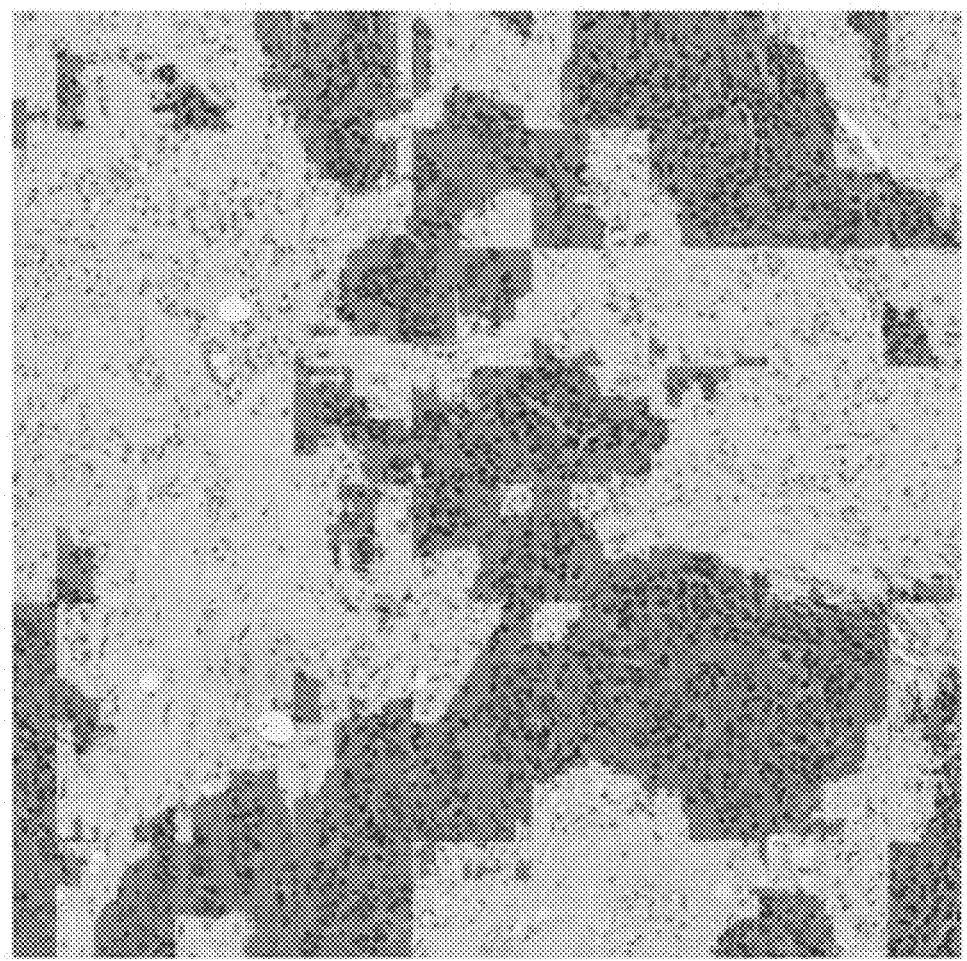
Figure 9J:
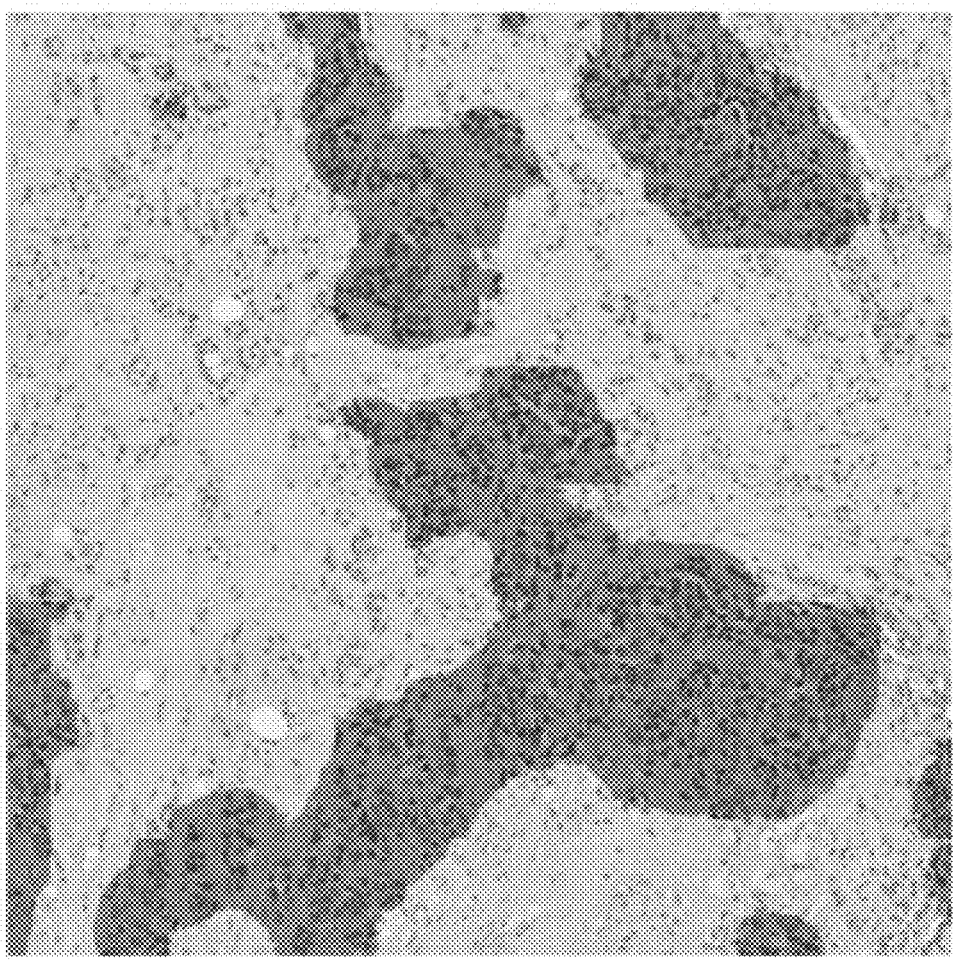
Figure 9K:
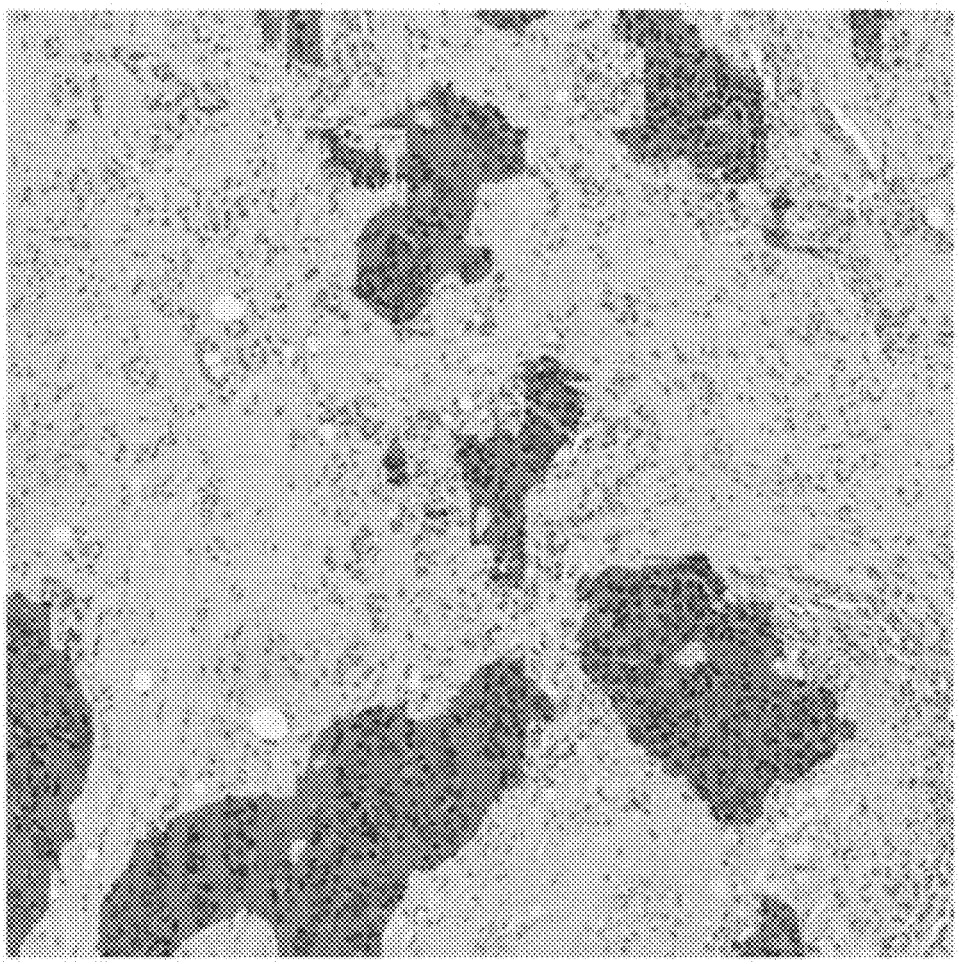
Figure 9L:
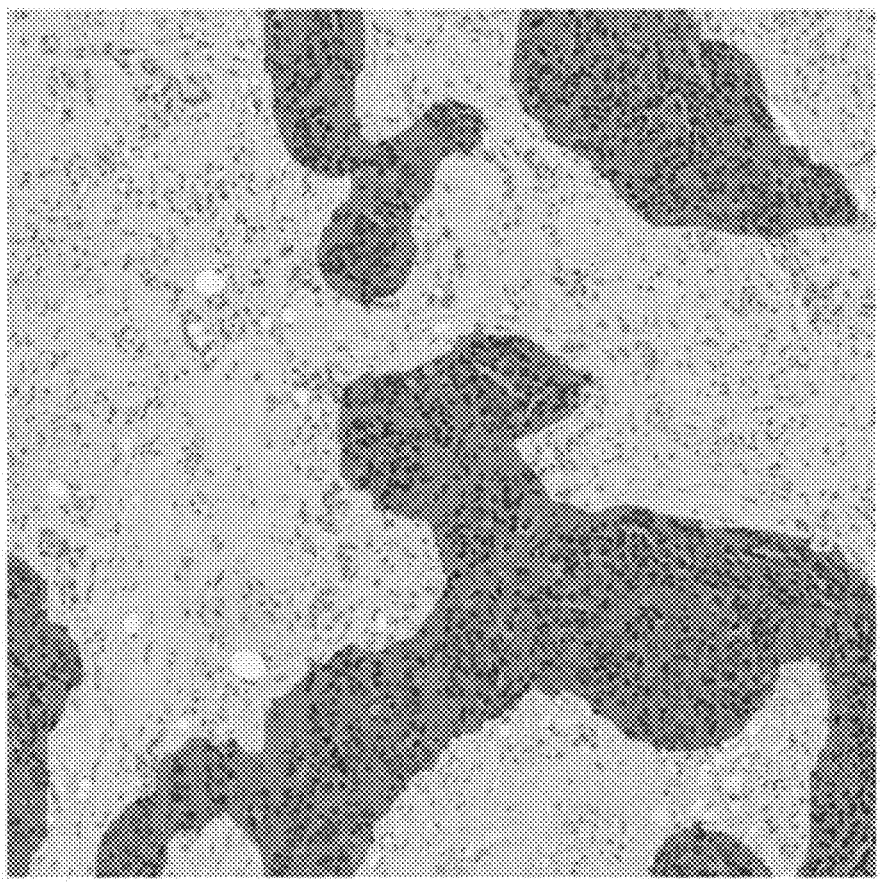

Thirty-eight images were partially annotated from the TNBC dataset. The TNBC dataset was split as 26 training images, 6 validation images, and 6 testing images. Six classes (C=6) may be used in the TNBC dataset which are carcinoma, benign epithelial, background, stroma, necrotic, and adipose. Note that background is defined as regions which are not tissue. Here, 5.48% of pixels of whole slide images were annotated. To balance the number of annotated pixels between classes, the values $r_2=10$, $r_1=2$, $r_5=3$, $r_3=1$, $r_4=0$, and $r_6=0$ were empirically set where $r_1$, $r_2$, $r_3$, $r_4$, $r_5$, and $r_6$ are rates of elastic deformation of carcinoma, benign epithelial, background, stroma, necrotic, and adipose, respectively. Benign epithelial was selected as the highest class order followed by carcinoma, necrotic, and background to accurately segment carcinoma regions and to separate benign epithelial to reduce false segmentation. FIG. 5 shows the number of annotated pixels between classes are balanced using elastic deformation. Using a single NVIDIA GeForce GTX TITAN X GPU, the training process took approximately 3 days.

FIGS. 6 and 7 show multi-class segmentation predictions of the Single-Encoder Single-Decoder (SESD) architecture, the Multi-Encoder Single-Decoder (MESD) architecture, the Multi-Encoder Multi-Decoder Single-Concatenation (MEMDSC) architecture, and the proposed Multi-Encoder Multi-Decoder Multi-Concatenation (MEMDMC) architecture, both slide-level and 10× magnification. Here, carcinoma is labeled in red, benign epithelial in blue, background in yellow, stroma in green, necrotic in gray, and adipose in orange. Note that white regions in FIGS. 6(b), (h) and 7(b), (h) are unlabeled. The Otsu thresholding technique is not used for segmentation on the TNBC dataset because it was observed that adipose regions are predicted as background due to their pixel intensities. Without the Otsu thresholding technique, segmentation on one WSI took approximately 15 minutes using the single GPU. It is observed that SESD does not produce accurate boundaries between subtypes because the field-of-view is narrow to make accurate segmentation predictions. MESD sometimes cannot distinguish between carcinoma and benign epithelial. MEMDSC and MEMDMC produce accurate segmentation predictions for the TNBC images.

The breast margin images were processed using the same multi-class segmentation models. All carcinoma regions were exhaustively annotated for precise evaluation. FIGS. 8 and 9 show segmentation predictions on breast margin images, both slide-level and 10× magnification. A cancer segmentation of breast margin images may be done, so that cancer regions are labeled in red and non-cancer regions including benign epithelial, background, stroma, necrotic, and adipose are labeled in yellow. The Otsu thresholding technique was used before tiling the whole slide images to reduce processing time to segment cancer regions on breast margin images. With the Otsu thresholding technique, segmentation on one WSI took approximately 2 minutes using the single GPU. SESD still produces segmentation predictions with inaccurate boundary. It is observed that large non-cancer regions are falsely segmented as cancer by MEMDSC. MESD and MEMDMC produce accurate segmentation on carcinoma regions for the breast margin images.

The predictions were evaluated numerically using intersection-over-union (IOU), recall, and precision. IOU, recall, and precision are defined as the followings:

$$IOU = \frac{N_{TP}}{N_{TP} + N_{FP} + N_{FN}} \quad (3)$$

$$Recall = \frac{N_{TP}}{N_{TP} + N_{FN}} \quad (4)$$

$$Precision = \frac{N_{TP}}{N_{TP} + N_{FP}} \quad (5)$$

where $N_{TP}$, $N_{FP}$ and $N_{FN}$ are the number of pixels for true-positive, false-positive, and false-negative, respectively. Tables I, II, and III show IOU, recall, and precision values on the TNBC dataset, respectively. Note that the evaluations in Tables I, II, and III were done using the partially-annotated TNBC images. The method (MEMDMC) outperforms other architectures. Especially, separating carcinoma and benign epithelial is known to be challenging due to similar morphological patterns but the method has the highest IOU for both carcinoma and benign epithelial. Table IV shows IOU, recall, and precision on the four models on carcinoma regions on the breast margin dataset. The model was trained on TNBC dataset and breast margin images were kept aside for the testing set. Note only 0.188% of pixels in the 10 breast margin images were exhaustively labeled as carcinoma. SESD and MEMDSC have low precision values because many non-cancer regions are segmented as cancer. MESD can successfully segment carcinoma regions on the breast margin images but it does not segment well on the TNBC dataset. This numerical analysis shows that the proposed MEMDMC model has good carcinoma segmentation performance on both datasets, proving that the model can generalize successfully on unseen datasets.

TABLE I

INTERSECTION OVER UNION (IOU) ON THE TNBC DATASET

|  | SESD | MESD | MEMDSC | MEMDMC |
|---|---|---|---|---|
| Carcinoma | 0.869 | 0.895 | 0.899 | 0.927 |
| Benign Epithelial | 0.841 | 0.777 | 0.864 | 0.916 |
| Stroma | 0.877 | 0.909 | 0.899 | 0.916 |
| Necrotic | 0.902 | 0.905 | 0.929 | 0.914 |
| Adipose | 0.966 | 0.979 | 0.976 | 0.985 |
| Background | 0.910 | 0.924 | 0.919 | 0.965 |
| Mean | 0.894 | 0.898 | 0.914 | 0.937 |

TABLE II

RECALL ON THE TNBC DATASET

|  | SESD | MESD | MEMDSC | MEMDMC |
|---|---|---|---|---|
| Carcinoma | 0.966 | 0.955 | 0.981 | 0.966 |
| Benign Epithelial | 0.936 | 0.976 | 0.951 | 0.973 |
| Stroma | 0.919 | 0.940 | 0.923 | 0.946 |
| Necrotic | 0.938 | 0.940 | 0.972 | 0.970 |
| Adipose | 0.977 | 0.985 | 0.985 | 0.991 |
| Background | 0.947 | 0.931 | 0.924 | 0.981 |
| Mean | 0.947 | 0.955 | 0.956 | 0.971 |

TABLE III

PRECISION ON THE TNBC DATASET

| | SESD | MESD | MEMDSC | MEMDMC |
|---|---|---|---|---|
| Carcinoma | 0.869 | 0.934 | 0.915 | 0.958 |
| Benign Epithelial | 0.892 | 0.791 | 0.904 | 0.940 |
| Stroma | 0.951 | 0.965 | 0.971 | 0.967 |
| Necrotic | 0.959 | 0.960 | 0.954 | 0.941 |
| Adipose | 0.989 | 0.993 | 0.991 | 0.994 |
| Background | 0.959 | 0.992 | 0.994 | 0.983 |
| Mean | 0.941 | 0.939 | 0.955 | 0.964 |

TABLE IV

INTERSECTION OVER UNION (IOU), RECALL, AND PRECISION FOR CARCINOMA REGIONS ON THE BREAST MARGIN DATASET

| | SESD | MESD | MEMDSC | MEMDMC |
|---|---|---|---|---|
| IOU | 0.205 | 0.468 | 0.341 | 0.447 |
| Recall | 0.601 | 0.612 | 0.566 | 0.587 |
| Precision | 0.237 | 0.666 | 0.462 | 0.653 |

IV. Conclusions

Described herein is a Deep Multi-Magnification Network (DMMN) for an accurate multi-class tissue segmentation on whole slide images. The model is trained by partially-annotated images to reduce time and effort for annotators. Although the annotation was partially done, the model was able to learn not only spatial characteristics within a class but also spatial relationship between classes. The DMMN architecture see all 20×, 10×, and 5× magnifications to have a wider field-of-view to make more accurate predictions. It was also able to improve previous DMMNs by transferring intermediate feature maps in 10× and 5× decoders to the 20× decoder to enrich feature maps.

The implementation achieved outstanding segmentation performance on multiple breast dataset. Especially, automatic cancer segmentation on breast margin images can be used to decide patients' future treatment. It is observed that the model may not successfully segment low-grade well-differentiated carcinomas presented in breast images because it was mainly trained by invasive ductal carcinomas. In the future, a more accurate DMMN model may be developed where various cancer structures are included during training.

B. Second Approach for Deep Multi-Magnification Networks for Multi-Class Breast Cancer Image Segmentation.

I. Introduction

Breast carcinoma is the most common cancer to be diagnosed for women. Approximately 12% of women in the United States will be diagnosed with breast cancer during their lifetime. Pathologists diagnose breast carcinoma based on a variety of morphologic features including tumor growth pattern and nuclear cytologic features. Pathologic assessment of breast tissue dictates the clinical management of the patient and provides prognostic information. Breast tissue from a variety of biopsies and surgical specimens is evaluated by pathologists. For example, patients with early-stage breast cancer often undergo breast-conserving surgery, or lumpectomy, which removes a portion of breast tissue containing the cancer. To determine the completeness of the surgical excision, the edges of the lumpectomy specimen, or margins, are evaluated microscopically by a pathologist. Achieving negative margins (no cancer found touching the margins) is important to minimize the risk of local recurrence of the cancer. Accurate analysis of margins by the pathologist is critical for determining the need for additional surgery. Pathologic analysis of margin specimens involves the pathologist reviewing roughly 20-40 histologic slides per case, and this process can be time-consuming and tedious. With the increasing capabilities of digitally scanning histologic glass slides, computational pathology approaches could potentially improve the efficiency and accuracy of this process by evaluating whole slide images (WSIs) of specimens.

Various approaches have been used to analyze WSIs. Most models include localization, detection, classification, and segmentation of objects (i.e. histologic features) in digital slides. Histopathologic features include pattern-based identification, such as nuclear features, cellular/stromal architecture, or texture. Computational pathology has been used in nuclei segmentation to extract nuclear features such as size, shape, and relationship between them. Nuclei segmentation is done by adaptive thresholding and morphological operations to find regions where nuclei density is high. A breast cancer grading method can be developed by gland and nuclei segmentation using a Bayesian classifier and structural constraints from domain knowledge. To segment overlapping nuclei and lymphocytes, an integrated active contour based on region, boundary, and shape is presented in. A gland segmentation and classification method in prostate tissue is introduced where structural and contextual features from nuclei, cytoplasm, and lumen are used to classify artifact, normal gland, and cancer gland. These nuclei-segmentation-based approaches are challenging because shapes of nuclei and structures of cancer regions may have large variations in the tissues captured in the WSIs.

Recently, deep learning, a type of machine learning, has been widely used for automatic image analysis due to the availability of a large training dataset and the advancement of graphics processing units (GPUs). Deep learning models composed of deep layers with non-linear activation functions enable to learn more sophisticated features. Especially, convolutional neural networks (CNNs) learning spatial features in images have shown outstanding achievements in image classification, object detection, and semantic segmentation. Fully Convolutional Network (FCN) in developed for semantic segmentation, also known as pixelwise classification, can understand location, size, and shape of objects in images. FCN is composed of an encoder and a decoder, where the encoder extracts low-dimensional features of an input image and the decoder utilizes the low-dimensional features to produce segmentation predictions. To improve segmentation predictions, SegNet introduces max-unpooling layers where max-pooling indices in an encoder are stored and used at the corresponding upsampling layers in a decoder. Semantic segmentation has been used on medical images to automatically segment biological structures. For example, U-Net is used to segment cells in microscopy images. U-Net architecture has concatenations transferring feature maps from an encoder to a decoder to preserve spatial information. This architecture has shown more precise segmentation predictions on biomedical images.

Deep learning has recently received high attention in the computational pathology community. Investigators have shown automated identification of invasive breast cancer detection in WSIs by using a simple 3-layer CNN. A method of classifying breast tissue slides to invasive cancer or benign by analyzing stroma regions using CNNs is described in. More recently, a multiple-instance-learning-based CNN achieves 100% sensitivity where the CNN is trained by 44,732 WSIs from 15,187 patients. The availability of public pathology datasets contributes to develop many deep learning approaches for computational pathology. For example, a breast cancer dataset to detect lymph node metastases was released for the CAMELYON challenges and several deep learning techniques to analyze breast cancer datasets are developed.

One challenge of using deep learning on WSIs is that the size of a single, entire WSI is too large to be processed into GPUs. Images can be downsampled to be processed by pretrained CNNs but critical details needed for clinical diagnosis in WSIs would be lost. To solve this, patch-based approaches are generally used instead of slide-level approaches. Here, patches are extracted from WSIs to be processed by CNNs. A patch-based process followed by a multi-class logistic regression to classify in slide-level is described in. The winner of the CAMELYON16 challenge uses the Otsu thresholding technique to extract tissue regions and trains a patch-based model to classify tumor and non-tumor patches. To increase the performance, class balancing between tumor and non-tumor patches and data augmentation techniques such as rotation, flip, and color jittering are used in. The winner of the CAMELYON17 challenge additionally develops patch-overlapping strategy for more accurate predictions. In, a patch is processed with an additional larger patch including border regions in the same magnification to segment subtypes in breast WSIs. Alternatively, Representation-Aggregation CNNs to aggregate features generated from patches in WSIs are developed to share representations between patches. Patch-based approaches are not realistic because (1) pathologists do not look at slides in patch-level with a narrow field-of-view and (2) they switch zoom levels frequently to extract various features on slides from multiple magnifications.

Figure 10A:
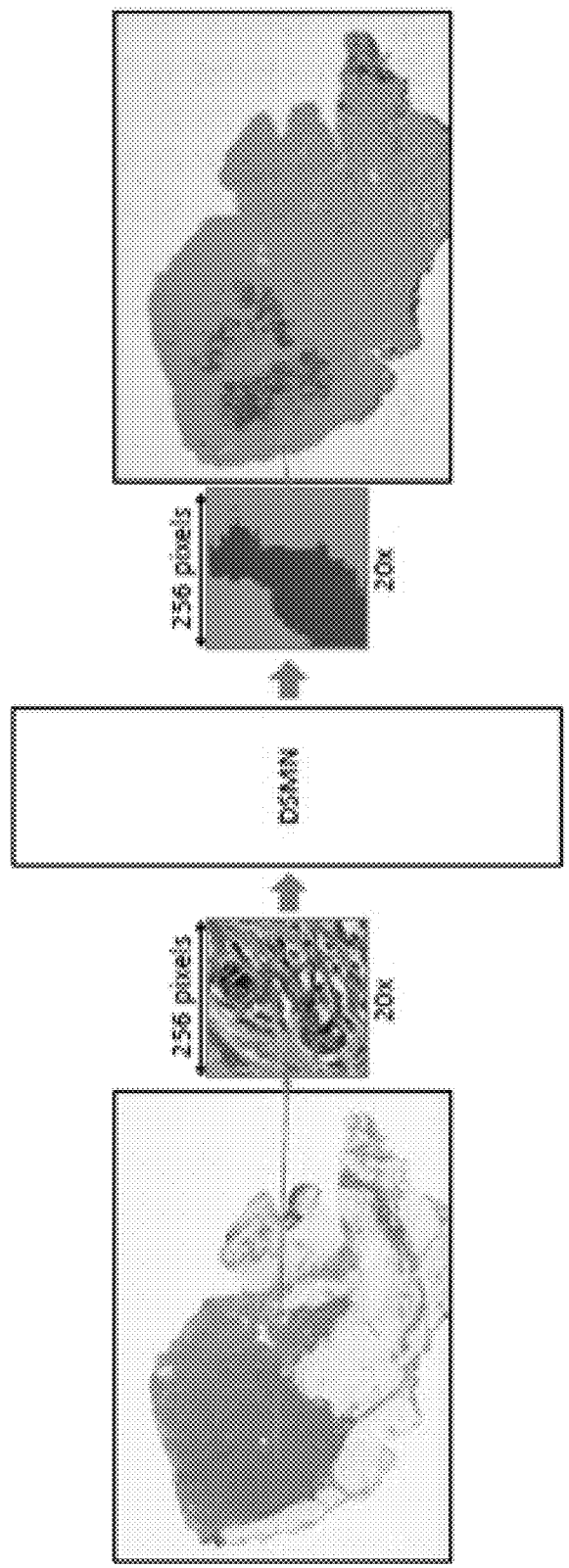
FIGS. 10(a) and (b). Comparison between a Deep Single-Magnification Network (DSMN) and a Deep Multi-Magnification Network (DMMN). (a) A DSMN looks at a patch from a single magnification with limited field-of-view. (b) A DMMN looks at a set of patches from multiple magnifications to have wider field-of-view. The DMMN can learn both cellular features from a higher magnification and architectural growth patterns from a lower magnification for more accurate predictions.
Figure 10B:
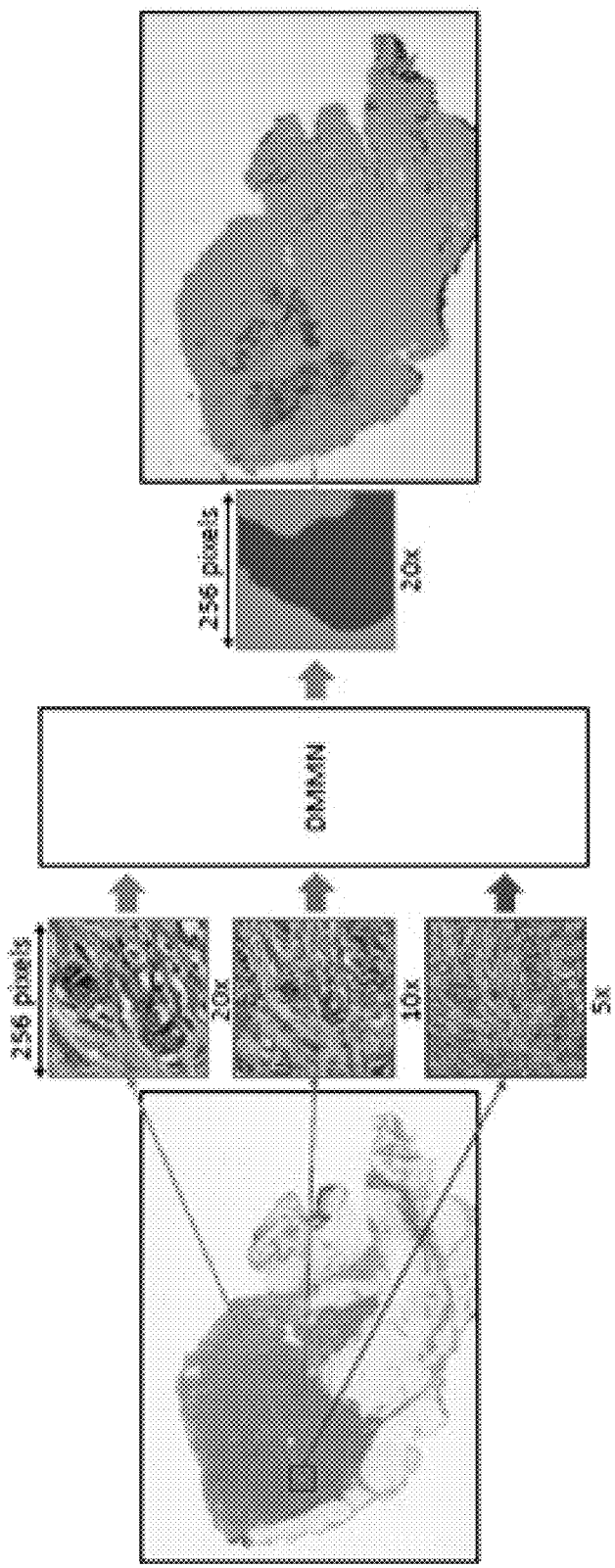

To develop more realistic CNNs, it is required to input a set of patches in multiple magnifications to increase the field-of-view and provide more information from other magnifications. High magnification patches provide details at the cellular level, such as nuclear features, whereas low magnification patches demonstrate distribution of tissue types and architectural growth patterns of benign and malignant processes. FIG. 1 shows the difference between a Deep Single-Magnification Network (DSMN) and a Deep Multi-Magnification Network (DMMN). An input to a DSMN in FIG. 10(*a*) is a single patch with size of 256×256 pixels in a single magnification of 20× which limits a field-of-view. An input to a DMMN in FIG. 10(*b*) is a set of patches with size of 256×256 pixels in multiple magnifications in 20×, 10×, and 5× allowing a wider field-of-view. DMMN can mimic how pathologists look at slides using a microscope by providing multiple magnifications in a wider field-of-view and this can produce more accurate analysis.

There are several works using multiple magnifications to analyze images from tissue samples. A multi-input multi-output CNN is introduced by analyzing an input image in multiple resolutions to segment cells in fluorescence microscopy images. Similarly, a stain-aware multi-scale CNN is further designed for instance cell segmentation in histology images. To segment tumor regions in the CAMELYON dataset, a binary segmentation CNN is described in. In this work, four encoders for different magnifications are implemented but only one decoder is used to generate the final segmentation predictions. More recently, a CNN architecture composed of three expert networks for different magnifications, a weighting network to automatically select weights to emphasize specific magnifications based on input patches, and an aggregating network to produce final segmentation predictions is developed in. Here, feature maps are not shared between the three expert networks until the last layer which can limit utilizing feature maps from multiple magnifications. Architectures designed in and center-crop feature maps in lower magnifications and then upsample the cropped feature maps to match the size and magnification during concatenations which can also limit the usage of feature maps on cropped boundary regions in lower magnifications.

Presented herein is a Deep Multi-Magnification Network (DMMN) to accurately segment multiple subtypes in images of breast tissue. The DMMN architecture has multiple encoders, multiple decoders, and multiple concatenations between decoders to have richer feature maps in intermediate layers. To fully utilize feature maps in lower magnifications, intermediate feature maps may be center-cropped during concatenations. By concatenating intermediate feature maps in each layer, feature maps from multiple magnifications can be used to produce accurate segmentation predictions. To train the DMMN, WSIs may be partially annotated, similarly done as, to reduce the burden of annotations. The DMMN model trained by the partial annotations can learn not only features of each subtype, but also morphological relationship between subtypes especially transitions from one subtype to another subtype on boundary regions, which leads to outstanding segmentation performance. The multi-magnification model may be tested on two breast datasets and observe that the model consistently outperforms other architectures. The method can be used to automatically segment cancer regions on breast images to assist in diagnosis of patients' status and to decide future treatments. The main contributions of the work are the following: (1) Deep Multi-Magnification Networks combining feature maps in various magnification for more accurate segmentation predictions, and (2) introduction of partial annotations to save annotation time for pathologists and still achieve high performance.

II. Proposed Method

Figure 11:
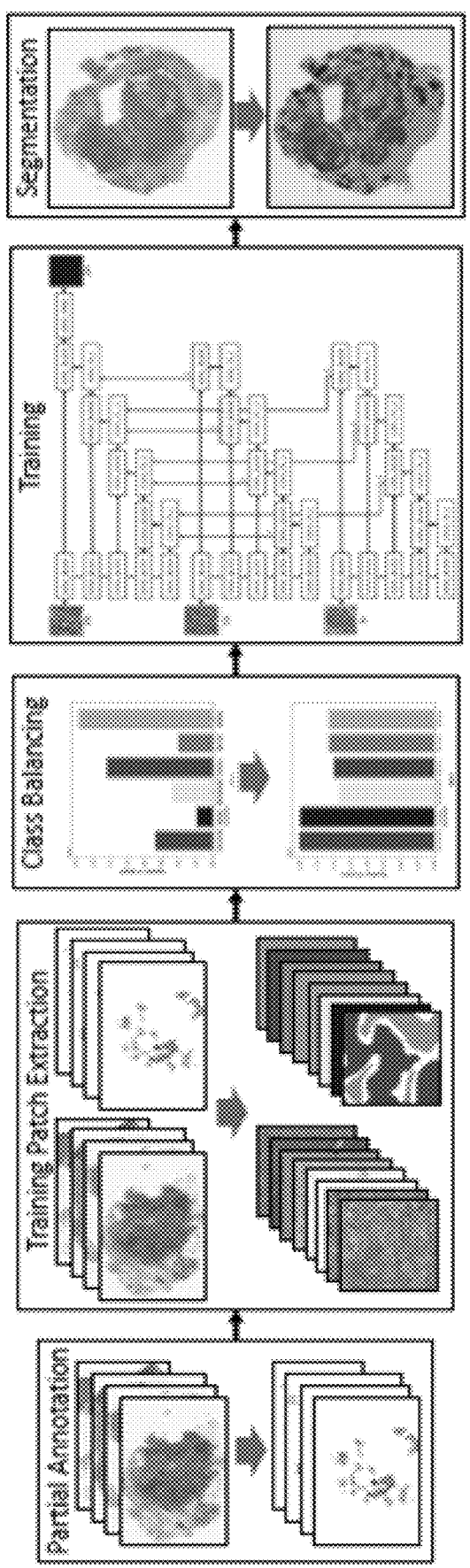
FIG. 11. A block diagram of the proposed method with the Deep Multi-Magnification Network. The first step of the method is to partially annotate training whole slide images. After extracting training patches from the partial annotations and balancing the number of pixels between classes, the Deep Multi-Magnification Network is trained. The trained network is used for multi-class tissue segmentation of whole slide images.

FIG. 11 shows the block diagram of the proposed method. The goal is to segment multiple subtypes on breast images using the Deep Multi-Magnification Network (DMMN). First of all, manual annotation is done on the training dataset with C classes. Here, this annotation is done partially for an efficient and fast process. To train the multi-class segmentation DMMN, patches are extracted from whole slide images (WSIs) and the corresponding annotations. Before training the DMMN with the extracted patches, elastic deformation may be used to multiply patches belonging to rare classes to balance the number of annotated pixels between classes. After the training step is done, the model can be used for multi-class segmentation of breast cancer images.

Partial Annotation

A large set of annotations is needed for supervised learning, but this is generally an expensive step requiring pathologists' time and effort. Especially, due to giga-pixel scale of image size, exhaustive annotation to label all pixels in WSIs is not practical. Many works are done using public datasets such as CAMELYON datasets but public datasets are designed for specific applications and may not be generalized to others. To segment multiple tissue subtypes on the breast training dataset, images may be partially annotated.

Figure 12A:
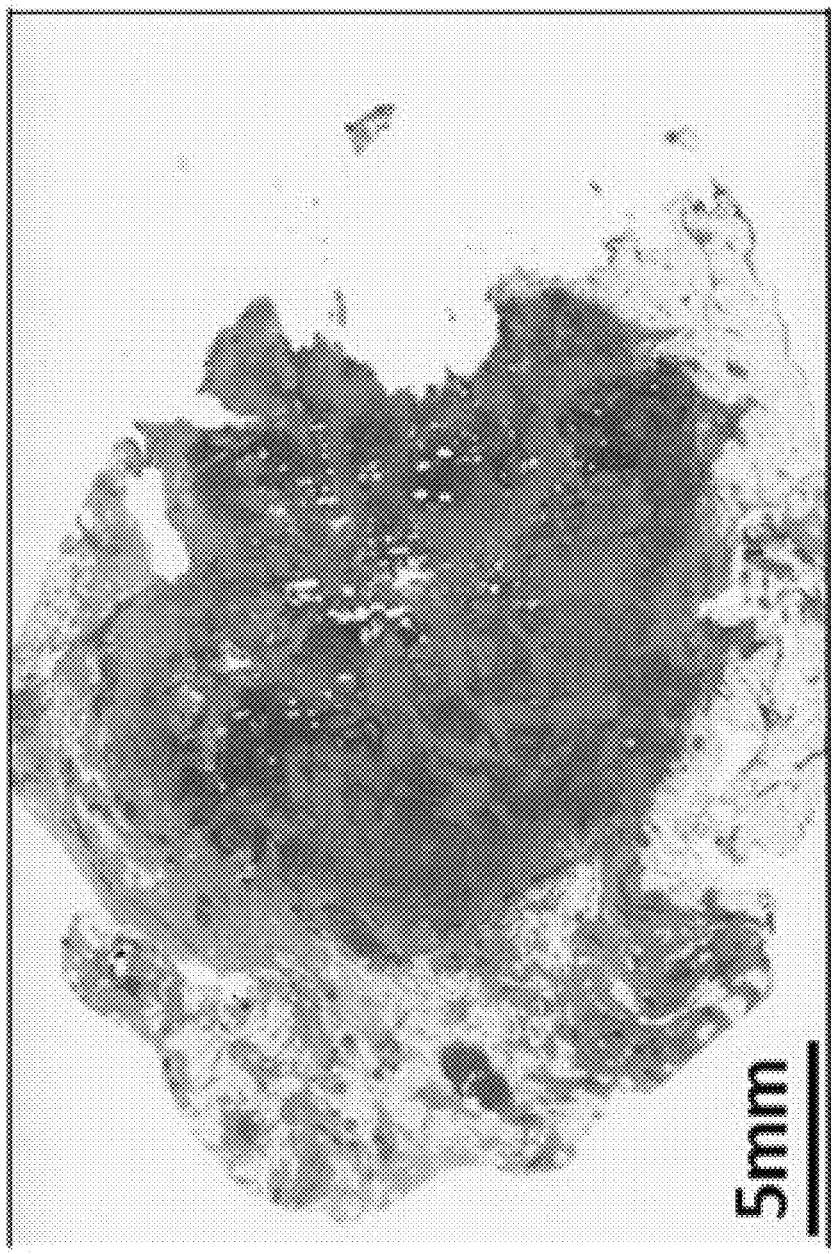
FIGS. 12(a) and (b). An example of partial annotation. (a) A whole slide image from breast tissue. (b) A partially annotated image where multiple tissue subtypes are annotated in distinct colors and white regions are unlabeled.
Figure 12B:

For partial annotations, (1) annotating close boundary regions between subtypes while minimizing the thickness of these unlabeled regions and (2) annotated the entire subtype components without cropping may be avoided. Exhaustive annotations, especially on boundary regions, without any overlapping portions and subsequent inaccurate labeling can be challenging given the regions merge into each other seamlessly. Additionally, the time required for complete, exhaustive labeling is immense. By minimizing the thickness of these unlabeled boundary regions, the CNN model trained by the partial annotation can learn the spatial relationships between subtypes such as transitions from one subtype to another subtype and generate precise segmentation boundaries. This is different from the partial annotation done in where annotated regions of different subtypes were too widely spaced and thus unsuitable for training spatial relationships between them. The work in also suggests exhaustive annotation in subregions of WSIs to reduce annotation efforts, but if the subtype components are cropped the CNN model cannot learn the growth pattern of the different subtypes. Each subtype component may be annotated entirely to let the CNN model learn the growth pattern of all subtypes. FIG. 12(a) shows an example of the partial annotation where an experienced pathologist can spend approximately 30 minutes to partially annotate one WSI. Note white regions in FIG. 12(b) are unlabeled.

Training Patch Extraction

Whole slide images are generally too large to process in slide-level using convolutional neural networks. To analyze WSIs, patch-based methods are used where patches extracted from an image is processed by a CNN and then the outputs are combined for slide-level analysis. One limitation of the patch-based methods is that they only look at patches in a single magnification with a limited field-of-view.

To have a wider field-of-view, a set of multi-magnification patches is extracted to train the DMMN. The size of a target patch may be set to be analyzed in a WSI be 256×256 pixels in 20× magnification. To analyze the target patch, an input patch with size of 1024×1024 pixels in 20× is extracted from the image where the target patch is located at the center of the input patch. From this input patch, a set of three multi-magnification patches is extracted. The first patch is extracted from the center of the input patch with size of 256×256 pixels in 20×, which is the same location and magnification with the target patch. The second patch is extracted from the center of the input patch with size of 512×512 pixels and downsampled by a factor of 2 to become size of 256×256 pixels in 10×. Lastly, the third patch is generated by downsampling the input patch by a factor of 4 to become size of 256×256 pixels in 5×. The set of three patches in different magnifications becomes the input to the DMMN to segment cancer in the target patch with size of 256×256 pixels. Input patches are extracted from training images if more than 1% of pixels in the corresponding target patches are annotated. The stride to x and y-directions is 256 pixels to avoid overlapping target patches. Note target patches may have multiple class labels.

Class Balancing

Class balancing is a prerequisite step for training CNNs for accurate performance. When the number of training patches in one class dominates the number of training patches in another class, CNNs cannot properly learn features from the minor class. In this work, class imbalance is observed in the annotations. For example, the number of annotated pixels in carcinoma regions dominates the number of annotated pixels in benign epithelial regions. To balance between classes, elastic deformation is used to multiply training patches belonging to minor classes.

Elastic deformation is widely used as a data augmentation technique in biomedical images due to the squiggling shape of biological structures. To perform elastic deformation on a patch, a set of grid points in the patch is selected and displaced randomly by a normal distribution with a standard deviation of σ. According to the displacements of the grid points, all pixels in the patch are displaced by bicubic interpolation. The grid points may be empirically set by 17×17 and σ=4 to avoid excessive distortions of nuclei to lose their features.

The number of patches to be multiplied needs to be carefully selected to balance the number of pixels between classes. Here, a rate of elastic deformation may be defined for a class c, denoted as rc, to be the number of patches to be multiplied for the class c and a class order to decide the order of classes when multiplying patches. The rate can be selected based on the number of pixels in each class. The rate is a non-negative integer and elastic deformation is not performed if the rate is 0. The class order can be decided based on applications. For example, if one desires an accurate segmentation on carcinoma regions, then a class of carcinoma would have a higher order than other classes. To multiply patches, each patch needs to be classified to a class c if the patch contains a pixel label classified to c. If a patch contains pixels in multiple classes, a class with a higher class order becomes the class of the patch. After patches are classified, rc number of patches will be multiplied for each patch in class c using elastic deformation. Once class balancing is done, all patches are used to train CNNs.

CNN Architectures

FIG. 13 shows architectures of a Deep Single-Magnification Network (DSMN) and Deep Multi-Magnification Networks (DMMNs) for multi-class tissue segmentation. The size of input patches is 256×256 pixels and the size of an output prediction is 256×256 pixels. CONV_BLOCK contains two sets of a convolutional layer with kernel size of 3×3 with padding of 1 followed by a rectified linear unit (ReLU) activation function in series. CONV_TR_u contains a transposed convolutional layer followed by the ReLU activation function where u is an upsampling rate. Note CONV_TR_4 is composed of two CONV_TR_2 in series. CONV_FINAL contains a convolutional layer with kernel size of 3×3 with padding of 1, the ReLU activation function, and a convolutional layer with kernel size of 1×1 to output C channels. The final segmentation predictions are produced using the softmax operation. Green arrows are max-pooling operations by a factor of 2 and red arrows are center-crop operations where cropping rates are written in red. The center-crop operations crop the center regions of feature maps in all channels by the cropping rate to fit the size and magnification of feature maps for the next operation. During the center-crop operations, the width and height of the cropped feature maps become a half and a quarter of the width and height of the input feature maps if the cropping rate is 2 and 4, respectively.

Figure 13A:
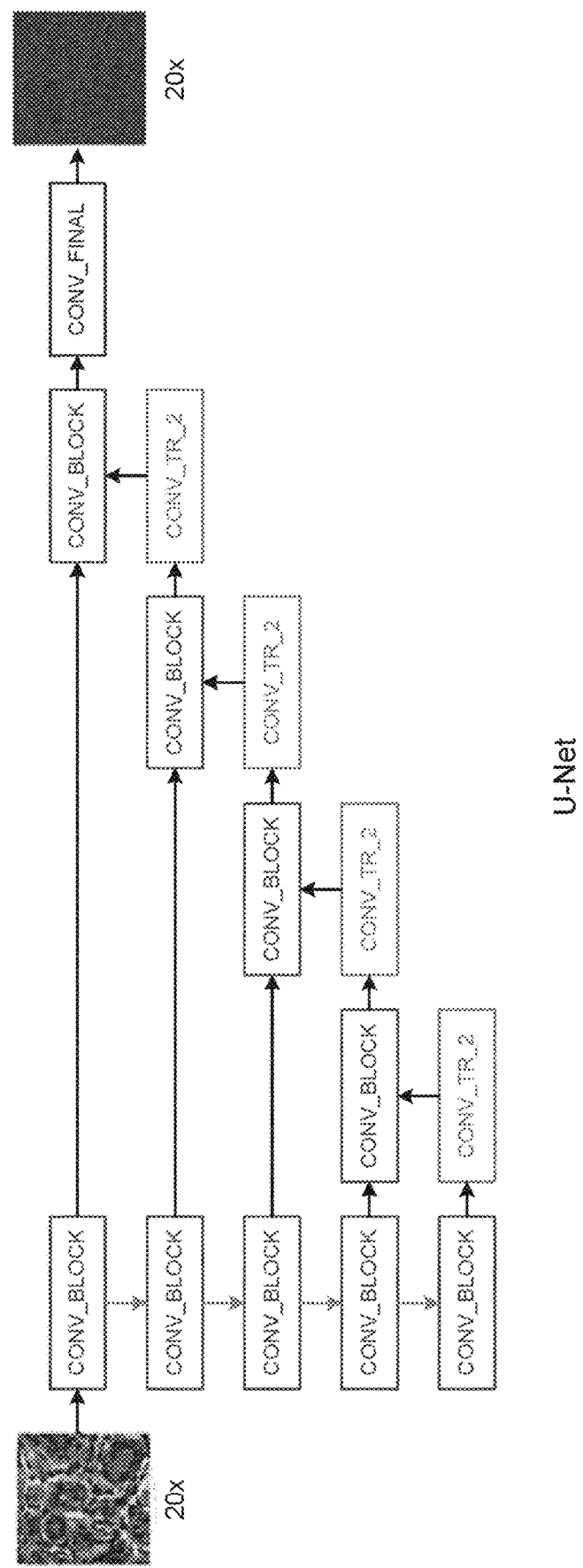
Figure 13B:
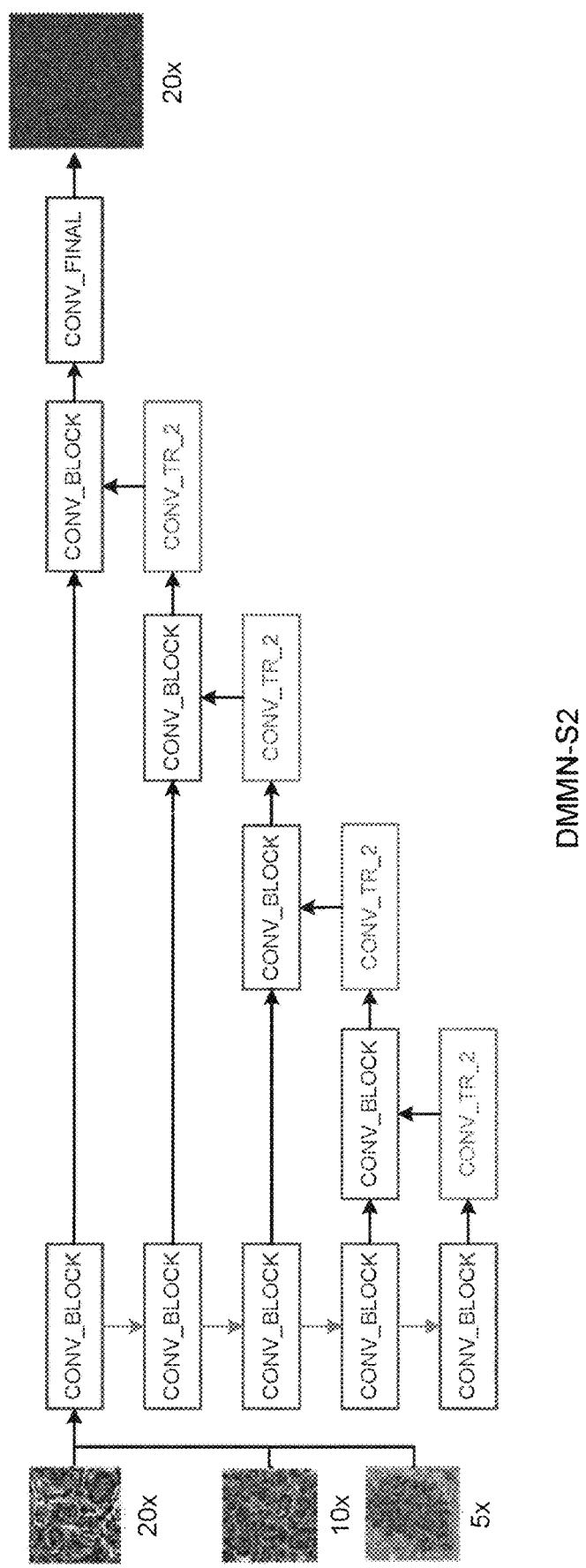
Figure 13C:
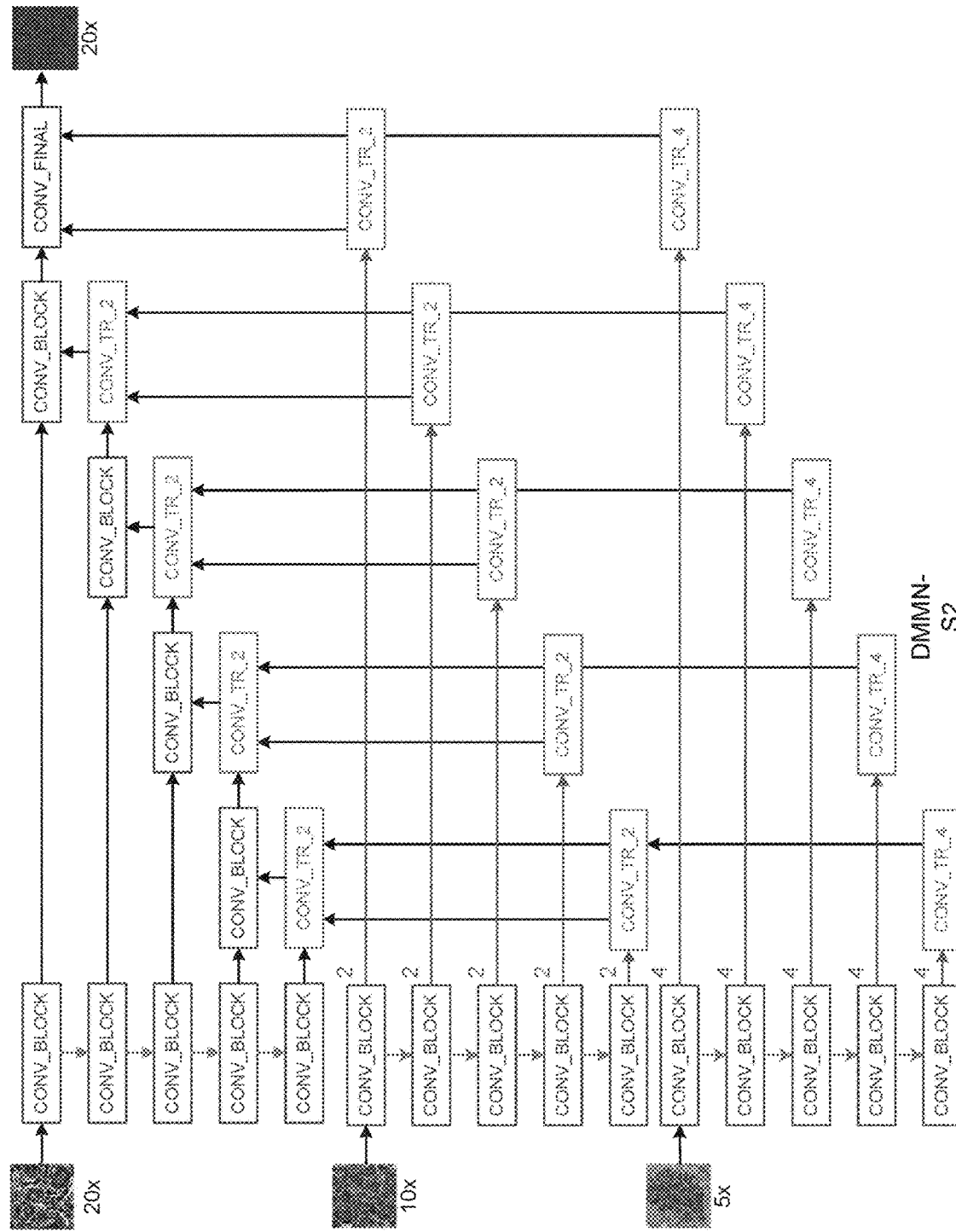
Figure 13D:
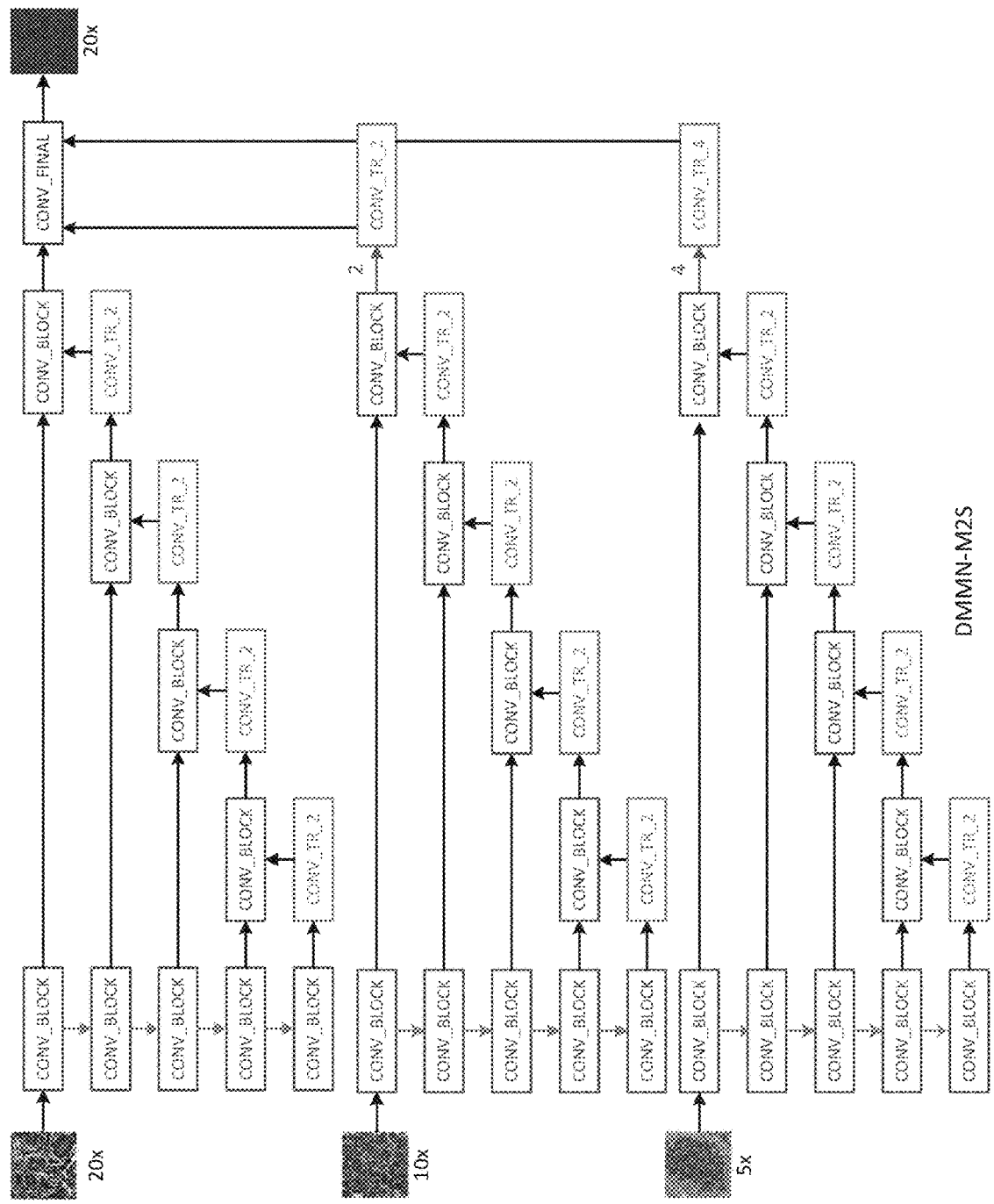

An original U-Net architecture in FIG. 13(a) uses a single magnification patch in 20× to produce the corresponding segmentation predictions. A Single-Encoder Single-Decoder (DMMN-S2) architecture in FIG. 13(b) uses multiple patches in 20×, 10×, and 5× magnifications, but they are concatenated and used as an input to the U-Net architecture. A Multi-Encoder Single-Decoder (DMMN-MS) architecture in FIG. 13(c), motivated by the work in, uses multiple encoders in 20×, 10×, and 5× magnifications, but only uses a single decoder in 20× by transferring feature maps from encoders in 10× and 5×. A Multi-Encoder Multi-Decoder Single-Concatenation (DMMN-M2S) architecture in FIG. 13(d), motivated by the work in, has multiple encoders and the corresponding decoders in 20×, 10×, and 5× magnifications, but the concatenation is done only at the end of the encoder-decoder pairs. Here, the weighting CNN in is excluded for a fair comparison with other architectures. Lastly, the proposed Multi-Encoder Multi-Decoder Multi-Concatenation (DMMN-M3) architecture in FIG. 13(e) has multiple encoders and decoders and has concatenations between the decoders in multiple layers to enrich feature maps from the decoders in 10× and 5× to the decoder in 20×. Additionally, center-crop operations may be used while transferring feature maps from the decoders in 10× and 5× to the decoder in 20× to extract features in 10× and 5× as much as possible. Note DMMN-MS and DMMN-M2S use center-crop operations in 10× and 5× levels where cropped regions before concatenation can limit feature extraction processes in lower magnifications.

CNN Training

The balanced set of patches from above is used to train the multi-class segmentation CNNs. A weighted cross entropy is used as the training loss function with N pixels in a patch and C classes:

$$L(t^{gt}, t^{pred}) = -\frac{1}{N}\sum_{p=1}^{N}\sum_{c=1}^{C} w_c t_c^{gt}(p)\log t_c^{pred}(p) \quad (1)$$

where $t_c^{gt}$ and $t_c^{pred}$ are two-dimensional groundtruth and segmentation predictions for a class c, respectively. $t_c^{gt}(p)$ is a binary groundtruth value for a class c at a pixel location p, either 0 or 1, and $t_c^{Pred}(p)$ is a segmentation prediction value for a class c at a pixel location p, between 0 and 1. In Equation 1, a weight for class c, w c is defined as $$w_c = 1 - \frac{N_c}{\sum_c N_c} \quad (2)$$

where Nc is the number of pixels for class c in a training set. Unlabeled pixels do not contribute to the training loss function. Stochastic gradient descent (SGD) with a learning rate of $5\times10^{-5}$, a momentum of 0.99, and a weight decay of $10^{-4}$ for 20 epochs may be used for optimization. A CNN model with the highest mean intersection-over-union (mIOU) on validation images is selected as the final model. During training, data augmentation using random rotation, vertical and horizontal flip, brightness, contrast, and color jittering is used.

Multi-Class Segmentation

Multi-class tissue segmentation on breast images can be done using the trained CNN. The final label in each pixel is selected as a class which has the largest prediction value among the C classes. An input patch with size of 1024×1024 pixels is extracted from a WSI to generate a set of three patches with size of 256×256 pixels in 20×, 10×, and 5× magnifications by the process described above. The set of three patches is processed by our trained CNN. The segmentation predictions with size of 256×256 pixels are located at the center location of the input patch. Input patches are extracted from the top-left corner of the WSI with a stride of 256 pixels in x and y directions to process the entire WSI. Zero-padding is done to extract input patches on the boundary of WSIs. The Otsu thresholding technique can be used before extracting patches as optional to remove background regions to speed up the segmentation process. No pre-processing step is used during segmentation.

III. Experimental Results

Two breast datasets, Dataset-I and Dataset-II, were used to train and evaluate various multi-class tissue segmentation methods. Dataset-I is composed of whole slide images (WSIs) with Triple-Negative Breast Cancer (TNBC) containing invasive ductal carcinoma (IDC). Dataset-II is composed of WSIs from lumpectomy and breast margins containing IDC and ductal carcinoma in situ (DCIS) of various histologic grades. All WSIs in Dataset-I and Dataset-II were from different patients, were hematoxylin and eosin (H&E) stained, and were digitized at Memorial Sloan Kettering Cancer Center. Dataset-I was digitized by Aperio XT where microns per pixel (MPP) in 20× is 0.4979 and Dataset-II was digitized by Aperio AT2 where MPP in 20× is 0.5021. WSIs in Dataset-I were partially annotated by two pathologists and WSIs in Dataset-II were partially annotated by another pathologist.

Figure 14:
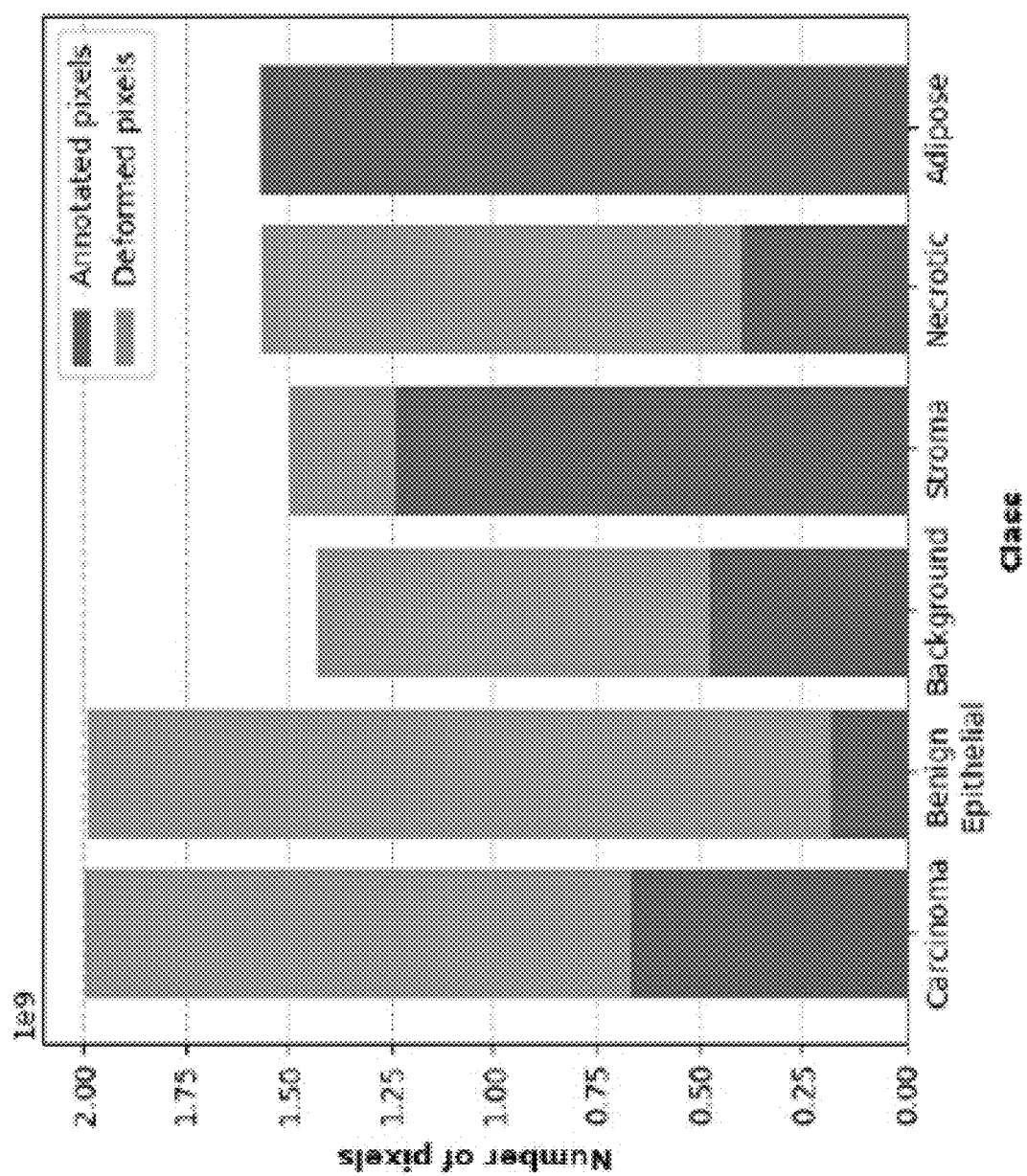
FIG. 14. Class balancing using elastic deformation in the training breast dataset.
Figure 15A:
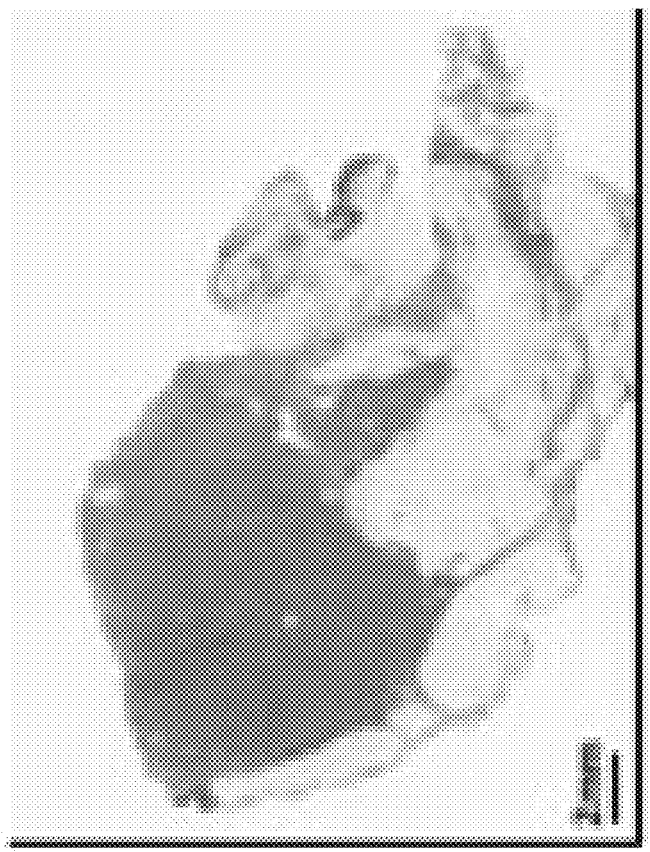
FIG. 15(a)-(p): Segmentation predictions on Dataset-I using two Deep Single-Magnification Networks (DSMNs), SegNet and U-Net, and four Deep Multi-Magnification Networks (DMMNs), Single-Encoder Single-Decoder (DMMN-S2), Multi-Encoder Single-Decoder (DMMN-MS), Multi-Encoder Multi-Decoder Single-Concatenation (DMMN-M2S), and the proposed Multi-Encoder Multi-Decoder Multi-Concatenation (DMMN-M3). (a-h) are thumbnail versions of a whole slide image and (i-p) are zoom-in images on invasive ductal carcinoma (IDC) with size of 1024×1024 pixels in magnification of 10×.
Figure 15B:
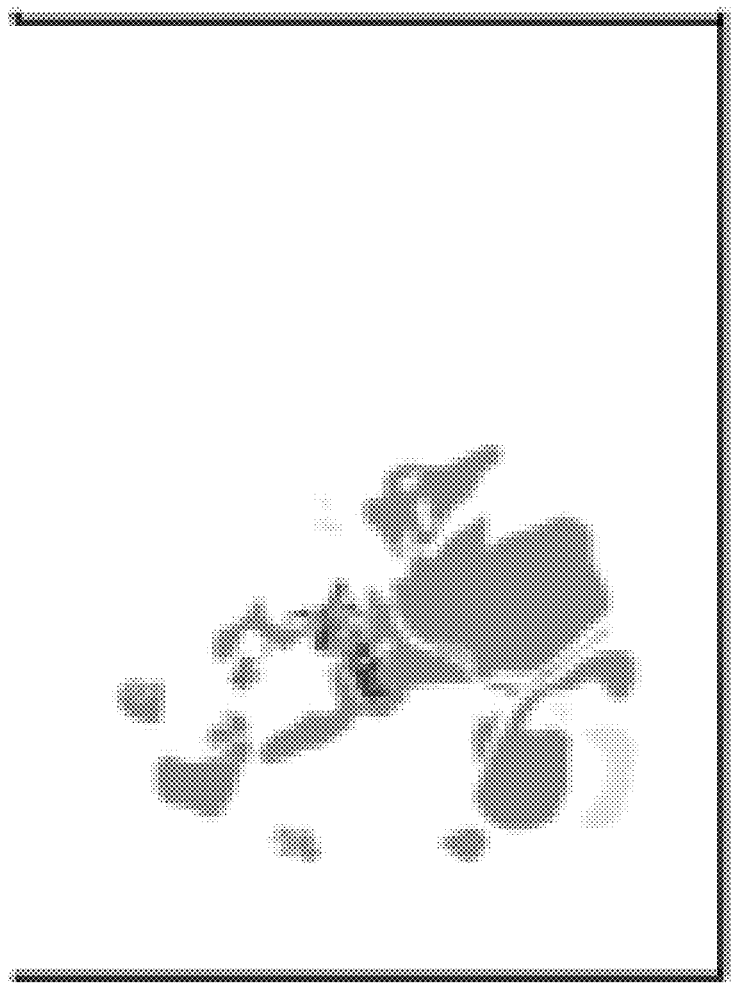
Figure 15C:
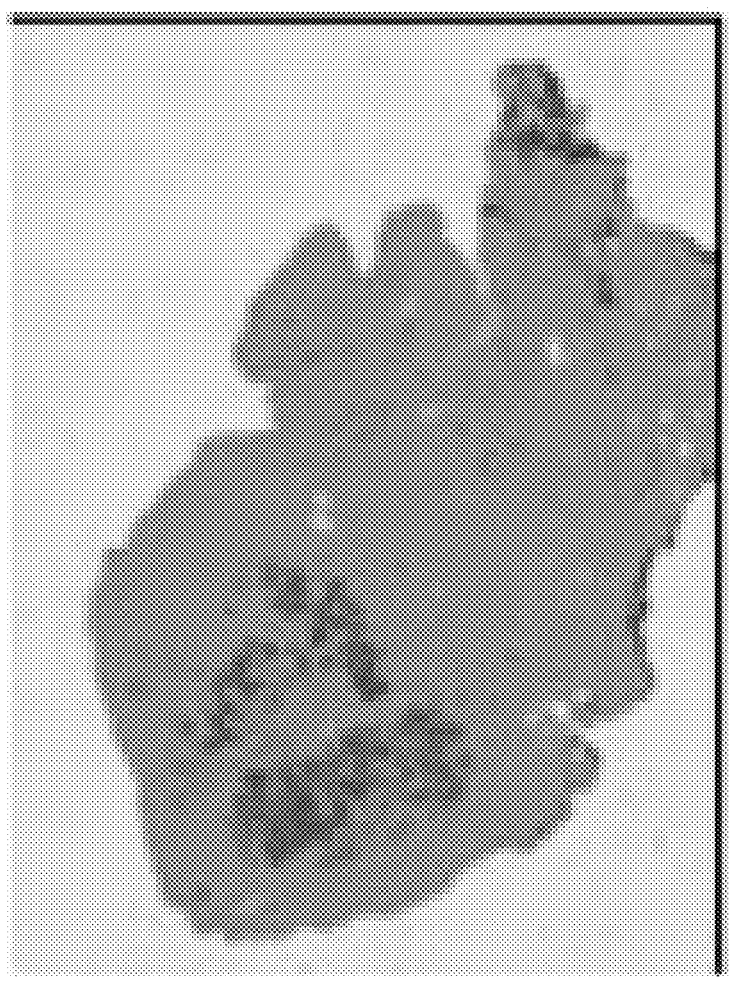
Figure 15D:
Figure 15E:
Figure 15F:
Figure 15G:
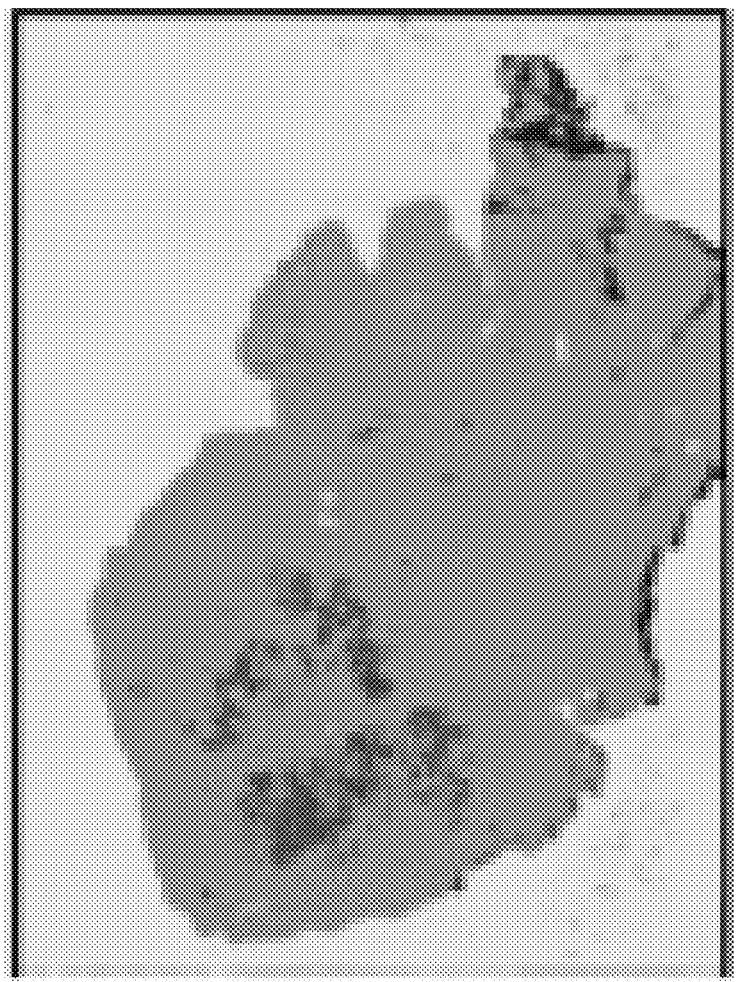
Figure 15H:
Figure 15I:
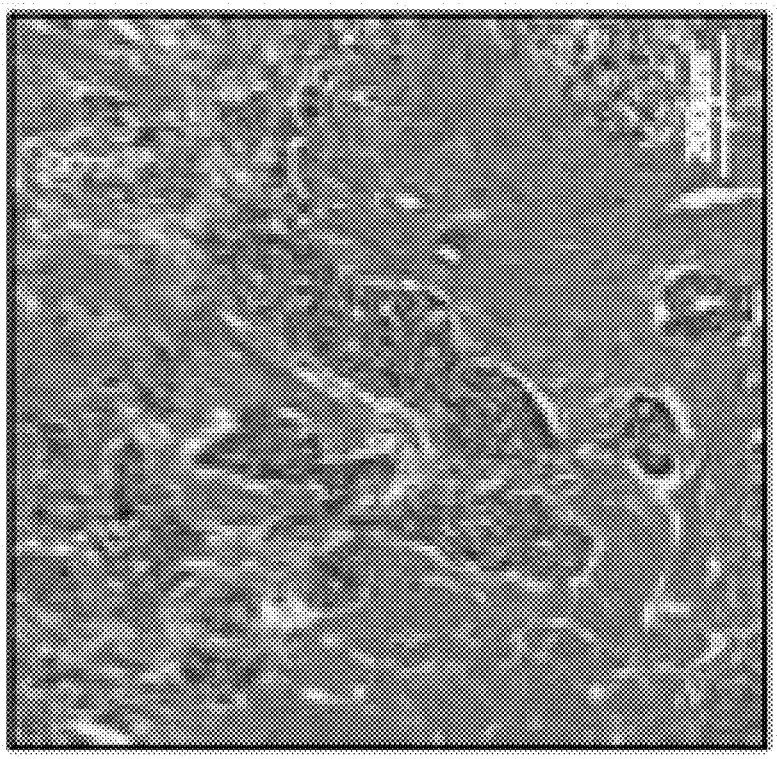
Figure 15J:
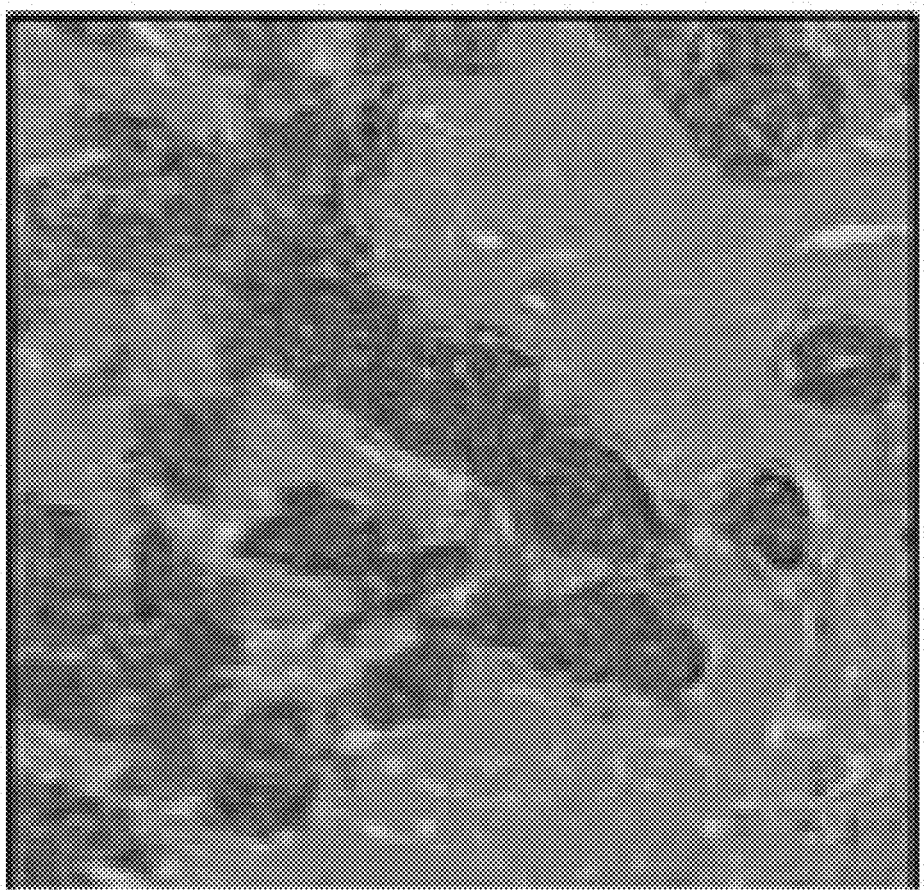
Figure 15K:
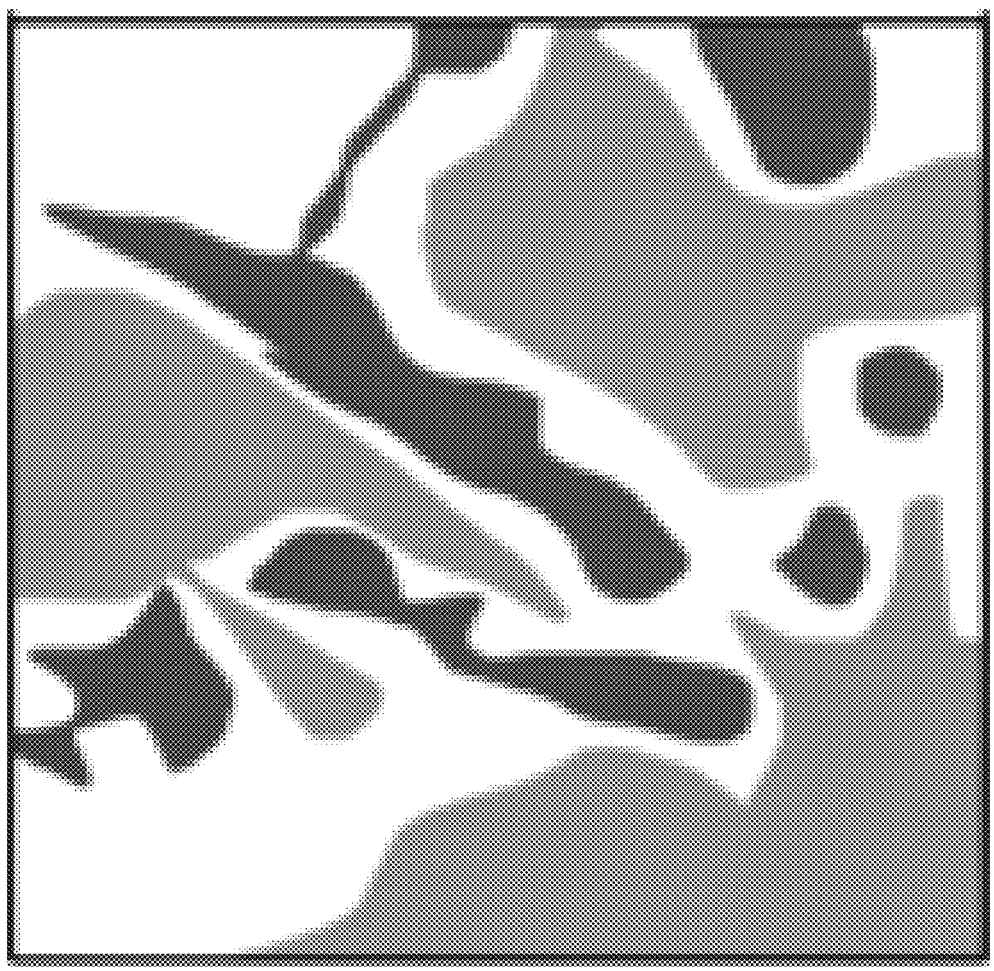
Figure 15L:
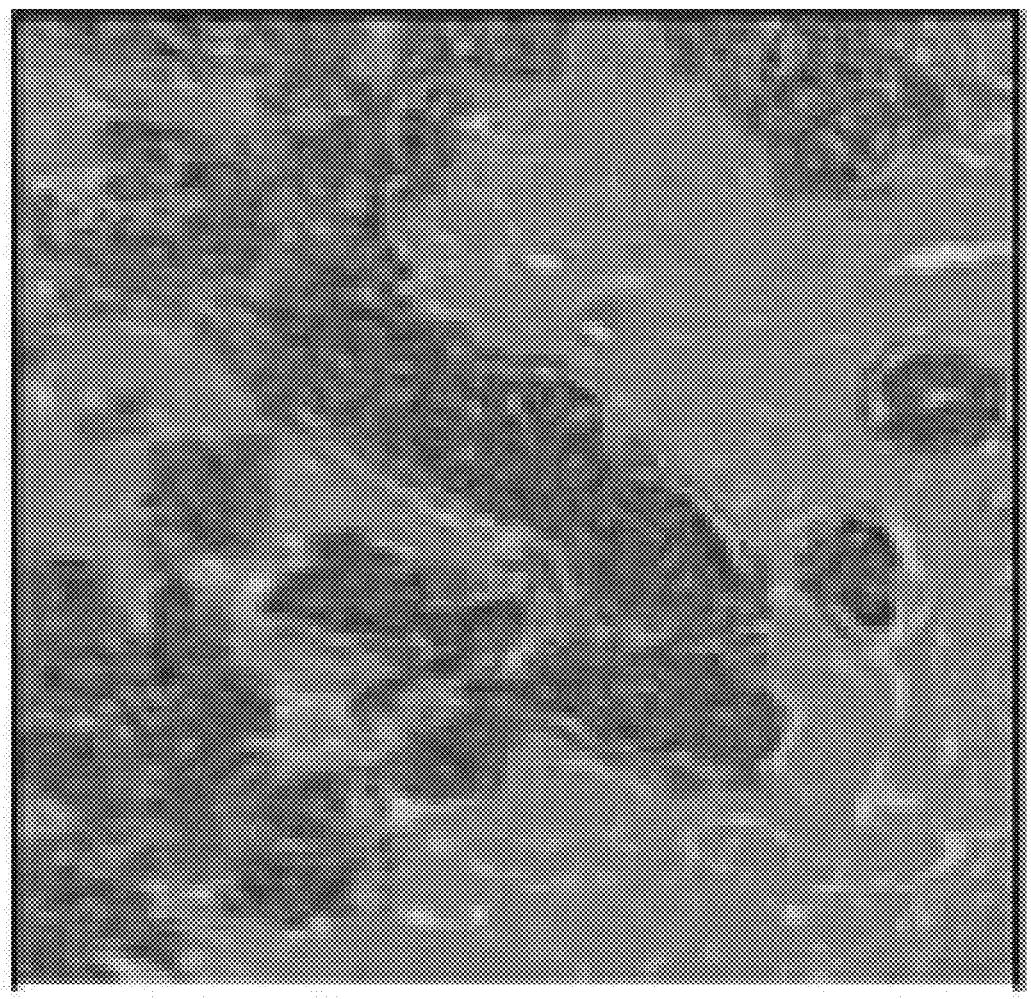
Figure 15M:
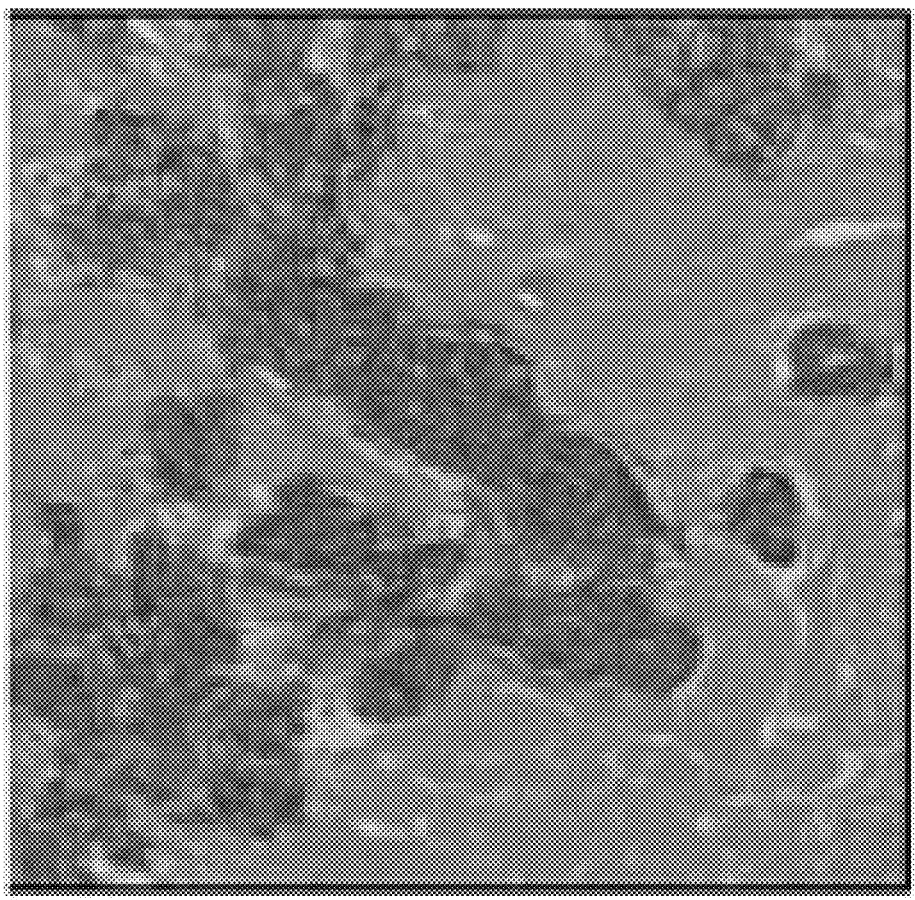
Figure 15N:
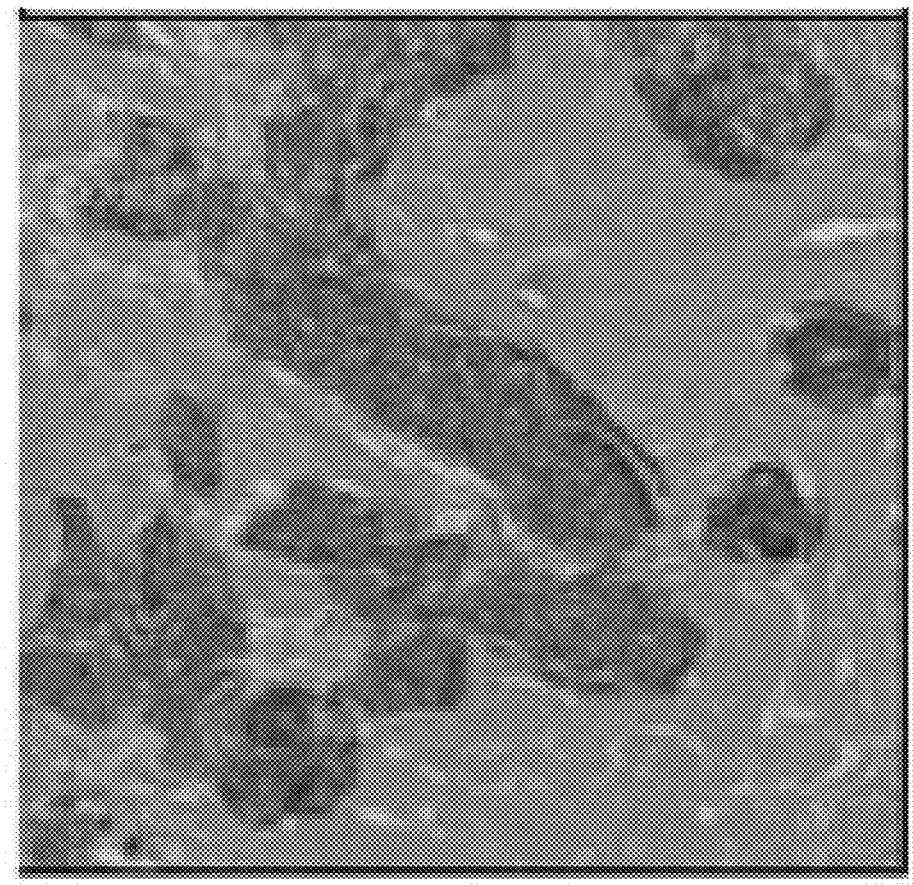
Figure 15O:
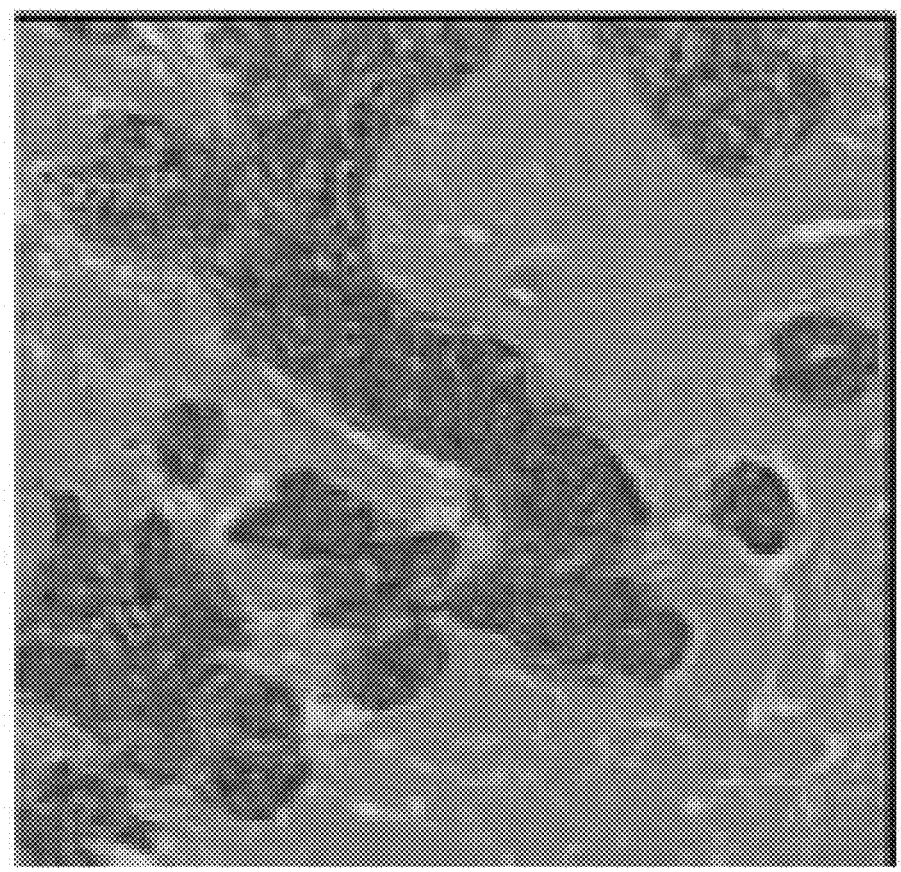
Figure 15P:
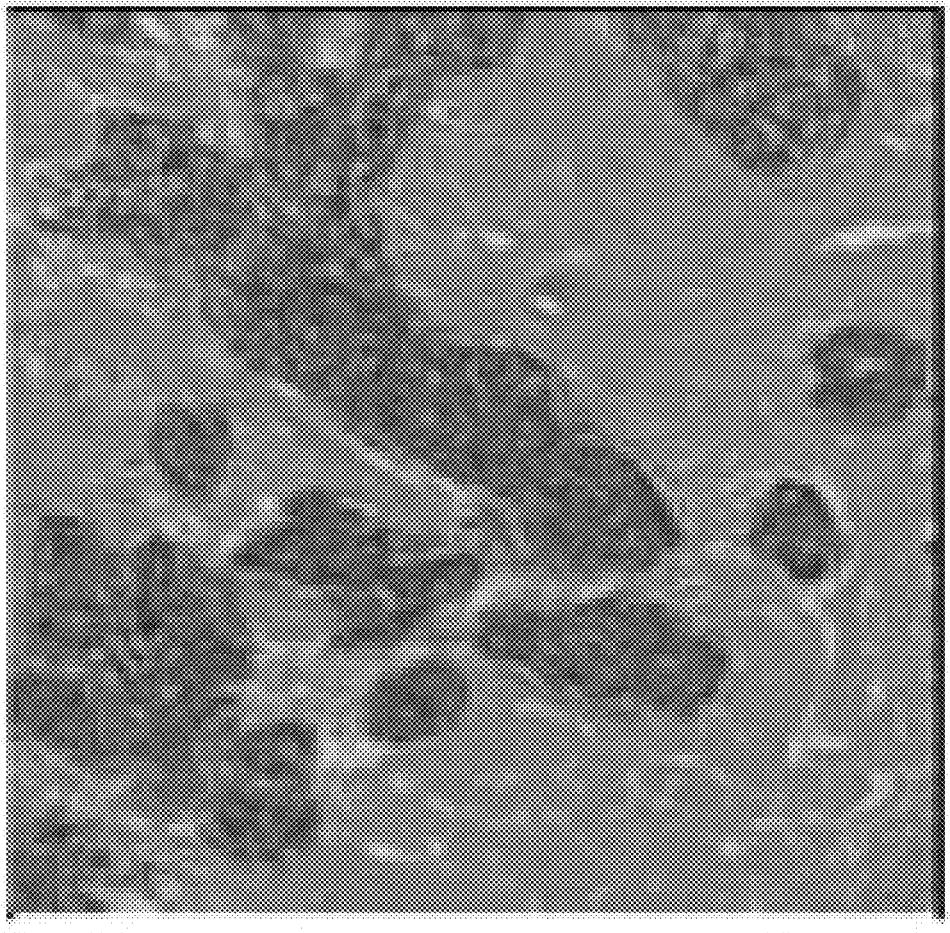
Figure 16A:
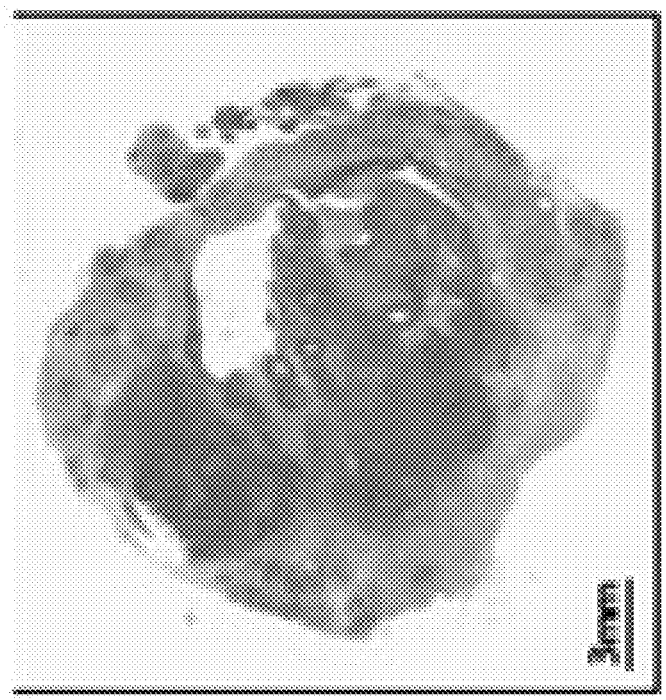
FIG. 16(a)-(p). Segmentation predictions on Dataset-I using two Deep Single-Magnification Networks (DSMNs), SegNet and U-Net, and four Deep Multi-Magnification Networks (DMMNs), Single-Encoder Single-Decoder (DMMN-S2), Multi-Encoder Single-Decoder (DMMN-MS), Multi-Encoder Multi-Decoder Single-Concatenation (DMMN-M2S), and the proposed Multi-Encoder Multi-Decoder Multi-Concatenation (DMMN-M3). (a-h) are thumbnail versions of a whole slide image and (i-p) are zoom-in images on benign epithelial with size of 1024×1024 pixels in magnification of 10×.
Figure 16B:
Figure 16C:
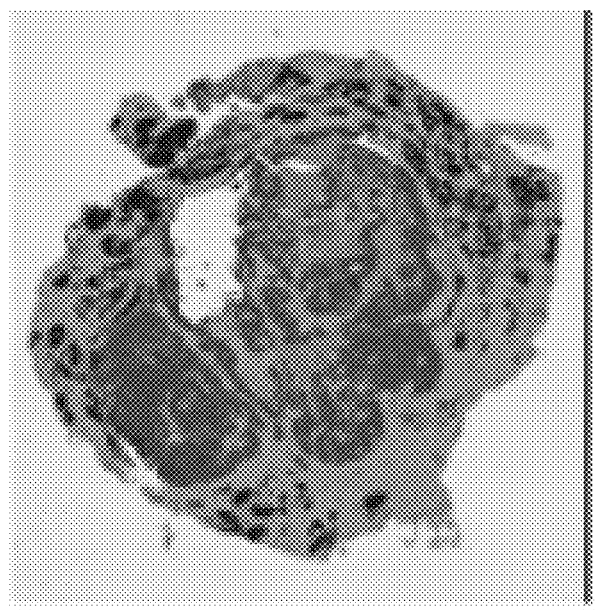
Figure 16D:
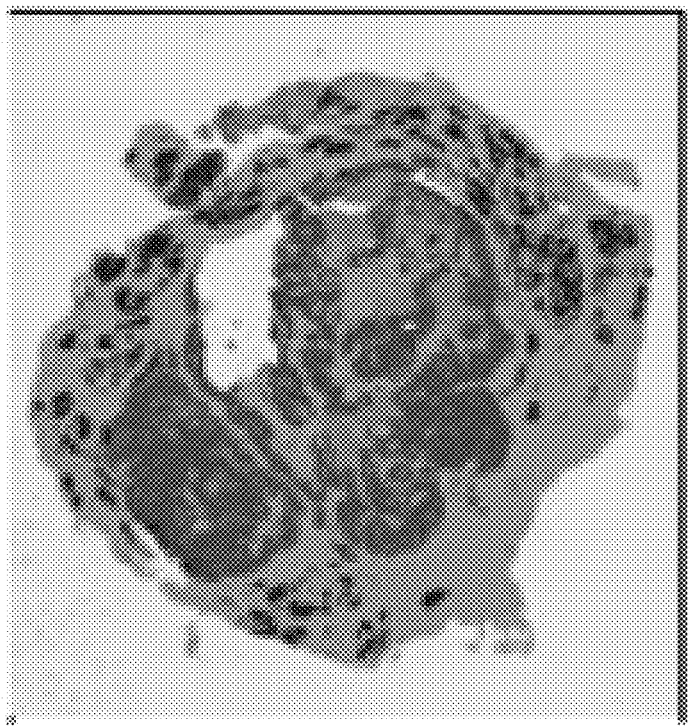
Figure 16E:
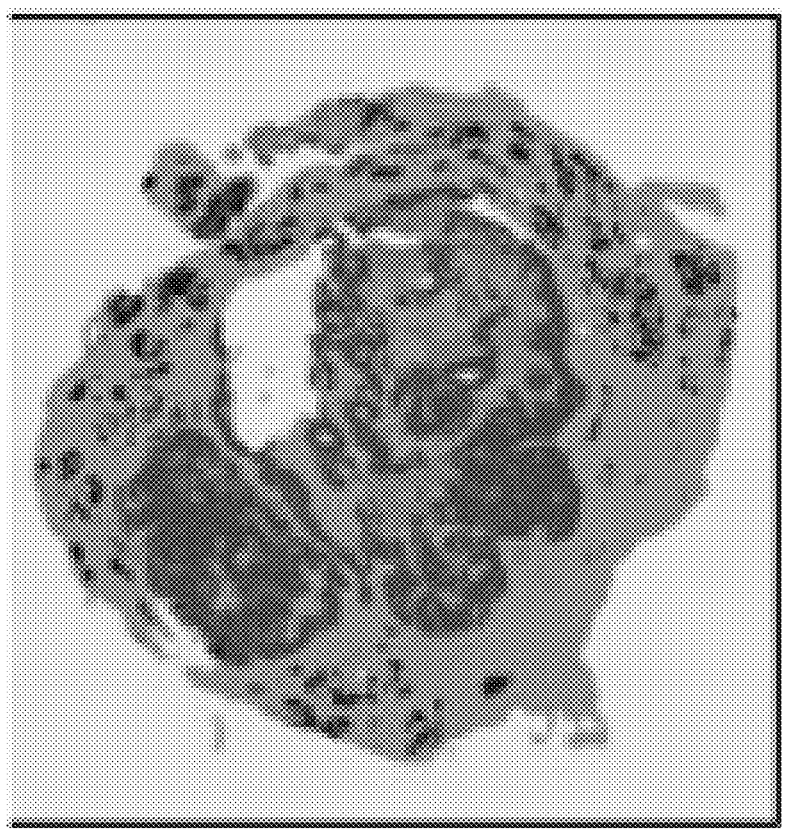
Figure 16F:
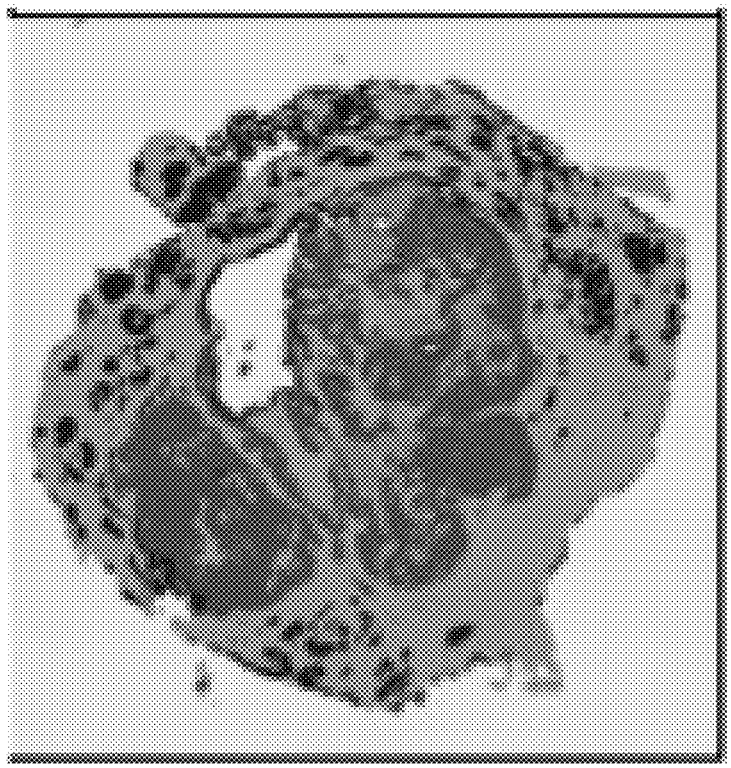
Figure 16G:
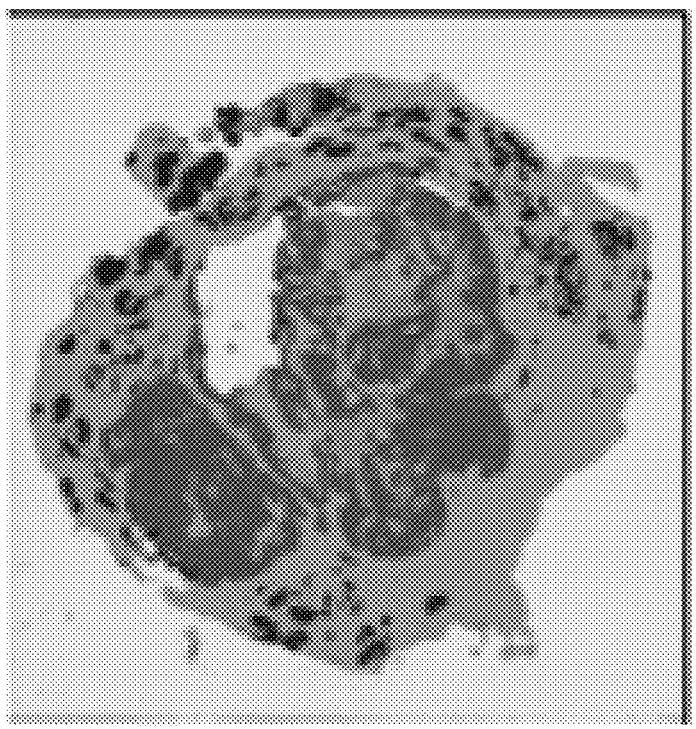
Figure 16H:
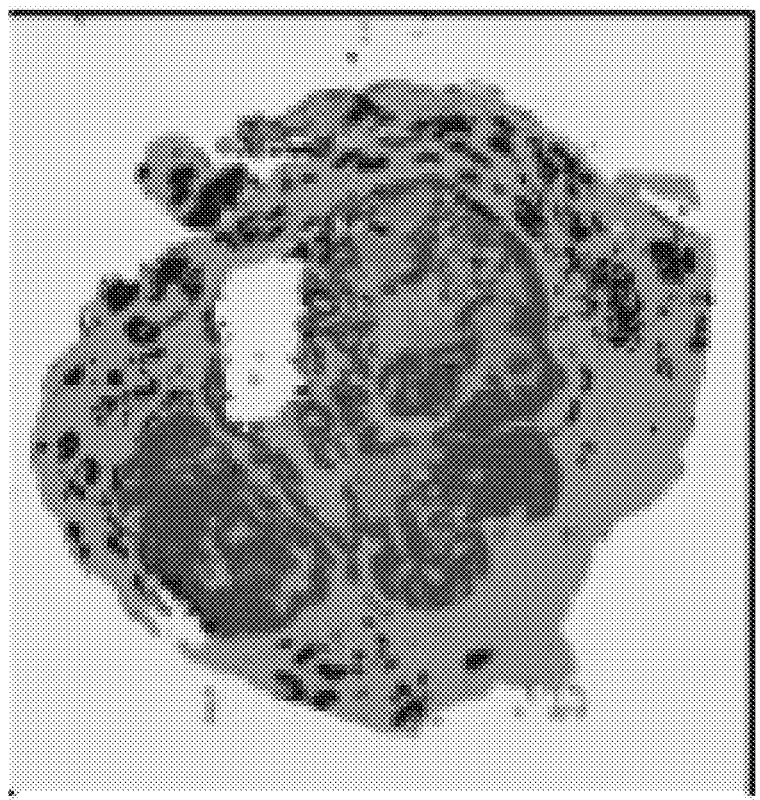
Figure 16I:
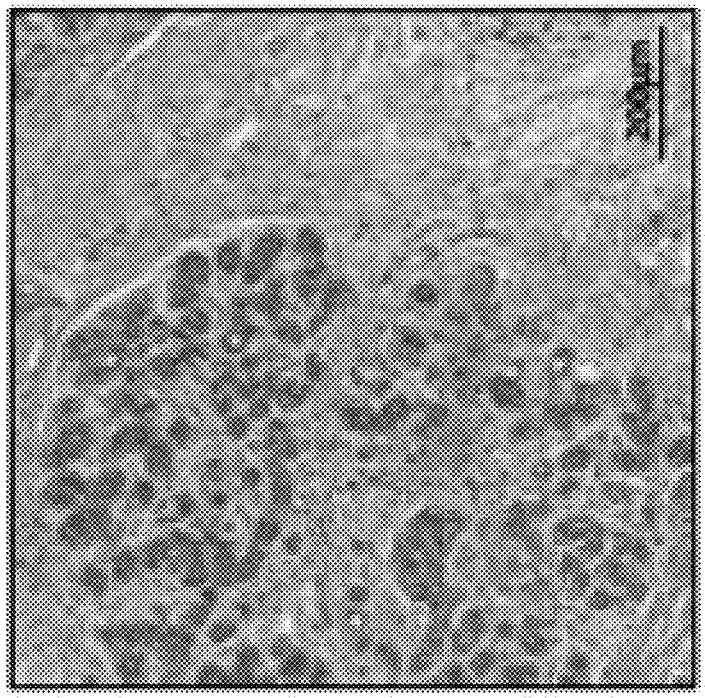
Figure 16J:
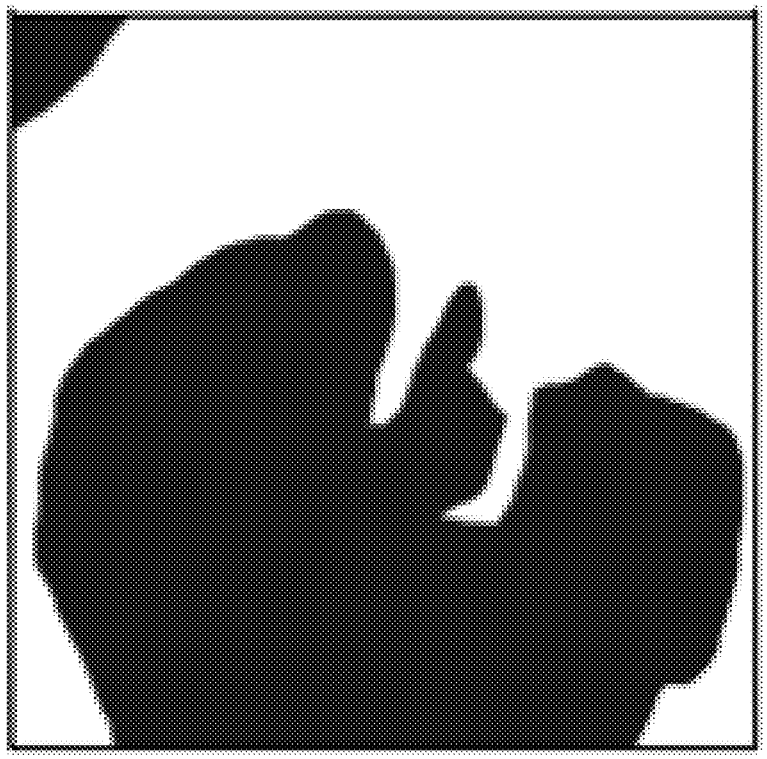
Figure 16K:
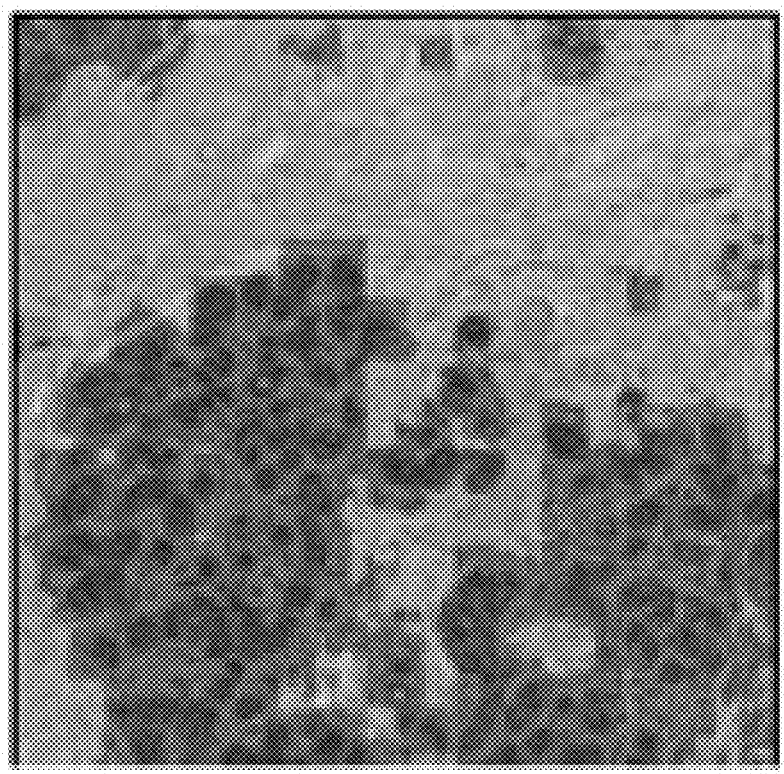
Figure 16I:
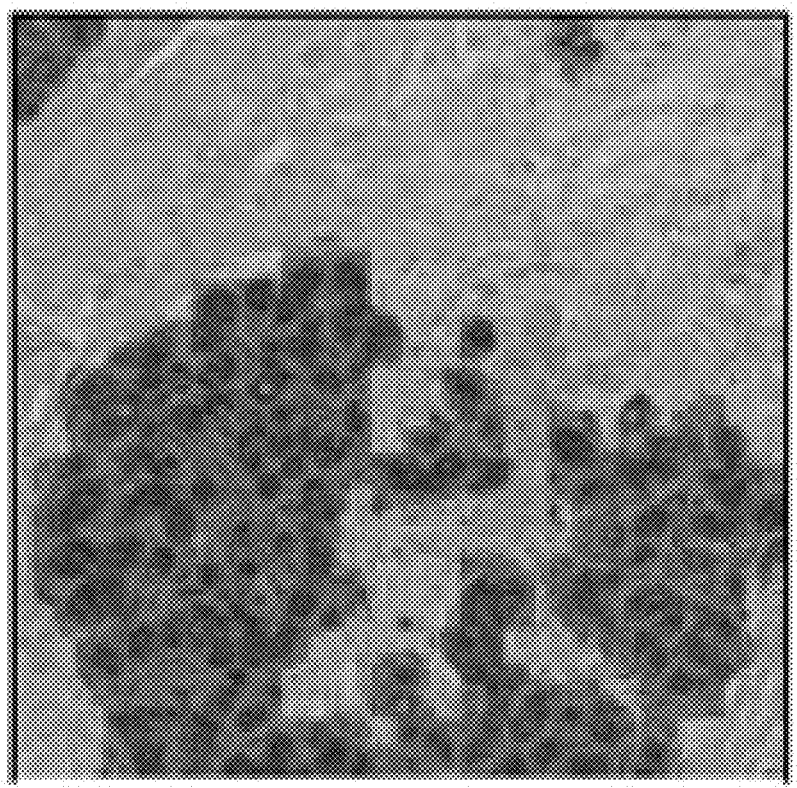
Figure 16M:
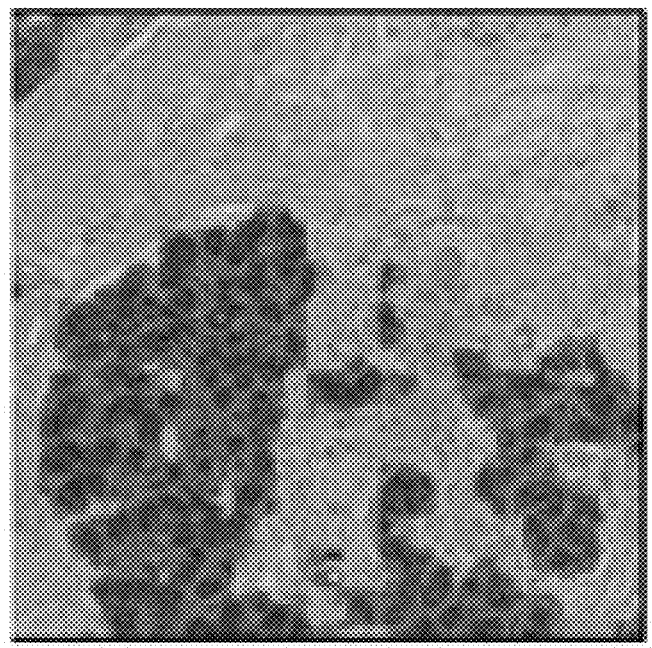
Figure 16N:
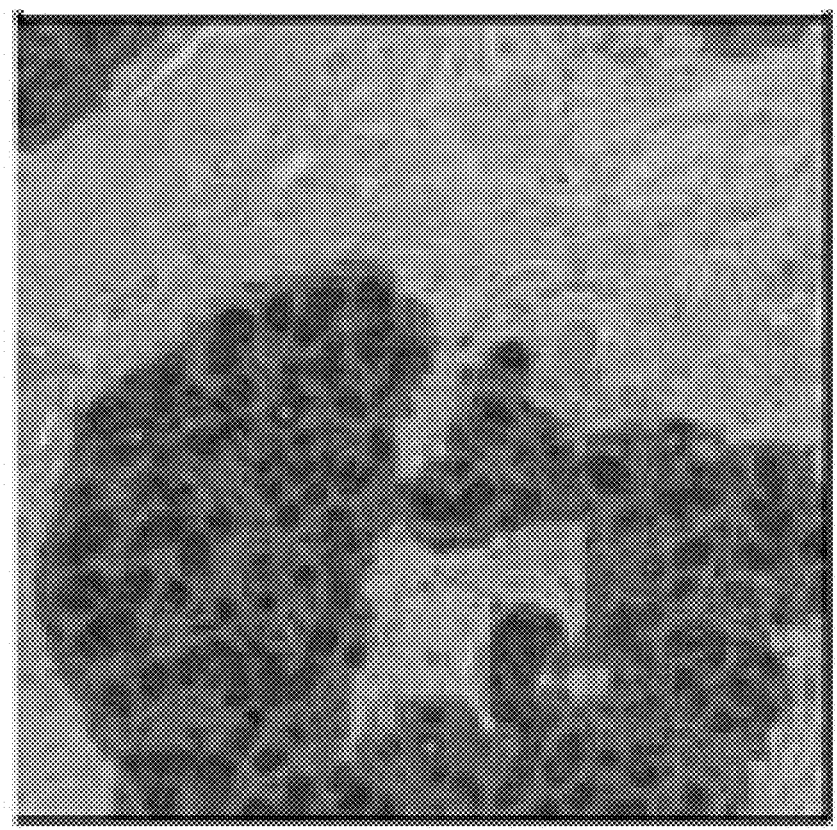
Figure 16O:
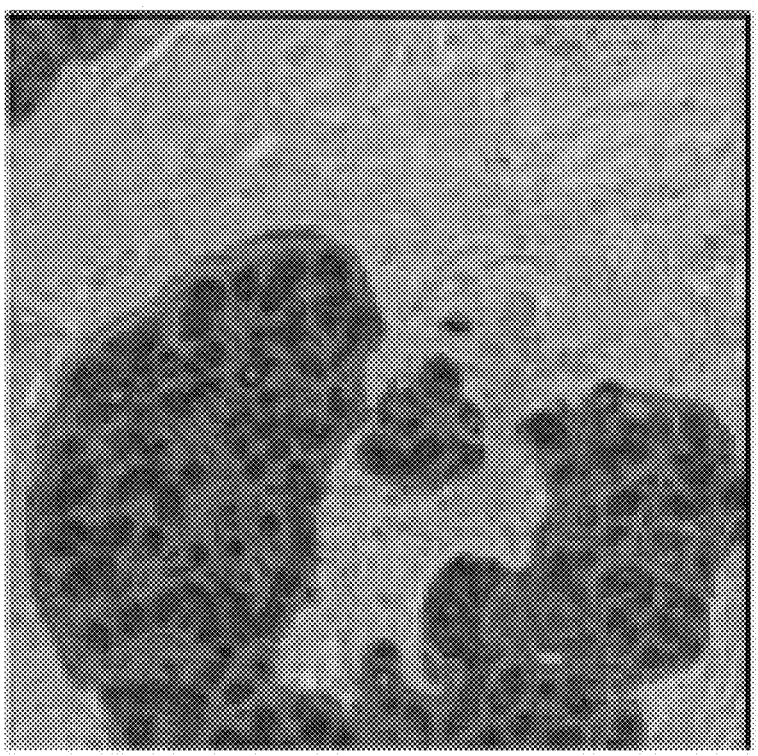
Figure 16P:
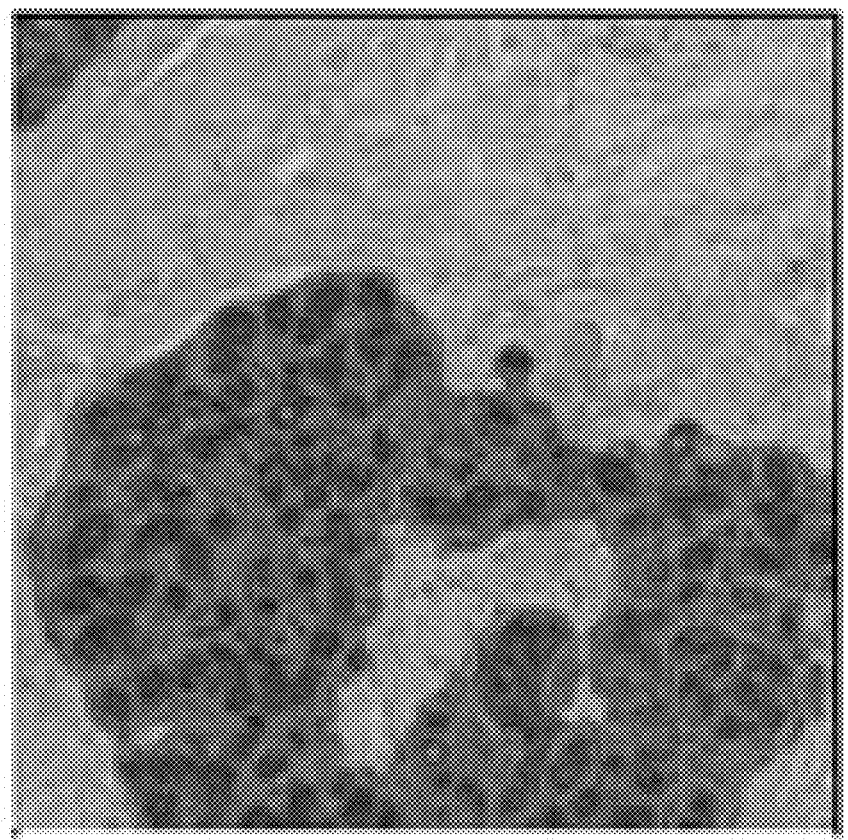

To train models, 32 training images from Dataset-I were used where 6 images were separated for validation. No images from Dataset-II were used during training. In our work, only 5.34% of pixels of training WSIs were annotated. Our models can predict 6 classes (C=6) which are carcinoma, benign epithelial, background, stroma, necrotic, and adipose. Note that background is defined as regions which are not tissue. To balance the number of annotated pixels between classes, the following parameters may be set to be $r_2=10$, $r_1=2$, $r_5=3$, $r_3=1$, $r_4=0$, and $r_6=0$ where $r_1$, $r_2$, $r_3$, $r_4$, $r_5$, and $r_6$ are rates of elastic deformation of carcinoma, benign epithelial, background, stroma, necrotic, and adipose, respectively. Benign epithelial was selected as the highest class order followed by carcinoma, necrotic, and background, because it may be desired to accurately segment carcinoma regions and separate benign epithelial to reduce false segmentation. FIG. 14 shows the number of annotated pixels between classes are balanced using elastic deformation. Two Deep Single-Magnification Networks (DSMNs), SegNet architecture and U-Net architecture, and four Deep Multi-Magnification Networks (DMMNs), Single-Encoder Single-Decoder (DMMN-S2) architecture, Multi-Encoder Single-Decoder (DMMN-MS) architecture, Multi-Encoder Multi-Decoder Single-Concatenation (DMMN-M2S) architecture, and the proposed Multi-Encoder Multi-Decoder Multi-Concatenation (DMMN-M3) architecture may be trained. The number of convolutional layers, the number of downsampling and upsampling layers, and the number of channels are kept the same between the SegNet architecture used in this experiment and the original U-Net architecture. Also, the number of channels on DMMN-MS, DMMN-M2S, and DMMN-M3 are reduced by a factor of 2 from an original U-Net architecture. Table V lists the models compared, the number of trainable parameters, and segmentation time, where the segmentation time was measured on a whole slide image in FIG. 15 whose size is 53,711×38,380 pixels with 31,500 patches using a single NVIDIA GeForce GTX TITAN X GPU.

TABLE V

THE NUMBER OF TRAINABLE PARAMETERS AND COMPUTATIONAL TIME FOR MULTI-CLASS SEGMENTATION MODELS

| Model | Trainable Parameters | Segmentation Time |
|---|---|---|
| SegNet | 18,881,543 | 7 min 48 sec |
| U-Net | 34,550,663 | 12 min 50 sec |
| DMMN-S2 | 34,554,119 | 13 min 16 sec |
| DMMN-MS | 30,647,207 | 13 min 6 sec |
| DMMN-M2S | 25,947,047 | 16 min 21 sec |
| DMMN-M3 | 27,071,303 | 14 min 52 sec |

55 testing images from Dataset-I and 34 testing images from Dataset-II were processed to evaluate various models. FIGS. 15, 16, and 17 depict multi-class segmentation predictions of SegNet architecture, U-Net architecture, DMMN-S2 architecture, DMMN-MS architecture, DMMN-M2S architecture, and our proposed DMMN-M3 architecture, both slide-level and 10× magnification. Tissue subtypes are labeled in distinct colors such as carcinoma in red, benign epithelial in blue, background in yellow, stroma in green, necrotic in gray, and adipose in orange. White regions in FIGS. 15(b,j), 16(b,j), and 17(b,j) are unlabeled. The Otsu thresholding technique was used to extract patches only on foreground regions of the WSIs from Dataset-II digitized from a different scanner because it is observed that models are sensitive to background noise leading mis-segmentation on background regions. White regions in FIG. 17(c-f), (i-l) are removed by the Otsu technique.

Figure 19D:
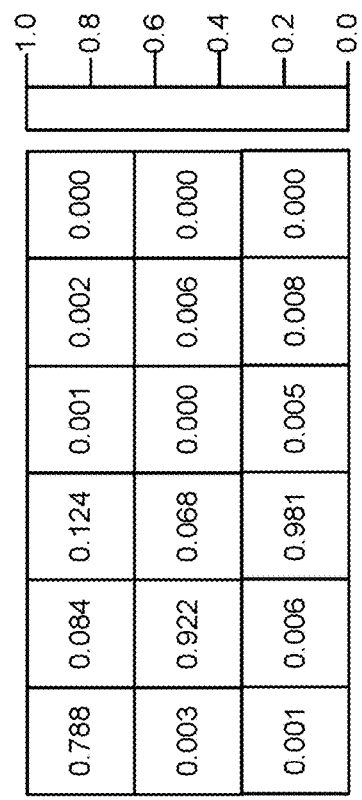
Figure 19C:
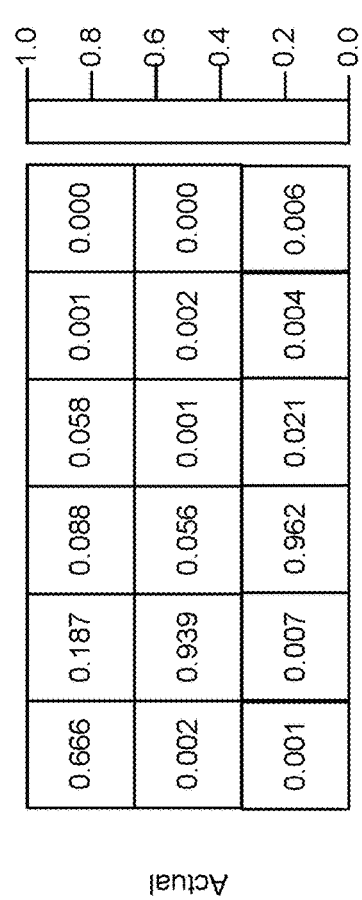
Figures 19E, 19F:
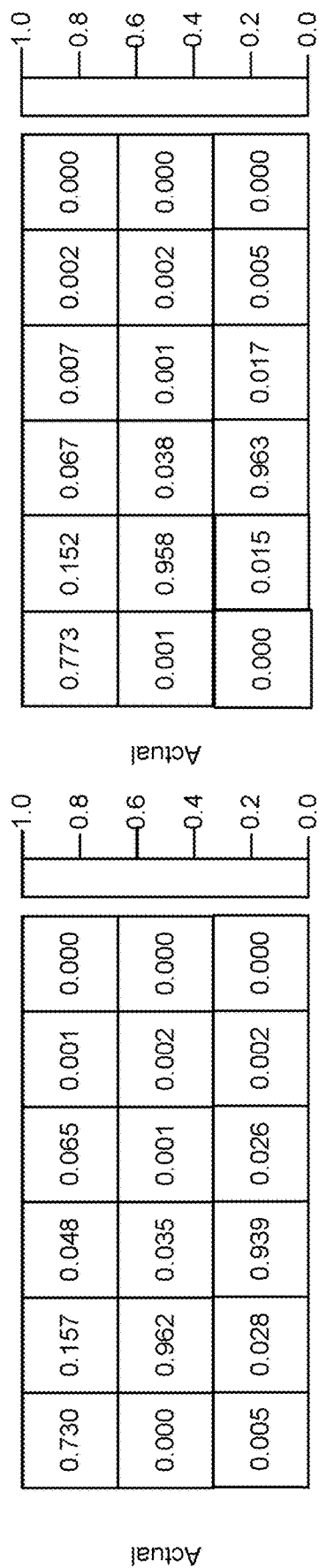

The predictions were numerically evaluated using intersection-over-union (IOU), recall, and precision which are defined as the followings:

$$IOU = \frac{N_{TP}}{N_{TP} + N_{FP} + N_{FN}} \quad (3)$$

$$Recall = \frac{N_{TP}}{N_{TP} + N_{FN}} \quad (4)$$

$$Precision = \frac{N_{TP}}{N_{TP} + N_{FP}} \quad (4)$$

where NTP, NFP, and NFN are the number of pixels for true-positive, false-positive, and false-negative, respectively. Tables VI and VII shows mean IOU (mIOU), mean recall (mRecall), and mean precision (mPrecision) on Dataset-I and Dataset-II, respectively. Pixel-level evaluations in Tables VI and VII were done by partially annotated groundtruth images. FIGS. 13 and 14 show confusion matrices from models on Dataset-I and Dataset-II, respectively. Necrotic, adipose, and background were excluded from the evaluation on Dataset-II in FIG. 19 and Table VII because (1) Dataset-II does not contain large necrotic regions and (2) most of adipose and background regions were not segmented due to the Otsu technique.

TABLE VI

MEAN IOU, RECALL, AND PRECISION ON DATASET-I

| Model | mIOU | mRecall | mPrecision |
|---|---|---|---|
| SegNet | 0.766 | 0.887 | 0.850 |
| U-Net | 0.803 | 0.896 | 0.879 |
| DMMN-S2 | 0.833 | 0.900 | 0.910 |
| DMMN-MS | 0.836 | 0.918 | 0.906 |
| DMMN-M2S | 0.848 | 0.931 | 0.904 |
| DMMN-M3 | 0.870 | 0.939 | 0.922 |

TABLE VII

MEAN IOU, RECALL, AND PRECISION ON DATASET-II

| Model | mIOU | mRecall | mPrecision |
|---|---|---|---|
| SegNet | 0.682 | 0.872 | 0.784 |
| U-Net | 0.726 | 0.882 | 0.819 |
| DMMN-S2 | 0.639 | 0.855 | 0.764 |
| DMMN-MS | 0.720 | 0.897 | 0.806 |
| DMMN-M2S | 0.693 | 0.877 | 0.801 |
| DMMN-M3 | 0.706 | 0.898 | 0.795 |

Figure 18B:
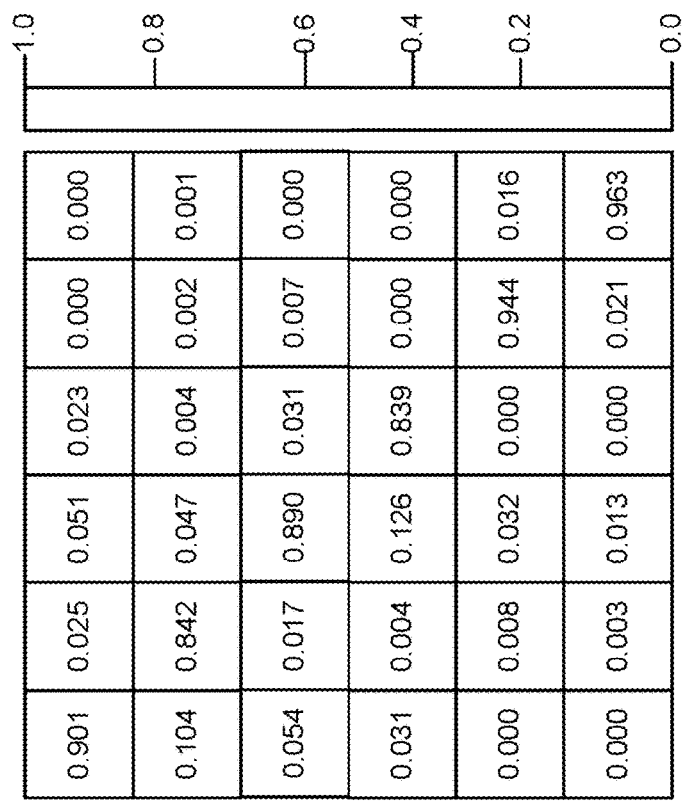
FIGS. 18(a)-18(f). Confusion matrices evaluating carcinoma, benign epithelial, stroma, necrotic, adipose, and background segmentation on Dataset-I based on two Deep Single-Magnification Networks (DSMNs), SegNet and U-Net, and four Deep Multi-Magnification Networks (DMMNs), Single-Encoder Single-Decoder (DMMN-S2), Multi-Encoder Single-Decoder (DMMN-MS), Multi-Encoder Multi-Decoder Single-Concatenation (DMMN-M2S), and the proposed Multi-Encoder Multi-Decoder Multi-Concatenation (DMMN-M3).
Figure 18A:
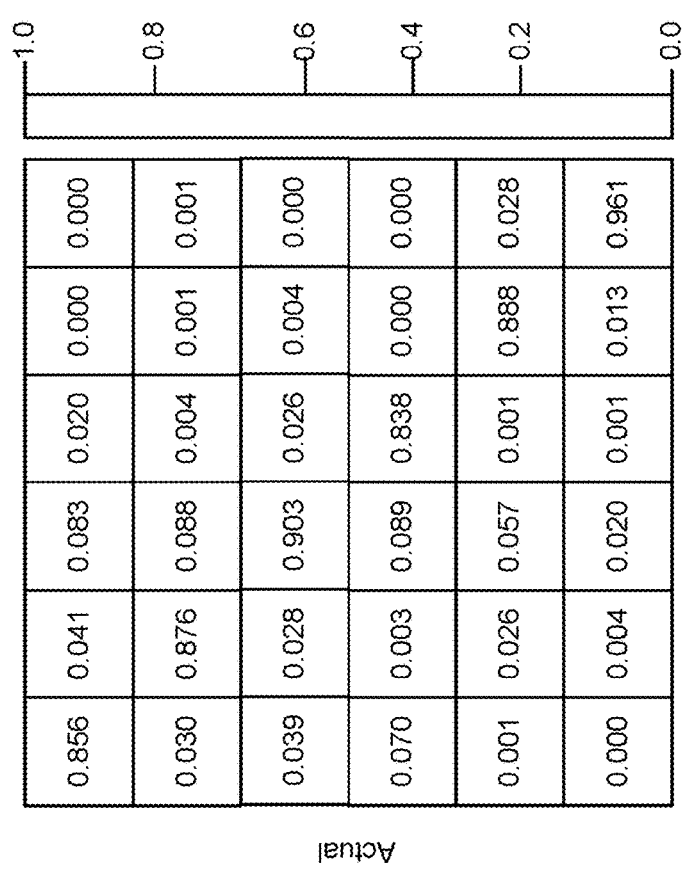
Figures 18C, 18D:
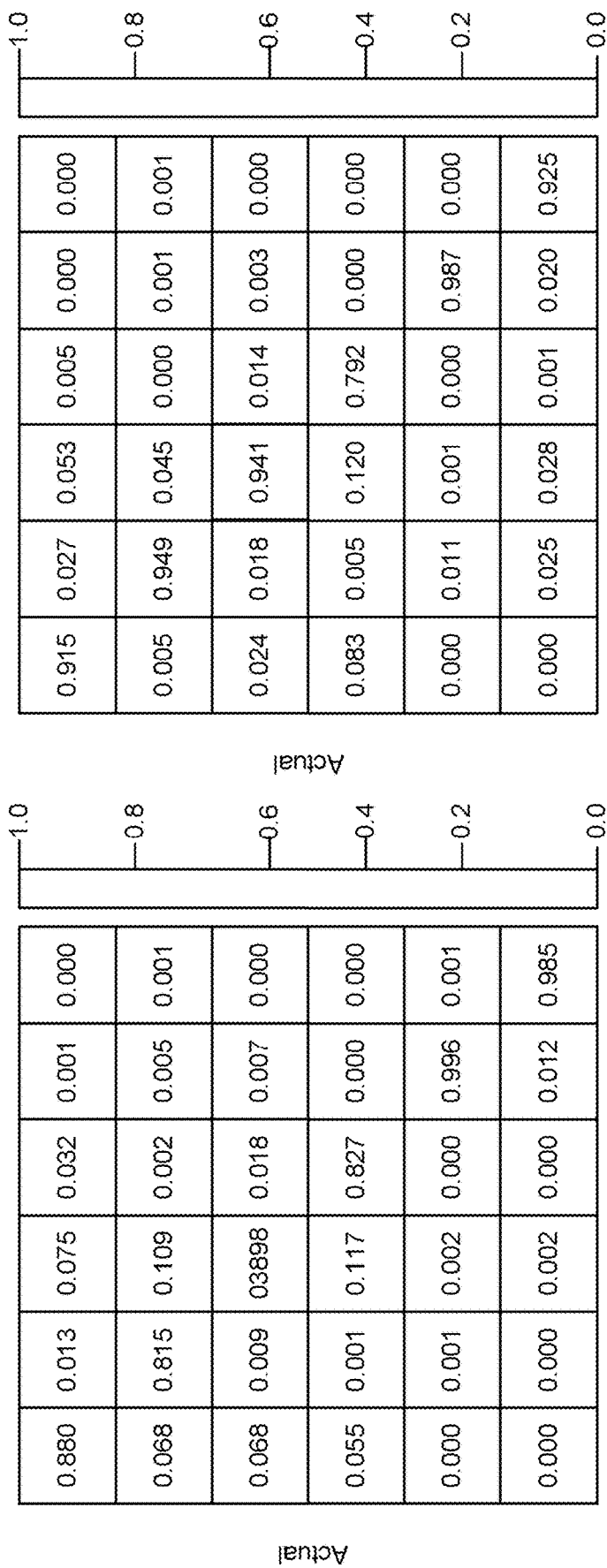
Figures 18E, 18F:
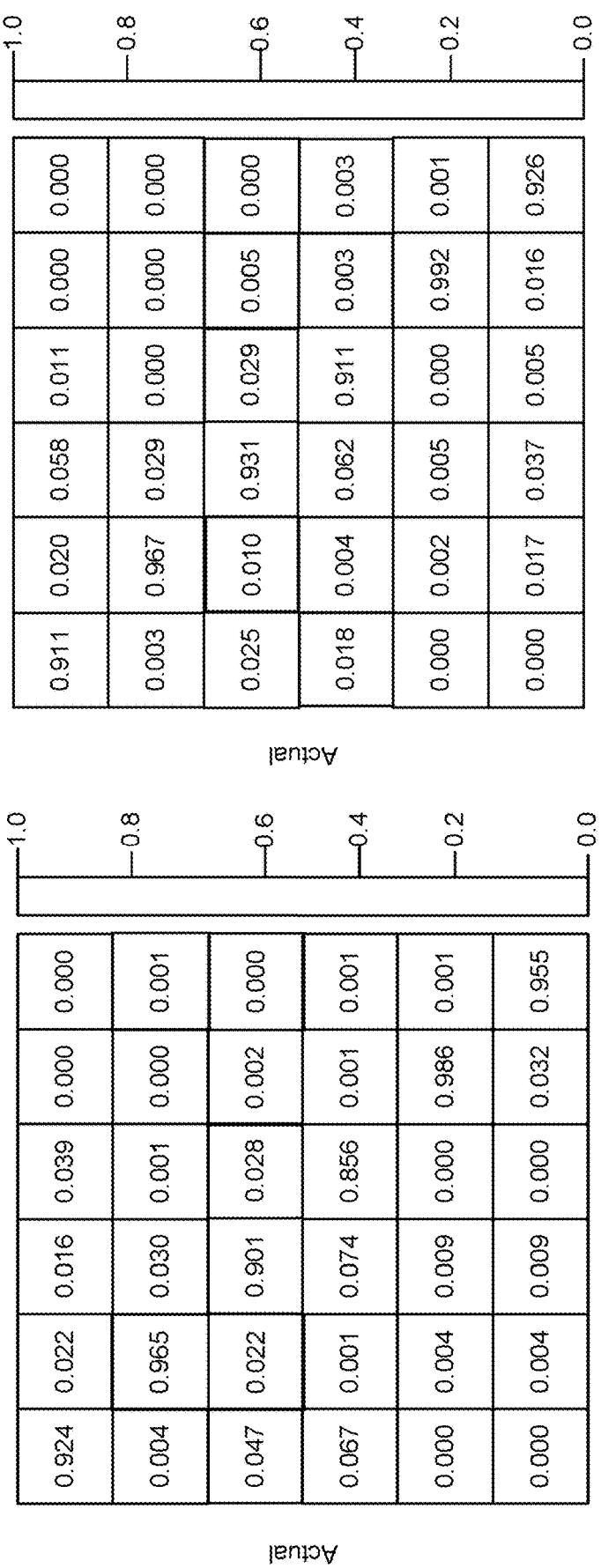

Based on our visual and numerical evaluations on Dataset-I, both DSMNs had blocky boundaries between subtypes, shown in FIGS. 15(k,l) and 11(k,l) due to their narrow field-of-view. DMMN-S2 also had blocky boundaries between subtypes, shown in FIGS. 15(m) and 16(m), because patches from multiple magnifications are concatenated early in the model so various features from multiple magnifications could not be fully extracted. These blockly predictions led to low mIOU, low mRecall, and low mPrecision in Table VI. DMMN-MS and DMMN-M2S had smoother boundaries between subtypes, but they did not have consistent predictions throughout subtypes. For example, DMMN-MS and DMMN-M2S cannot predict necrotic successfully according to FIG. 18(d,e). Our proposed DMMN-M3 has shown accurate predictions throughout all subtypes, shown in FIG. 18(f), leading to the best mIOU, mRecall, and mPrecision in Table VI.

Figure 17A:
FIGS. 17(a)-(p). Segmentation predictions on Dataset-II using two Deep Single-Magnification Networks (DSMNs), SegNet and U-Net, and four Deep Multi-Magnification Networks (DMMNs), Single-Encoder Single-Decoder (DMMN-S2), Multi-Encoder Single-Decoder (DMMN-MS), Multi-Encoder Multi-Decoder Single-Concatenation (DMMN-M2S), and the proposed Multi-Encoder Multi-Decoder Multi-Concatenation (DMMN-M3). (a-h) are thumbnail versions of a whole slide image and (i-p) are zoom-in images on ductal carcinoma in situ (DCIS) with size of 1024×1024 pixels in magnification of 10×.
Figure 17B:
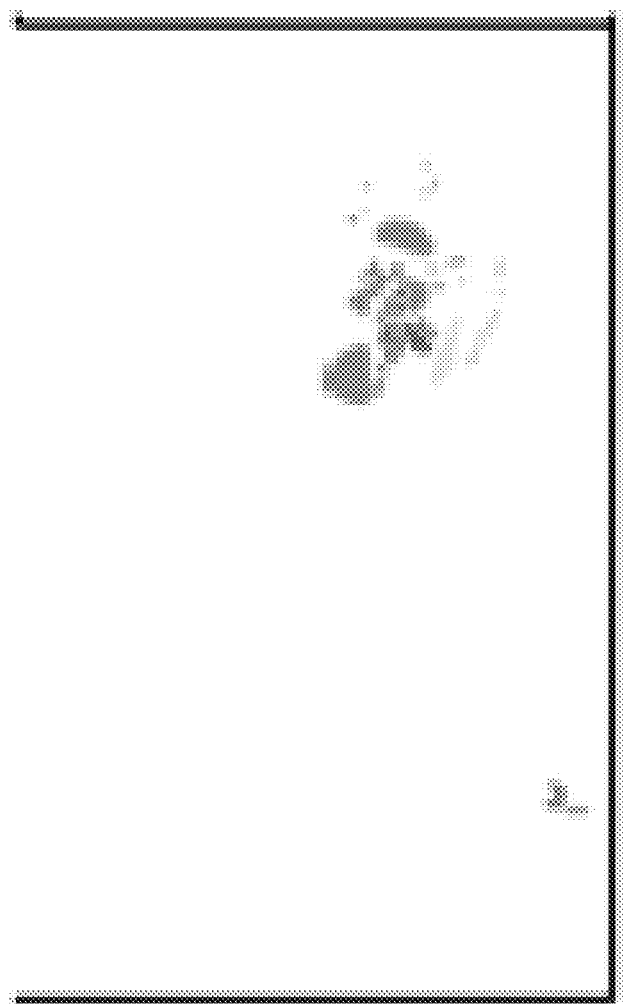
Figure 17C:
Figure 17D:
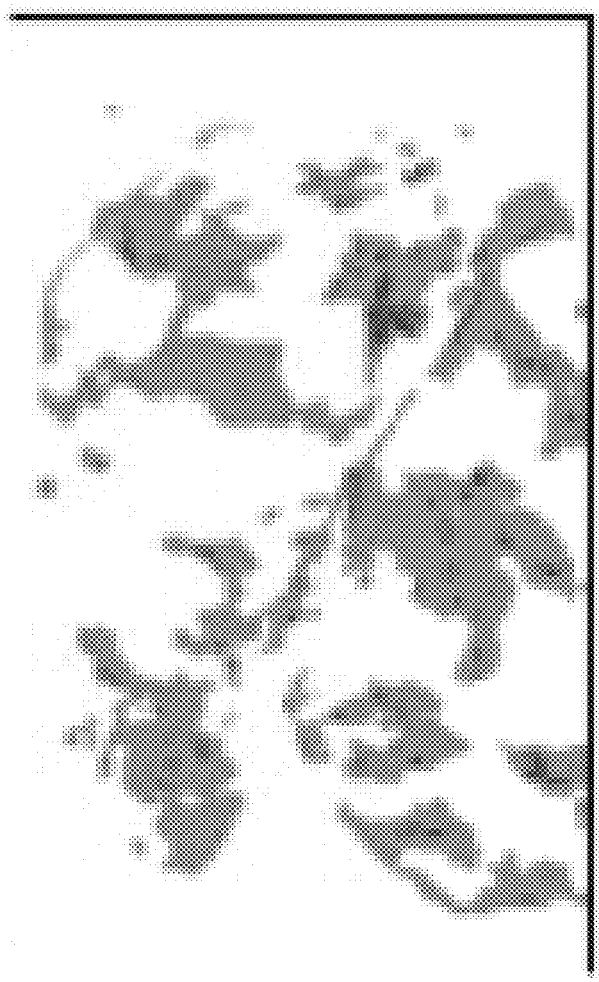
Figure 17E:
Figure 17F:
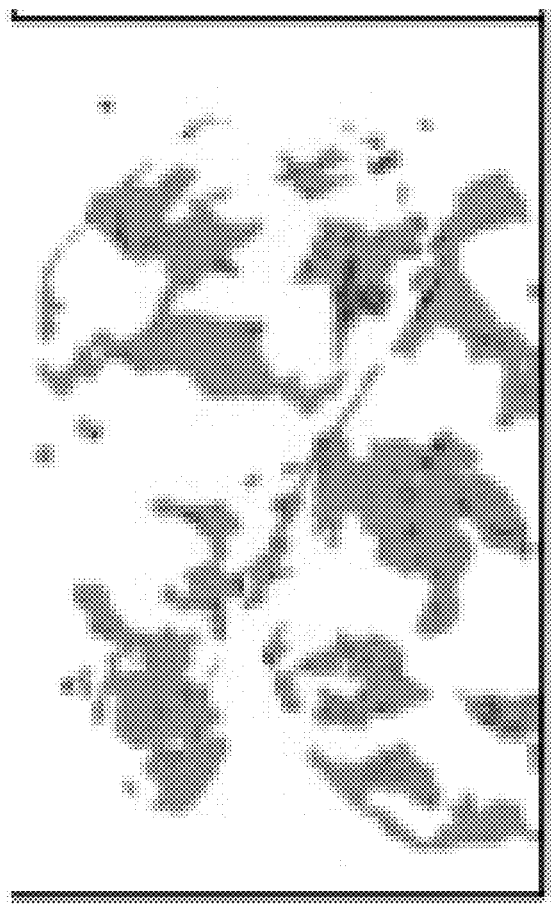
Figure 17G:
Figure 17H:
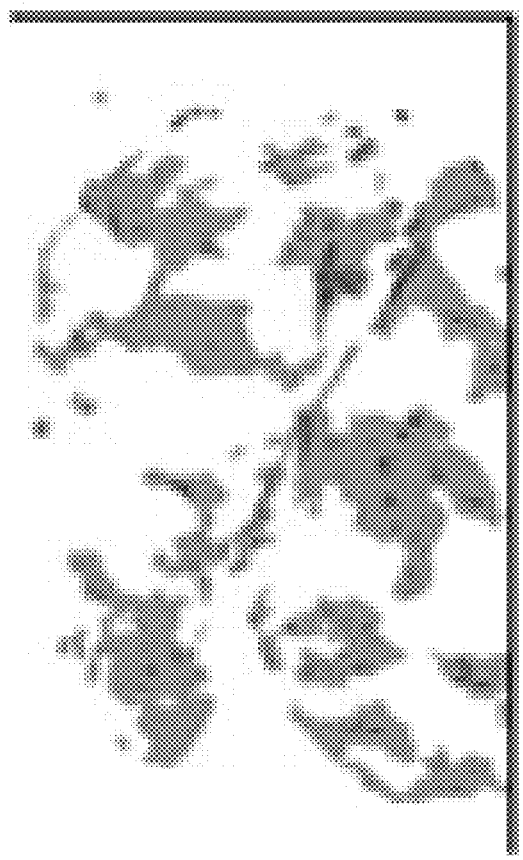
Figure 17I:
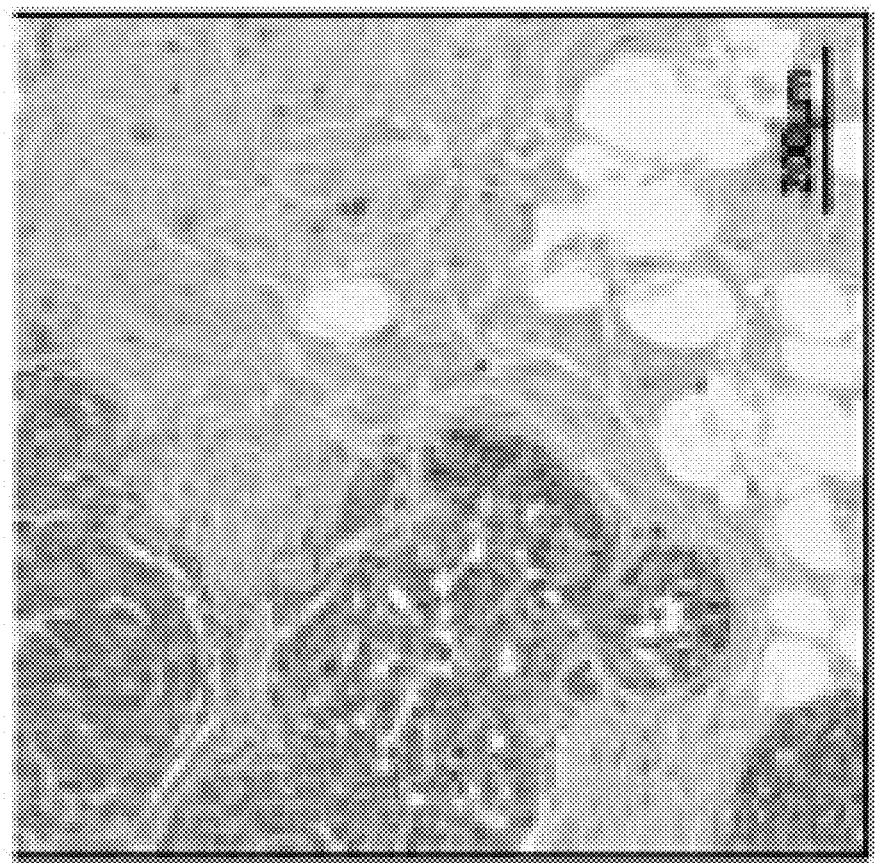
Figure 17J:
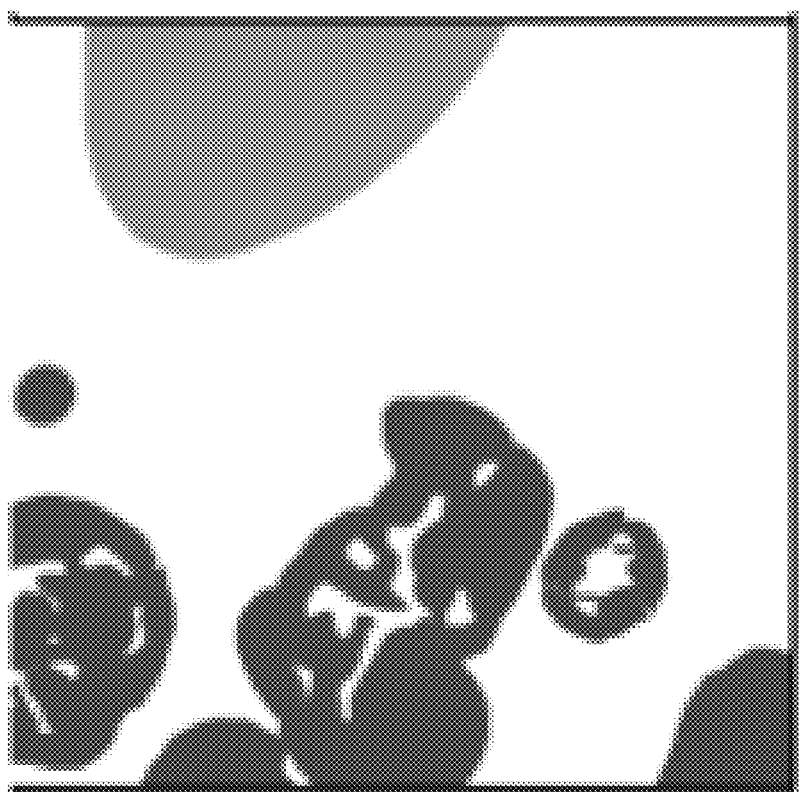
Figure 17K:
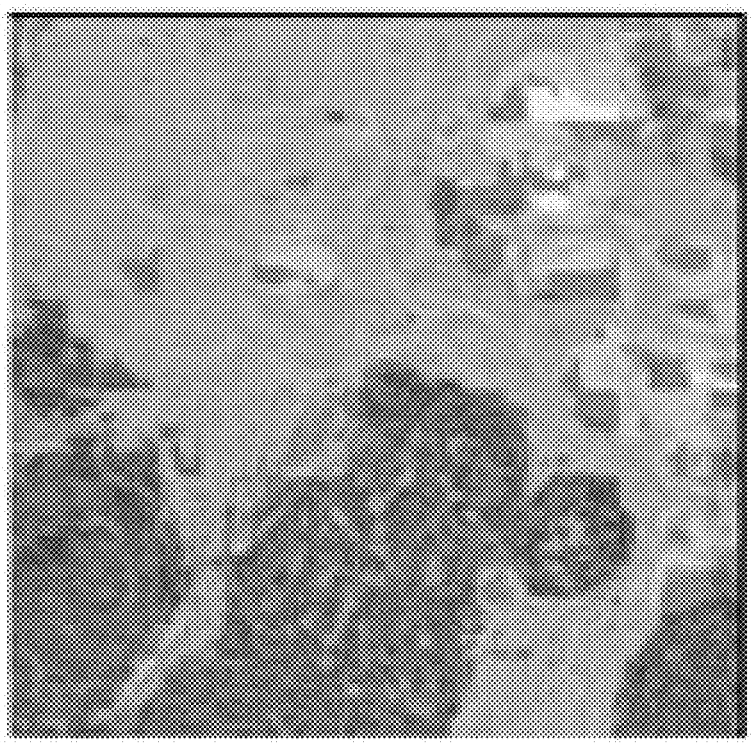
Figure 17I:
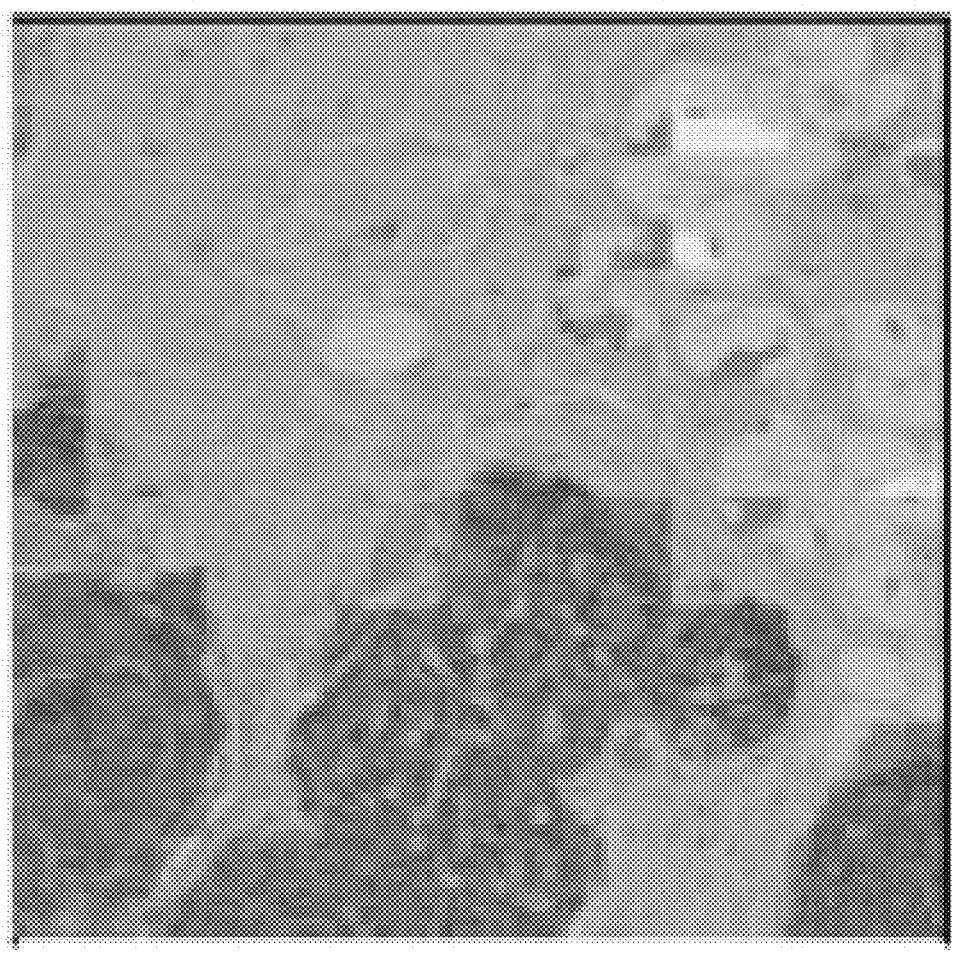
Figure 17M:
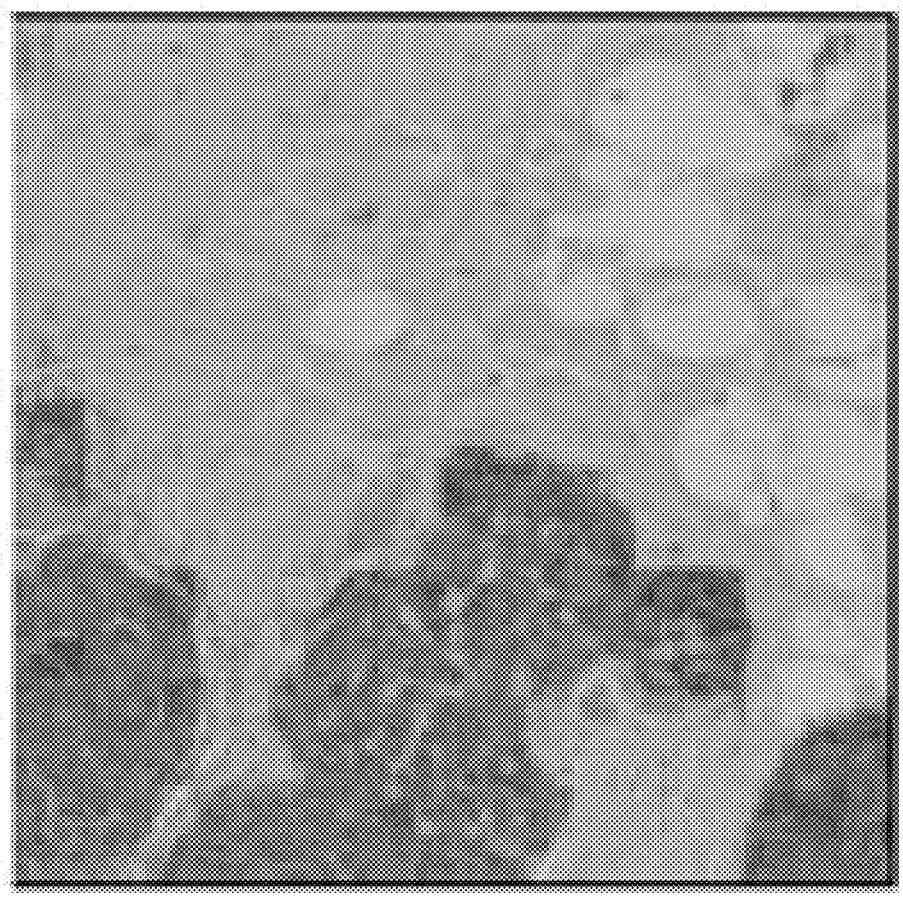
Figure 17N:
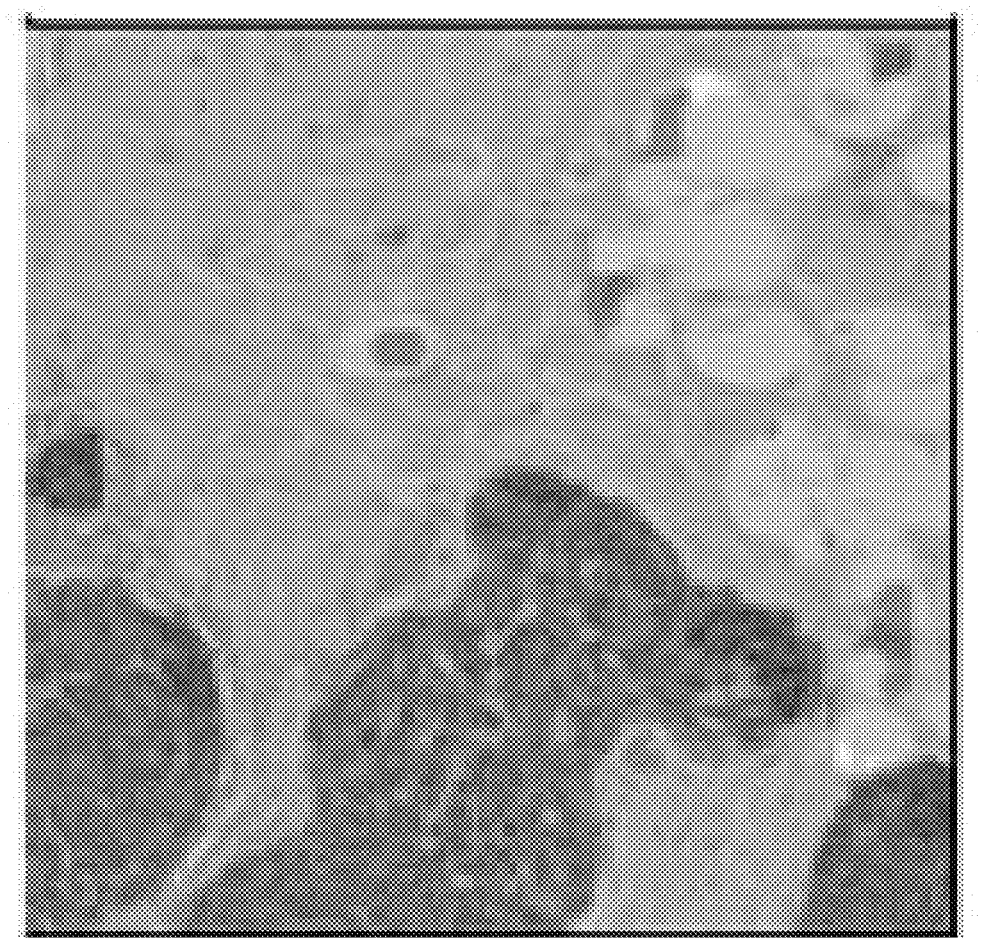
Figure 17O:
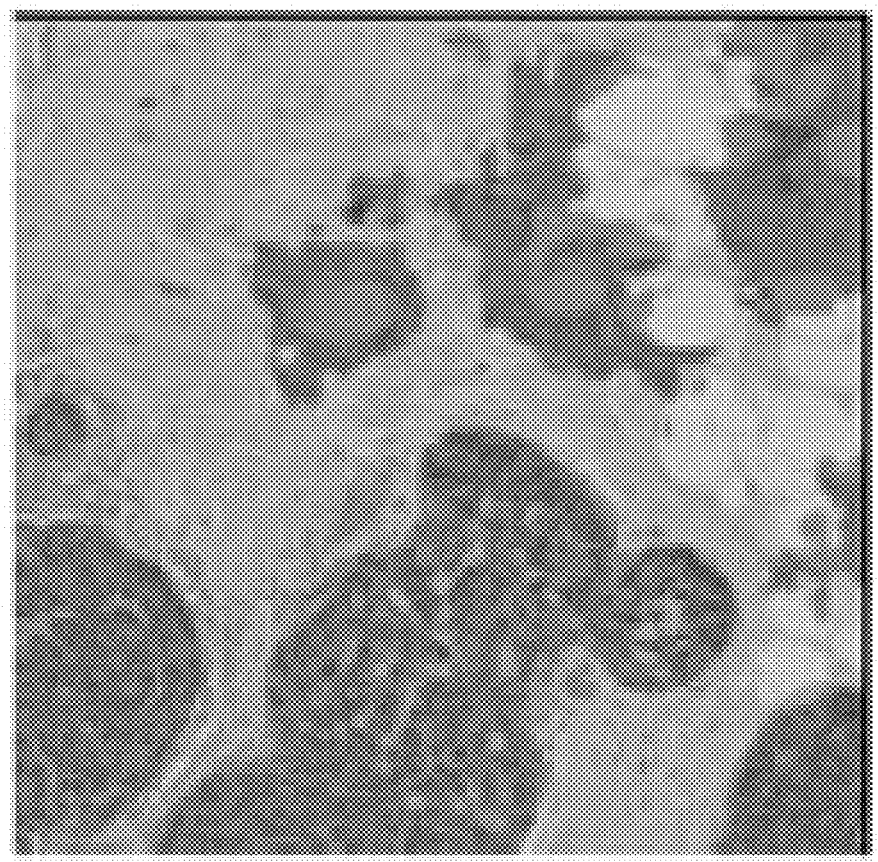
Figure 17P:
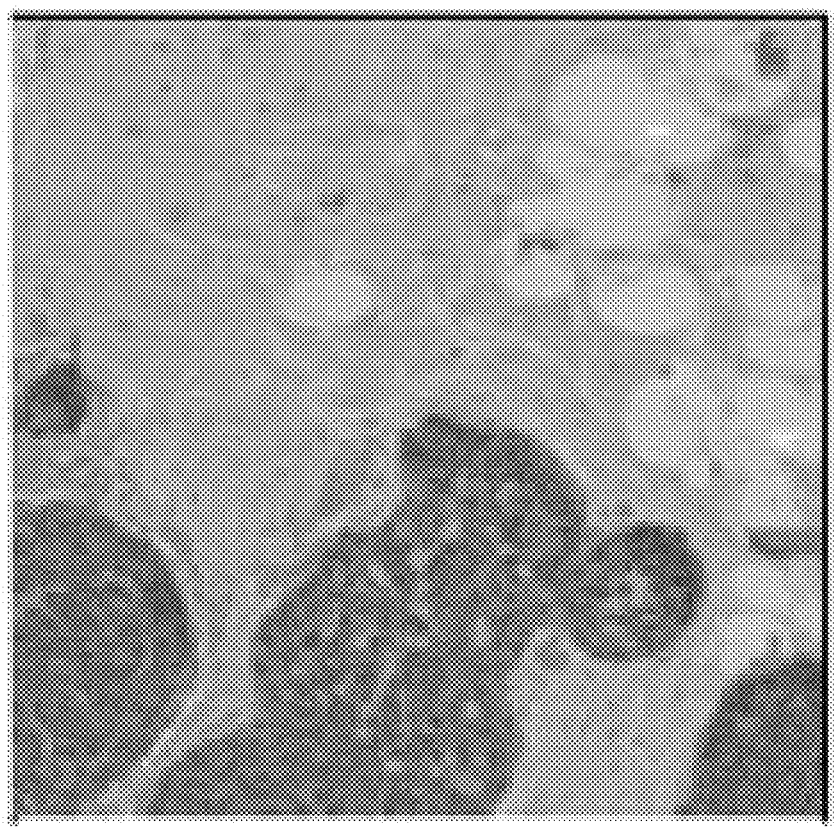

Our models were trained on Dataset-I and we kept aside images in Dataset-II, annotated by a different pathologist, for our testing set. We still observed blocky boundaries on predictions done by SegNet, U-Net, and DMMN-S2 on Dataset-II, shown in FIG. 17(k,l,m). We noticed predictions by DMMN-M2S were not successful where large regions are falsely segmented as benign epithelial in FIG. 17(g,o). DMMN-MS and DMMN-M3 generated the best predictions depicted in FIG. 17(n,p). While the numerical analyses based on mIOU, mRecall, and mPrecision are comparable between U-Net and DMMN-M3, the visual analysis in FIGS. 17(a)-(p) depicts drastic difference which is not captured by partially annotated groundtruth. FIGS. 17(a)-(p) demonstrates that the proposed DMMN-M3 with smoother and clearer boundaries between subtypes would outperform the state-of-the-art with exhaustively annotated groundtruth.

IV. Conclusion

A Deep Multi-Magnification Network (DMMN) is described for an accurate multi-class tissue segmentation on whole slide images. The model is trained by partially-annotated images to reduce time and effort for annotators. Although the annotation was partially done, our model was able to learn not only spatial characteristics within a class but also spatial relationship between classes. Our DMMN architecture see all 20×, 10×, and 5× magnifications to have a wider field-of-view to make more accurate predictions based on feature maps from multiple magnifications. The DMMNs were able to be improved by transferring intermediate feature maps from decoders in 10× and 5× to a decoder in 20× to enrich feature maps. Our implementation achieved outstanding segmentation performance on breast datasets that can be used to decide patients' future treatment. One main challenge is that our model may not successfully segment low-grade well-differentiated carcinomas presented in breast images because it was mainly trained by invasive ductal carcinomas. It is also observed that our model can be sensitive to background noises potentially leading to mis-segmentation on background regions if whole slide images are digitized by other scanners. A more accurate DMMN model may be developed, where various cancer structures and background noise patterns are included during training.

Figure 20A:
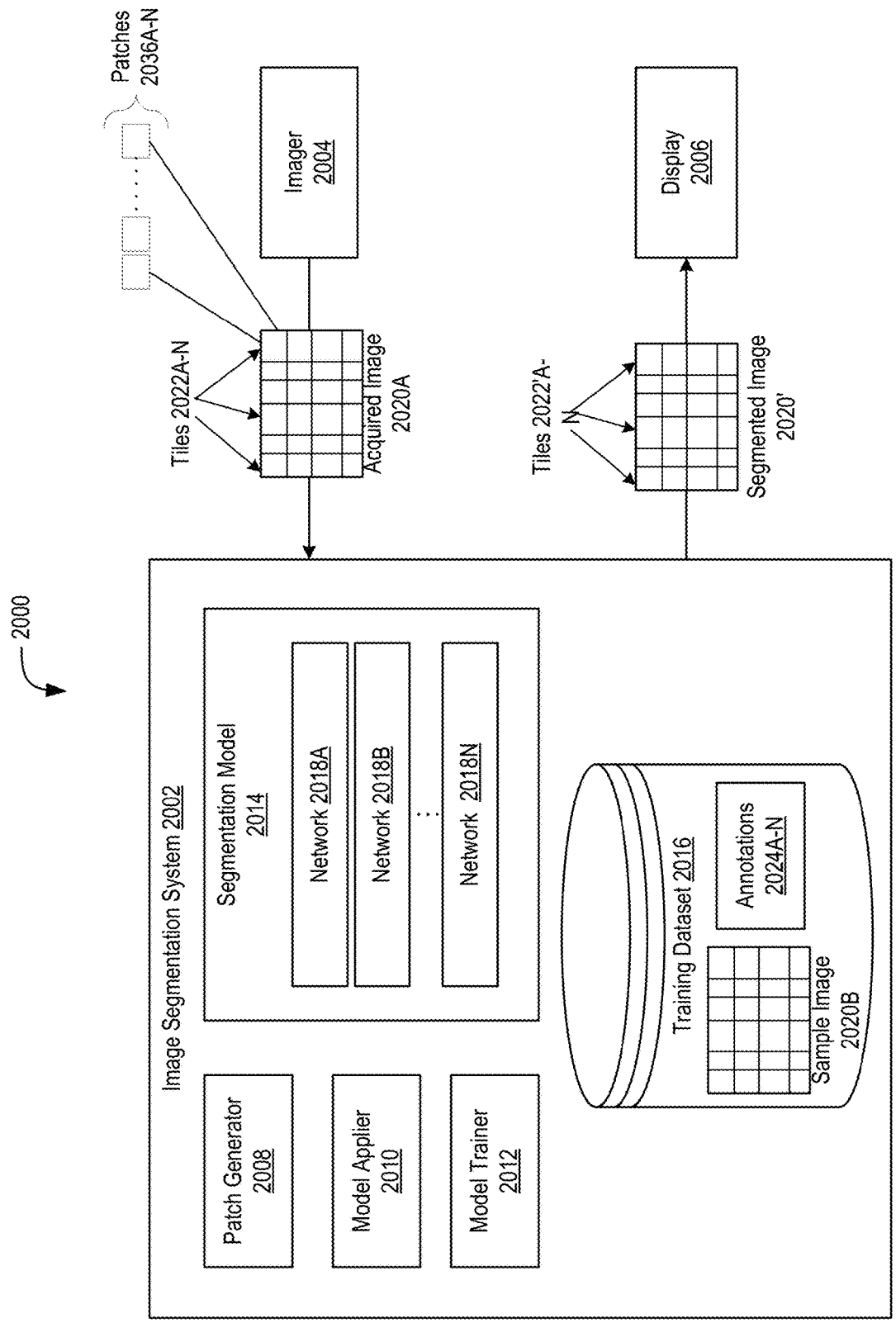
FIG. 20(a) depicts a block diagram of an example system for segmenting biomedical images using multi-magnification encoder-decoder concatenation networks.

C. Systems and Methods for Segmenting Biomedical Images Using Multi-Magnification Encoder-Decoder Concatenation Networks and Training Networks to Segment Biomedical Images Referring to FIG. 20(a), depicted is a block diagram of an environment or system 2000 for segmenting biomedical images using multi-magnification encoder-decoder concatenation networks in accordance with an illustrative embodiment. In overview, the system 2000 may include at least one image segmentation system 2002, at least one imager 2004, and at least one display 2006. The image segmentation system 2002, the imager 2004, and the display 2006 may be communicatively coupled with one another. The image segmentation system 2002 may include at least one patch generator 2008, at least one model applier 2010, at least one model trainer 2012, at least one segmentation model 2014, and at least one training dataset 2016, among others. The segmentation model 2014 may include a set of networks 2018A-N (hereinafter generally referred to as network 2018).

Each of the components in the system 2000 listed above may be implemented using hardware (e.g., one or more processors coupled with memory) or a combination of hardware and software as detailed herein in Section B. Each of the components in the system 2000 may implement or execute the functionalities detailed herein in Section A, such as those described in conjunction with FIGS. 1(a)-4(d) and 5(a)-9(l), and Section B, such as those described in conjunction with FIGS. 10(a)-13(e). For example, the segmentation model 2014 may implement or may have the functionalities of the architecture discussed herein in conjunction with FIG. 4(d) or 13(e).

In further detail, the imager 2004 (sometimes herein referred to as a microscopic imager or imaging device) may acquire or generate at least one biomedical image 2020A (also referred herein as an acquired image). The biomedical image 2020A may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The imager 2004 may acquire the biomedical image 2020A from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject. The tissue sample used to acquire the biomedical image 2020A may have a region of interest, such as a tumorous growth, a lesion, or an injury, among others. In some embodiments, the imager 2004 may acquire the biomedical image 2020A in accordance with microscopy techniques, such as using an optical microscope, a confocal microscope, a fluorescence microscope, a phosphorescence microscope, an electron microscope, among others. Upon acquisition or generation, the imager 2004 may send or provide the biomedical image 2020A to the image segmentation system 2002.

The imager 2004 may use the biomedical image 2020A generate a sample biomedical image 2020B. Upon generation of the sample biomedical image 2020B, the imager 2004 may provide the sample biomedical image 2020B to the image segmentation system 2002 for storage as part of the training dataset 2016. The sample biomedical image 2020B may be a histological section with staining using one of the techniques discussed above in connection with the biomedical image 2020A. In addition, the sample biomedical image 2020B may be included as part of the training dataset 2016 to train and update the segmentation model 2014 in accordance with supervised learning techniques.

Figure 20B:
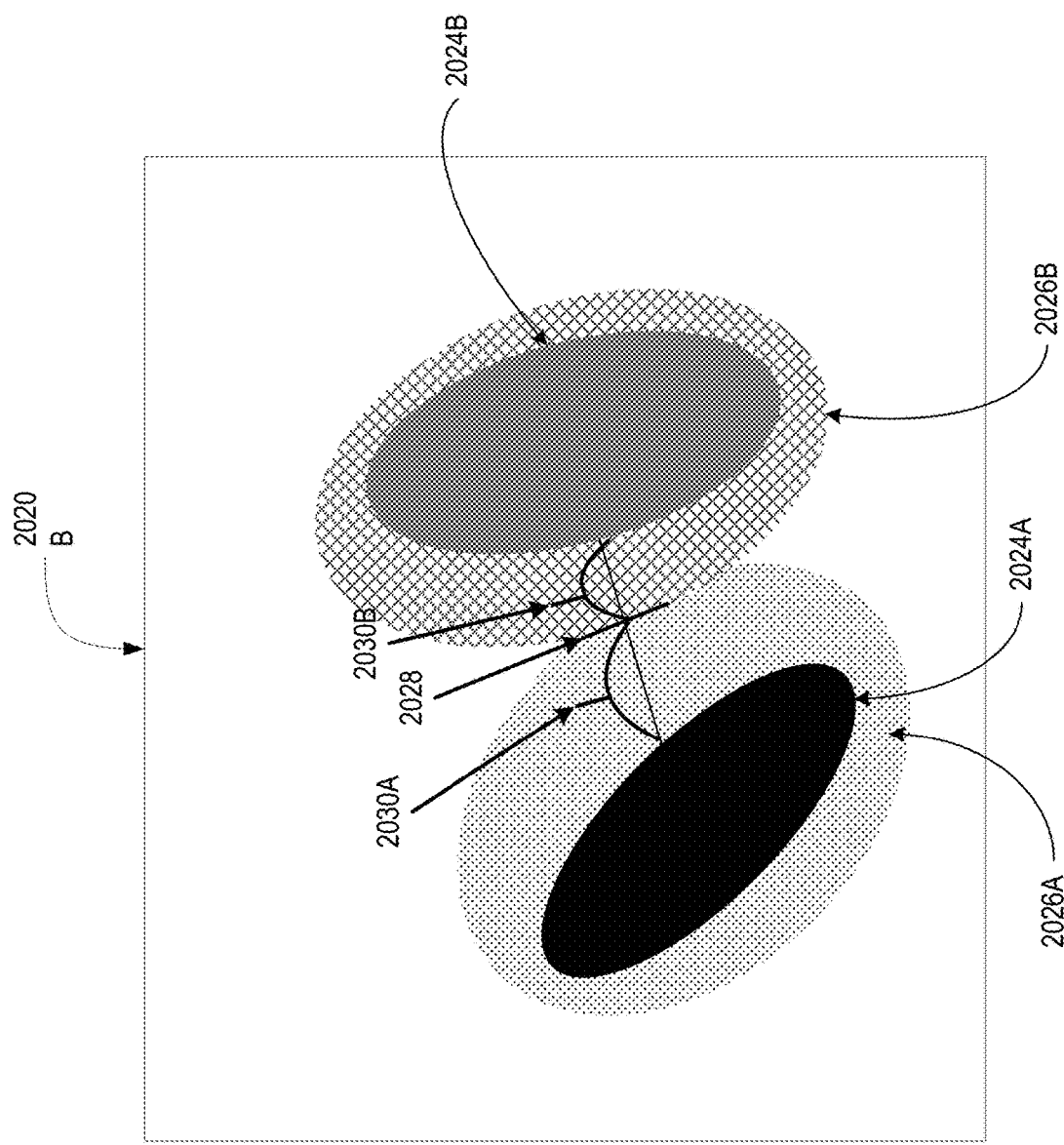
FIG. 20(b) depicts an example biomedical image with partial annotations for training a segmentation model.

Referring to FIG. 20(b), depicted is a diagram of an example of the sample biomedical image 2020B in accordance with an illustrative embodiment. The sample biomedical image 2020B may be associated with at least one annotation 2024A-N (hereinafter generally referred to as annotations 2024). In some embodiments, the annotation 2024 may be manually prepared by a pathologist examining the sample biomedical image 2020B. The annotation 2024 may indicate or otherwise label at least a portion of each region of interest 2026A-N (hereinafter generally referred to as region of interest 2026) within the sample biomedical image 2020B. In some embodiments, the annotations 2024 may specify or define area, dimensions, or coordinates (e.g., pixel coordinates) of the region of interest 2026 within the sample biomedical image 2020B.

Each region of interest 2026 may correspond to tumor, lesion, or other injury in the imaged tissue sample used to generate the sample biomedical image 2020B. In some embodiments, each region of interest 2026 may correspond to a different type (sometimes referred herein as subtype) of feature on the imaged tissue sample. Each annotation 2024 may also correspond to the different type of feature of the region of interest 2026. For example, the types of features in the imaged tissue sample may include carcinoma tissue, benign epithelial tissue, stroma tissue, necrotic tissue, and adipose tissue, among others. In the example depicted, the sample biomedical image 2020B may include a first region of interest 2026A partially labeled using a first annotation 2024A. Additionally, the sample biomedical image 2020B may include a second region of interest 2026B partially labeled using a second annotation 2024B.

The annotations 2024 may fully label or partially label (e.g., as depicted) the corresponding region of interest 2026 within the sample biomedical image 2020B. When fully labeled, the annotation 2024 may cover or substantially cover (e.g., 90% or above) the corresponding region of interest 2026 within the sample biomedical image 2020B. Conversely, when partially labeled, the annotation 2024 may define a portion of the region of interest 2026 (less than fully) within the sample biomedical image 2020B. In addition, the portion defined by each annotation 2024 may be separated from at least one edge 2028 of the region of interest 2026. The edge 2028 may define a perimeter or a boundary between two or more regions of interests 2026. The annotation 2024 may be separated or arranged from the edge 2028 by a separation distance 2030A-N (hereinafter generally referred to as separation distance 2030). In the example depicted, the first annotation 2024A partially labeling the region of interest 2026A may be separated from the edge 2028 by a first distance 2030A. Furthermore, the second annotation 2024B partially labeling the region of interest 2026B may be separated from the edge 2028 by a second distance 2030B. By partially labeling the regions of interest 2026 using the annotations 2024, the time consumed in generation of annotations 2024 may be reduced. Furthermore, the segmentation model 2014 may learn spatial relationships between different types of features for the regions of interest 2026 and generate more accurate and precise results.

Returning to FIG. 20(a), the image segmentation system 2002 itself and the components therein, such as the patch generator 2008, the model applier 2010, and the model trainer 2012, may have a runtime mode and a training mode. Under training mode, the image segmentation system 2002 may train the segmentation model 2014 using the training dataset 2016 in comparison with the segmented image 2020'. Under runtime mode, the image segmentation system 2020 may apply segmentation model 2014 to acquired biomedical images 2020A to generate segmented image 2020'.

The patch generator 2008 executing on the image segmentation system 2002 may receive, retrieve, or otherwise identify the acquired biomedical image 2020A or the sample biomedical image 2020B (both referred to as biomedical image 2020 in general). Under the runtime mode, the patch generator 2008 may identify the acquired biomedical image 2020A from the imager 2004. In contrast to the sample biomedical image 2020B, the acquired biomedical image 2020A may lack any associated annotations 2024. The acquired biomedical image 2020A may differ from the sample biomedical image 2020B of the training dataset 2016. Conversely, under the training mode, the patch generator 2008 may access the training dataset 2016 to identify the sample biomedical image 2020B. The sample biomedical image 2020B may be associated with at least one of the sets of annotations 2024 labeling the regions of interest 2026.

With the identification of the biomedical image 2020, the patch generator 2008 may process the biomedical image 2020 for feeding into the segmentation model 2014. The patch generator 2008 may generate a set of tiles 2022A-N (hereinafter generally referred to as tiles 2022 from the biomedical image 2020. The patch generator 2008 may partition or divide the biomedical image 2020 into the set of tiles 2022. Each tile 2022 may correspond a portion of the biomedical image 2020. The portions may be mutually exclusive or may be partially overlapping. In some embodiments, the portions of the biomedical image 2020 corresponding to the tiles 2022 may be without overlap. In some embodiments, the portions of the biomedical image 2020 corresponding to the tiles 2022 may partially overlap. Adjacent tiles 2022 generated from the biomedical image 2020 may overlap by an overlap ratio (e.g., 10-90%) with one another.

In some embodiments, the patch generator 2008 may identify or detect one or more regions of the biomedical image 2020 corresponding to negative space. The identification of the negative space may be in accordance with a feature detection algorithm. The negative space region of the biomedical image 2020 may lack any portion of the microanatomical sample or specimen. For example, the negative space may correspond to the region of the biomedical image 2020 that is null or white, or substantially null or white (e.g., at least 90%). Upon detection of the negative space, the patch generator 2008 may remove the region of the biomedical image 2020 corresponding to the negative space from the generation of the set of tile 2022.

For each tile 2022 from the biomedical image 2002, the patch generator 2008 may generate or create a set of patches 2036A-N (hereinafter generally referred to as patches 2036) using a corresponding set of magnification factors. Each patch 2036 may correspond to the portion of the biomedical image 2020 from which the tile 2022 was generated at one of the magnification factors. Each magnification factor may specify an amount, a number, or a ratio at which to enlarge the tile 2022 (e.g., by increasing a resolution of an image in the tile 2022) or to reduce the tile 2022 (e.g., by decreasing the resolution of the image in the tile 2022). To create each patch 2036, the patch generator 2008 may apply a corresponding magnification factor to the tile 2022. The magnification factors used to generate the patches 2036 may range, for example, from 1× to 300×. The number of patches 2036 generated may range from two to hundreds. For example, using the same tile 2022 from the biomedical image 2020, the first patch 2036A may be at a magnification factor of 20×, the second patch 2036A may be at a magnification of 10×, and the third patch 2036C may be at a magnification factor of 20×.

In some embodiments, the patch generator 2008 may generate one patch 2036 at one magnification factor using another patch 2036 at another magnification factor for the same tile 2022 of the biomedical image 2020. The patch generator 2008 may generate a first patch 2036A by applying a first magnification factor from one tile 2022 of the biomedical image 2020A. Upon generation, the patch generator 2008 may identify a portion of the first patch 2036A. The portion may correspond to, for example, a center portion, a left portion, a right portion, a top portion, a bottom portion, a top-left portion, a top-right portion, a bottom-left portion, a bottom-right portion, or any other subsection of the patch 2036. On the identified portion, the patch generator 2008 may apply a second magnification factor to generate a second patch 2036B. In some embodiments, the patch generator 2008 may down-sample (or up-sample) the identified portion of the first patch 2036A to generate the second patch 2036B at the second magnification factor. The patch generator 2008 may repeat the identification of the portion and sampling to generate the set of patches 2036. In some embodiments, the repetition may be defined to the number of patches 2036 to be generated by the patch generator 2008 for the tiles 2022 of the biomedical image 2020.

The model applier 2010 executing on the image segmentation system 2002 may maintain and establish the segmentation model 2014 on the image segmentation system 2002. The model applier 2010 may apply the segmentation model 2014 to each patch 2036. The application of the segmentation model 2014 may be performed in both runtime mode and training mode. In applying, the model applier 2010 may feed or input the set of patches 2036 from each tile 2022 of the biomedical image 2020 into the segmentation model 2014. In some embodiments, the model applier 2010 may each patch 2036 into corresponding network 2018 of the segmentation model 2014 for the magnification factor attributed to the patch 2036. For example, the model applier 2010 may feed: the first patch 2036A at the first magnification factor to the first network 2018A, the second patch 2036B at the second magnification factor to the second network 2018B, and the third patch 2036C at the third magnification factor to the third network 2018C, and so forth. By applying each tile 2022, the model applier 2010 may generate a corresponding tile 2022' for the segmented image 2020'. The segmented tile 2022' may identify a region of interest 2026 within the tile 2022. Details of the functions and structures of the segmentation model 2014 and the networks 2018 are provided herein in conjunction with FIGS. 20(c)-(g).

Referring to FIG. 20(c), depicted is a block diagram of a convolution block 2032 (sometimes referred herein as an encoder) in one of the networks 2018 of the segmentation model 2014 in accordance with an illustrative embodiment. One or more instances of the convolution block 2032 can be included in each network 2018 of the segmentation model 2014. In overview, the convolution block 2032 may include a set of transform layers 2034A-N. The set of transform layers 2034A-N may include one or more convolutional layers 2034A and one or more normalization layers 2034B, and one or more activation layers 2034C (also referred herein as a rectified linear unit), among others. In some embodiments, the set of transform layers 2034A-N may lack the one or more normalization layers 2034B. The convolution block 2032 may have a set of feature maps 2038 (as shown) or one of the patches 2036 as input. The set of transform layers 2034A-N of the convolution block 2032 may be applied to the input, such as the set of feature maps 2038 or one of the patches 2036, in any sequence (such as the one depicted). The set of input feature maps 2038 may have the same resolution of the patch 2036 inputted to the network 2018 in which the convolution block 2032 is in. The resolution may correspond or define a number of pixels in each dimension of the feature map 2038 or the patch 2036. The set of input feature maps 2038 may be the resultant output of another component of the same or different network 2018 from processing one of the patches 2036.

The convolution layer 2034A of the convolution block 2032 may include one or more filters (sometimes referred to as kernels or feature detectors). The convolution layer 2034A may apply the one or more filters to the input set of feature maps 2038. Each filter may be a function to apply to the input of the convolutional layer 2034A over the predetermined size at a predetermined stride (e.g., ranging from 1 to 64) to generate an output. The function of the filter may include one or more parameters (sometimes referred to as weights) to apply to the input. The one or more parameters may be set, adjusted, or modified by training. Each filter may be of a predetermined size (e.g., ranging from 3×3×1 to 1024×1024×3). The size and the number of the filter may differ depending on which network 2018 the instance of the convolution layer 2034A is included in. The parameter of the convolutional layer 2034A may be repeatedly applied to the input (e.g., the input set of feature maps 2038) in accordance with the predetermined stride to generate an output.

The normalization layer 2034B of the convolution block 2032 may include at least one function to apply to the output of the previous transform layer 2034A-N (e.g., the convolution layer 2034A as depicted). The function of the normalization layer 2034B may include one or more parameters to apply to the input. The function may be set, adjusted, or modified by training. The normalization layer 2034B may identify a range of values of the input. From the range of values, the normalization layer 2034B may identify a minimum value, a maximum value, and a difference between the minimum value and the maximum value for the input. The normalization layer 2034B may determine a transformation factor based on the minimum value, the maximum value, and the difference between the minimum value and the maximum value (e.g., as a linear function). The normalization layer 2034B may then apply (e.g., multiply) the transformation factor to all the input to form the output.

The activation layer 2034C of the convolution block 2032 may include at least one function to apply to the output of the previous transform layer 2034A-N (e.g., the convolution layer 2034A or the normalization layer 2034B as depicted). The function of the activation layer 2034C may be an activation function, such as an identity function, a unit step function, a hyperbolic function, an arcus function, or a rectifier function (max(0, x)), among others. The function may be set, adjusted, or modified by training. The activation function may be non-linear. The activation layer 2034C may traverse all of the input each corresponding to the output of one of the filters at the previous transform layer 2034A-N, such as the convolutional layer 2034A as depicted. While traversing, the activation layer 2034C may apply the activation function to the input to generate the output set of feature maps 2038'. Because of the activation function, the output of the activation layer 2034C may be non-linear relative to the input.

By applying the set of transform layers 2034A-N to the set of feature maps 2038 or one of the patches 2036, the convolution block 2032 may generate a set of feature maps 2038' as output. With the generation, the convolution block 2032 may feed or provide the output set of feature maps 2038' along the same network 2018 of the segmentation model 2014 (e.g., as depicted by the horizontal arrow). The convolution block 2032 may feed or provide the output set of feature maps 2038' to a network 2018 for a different magnification factor in the segmentation model 2014 (e.g., as depicted by the downward vertical arrow). The output set of feature maps 2038' may have the same resolution as the input set of feature maps 2038 and the patch 2036 inputted into the network 2018 in which the convolution block 2032 is in.

Figure 20D:
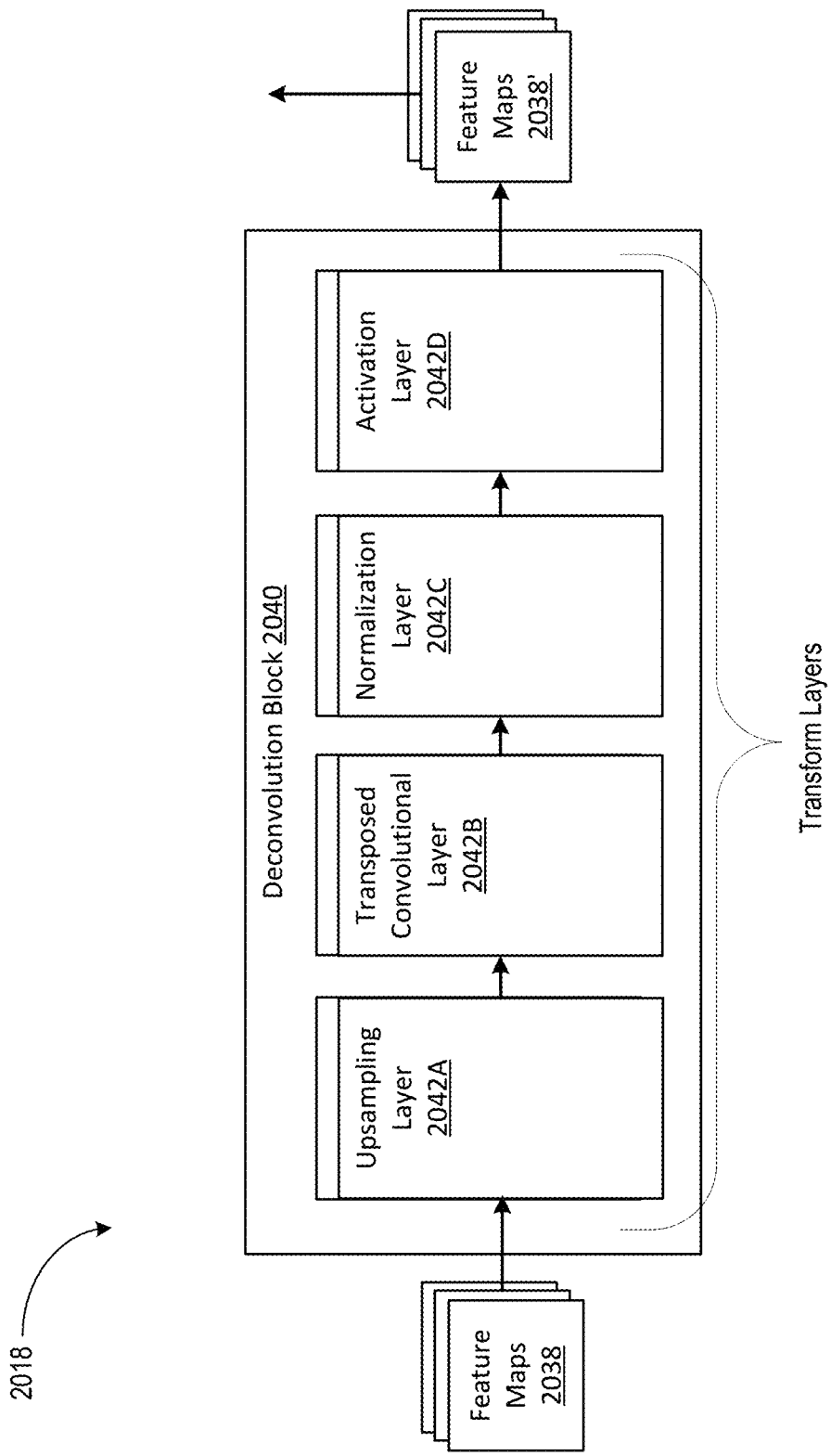
FIG. 20(c) depicts a block diagram of a convolution block of a network in a segmentation model for segmenting biomedical images.
FIG. 20 (d) depicts a block diagram of a deconvolution block of a network in a segmentation model for segmenting biomedical images.
FIG. 20(e) depicts a block diagram of a terminal convolution block of a network in a segmentation model.
FIG. 20(f) depicts a block diagram of a network in the segmentation model for segmenting biomedical images.
FIG. 20(g) depicts a block diagram of the segmentation model for segmenting biomedical images.
FIG. 20(h) depicts a flow diagram of a method of segmenting biomedical images using multi-magnification encoder-decoder concatenation networks.
FIG. 20(i) depicts a flow diagram of a method of training models for segmenting biomedical images using multi-magnification encoder-decoder concatenation networks.

Referring to FIG. 20(d), depicted is a block diagram of a deconvolution block 2040 (sometimes referred herein as a decoder) in one of the networks 2018 of the segmentation model 2014 in accordance with an illustrative embodiment. One or more instances of the deconvolution block 2040 can be included in each network 2018 of the segmentation model 2014. In overview, the deconvolution block 2040 may include a set of transform layers 2042A-N. The set of transform layers 2042A-N may include one or more upsampling layers 2042A, one or more convolutional layers 2042B, one or more normalization layers 2042C, and one or more activation layers 2042D (also referred herein as a rectified linear unit), among others. In some embodiments, the set of transform layers 2042A-N may lack the one or more normalization layers 2042B. The deconvolution block 2040 may have a set of feature maps 2038 as input. The set of transform layers 2042A-N of the deconvolution block 2040 may be applied to the input, such as the set of feature maps 2038, in any sequence (such as the one depicted). The set of input feature maps 2038 may have the same resolution or size of the patch 2036 inputted to the network 2018 in which the deconvolution block 2040 is in. The set of input feature maps 2038 may be the resultant output of another component of the same or different network 2018 from processing one of the patches 2036 inputted to the network 2018.

The upsampling layer 2042A of the deconvolution block 2040 may increase a resolution of the input set of feature maps 2038 to a target resolution. The target resolution may equal the resolution of another network 2018 within the segmentation model 2014 to which the resultant output set of feature maps 2038' is to be fed into. In some embodiments, the upsampling layer 2042A may identify the resolution of the input set of feature maps 2038. With the identification, the upsampling layer 2042A may determine a difference between the resolution and the target resolution. With the determination of the difference, the upsampling layer 2042A may perform zero-padding to the input set of feature maps 2038 to increase the resolution by the difference to the target resolution. The upsampling layer 2042A may apply an interpolation filter to the zero-padded input set of feature maps 2038 to smooth discontinuities arising from zero-padding. The interpolation filter may be of the same size as the target resolution.

The transposed convolutional layer 2042B of the deconvolution block 2040 may include one or more filters (sometimes referred to as kernels or feature detectors). The convolution layer 2042B may apply the one or more filters to the input set of feature maps 2038. Each filter may be a function to apply to the input of the transposed convolutional layer 2042B over the predetermined size at a predetermined stride (e.g., ranging from 1 to 64) to generate an output. The function of the filter may include one or more parameters (sometimes referred to as weights) to apply to the input. Relative to the parameters in the convolutional layer 2034A in the convolution block 2032, the parameters of the filters in the transposed convolutional layer 2042B of the deconvolution block 2040 may be transposed or inversed (pseudo-inverse). The one or more parameters of the filters may be set, adjusted, or modified by training. The adjusting of the parameters of the filters in the transposed convolutional layer 2042B of the deconvolution block 2040 may depend on the adjusting of the parameters of the filters in the convolutional layer 2034A in the convolution block 2032. Each filter may be of a predetermined size (e.g., ranging from 3×3×1 to 1024×1024×3). The size and the number of the filter may differ depending on which network 2018 the instance of the convolution layer 2042B is included in. The parameter of the convolutional layer 2042B may be repeatedly applied to the input (e.g., the input set of feature maps 2038) in accordance with the predetermined stride to generate an output.

The normalization layer 2042C of the deconvolution block 2040 may include at least one function to apply to the output of the previous transform layer 2042A-N (e.g., the transposed convolution layer 2042B as depicted). The function of the normalization layer 2042C may include one or more parameters to apply to the input. The function may be set, adjusted, or modified by training. The normalization layer 2042C may identify a range of values of the input. From the range of values, the normalization layer 2042C may identify a minimum value, a maximum value, and a difference between the minimum value and the maximum value for the input. The normalization layer 2042C may determine a transformation factor based on the minimum value, the maximum value, and the difference between the minimum value and the maximum value (e.g., as a linear function). The normalization layer 2042C may then apply (e.g., multiply) the transformation factor to all the input to form the output.

The activation layer 2042D of the deconvolution block 2040 may include at least one function to apply to the output of the previous transform layer 2042A-N (e.g., the transposed convolution layer 2042B or the normalization layer 2042C as depicted). The function of the activation layer 2042D may be an activation function, such as an identity function, a unit step function, a hyperbolic function, an arcus function, or a rectifier function (max(0, x)), among others. The function may be set, adjusted, or modified by training. The activation function may be non-linear. The activation layer 2042D may traverse all of the input each corresponding to the output of one of the filters at the previous transform layer 2042A-N, such as the convolutional layer 2042B. While traversing, the activation layer 2042D may apply the activation function to the input to generate the output set of feature maps 2038'. Because of the activation function, the output of the activation layer 2048B may be non-linear relative to the input.

By applying the set of transform layers 2042A-N to the set of input feature maps 2038, the deconvolution block 2040 may generate a set of feature maps 2038' as the output. With the generation, the deconvolution block 2040 may feed or provide the output set of feature maps 2038' to a network 2018 for a different magnification factor in the segmentation model 2014 (e.g., as depicted by the upward vertical arrow). The output set of feature maps 2038' may have the same resolution as the input set of feature maps 2038 of the network 2018 to which the deconvolution block 2040 feeds the output set of feature maps 2038'.

Figure 20E:
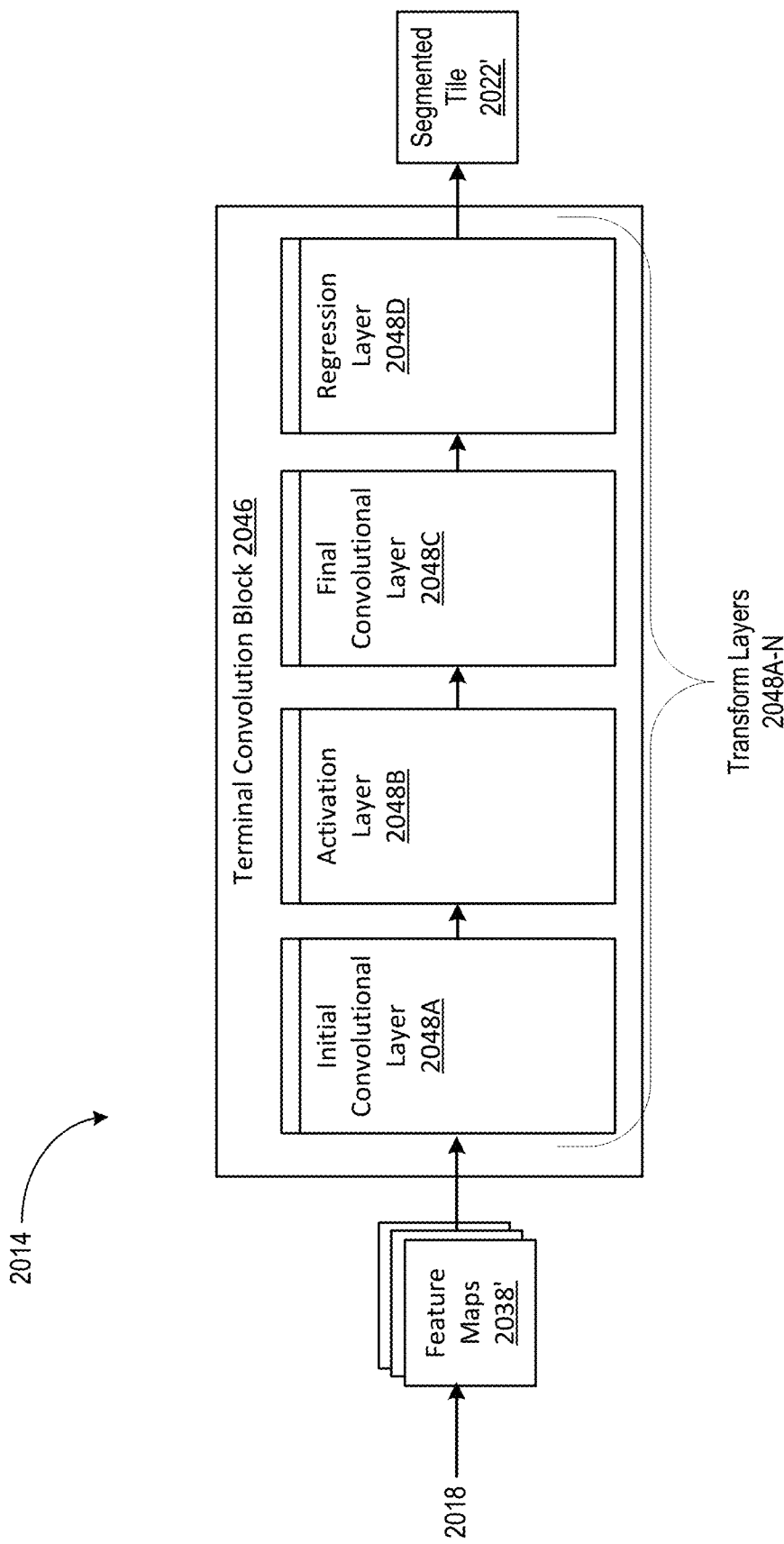

Referring to FIG. 20(e), depicted is a block diagram of a terminal convolution block 2046 in the segmentation model 2014 in accordance with an illustrative embodiment. One or more instances of the terminal convolution block 2046 can be included in the segmentation model 2014. In overview, the terminal convolution block 2046 may include a set of transform layers 2048A-N. The set of transform layers 2048A-N may include one or more initial convolutional layers 2048A, one or more activation layers 2048B, one or more final convolution layers 2048C, and one or more regression layers 2048D, among others. The terminal convolution block 2046 may have a set of feature maps 2038 as input. The set of transform layers 2048A-N of the terminal convolution block 2046 may be applied to the input, such as the set of feature maps 2038', in any sequence (such as the one depicted), outputted by one of the networks 2018. The set of feature maps 2038' may be the resultant output of one of the networks 2018 from processing one of the patches 2036 and other input feature maps 2038 inputted to the network 2018.

The initial convolutional layer 2048A of the terminal convolution block 2046 may include one or more filters (sometimes referred to as kernels or feature detectors). The convolution layer 2048A may apply the one or more filters to the set of feature maps 2038' inputted into the terminal convolution block 2046. Each filter may be a function to apply to the input of the convolutional layer 2048A over the predetermined size at a predetermined stride (e.g., ranging from 1 to 64) to generate an output. The function of the filter may include one or more parameters (sometimes referred to as weights) to apply to the input. The one or more parameters may be set, adjusted, or modified by training. Each filter may be of a predetermined size (e.g., ranging from 3×3×1 to 1024×1024×3). The size and the number of the filter may differ depending on the network 2018 providing the set of feature maps 2038' as input into the terminal convolution block 2046. The parameter of the convolutional layer 2048A may be repeatedly applied to the input (e.g., the set of feature maps 2038') in accordance with the predetermined stride to generate an output.

The activation layer 2048B of the terminal convolution block 2046 may include at least one function to apply to the output of the previous transform layer 2048A-N (e.g., the initial convolution layer 2048A). The function of the activation layer 2048B may be an activation function, such as an identity function, a unit step function, a hyperbolic function, or an arcus function, a rectifier function (max(0, x)), among others. The function may be set, adjusted, or modified by training. The activation function may be non-linear. The activation layer 2048B may traverse all of the input each corresponding to the output of one of the filters at the previous transform layer 2048A-N, such as the initial convolutional layer 2048A. While traversing, the activation layer 2048B may apply the activation function to the input to generate the output set of feature maps. Because of the activation function, the output of the activation layer 2048B may be non-linear relative to the input.

The final convolutional layer 2048C of the terminal convolution block 2046 may include one or more filters (sometimes referred to as kernels or feature detectors). The convolution layer 2048C may apply the one or more filters to the output of the activation layer 2048B. Each filter may be a function to apply to the input of the convolutional layer 2048C over the predetermined size at a predetermined stride (e.g., ranging from 1 to 64) to generate an output. The function of the filter may include one or more parameters (sometimes referred to as weights) to apply to the input. The one or more parameters may be set, adjusted, or modified by training. Each filter may be of a predetermined size (e.g., ranging from 3×3×1 to 1024×1024×3). The size and the number of the filter may differ depending on the network 2018 providing the set of feature maps 2038' as input into the terminal convolution block 2046. The parameter of the convolutional layer 2048C may be repeatedly applied to the input (e.g., the set of feature maps 2038') in accordance with the predetermined stride to generate an output.

The regression layer 2048D of the terminal convolution block 2046 may include at least one function to apply to the output of the previous transform layer 2048A-N (e.g., the final convolution layer 2048C). The function of the regression layer 2048D may be a logistic activation function, such as a softmax function (sometimes referred herein as a normalized exponential function or a multinomial logistic regression), among others. The function may be set, adjusted, or modified by training. The activation function may be non-linear. The regression layer 2048D may traverse all of the input each corresponding to the output of one of the filters at the previous transform layer 2048A-N, such as the final convolutional layer 2048C. While traversing, the regression layer 2048D may apply the activation function to the input to generate the output set of feature maps. Because of the logistic activation function, the output of the regression layer 2048D may be non-linear relative to the input.

By applying the set of transform layers 2048A-N to the set of feature maps 2038', the terminal convolution block 2046 may generate a corresponding tile 2022' for the segmented image 2020'. The output tile 2022' may have the same resolution as the set of feature maps 2038' provided as input to the terminal convolution block 2046. In turn, the output tile 2022' may also have the same resolution and magnitude factor as the original patch 2036 outputted by the network 2018 providing the set of feature maps 2038' as input. The generation of additional tiles 2022' may be use the segmented image 2020' corresponding to the biomedical image 2020.

Figure 20F:
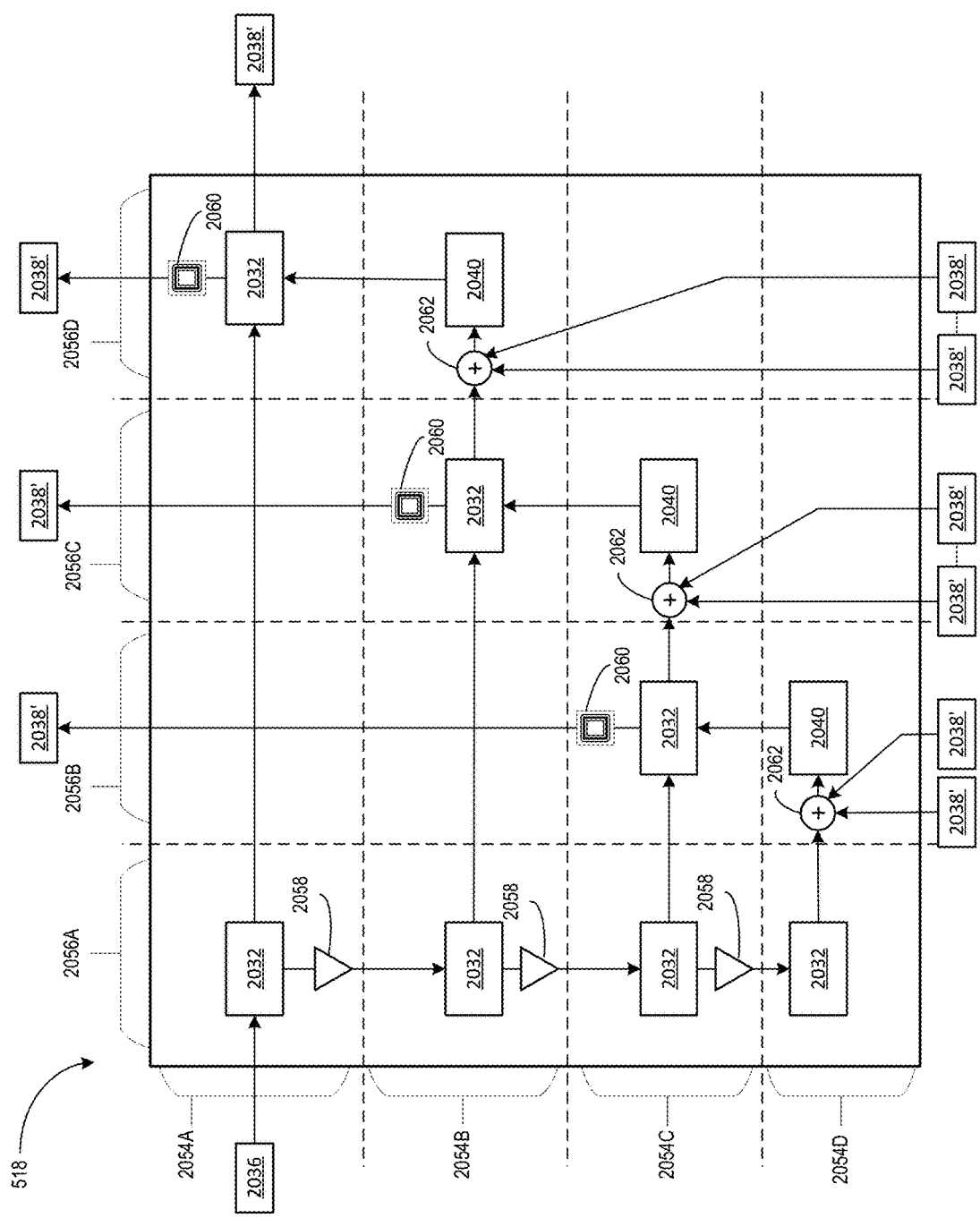

Referring to FIG. 20(f), depicted is a block diagram of one of the networks 2018 of the segmentation model 2014 in accordance with an illustrative embodiment. Instances of the network 2018 may be included in the segmentation model 2014. In addition, different instances of the network 2018 may include or lack at least some of components or input/output connections depicted in the example. In overview, the network 2018 and the components thereof may be divided, organized, or arranged into a set of rows 2054A-N (hereinafter generally referred to as row 2054) and into a set of columns 2056A-N (hereinafter generally referred to as column 2056). The network 2018 may have one or more sets of feature maps 2038' as outputs (depicted generally above). The network 2018 may have one of the patches 2036 of a tile 2022 in the biomedical image 2020 (depicted generally to the left) and set of feature maps 2038' outputted from other networks 2018 (depicted generally below) as an input.

The network 2018 may have one or more convolution blocks 2032 and one or more deconvolution blocks 2040 arranged across different rows 2054 (sometimes referred herein as channels). Each row 2054 may correspond to feeding forward of processed feature maps of the same resolution or size. The size may correspond or define a number of pixels in each dimension of the feature map. For example, the first row 2054A may have two convolution blocks 2032 (one depicted generally towards the left and the other depicted generally towards the right). The feature maps processed and outputted by the convolution blocks 2032 in the first row 2054A may be of the same resolution. Likewise, the second row 2054B may feed forward feature maps of the same resolution, the third row 2054C may feed forward feature maps of the same resolution, and the fourth row 2054D, and so forth. Conversely, the feature maps in different rows 2054 may be of different resolutions. For example, the feature maps fed forward along the second row 2054B may have a different resolution from the feature maps fed forward along the first row 2054A. Each row 2054 may include at least one convolution block 2032. At least some of the rows 2054, such as the rows 2054B-N below the first row 2054A, may include at least one deconvolution block 2040.

The network 2018 may have one or more convolution blocks 2032 and one or more deconvolution blocks 2040 arranged across different columns 2056. Each column 2056 may correspond to feeding upward or downward of processed feature maps from one resolution (or one row 2054) to another resolution (or another row 2054) after processing by one of the convolution blocks 2032 or one of the deconvolution blocks 2040. For example, the first column 2056A may correspond to a first instance the processed feature maps are passed from one row to another row after processing by the first convolution block 2032 in each row 2054. Likewise, the second column 2056B may correspond to a second instance the feature maps are passed from one row to another row after processing by the convolution block 2032 in the third row 2054C or the deconvolution block 2040 in the fourth row 2054D.

In addition to the convolution blocks 2032 and the deconvolution blocks 2040, the network 2018 may include one or more pooling units 2058 (sometimes referred herein as a pooling operator). Each pooling unit 2058 may span between rows 2054 or may be in one of the rows 2054 (e.g., as depicted) to feed into from one row 2054 to another row 2054. Each pooling unit 2058 may retrieve, receive, or otherwise identify feature maps processed by one of the convolution blocks 2032 (e.g., as depicted) or deconvolution blocks 2040 in the same row 2054. The pooling unit 2058 may apply a pooling operation to the identified feature maps. The pooling operation can include, for example, max-pooling by a predefined factor (e.g., 2 to 10) to select the highest value within each set patch in the feature map or mean-pooling to determine an average value within the set patch in the feature map. With the application of the pooling operation, the pooling unit 2058 may generate a feature map of a resolution same as the row 2054 to which the feature map is to be provided. The size of the resultant set of feature maps may have a lower size than the input set of feature maps.

Furthermore, the network 2018 may include one or more cropping units 2060 (sometimes referred herein as crop operators or croppers). Each cropping unit 2060 may retrieve, receive, or otherwise identify feature maps processed by one of the convolution blocks 2032 (e.g., as depicted) or deconvolution blocks 2040 in the same row 2054. The cropping unit 2060 may apply or perform a cropping operation at a predefined cropping rate (e.g., 2 to 10) to the identified feature maps. In performing the cropping operation, the cropping unit 2060 may identify a portion of the feature map. The portion may correspond to, for example, a center portion, a left portion, a right portion, a top portion, a bottom portion, a top-left portion, a top-right portion, a bottom-left portion, a bottom-right portion, or any other subsection of the feature map. Which portion is identified by the cropping unit 2060 may by the same as the portion identified by the patch generator 2008 to generate the patch 2036. With the application of the cropping operation, the cropping unit 2060 may generate feature maps 2038' of a resolution same as the network 2018 to which the feature maps 2038' are to be provided (e.g., as depicted generally toward top). The size of the resultant set of feature maps may have a higher size than the input set of feature maps.

Additionally, the network 2018 may include one or more concatenation units 2062 (sometimes referred herein as concatenators or aggregators). Each concatenation unit 2062 may concatenate, adjoin, or otherwise add two or more feature maps prior to processing by the subsequent deconvolution block 2040 (e.g., as depicted) or the convolution block 2032 within the same row 2054. In some embodiments, the concatenation unit 2062 may be part of the deconvolution block 2040 that is to process the resultant set of feature maps in the same row 2054. Each received feature map may be from another network 2018 within the segmentation model 2014. Upon receipt of input feature maps, the concatenation unit 2062 may combine the feature maps to generate a resultant set of feature maps to feed forward along the row 2054. The combination of the feature maps (e.g., feature maps 2038') by the concatenation unit 2062 may include concatenation, weighted summation, and addition, among others. The resultant set of feature maps may be fed forward for input to the deconvolution block 2040 (e.g., as depicted) for additional processing in the network 2018.

With the arrangement of the components of the network 2018 across the rows 2054 and columns 2056, the network 2018 may have one or more inputs and outputs arranged across the rows 2054 and the columns 2056 as well. The first row 2054A may have one of the patches 2036 from a tile 2022 of the biomedical image 2020 as input and a resultant set of feature maps 2038' as output. The second and subsequent columns 2056B-N (e.g., the second column 2056B, third column 2056C, fourth column 2056D) each may have resultant sets of feature maps 2038' from other network 2018, such as networks 2018 associated with lower magnification factors, as input. In addition, the second and subsequent columns 2056B-N each may have resultant sets of feature maps 2038' outputted by the components therein as outputs to other networks 2018, such as networks 2018 associated with higher magnification factors, as output.

Figure 20G:
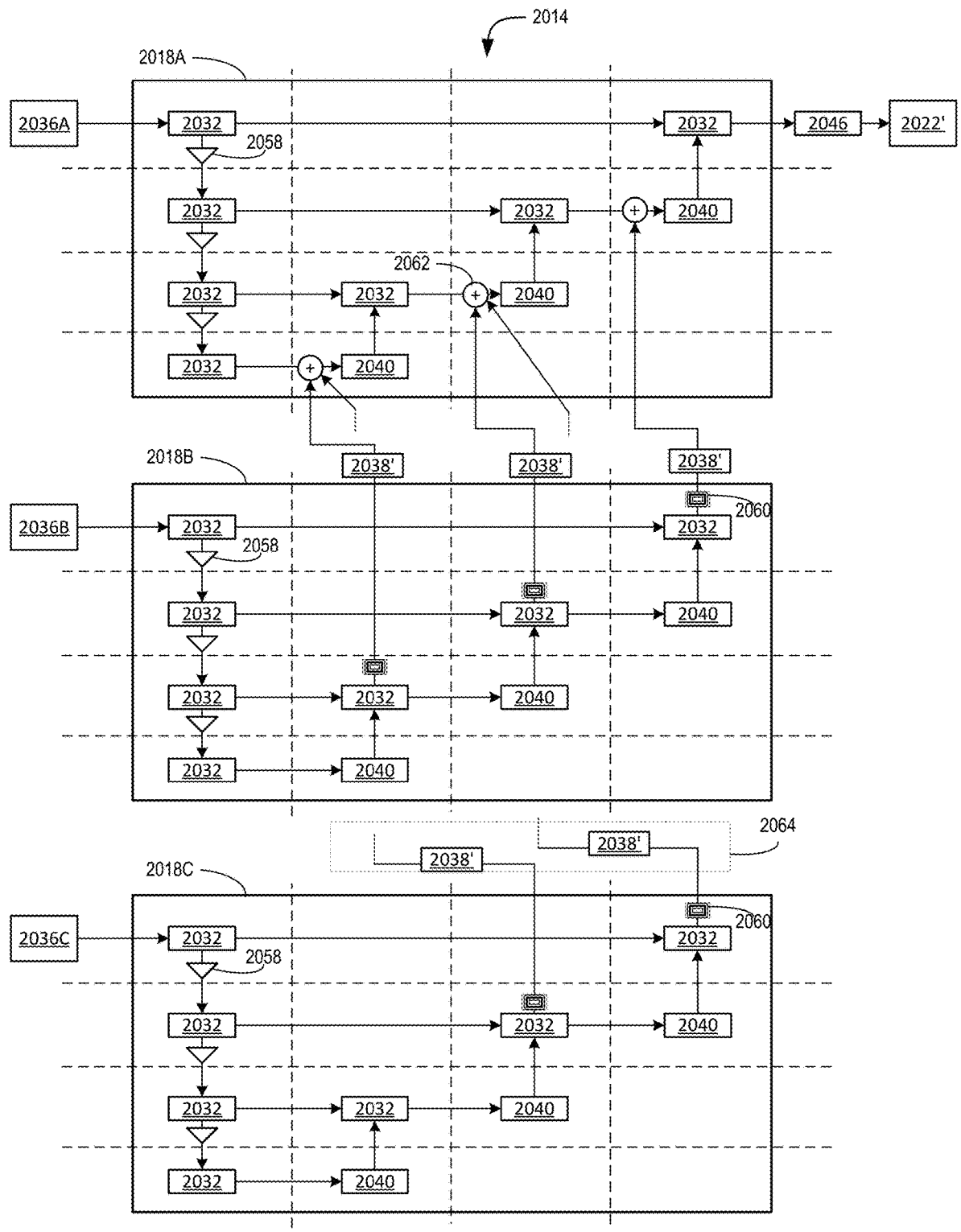

Referring to FIG. 20(g), depicted is a block diagram of the segmentation model 2014 in accordance with an illustrative embodiment. The segmentation model 2014 may include a set of networks 2018, such as a first network 2018A, a second network 2018B, and a third network 2018C as depicted. Each network 2018 may include or exclude components and connections described herein in conjunction with FIG. 20(f). As depicted, the first network 2018A may lack any cropping units 2060, whereas the second network 2018B and the third network 2018C each may lack concatenation units 2062. Although three networks 2018A-C are depicted, the segmentation model 2014 may have any number of networks 2018.

From outside the segmentation model 2014, each network 2018 may have one of the patches 2036 at a corresponding magnification factor from one of the tiles 2022 of the biomedical image 2020 as input. The patch 2036 may be fed into the first row 2054A of each network 2018. For example as depicted, the patch 2036A at a first magnification factor (e.g., 20×) may be fed into the first row 2054A of the first network 2018A as input, the patch 2036B at a second magnification factor (e.g., 10×) may be fed into the first row 2054A of the second network 2018B as input, and the patch 2036 at a third magnification factor (e.g., 20×) may be fed into the first row 2054A of the third network 2018C as input.

In addition, each network 2018 itself may correspond to or be associated with one of the magnification factors. For example, the first network 2018A may be associated with the first magnification factor (e.g., 20×), the second network 2018B may be associated with the second magnification factor (e.g., 10×), and the third network 2018C may be associated with the third magnification factor (e.g., 20×), and so forth.

In the segmentation model 2014, the inputs and outputs of the network 2018 may be fed into one another. The outputs of networks 2018 of lower magnification factors may be fed as inputs of the network 2018 of the highest magnification factor. For example, as depicted, the resultant sets of feature maps 2038' from the second network 2018B (associated with a magnification factor of 10×) from each column 2056 may be provided as input to concatenation units 2062 of the corresponding columns 2056 of the first network 2018A (associated with a magnification factor of 20×). In some embodiments, the outputs of networks 2018 of even lower magnification factors may be fed as inputs of the network 2018 of the magnification factor with a shift 2064. The shift 2064 may define a transfer of output set of feature maps 2038' of one column 2056 from the network 2018 of the lower magnification factor to another column 2056 of the network 2018 of the higher magnification factor as input. The shift 2064 may account for discrepancies in resolutions or size for the next component to which the output set of feature maps 2038' are to be fed. For example, the resultant set of feature maps 2038' from each column 2056 of the third network 2018C may be fed as input to the concatenation units 2062 in one column 2056 over in the first network 2018A. As illustrated, the resultant set of feature maps 2038' from the third column 2056C in the third network 2018C may be fed as input into the second column 2056B of the first network 2018A.

Furthermore, at the output of the first row 2054A of the first network 2018A, the segmentation model 2014 may have the terminal convolution block 2046. The output of the first row 2054A of the first network 2018A may be fed as input to the terminal convolution block 2046. The transform layers 2048A-N of the terminal convolution block 2046 may be applied to generate a tile 2022' for the segmented biomedical image 2020'. The tile 2022' may be of the same resolution and magnification factor as the patch 2036A fed into the first network 2018A. By applying the networks 2018 of the segmentation model 2014 to patches 2036 from more tiles 2022 of the biomedical image 2020, additional tiles 2022' for the segmented image 2020' may be generated.

Referring back to FIG. 20(a), the model applier 2010 may apply the segmentation model 2014 to the patches 2036 generated from the tiles 2022 of the biomedical image 2020 to generate the segmented image 2020'. The model applier 2010 may use the output of the terminal convolution block 2046 as the tile 2022' for the segmented image 2020'. With repeated application of the segmentation model 2014 to the patches 2036, the model applier 2010 may aggregate tiles 2022' to construct the segmented image 2020'. The segmented image 2020' may have one or more indications of the regions of interest 2026 within the biomedical image 2020. Each indication may correspond to at least one of the regions of interest 2026 in the biomedical image 2020. In some embodiments, the segmented image 2020' may have a different indication (e.g., shown with color, shading, or another visual marker) for each type of region of interest 2026, such as carcinoma, benign epithelial, background, stroma, necrotic, and adipose tissue, among others.

In some embodiments, the model applier 2010 may provide the biomedical image 2020 or the segmented image 2020' to the display 2006 for presentation. The display 2006 may present or render an image (e.g., the biomedical image 2020A or 2020B or the segmented image 2020' as depicted) output by the image segmentation system 2002 provided by the model applier 2010. The display 2006 may include any monitor, such as a liquid crystal display (LCD), an organic light-emitting diode (OLED) monitor, and a cathode ray tube (CRT), among others. The display 2006 may be communicatively coupled with the image segmentation system 2002, and may render and output the image from the image segmentation system 2002. In some embodiments, the model applier 2010 may store the biomedical image 2020' (or individual tiles 2022' of the biomedical image 2020') on a database accessible to the image segmentation system 2002.

The model trainer 2012 executing on the image segmentation system 2002 may train the segmentation model 2014 using the training dataset 2016. The training of the segmentation model 2014 may be performed when the image segmentation system 2002 is in training mode. The training of the segmentation model 2014 may be in conjunction with the segmented image 2020' generated by the segmentation model 2014 using the sample biomedical image 2020B. The model trainer 2012 may identify the segmented image 2020' (or a segmented tile 2022') generated from applying the segmentation model 2014 to the sample biomedical image 2020B. From the training dataset 2016, the model trainer 2012 may also identify the sample biomedical image 2020B and the set of annotations 2024. In some embodiments, the model trainer 2012 may identify the tile 2022 in the sample biomedical image 2020B corresponding to the segmented tile 2022' to compare against. With the identifications, the model trainer 2012 may compare the segmented image 2020' with the annotations 2024 for the sample biomedical image 2020B that was used to generate the segmented image 2020'. As discussed previously, the annotations 2024 may be full or partial relative to the regions of interest 2026 within the sample biomedical image 2020. In some embodiments, the model trainer 2021 may compare the indications to regions of interest 2026 in the segmented image 2020' with the annotation 2024 for the type of region of interest.

By comparing the segmented image 2020' with the set of annotations 2024, the model trainer 2012 may calculate or otherwise determine at least one loss metric between the segmented image 2020' and the annotations 2024. The loss metric may indicate at least one difference between the segmented image 2020' and the annotations 2024, and may be, for example, a root mean squared error, a relative root mean squared error, and a weighted cross entropy, among others. The comparison between the segmented image 2020 'and the annotations 2024 may be pixel-by-pixel, and the loss metric may be calculated pixel-by-pixel as well. In some embodiments, the model trainer 2012 may determine a loss metric over all or at least a portion of the pixel of the segmented image 2020' and the annotations 2024. In some embodiments, the model trainer 2012 may determine a loss metric between the segmented image 2020' and the annotations 2024 for each type of region of interest 2026.

With the calculation of the loss metric, the model trainer 2012 may update at least one of the parameters in the networks 2018 of the segmentation model 2014. In some embodiments, the model trainer 2012 may update at least one of the parameters in the networks 2018 using the loss metrics calculated for each type of region of interest 2026. The parameters updated using the loss metric may be those in the transform layers 2034A-N of the convolution block 2032, the transform layers 2042A-N of the deconvolution block 2040, and the transform layers 2048A-N of the terminal convolution block 2046, among others.

In some embodiments, the model trainer 2012 may determine whether the segmentation model 2014 has converged based on a comparison between the current determination of the loss metric and the previous determination of the loss metric. If the difference between the two loss metrics is greater than a threshold, the model trainer 2012 may continue to train the segmentation model 2014. Otherwise, if the difference is less than or equal to the threshold, the model trainer 2012 may halt training. In some embodiments, the training of the segmentation model 2014 may be defined using an objective function (e.g., stochastic gradient descent (SGD)) with a set learning rate (e.g., ranging from $10^{-6}$ to $10^{-4}$), a momentum (e.g., ranging from 0.5 to 1), and a weigh decay (e.g., ranging from $10^{-6}$ to $10^{-4}$) for a number of iterations (e.g., ranging from 10 to 100).

Figures 20H, 20I:
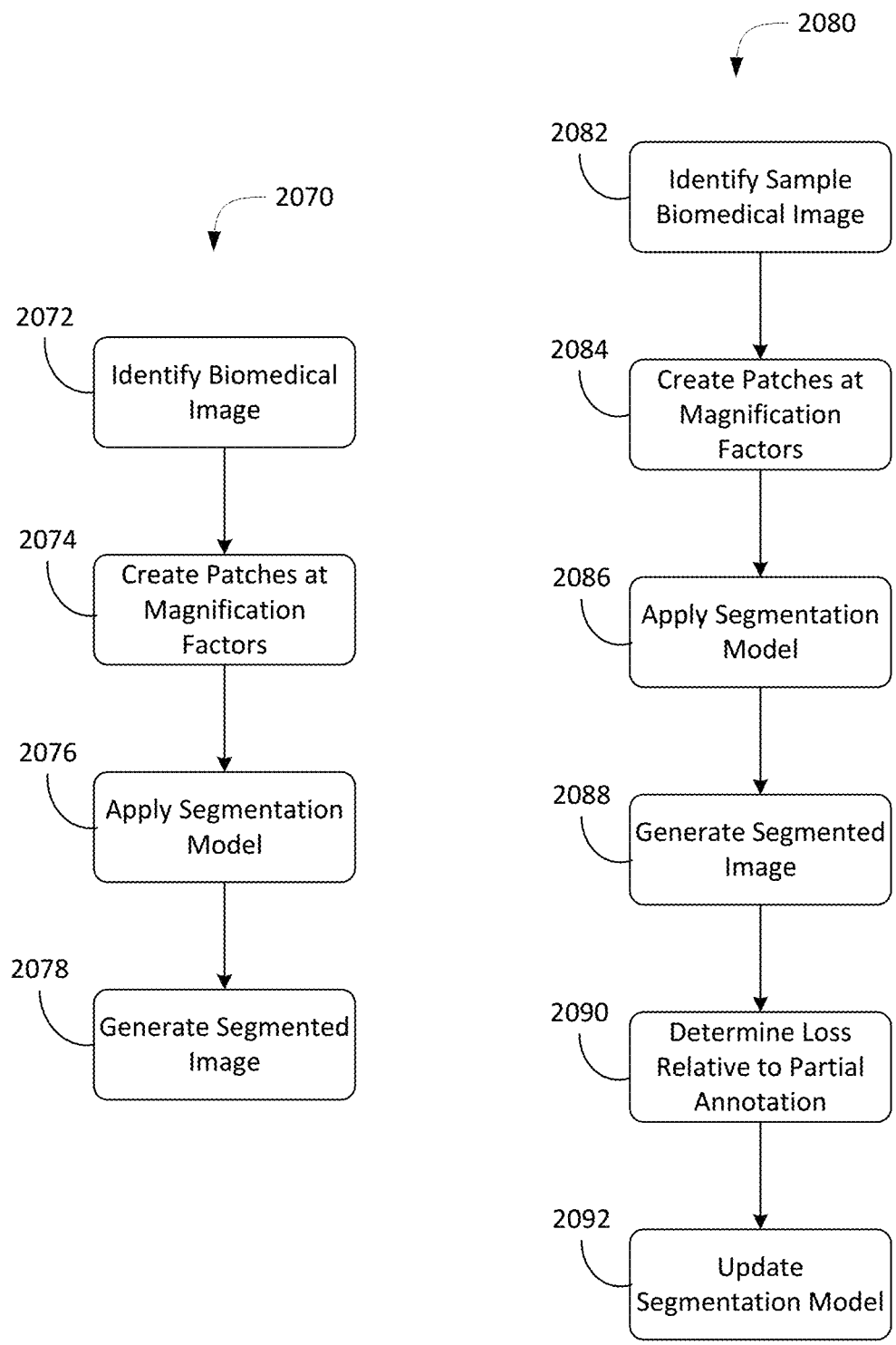

Referring to FIG. 20(h), depicted is a flow diagram of a method 2070 of segmenting biomedical images using multi-magnification encoder-decoder concatenation networks, in accordance with an illustrative embodiment. The method 2070 may be implemented, performed, or executed using any of the components described in conjunction with FIGS. 20(a)-(g) or FIGS. 16(a)-(d). In brief overview, a computing system may identify a biomedical image (572). The computing system may create patches at magnification factors (574). The computing system may apply a segmentation model (576). The computing system may generate a segmented image (578).

In further detail, a computing system (e.g., the image segmentation system 2002) may identify a biomedical image (e.g., the acquired biomedical image 2020A) (572). The biomedical image 2020 may be, for example, a histological section with staining, such as with a hematoxylin and eosin (H&E) stain. An imaging device (e.g., the imager 2004) may acquire the biomedical image from a tissue section from a subject for performing histopathological surveys. The tissue sample used to acquire the biomedical image may have a region of interest, such as a tumorous growth, a lesion, or an injury, among others. The biomedical image identified by the computing system may lack any associated annotation (e.g., annotation 2024). The computing system may divide the biomedical image into a set of tiles (e.g., tiles 2022). Each tile may correspond to a portion of the biomedical image.

The computing system may create patches (e.g., patches 2036) at magnification factors (574). Each patch may correspond a portion of the biomedical image at a different magnification factor. The magnification factor may define an amount, a number, or a ratio at which to enlarge the corresponding tile. To create each pile from a tile, the computing system may apply the corresponding magnification to the same tile.

The computing system may apply a segmentation model (e.g., the segmentation model 2014) (576). The application of the segmentation model may be to the set of patches created from each tile of the biomedical image. The segmentation model may include a set of networks (e.g. networks 2018) corresponding to the set of magnification factors used to create the patches. Each network may include a set of encoders (e.g., a convolution block 2032) and a set of decoders (e.g., a deconvolution block 2040). Each encoder may have a set of transform layers (e.g., transform layers 2034A-N) to convert feature maps. Each decoder may have a set of transform layers (e.g., transform layers 2042A-

N) to convert feature maps. In the network corresponding to the highest magnification factor (e.g., the first network 2018A), each decoder may also have a concatenator (e.g., concatenation unit 2062) to combine feature maps from other networks. Using the encoders and decoders, each network may transform an input patch at the corresponding magnification factor to a resultant set of feature maps (e.g., feature maps 2038').

The computing system may generate a segmented image (e.g., the biomedical image 2020') (578). The segmentation model may also have a final encoder (e.g., terminal convolution block 2046) to covert the resultant set of feature maps from the network with the highest magnification factor to a tile (e.g., tile 2022') for a segmented image (e.g., segmented image 2020'). By applying the segmented image, the computing system may generate the segmented image. The computing system may render the segmented image for display. The computing system ay store the segmented image on a database.

Referring to FIG. 20(*i*), depicted is a flow diagram of a method 2080 of training models for segmenting biomedical images using multi-magnification encoder-decoder concatenation networks, in accordance with an illustrative embodiment. The method 2080 may be implemented, performed, or executed using any of the components described in conjunction with FIGS. 20(*a*)-(*g*) or FIGS. 16(*a*)-(*d*). In brief overview, a computing system may identify a sample biomedical image (582). The computing system may create patches at magnification factors (584). The computing system may apply a segmentation model (586). The computing system may generate a segmented image (588). The computing system may determine a loss relative to a partial annotation (590). The computing system may update the segmentation model (592).

In further detail, a computing system (e.g., the image segmentation system 2002) may identify a sample biomedical image (e.g., the sample biomedical image 2020B) (582). The functionality of (582) may be similar to the functionality of (570) of method 2070, except with respect to the sample biomedical image. The sample biomedical image may be associated with a set of annotations (e.g., the annotations 2024). The annotation may indicate or label at least a portion of a region of interest (e.g., the region of interest 2026) in the sample biomedical image. Each annotation may correspond to a different type of region of interest, such as carcinoma tissue, benign epithelial tissue, stroma tissue, necrotic tissue, and adipose tissue, among others. When partially annotation, the annotations may be separated from a boundary of the region of interest by a separation distance (e.g., distance 2030).

The computing system may create patches (e.g., patches 2036) at magnification factors (584). The functionality of (584) may be similar to the functionality of (574) of method 2070 detailed above. The computing system may apply a segmentation model (e.g., the segmentation model 2014) (586). The functionality of (586) may be similar to the functionality of (576) of method 2070 detailed above. The computing system may generate a segmented image (e.g., the segmented image 2020') (588). The functionality of (588) may be similar to the functionality of (578) of method 2070 detailed above.

The computing system may determine a loss relative to a partial annotation (590). The computing system may compare the segmented image (e.g., the segmented image 2020') generated by applying the segmentation model to the sample biomedical image with the partial annotations for the sample biomedical image. In comparing, the computing system may determine or calculate the loss between the indications in the segmented image and the labeling in the annotations for the sample biomedical image. The comparison may be pixel-by-pixel, and the loss metric determined may be pixel-by-pixel. The computing system may update the segmentation model (592). Using the determined loss, the computing system may modify or update at least one parameter of the networks of the segmentation model, such as in one of the encoders or decoders.

D. Computing and Network Environment

It may be helpful to describe aspects of the operating environment as well as associated system components (e.g., hardware elements) in connection with the methods and systems described in Section A. Referring to FIG. 21(*a*), an embodiment of a network environment is depicted. In brief overview, the illustrated exploring network environment includes one or more clients 2102a-2102n (also generally referred to as local machine(s) 2102, client(s) 2102, client node(s) 2102, client machine(s) 2102, client computer(s) 2102, client device(s) 2102, endpoint(s) 2102, or endpoint node(s) 2102) in communication with one or more servers 2106a-1506n (also generally referred to as server(s) 2106, node 2106, or remote machine(s) 2106) via one or more networks 2104. In some embodiments, a client 2102 has the capacity to function as both a client node seeking access to resources provided by a server and as a server providing access to hosted resources for other clients 2102a-1602n.

Although FIG. 21(*a*) shows a network 2104 between the clients 2102 and the servers 2106, the clients 2102 and the servers 2106 may be on the same network 2104. In some embodiments, there are multiple networks 2104 between the clients 2102 and the servers 2106. In one of these embodiments, a network 2104' (not shown) may be a private network and a network 2104 may be a public network. In another of these embodiments, a network 2104 may be a private network and a network 2104' a public network. In still another of these embodiments, networks 2104 and 2104' may both be private networks.

The network 2104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 2104 may be any type and/or form of network. The geographical scope of the network 2104 may vary widely and the network 2104 can be a body area network (BAN), a personal area network (PAN), a local-area network (LAN), e.g. Intranet, a metropolitan area network (MAN), a wide area network (WAN), or the Internet. The topology of the network 2104 may be of any form and may include, e.g., any of the following: point-to-point, bus, star, ring, mesh, or tree. The network 2104 may be an overlay network, which is virtual and sits on top of one or more layers of other networks 2104'. The network 2104 may be of any such network topology as known to those ordinarily skilled in the art capable of supporting the operations described herein. The network 2104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 2104 may be a type of a broadcast network, a telecommunications network, a data communication network, or a computer network.

In some embodiments, the system may include multiple, logically-grouped servers 2106. In one of these embodiments, the logical group of servers may be referred to as a server farm 2107 or a machine farm 2107. In another of these embodiments, the servers 2106 may be geographically dispersed. In other embodiments, a machine farm 2107 may be administered as a single entity. In still other embodiments, the machine farm 2107 includes a plurality of machine farms 38. The servers 2106 within each machine farm 2107 can be heterogeneous—one or more of the servers 2106 or machines 2106 can operate according to one type of operating system platform (e.g., WINDOWS NT, manufactured by Microsoft Corp. of Redmond, Wash.), while one or more of the other servers 2106 can operate on according to another type of operating system platform (e.g., Unix, Linux, or Mac OS X).

In one embodiment, servers 2106 in the machine farm 2107 may be stored in high-density rack systems, along with associated storage systems, and located in an enterprise data center. In this embodiment, consolidating the servers 2106 in this way may improve system manageability, data security, the physical security of the system, and system performance by locating servers 2106 and high performance storage systems on localized high performance networks. Centralizing the servers 2106 and storage systems and coupling them with advanced system management tools allows more efficient use of server resources.

The servers 2106 of each machine farm 2107 do not need to be physically proximate to another server 2106 in the same machine farm 2107. Thus, the group of servers 2106 logically grouped as a machine farm 2107 may be interconnected using a wide-area network (WAN) connection or a metropolitan-area network (MAN) connection. For example, a machine farm 2107 may include servers 2106 physically located in different continents or different regions of a continent, country, state, city, campus, or room. Data transmission speeds between servers 2106 in the machine farm 2107 can be increased if the servers 2106 are connected using a local-area network (LAN) connection or some form of direct connection. Additionally, a heterogeneous machine farm 2107 may include one or more servers 2106 operating according to a type of operating system, while one or more other servers 2106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 2107 may be decentralized. For example, one or more servers 2106 may comprise components, subsystems and modules to support one or more management services for the machine farm 2107. In one of these embodiments, one or more servers 2106 provide functionality for management of dynamic data, including techniques for handling failover, data replication, and increasing the robustness of the machine farm 2107. Each server 2106 may communicate with a persistent store and, in some embodiments, with a dynamic store.

Server 2106 may be a file server, application server, web server, proxy server, appliance, network appliance, gateway, gateway server, virtualization server, deployment server, SSL VPN server, or firewall. In one embodiment, the server 2106 may be referred to as a remote machine or a node. In another embodiment, a plurality of nodes may be in the path between any two communicating servers.

Referring to FIG. 21(*b*), a cloud computing environment is depicted. A cloud computing environment may provide client 2102 with one or more resources provided by a network environment. The cloud computing environment may include one or more clients 2102a-2102n, in communication with the cloud 2108 over one or more networks 2104. Clients 2102 may include, e.g., thick clients, thin clients, and zero clients. A thick client may provide at least some functionality even when disconnected from the cloud 2108 or servers 2106. A thin client or a zero client may depend on the connection to the cloud 2108 or server 2106 to provide functionality. A zero client may depend on the cloud 2108 or other networks 2104 or servers 2106 to retrieve operating system data for the client device. The cloud 2108 may include back end platforms, e.g., servers 2106, storage, server farms or data centers.

The cloud 2108 may be public, private, or hybrid. Public clouds may include public servers 2106 that are maintained by third parties to the clients 2102 or the owners of the clients. The servers 2106 may be located off-site in remote geographical locations as disclosed above or otherwise. Public clouds may be connected to the servers 2106 over a public network. Private clouds may include private servers 2106 that are physically maintained by clients 2102 or owners of clients. Private clouds may be connected to the servers 2106 over a private network 2104. Hybrid clouds 2108 may include both the private and public networks 2104 and servers 2106.

The cloud 2108 may also include a cloud based delivery, e.g. Software as a Service (SaaS) 2110, Platform as a Service (PaaS) 2112, and Infrastructure as a Service (IaaS) 2114. IaaS may refer to a user renting the use of infrastructure resources that are needed during a specified time period. IaaS providers may offer storage, networking, servers or virtualization resources from large pools, allowing the users to quickly scale up by accessing more resources as needed. PaaS providers may offer functionality provided by IaaS, including, e.g., storage, networking, servers or virtualization, as well as additional resources such as, e.g., the operating system, middleware, or runtime resources.

Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources.

Clients 2102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 2102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 2102 may access SaaS resources through the use of web-based user interfaces, provided by a web browser. Clients 2102 may also access SaaS resources through smartphone or tablet applications, including. Clients 2102 may also access SaaS resources through the client operating system.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 2102 and server 2106 may be deployed as and/or executed on any type and form of computing device, e.g. a computer, network device or appliance capable of communicating on any type and form of network and performing the operations described herein. FIGS. 21(*c*) and 21(*d*) depict block diagrams of a computing device 2100 useful for practicing an embodiment of the client 2102 or a server 2106. As shown in FIGS. 21(*c*) and 21(*d*), each computing device 2100 includes a central processing unit 2121, and a main memory unit 2122. As shown in FIG. 21(*c*), a computing device 2100 may include a storage device 2128, an installation device 2116, a network interface 2118, an I/O controller 2123, display devices 2124*a*-1124*n*, a keyboard 2126 and a pointing device 2127, e.g. a mouse. The storage device 2128 may include, without limitation, an operating system, and/or software 2120. As shown in FIG. 21(*d*), each computing device 2100 may also include additional optional elements, e.g. a memory port 2103, a bridge 2170, one or more input/output devices 2130*a*-1130*n* (generally referred to using reference numeral 2130), and a cache memory 2140 in communication with the central processing unit 2121.

The central processing unit 2121 is any logic circuitry that responds to and processes instructions fetched from the main memory unit 2122. In many embodiments, the central processing unit 2121 is provided by a microprocessor unit. The computing device 2100 may be based on any of these processors, or any other processor capable of operating as described herein. The central processing unit 2121 may utilize instruction level parallelism, thread level parallelism, different levels of cache, and multi-core processors. A multi-core processor may include two or more processing units on a single computing component.

Main memory unit 2122 may include one or more memory chips capable of storing data and allowing any storage location to be directly accessed by the microprocessor 2121. Main memory unit 2122 may be volatile and faster than storage 2128 memory. Main memory units 2122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 2122 or the storage 2128 may be non-volatile; e.g., non-volatile read access memory (NVRAIVI), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 2122 may be based on any of the above described memory chips, or any other available memory chips capable of operating as described herein. In the embodiment shown in FIG. 21(*c*), the processor 2121 communicates with main memory 2122 via a system bus 2150 (described in more detail below). FIG. 21(*d*) depicts an embodiment of a computing device 2100 in which the processor communicates directly with main memory 2122 via a memory port 2103. For example, in FIG. 21(*d*) the main memory 2122 may be DRDRAM.

FIG. 21(*d*) depicts an embodiment in which the main processor 2121 communicates directly with cache memory 2140 via a secondary bus, sometimes referred to as a backside bus. In other embodiments, the main processor 2121 communicates with cache memory 2140 using the system bus 2150. Cache memory 2140 typically has a faster response time than main memory 2122 and is typically provided by SRAM, BSRAM, or EDRAM. In the embodiment shown in FIG. 21 (*d*), the processor 2121 communicates with various I/O devices 2130 via a local system bus 2150. Various buses may be used to connect the central processing unit 2121 to any of the I/O devices 2130, including a PCI bus, a PCI-X bus, or a PCI-Express bus, or a NuBus. For embodiments in which the I/O device is a video display 2124, the processor 2121 may use an Advanced Graphics Port (AGP) to communicate with the display 2124 or the I/O controller 2123 for the display 2124. FIG. 21(*d*) depicts an embodiment of a computer 2100 in which the main processor 2121 communicates directly with I/O device 2130*b* or other processors 2121' via HYPER-TRANSPORT, RAPIDIO, or INFINIBAND communications technology. FIG. 21(*d*) also depicts an embodiment in which local busses and direct communication are mixed: the processor 2121 communicates with I/O device 2130*a* using a local interconnect bus while communicating with I/O device 2130*b* directly.

A wide variety of I/O devices 2130*a*-1130*n* may be present in the computing device 2100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Figure 21A:
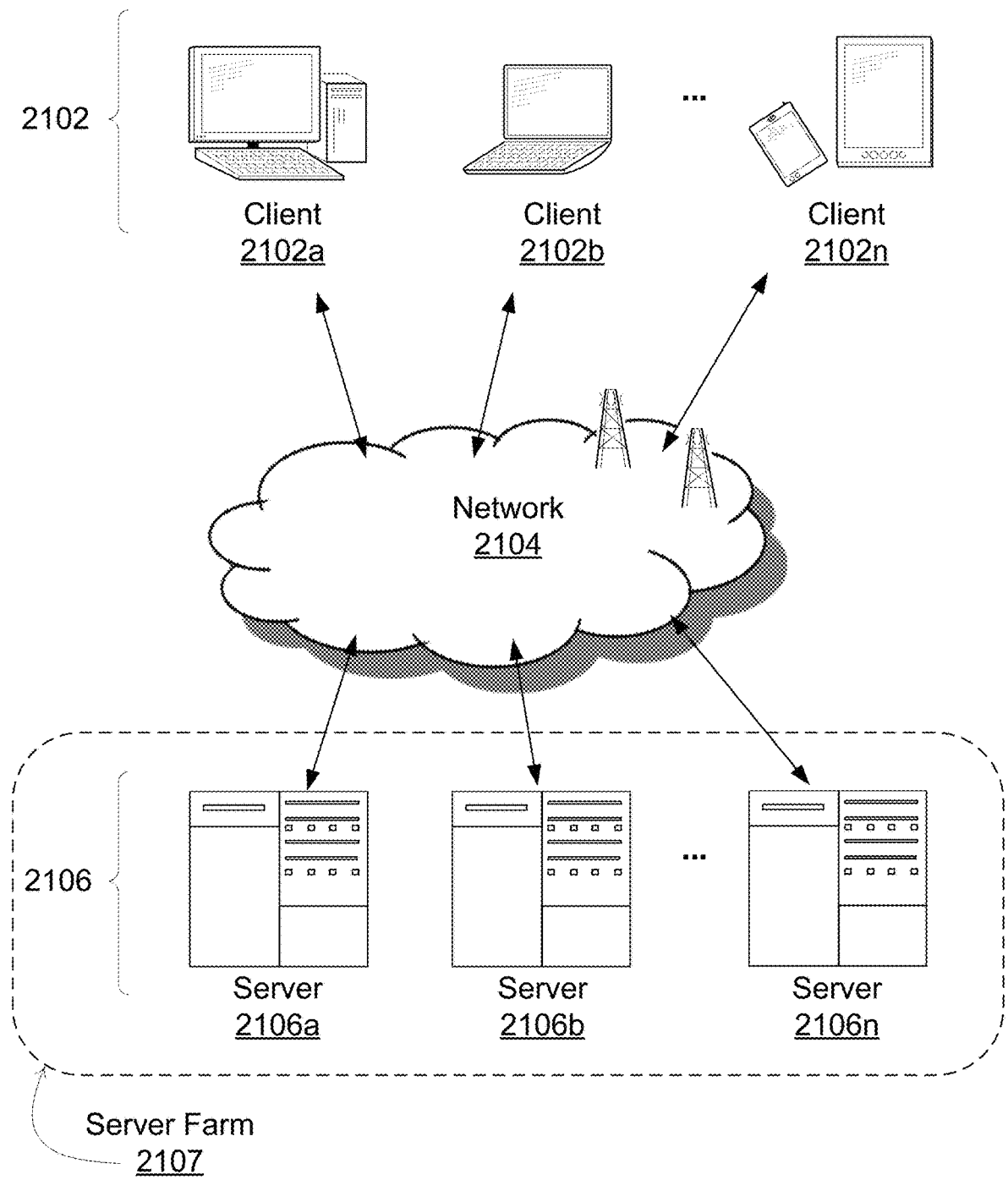
FIG. 21(a) is a block diagram depicting an embodiment of a network environment comprising client devices in communication with server devices.
Figure 21B:
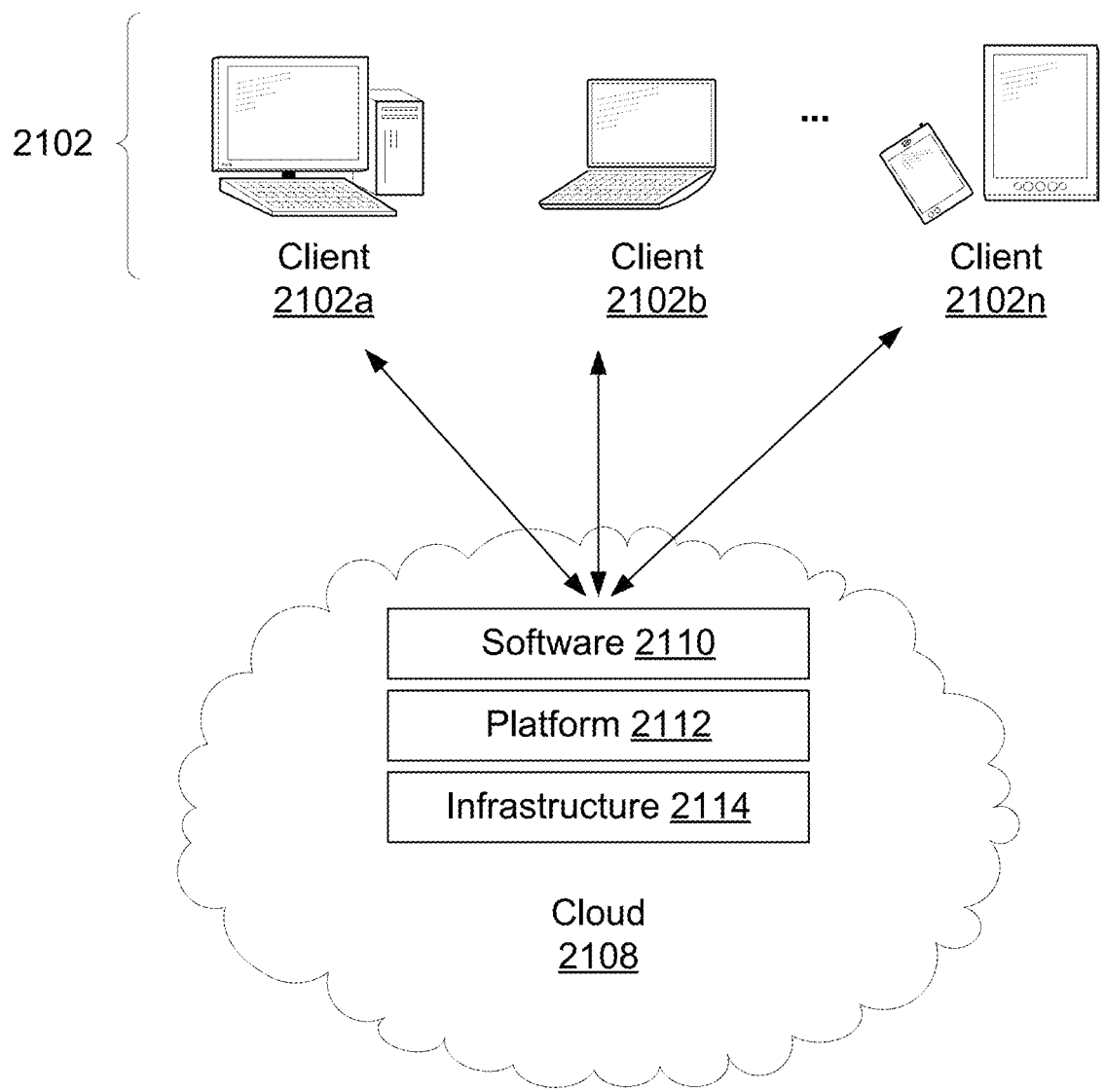
FIG. 21(b) is a block diagram depicting a cloud computing environment comprising client devices in communication with a cloud service provider.
Figure 21C:
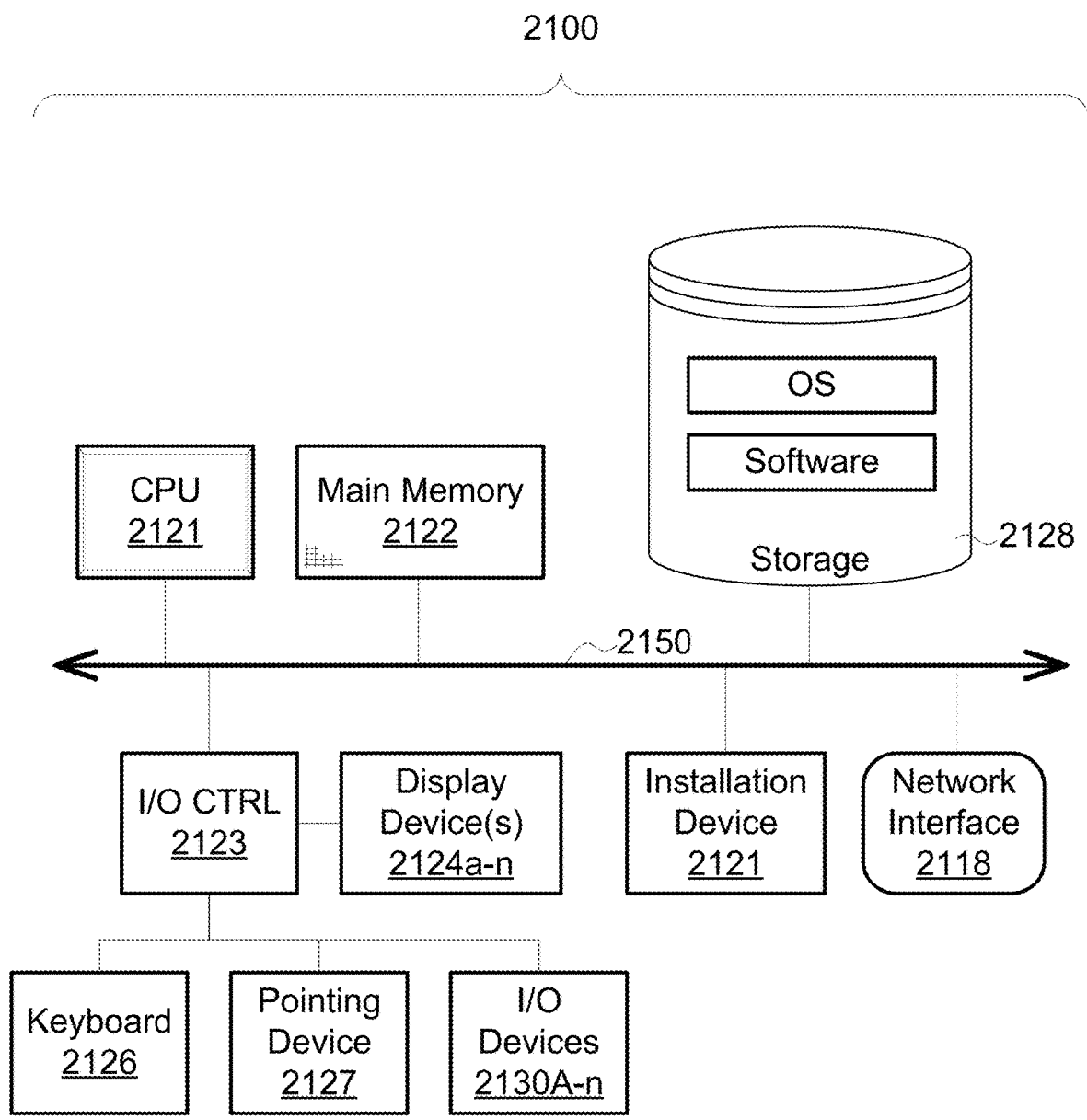
FIGS. 21(c) and 21(d) are block diagrams depicting embodiments of computing devices useful in connection with the methods and systems described herein.
Figure 21D:
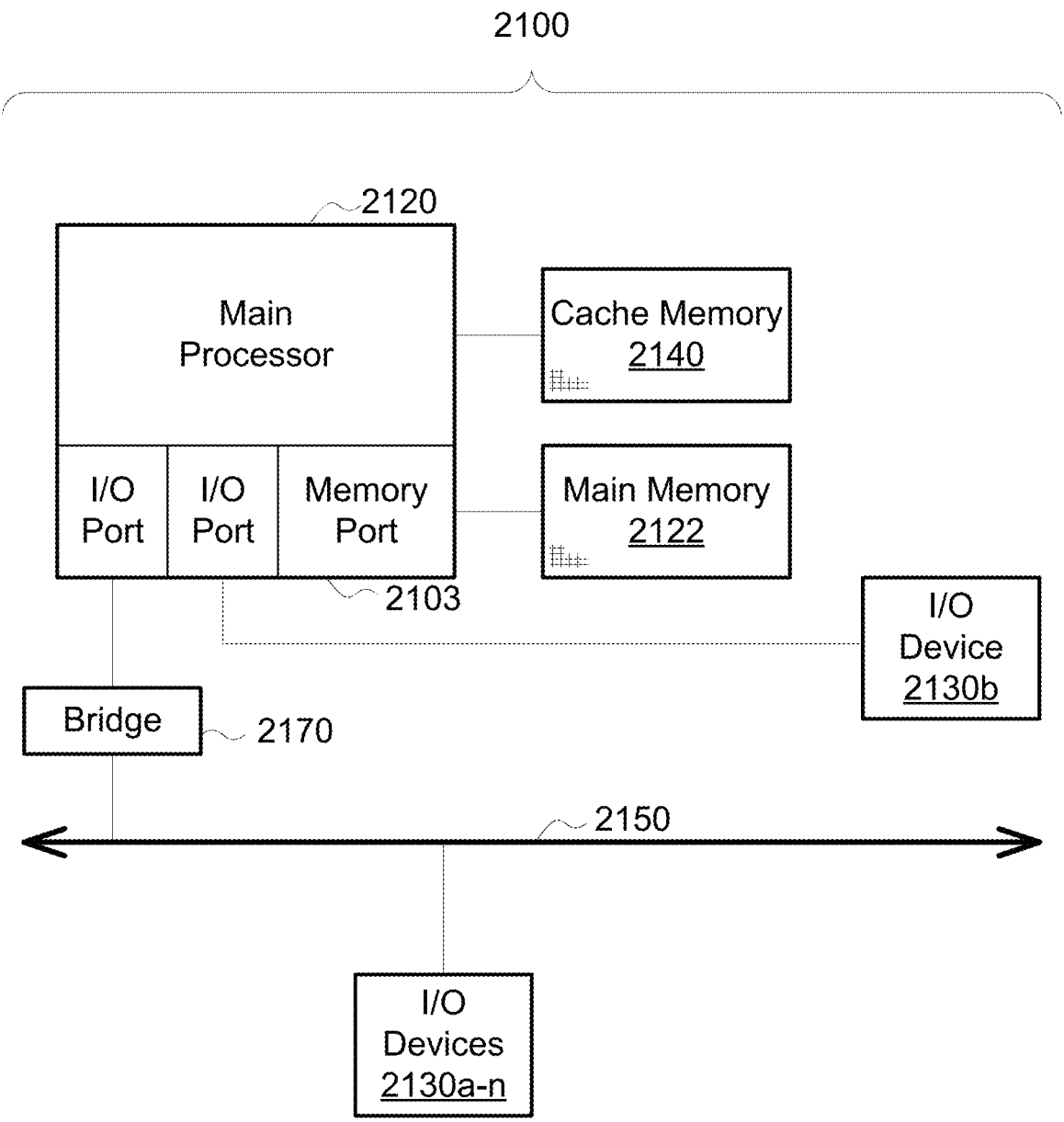

Devices 2130a-1130n may include a combination of multiple input or output devices, including. Some devices 2130a-1130n allow gesture recognition inputs through combining some of the inputs and outputs. Some devices 2130a-1130n provides for facial recognition which may be utilized as an input for different purposes including authentication and other commands. Some devices 2130a-1130n provides for voice recognition and inputs. Additional devices 2130a-1130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, such as on a table-top or on a wall, and may also interact with other electronic devices. Some I/O devices 2130a-1130n, display devices 2124a-1124n or group of devices may be augment reality devices. The I/O devices may be controlled by an I/O controller 2123 as shown in FIG. 21(c). The I/O controller may control one or more I/O devices, such as, e.g., a keyboard 2126 and a pointing device 2127, e.g., a mouse or optical pen. Furthermore, an I/O device may also provide storage and/or an installation medium 2116 for the computing device 2100. In still other embodiments, the computing device 2100 may provide USB connections (not shown) to receive handheld USB storage devices. In further embodiments, an I/O device 2130 may be a bridge between the system bus 2150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 2124a-1124n may be connected to I/O controller 2123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 2124a-1124n may also be a head-mounted display (HMD). In some embodiments, display devices 2124a-1124n or the corresponding I/O controllers 2123 may be controlled through or have hardware support for OPENGL or DIRECTX API or other graphics libraries.

In some embodiments, the computing device 2100 may include or connect to multiple display devices 2124a-1124n, which each may be of the same or different type and/or form. As such, any of the I/O devices 2130a-1130n and/or the I/O controller 2123 may include any type and/or form of suitable hardware, software, or combination of hardware and software to support, enable or provide for the connection and use of multiple display devices 2124a-1124n by the computing device 2100. For example, the computing device 2100 may include any type and/or form of video adapter, video card, driver, and/or library to interface, communicate, connect or otherwise use the display devices 2124a-1124n. In one embodiment, a video adapter may include multiple connectors to interface to multiple display devices 2124a-1124n. In other embodiments, the computing device 2100 may include multiple video adapters, with each video adapter connected to one or more of the display devices 2124a-1124n. In some embodiments, any portion of the operating system of the computing device 2100 may be configured for using multiple displays 2124a-1124n. In other embodiments, one or more of the display devices 2124a-1124n may be provided by one or more other computing devices 2100a or 2100b connected to the computing device 2100, via the network 2104. In some embodiments software may be designed and constructed to use another computer's display device as a second display device 2124a for the computing device 2100.

Referring again to FIG. 21(c), the computing device 2100 may comprise a storage device 2128 (e.g. one or more hard disk drives or redundant arrays of independent disks) for storing an operating system or other related software, and for storing application software programs such as any program related to the software 2120. Examples of storage device 2128 include, e.g., hard disk drive (HDD); optical drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 2128 may be non-volatile, mutable, or read-only. Some storage device 2128 may be internal and connect to the computing device 2100 via a bus 2150. Some storage device 2128 may be external and connect to the computing device 2100 via an I/O device 2130 that provides an external bus. Some storage device 2128 may connect to the computing device 2100 via the network interface 2118 over a network 2104. Some client devices 2100 may not require a non-volatile storage device 2128 and may be thin clients or zero clients 2102. Some storage device 2128 may also be used as an installation device 2116, and may be suitable for installing software and programs.

Client device 2100 may also install software or application from an application distribution platform. An application distribution platform may facilitate installation of software on a client device 2102. An application distribution platform may include a repository of applications on a server 2106 or a cloud 2108, which the clients 2102a-2102n may access over a network 2104. An application distribution platform may include application developed and provided by various developers. A user of a client device 2102 may select, purchase and/or download an application via the application distribution platform.

Furthermore, the computing device 2100 may include a network interface 2118 to interface to the network 2104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 2100 communicates with other computing devices 2100' via any type and/or form of gateway or tunneling protocol e.g. Secure Socket Layer (SSL) or Transport Layer Security (TLS). The network interface 2118 may comprise a built-in network adapter, network interface card, PCMCIA network card, EXPRESSCARD network card, card bus network adapter, wireless network adapter, USB network adapter, modem or any other device suitable for interfacing the computing device 2100 to any type of network capable of communication and performing the operations described herein.

A computing device 2100 of the sort depicted in FIGS. 21 (*b*) and 21 (*c*) may operate under the control of an operating system, which controls scheduling of tasks and access to system resources. The computing device 2100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 2100 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication. The computer system 2100 has sufficient processor power and memory capacity to perform the operations described herein. In some embodiments, the computing device 2100 may have different processors, operating systems, and input devices consistent with the device.

In some embodiments, the computing device 2100 is a gaming system. In some embodiments, the computing device 2100 is a digital audio player. Some digital audio players may have other functionality, including, e.g., a gaming system or any functionality made available by an application from a digital application distribution platform. In some embodiments, the computing device 2100 is a portable media player or digital audio player supporting file formats including. In some embodiments, the computing device 2100 is a tablet. In other embodiments, the computing device 2100 is an eBook reader. In some embodiments, the communications device 2102 includes a combination of devices, e.g. a smartphone combined with a digital audio player or portable media player. For example, one of these embodiments is a smartphone. In yet another embodiment, the communications device 2102 is a laptop or desktop computer equipped with a web browser and a microphone and speaker system, e.g. a telephony headset. In these embodiments, the communications devices 2102 are web-enabled and can receive and initiate phone calls. In some embodiments, a laptop or desktop computer is also equipped with a webcam or other video capture device that enables video chat and video call. In some embodiments, the communication device 2102 is a wearable mobile computing device.

In some embodiments, the status of one or more machines 2102, 2106 in the network 2104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

The description herein including modules emphasizes the structural independence of the aspects of the image segmentation system, and illustrates one grouping of operations and responsibilities of the image segmentation system. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A method of segmenting biomedical images, comprising:
   identifying, by a computing system having one or more processors, for at least one tile of a biomedical image, a first patch at a first magnification factor and a second patch at a second magnification factor;
   applying, by the computing system, a trained segmentation model to the first patch and the second patch to generate a segmented tile, the trained segmentation model comprising a plurality of networks, the plurality of networks comprising:

a first network comprising a first plurality of decoders arranged across a first plurality of columns to generate a first plurality of feature maps using the first patch at the first magnification factor;

a second network comprising a second plurality of decoders arranged across a second plurality of columns to generate a second feature map using the second patch at the second magnification factor and the first plurality of feature maps transferred from the first plurality of decoders of the first network in accordance with a shift between the first plurality of columns and the second plurality of columns; and a terminal block to generate the segmented tile using the second feature map generated by the second network; and storing, by the computing system, the segmented tile identifying a region of interest within the at least one tile of the biomedical image.

2. The method of claim 1, wherein the plurality of networks of the trained segmentation model comprises a third network to:

generate a third plurality of feature maps using a third patch of the at least one tile at a third magnification factor; and provide the third plurality of feature maps to the second plurality of decoders of the second network to generate the second feature map.

3. The method of claim 1, wherein each of the second plurality of decoders of the second network comprises is further configured to process a corresponding feature map of the first plurality of feature maps transferred from a corresponding decoder of the first plurality of decoders of the first network in accordance with the shift.

4. The method of claim 1, wherein the second network comprises a plurality of concatenators to combine the first plurality of feature maps from the first network with a corresponding plurality of intermediate feature maps in generating the second feature map.

5. The method of claim 1, further comprising generating, by the computing system, a segmented biomedical image using a plurality of segmented tiles from applying the trained segmentation model applied to a plurality of patches at corresponding plurality of magnification factors, each patch identified from a corresponding tile of a plurality of tiles of the biomedical image.

6. The method of claim 1, further comprising obtaining, by the computing system, the biomedical image derived from a histopathological image preparer, the biomedical image divided into a plurality of tiles, each tile of the plurality of tiles corresponding to a respective portion of the biomedical image.

7. A method of training networks for segmenting biomedical images, comprising:

identifying, by a computing system having one or more processors, a training dataset comprising:

at least one sample tile from a sample biomedical image, the sample biomedical image having a region of interest; and an annotation labeling at least a portion of the region of interest, the annotation indicating that at least the portion of the region of interest within the at least one sample tile;

generating, by the computing system, for the at least one sample tile of the sample biomedical image, a first patch at a first magnification factor and a second patch at a second magnification factor;

training, by the computing system, a segmentation model using the first patch, the second patch, and the annotation of the at least one sample tile, the segmentation model comprising a plurality of networks, the plurality of networks comprising:

a first network comprising a first plurality of decoders arranged across a first plurality of columns to generate a first plurality of feature maps using the first patch at the first magnification factor;

a second network comprising a second plurality of decoders arranged across a second plurality of columns to generate a second feature map using the second patch at the second magnification factor and the first plurality of feature maps transferred from the first plurality of decoders of the first network, in accordance with a shift between the first plurality of columns and the second plurality of columns; and a terminal block to generate a segmented tile using the second feature map generated by the second network, the segmented tile compared to the annotation.

8. The method of claim 7, wherein training the segmentation model further comprises:

determining, by the computing system, an error metric between the segmented tile and the at least one sample tile based on the annotation labeling the portion of the region of interest; and updating, by the computing system, at least one parameter in the plurality of networks of the segmentation model using the error metric.

9. The method of claim 7, wherein the plurality of networks of the segmentation model comprises a third network to:

generate a third plurality of feature maps using a third patch of the at least one sample tile at a third magnification factor; and provide the third plurality of feature maps to the second plurality of decoders of the second network to generate the second feature map.

10. The method of claim 7, wherein each of the second plurality of decoders of the second network is further configured to process a corresponding feature map of the first plurality of feature maps transferred from a corresponding decoder of the first plurality of decoders of the first network in accordance with the shift.

11. The method of claim 7, wherein the first network comprises a plurality of encoders arranged across the first plurality of columns, each of the plurality of encoders to provide a corresponding feature map of the first plurality of feature maps from a corresponding decoder of the first plurality of decoders to a respective decoder of the second plurality of decoders in the second network.

12. The method of claim 7, wherein the annotation of the training dataset labels the portion less than an entirety of the region of interest within the sample biomedical image, the annotation separated from an edge of the entirety of the region of interest.

13. The method of claim 7, further comprising generating, by the computing system, a segmented biomedical image using a plurality of segmented tiles from applying the segmentation model applied to a plurality of patches at corresponding plurality of magnification factors, each patch identified from a corresponding tile of a plurality of tiles of the sample biomedical image.

14. The method of claim 7, wherein the sample biomedical image is derived from a histopathological image preparer, the sample biomedical image divided into a plurality of tiles, each tile of the plurality of tiles corresponding to a respective portion of the sample biomedical image.

15. A system for segmenting biomedical images, comprising:
a computing system having one or more processors coupled with memory, configured to:
identify, for at least one tile of a biomedical image, a first patch at a first magnification factor and a second patch at a second magnification factor;
apply a trained segmentation model to the first patch and the second patch to generate a segmented tile, the trained segmentation model comprising a plurality of networks, the plurality of networks comprising:
a first network comprising a first plurality of decoders arranged across a first plurality of columns to generate a first plurality of feature maps using the first patch at the first magnification factor;
a second network comprising a second plurality of decoders arranged across a second plurality of columns to generate a second feature map using the second patch at the second magnification factor and the first plurality of feature maps transferred from the first plurality of decoders of the first network in accordance with a shift between the first plurality of columns and the second plurality of columns; and
a terminal block to generate the segmented tile using the second feature map generated by the second network; and
store the segmented tile identifying a region of interest within the at least one tile of the biomedical image.

16. The system of claim 15, wherein the plurality of networks of the trained segmentation model comprises a third network to:
generate a third plurality of feature maps using a third patch of the at least one tile at a third magnification factor; and
provide the third plurality of feature maps to the second plurality of decoders of the second network to generate the second feature map.

17. The system of claim 15, wherein each of the second plurality of decoders of the second network is further configured to process a corresponding feature map of the first plurality of feature maps transferred from a corresponding decoder of the first plurality of decoders of the first network in accordance with the shift.

18. The system of claim 15, wherein the first network comprises a plurality of encoders arranged across the first plurality of columns, each of the plurality of encoders to provide a corresponding feature map of the first plurality of feature maps from a corresponding decoder of the first plurality of decoders to a respective decoder of the second plurality of decoders in the second network.

19. The system of claim 15, wherein the computing system is further configured to generate a segmented biomedical image using a plurality of segmented tiles from applying the trained segmentation model applied to a plurality of patches at corresponding plurality of magnification factors, each patch identified from a corresponding tile of a plurality of tiles of the biomedical image.

20. The system of claim 15, wherein the computing system is further configured to obtain the biomedical image derived from a histopathological image preparer, the biomedical image divided into a plurality of tiles, each tile of the plurality of tiles corresponding to a portion of the biomedical image.

21. The method of claim 1, wherein the first network comprises a plurality of encoders arranged across the first plurality of columns, each of the plurality of encoders to provide a corresponding feature map of the first plurality of feature maps from a corresponding decoder of the first plurality of decoders to a respective decoder of the second plurality of decoders in the second network.

* * * * *